(12) United States Patent
Poulain et al.

(10) Patent No.: US 12,522,592 B2
(45) Date of Patent: Jan. 13, 2026

(54) ERAP INHIBITORS

(71) Applicants: UNIVERSITE DE LILLE, Lille (FR); INSTITUT PASTEUR DE LILLE, Lille (FR); INSTITUT NATIONAL DE LA SANTE ET DE LA RECHERCHE MEDICALE, Paris (FR)

(72) Inventors: Rebecca Deprez Poulain, Lille (FR); Ronan Gealageas, Mauges-sur-Loire (FR); Virgyl Camberlein, Dunkirk (FR); Charlotte Tabey Fleau, Villeneuve d'Ascq (FR); Valentin Guillaume, Faches-Thumesnil (FR); Damien Bosc, Haubourdin (FR); Benoit Deprez, Lille (FR); Pierre Sierocki, Mouvaux (FR)

(73) Assignees: UNIVERSITE DE LILLE, Lillie (FR); INSTITUT PASTEUR DE LILLE, Lillie (FR); INSTITUT NATIONAL DE LA SANTE ET DE LA RECHERCHE MEDICALE, Paris (FR)

( * ) Notice: Subject to any disclaimer, the term of this patent is extended or adjusted under 35 U.S.C. 154(b) by 412 days.

(21) Appl. No.: 18/267,432

(22) PCT Filed: Dec. 17, 2021

(86) PCT No.: PCT/EP2021/086617
§ 371 (c)(1),
(2) Date: Jun. 14, 2023

(87) PCT Pub. No.: WO2022/129589
PCT Pub. Date: Jun. 23, 2022

(65) Prior Publication Data
US 2024/0101542 A1  Mar. 28, 2024

(30) Foreign Application Priority Data

Dec. 18, 2020 (EP) .................................. 20306621

(51) Int. Cl.
| | | |
|---|---|---|
| C07D 409/14 | (2006.01) | |
| A61K 31/453 | (2006.01) | |
| A61K 45/06 | (2006.01) | |
| C07D 409/12 | (2006.01) | |
| C07D 417/12 | (2006.01) | |

(52) U.S. Cl.
CPC ............ *C07D 409/14* (2013.01); *A61K 45/06* (2013.01); *C07D 409/12* (2013.01); *C07D 417/12* (2013.01)

(58) Field of Classification Search
CPC .......................... C07D 409/14; A61K 31/453
USPC ....................................................... 514/326
See application file for complete search history.

(56) References Cited

FOREIGN PATENT DOCUMENTS

| | | |
|---|---|---|
| GR | 20130100582 | 10/2014 |
| WO | 2020104822 A1 | 5/2020 |
| WO | 2020225569 A1 | 11/2020 |

OTHER PUBLICATIONS

Loredana Cifaldi, et al., "Natural Killer Cells Efficiently Reject Lymphoma Silenced for the Endoplasmic Reticulum Aminopeptidase Associated with Antigen Processing", American Association for Cancer Research, vol. 71(5), Mar. 1, 2011, pp. 1597-1606.

Gianna Elena Hammer, et al., "In the absence of aminopeptidase ERAAP, MHC class I molecules present many unstable and highly immunogenic peptides", Nature Immunology, vol. 8, No. 1, Jan. 2007, pp. 101-108.

Yoong Wearn Lim, et a., "Germline genetic polymorphisms influence tumor gene expression and immune cell Infiltration"; PNAS vol. 115, No. 50, Oct. 23, 2018, pp. 11701-11710.

Loredana Cifaldi, et al. "ERAP1 Regulates Natural Killer Cell Function by Controlling the Engagement of Inhibitory Receptors", American Association for Cancer, vol. 75(5), Mar. 1, 2015, pp. 824-834.

Despoina Koumantou, et al., "Editing the immunopeptidome of melanoma cells using a potent inhibitor of endoplasmic reticulum aminopeptidase 1 (ERAP1)", Springer Publishing, Jun. 20, 2019 (17 pages).

(Continued)

*Primary Examiner* — Raymond J Henley, III
(74) *Attorney, Agent, or Firm* — Thomas | Horstemeyer, LLP

(57) ABSTRACT

The present disclosure relates to novel compounds of formula (I) which are useful as inhibitors of endoplasmic reticulum aminopeptidases (ERAP), in particular as inhibitors of ERAP2. The disclosure also relates to the therapeutic use of these compounds, in particular the use of these compounds in the treatment or prophylaxis of proliferative disorders, autoinflammatory disorders and autoimmune disorders.

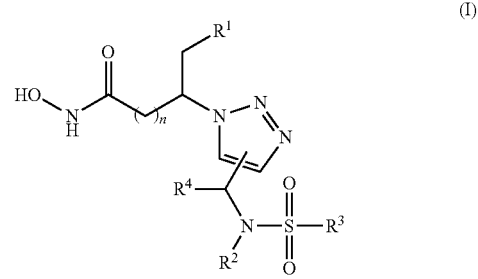

(I)

17 Claims, 1 Drawing Sheet

(56) References Cited

OTHER PUBLICATIONS

Edward James, et al., "Induction of Protective Antitumor Immunity through Attenuation of ERAAP Function", The Journal of Immunology, 2013; 190: pp. 5839-5846, prepublished online Apr. 22, 2013.

Thomas Serwold, et al., "ERAAP customizes peptides for MHC class I molecules in the endoplasmic reticulum", Nature Publishing Group, vol. 419, Oct. 3, 2002, pp. 480-483.

Robert T. Manguso, et al., "In vivo CRISPR screening identifies Ptpn2 as a cancer immunotherapy target", Macmillan Publishers Limited, part of Springer Nature, vol. 547, Jul. 27, 2017, pp. 413-429.

Loredana Saveanu, et al., "Concerted peptide trimming by human ERAP1 and ERAP2 aminopeptidase complexes in the endoplasmic reticulum", Nature Immunology, vol. 6, No. 7, Jul. 2005, pp. 689-697.

Jose A. Lopez de Castro, How ERAP1 and ERAP2 Shape the Peptidomes of Disease-Associated MHC-I Proteins, Frontiers in Immunology, vol. 9, Article 2463, Oct. 2018, pp. 1-17.

Yufeng Yao, et al., "Influence of ERAP1 and ERAP2 gene polymorphisms on disease susceptibility in different populations", Human Immunology, vol. 80 (2019), pp. 325-334.

Aimee L. Hanson, et al., "Genetic Variants in ERAP1 and ERAP2 Associated With Immune-Mediated Diseases Influence Protein Expression and the Isoform Profile", Arthritis & Rheumatology, vol. 70, No. 2, Feb. 2018, pp. 255-265.

Mirco Compagnone, et al., "Regulation of ERAP1 and ERAP2 genes and their disfunction in human cancer", Human Immunology, vol. 80 (2019), pp. 318-324.

Efthalia Zervoudi, et al., "Rationally designed inhibitor targeting antigen-trimming aminopeptidases enhances antigen presentation and cytotoxic T-cell responses", PNAS Early Edition, Oct. 18, 2013, pp. 1-6.

Zachary Maben, et al., "Discovery of Selective Inhibitors of Endoplasmic Reticulum Aminopeptidase 1", Journal of Medicinal Chemistry, vol. 63, 2020, pp. 103-121.

Liye Chen, et al., "Silencing or inhibition of endoplasmic reticulum aminopeptidase 1 (ERAP1) suppresses free heavy chain expression and Th17 responses in ankylosing spondylitis", BMJ Group, Nov. 8, 2017, pp. 916-923.

Irma Saulle, et al., "A New ERAP2/Iso3 Isoform Expression Is Triggered by Different Microbial Stimuli in Human Cells. Could It Play a Role in the Modulation of SARS-CoV-2 Infection?", Cells (2020), vol. 9, No. 1951, pp. 1-14.

Dimitris Georgiadis, et al. "Inhibitors of ER Aminopeptidase 1 and 2: from Design to Clinical Application", Bentham Science Publishers, 2014, pp. 1-15.

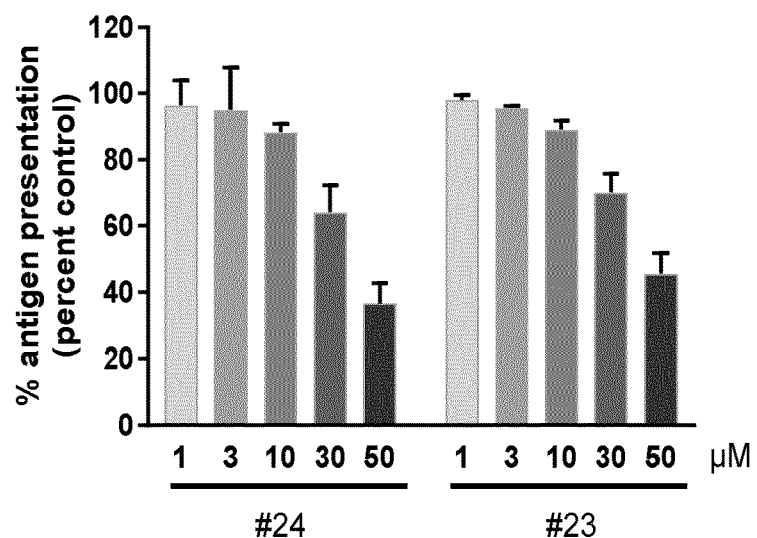

ERAP INHIBITORS

CROSS REFERENCE TO RELATED APPLICATIONS

This application is the 35 U.S.C. § 371 national stage application of PCT Application No. PCT/EP2021/086617, filed Dec. 17, 2021, which application claims the benefit of European Application No. EP 20306621.2 filed Dec. 18, 2020, both of which are hereby incorporated by reference herein in their entireties.

FIELD OF THE INVENTION

The present invention relates to novel compounds which are useful as inhibitors of endoplasmic reticulum aminopeptidases (ERAP), in particular as inhibitors of ERAP2. This invention also relates to the therapeutic use of these compounds.

BACKGROUND OF THE INVENTION

The elemental task of the adaptive immune system is to fight against diseases by the recognition of infected or abnormal cells. For that the immune system detects antigenic peptides (epitopes) on cell surface using blood cells that implement specialized cytotoxic responses. Antigenic peptides are produced by proteolytic hydrolysis of either intracellular proteins or previously endocytosed extracellular proteins. The composition of the pool of presented peptides (repertoire) is key to a well-functioning immune system and changes in the processing of peptides promote diseases. For instance, tumour cells typically halt the generation of antigenic peptides, while overactive processing produces epitopes that lead the immune system to cause auto-immune, auto-inflammatory diseases.

A significant proportion of the precursor peptides are processed by the endoplasmic reticulum (ER) aminopeptidases ERAP enzymes (ERAP1, ERAP2, and ERAP1,2 heterodimer; referred to as ERAP). ERAP trim the N-terminally extending precursors to mature epitopes.[1,2] These epitopes are loaded onto HLA class I molecules (MHC-I) and presented on the surface of antigen-presenting and tumour cells to instruct the immune system and engage immune response. Importantly some antigenic epitopes can be also destroyed by ERAP into peptides that are no longer able to bind the MHC-class I molecules. The overall composition of the antigen repertoire can have profound effects on cytotoxic response of the immune system and ERAP enzymes have emerged as key proteins for influencing its formation (and adjust T-cell and NK-cell cytotoxic responses.[3,4]

Polymorphisms in ERAP1 and ERAP2 have been associated with predisposition to various human diseases.[5] In particular these diseases include viral infections, cancer and proliferative diseases, autoimmune diseases.[6,7]

Examples of relevant autoimmune diseases are, but not limited to, MHC-Class I inflammatory diseases spondyloarthritis, Behcet's disease, Birdshot uveitis, psoriasis, type-1 diabetes. These correlations have been associated to changes in the activity and specificity of ERAP.

It has been shown that ERAP are important targets to boost T-cell and NK-cell cytotoxic responses in cancer.[8,9,10] The ERAP genotype associates with the immune infiltration of tumours, and strongly predicts the overall survival in cancer. Recent studies highlight that low levels of ERAP2 can be associated with improved response to anti-PD-L1 (immunotherapy) in patients with the luminal subtype of bladder cancer.[11] In the same line, an in vivo loss-of-function CRISP genetic screen showed that deletion of ERAP1 in a mouse transplantable tumor model increased the efficacy of anti-PD-1 immunotherapy.[12] Finally, ERAP modulate response to infections (HCV, HCMV, influenza virus, HPV, HIV, SARS-CoV-2, tuberculosis).[13,14]

ERAP inhibitors have been shown to modulate antigen presentation and immune responses.[15,16,17] An inhibitor was shown to suppress a Th17 response in a cellular model of spondyloarthritis.[18] The same compound modulates the immunopeptidome of patient cancer cells.[19]

These clinical and preclinical results enlighten that ERAP enzymes have important functions in vivo, and support that they are targets for therapeutic targeting of these diseases.

Accordingly, there is thus a need for efficient ERAP inhibitors, in particular for selective ERAP inhibitors. More specifically, it would be advantageous to provide selective and efficient ERAP inhibitors for use in the treatment or prophylaxis of disorders in which recognition by T-cells and/or NK-cells of antigenic peptides loaded on MHC-1 is implicated, such as proliferative, autoimmune and autoinflammatory disorders.

SUMMARY OF THE INVENTION

The present invention relates to compounds of formula (I):

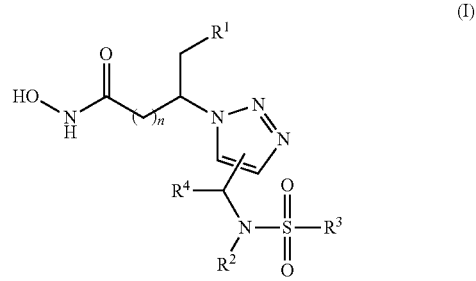

wherein:

n is 0 or 1;

$R^1$ is selected from the group consisting of phenyl, naphthalenyl, indolyl and benzodioxolyl, wherein said phenyl, naphthalenyl, indolyl and benzodioxolyl may be substituted by one or more substituents selected from the group consisting of hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy;

$R^3$ is a 5- or 6-membered heteroaryl comprising one sulfur atom and optionally one further nitrogen, sulfur or oxygen atom, wherein said 5- or 6-membered heteroaryl may be substituted by one or more substituents selected from the group consisting of halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl;

$R^2$ is hydrogen, $C_1$-$C_6$-alkyl or $C_3$-$C_6$-cycloalkyl; and $R^4$ is selected from the group consisting of hydrogen, $C_1$-$C_6$-alkyl, —$CH_2$—O—$R^{a4}$, —$CH_2$—C(=O)$R^{b4}$ and —$CH_2$—NH—C(=O)$R^{c4}$, wherein $R^{a4}$ is hydrogen or $C_1$-$C_6$-alkyl, $R^{b4}$ is hydroxyl, $C_1$-$C_6$-alkoxy, amino or $C_1$-$C_6$-alkylcarbonylamino and $R^{c4}$ is $C_1$-$C_6$-alkoxy, or $R^2$ and $R^4$ form together with the nitrogen and carbon atoms to which they are attached a 5- or 6-membered heteroaryl selected from pyrrolidinyl morpholinyl, thiazolidinyl and piperidinyl; or hydrates, solvates, or salts thereof and to pharmaceutical compositions comprising thereof.

The present invention also relates to the compounds of formula (I) for use in medicine, in particular for use in treatment or prophylaxis of proliferative disorders, autoinflammatory disorders and autoimmune disorders.

Further aspects of the invention are as disclosed herein and in the claims.

FIGURE

FIG. 1 represents the cellular effect of representative compounds 23 and 24 according to the invention, at increasing concentrations on antigen presentation of model antigen ovalbumin-specific peptide SIINFEKL. Data was normalized to the control.

DESCRIPTION OF THE INVENTION

Compounds of Formula (I)

The present invention relates to compounds of formula (I):

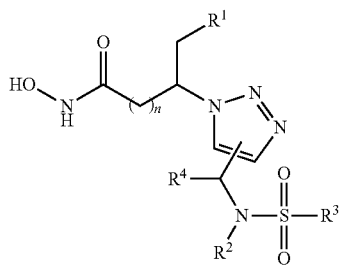

wherein:

n is 0 or 1;

$R^1$ is selected from the group consisting of phenyl, naphthalenyl, indolyl and benzodioxolyl, wherein said phenyl, naphthalenyl, indolyl and benzodioxolyl may be substituted by one or more substituents selected from the group consisting of hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy;

$R^3$ is a 5- or 6-membered heteroaryl comprising one sulfur atom and optionally one further nitrogen, sulfur or oxygen atom, wherein said 5- or 6-membered heteroaryl may be substituted by one or more substituents selected from the group consisting of halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl;

$R^2$ is hydrogen, $C_1$-$C_6$-alkyl or $C_3$-$C_6$-cycloalkyl; and $R^4$ is selected from the group consisting of hydrogen, $C_1$-$C_6$-alkyl, —$CH_2$—O—$R^{a4}$, —$CH_2$—C(=O)$R^{b4}$ and —$CH_2$—NH—C(=O)$R^{c4}$, wherein $R^{a4}$ is hydrogen or $C_1$-$C_6$-alkyl, $R^{b4}$ is hydroxyl, $C_1$-$C_6$-alkoxy, amino or $C_1$-$C_6$-alkylcarbonylamino and $R^{c4}$ is $C_1$-$C_6$-alkoxy, or $R^2$ and $R^4$ form together with the nitrogen and carbon atoms to which they are attached a 5- or 6-membered heteroaryl selected from pyrrolidinyl morpholinyl, thiazolidinyl and piperidinyl;

or hydrates, solvates, or salts thereof.

Preferred salts in the context of the present invention are physiologically acceptable salts of the compounds of formula (I). However, the invention also encompasses salts which themselves are unsuitable for pharmaceutical applications but which can be used, for example, for the isolation or purification of the compounds according to the invention.

The term "physiologically acceptable salt" refers to a relatively non-toxic, inorganic or organic acid addition salt of the compound of formula (I). A suitable pharmaceutically acceptable salt of the compound of formula (I) may be, for example, an acid-addition salt of a compound of formula (I), such as an acid-addition salt with an inorganic acid, such as hydrochloric, hydrobromic, hydroiodic, sulfuric, bisulfuric, phosphoric, or nitric acid, for example, or with an organic acid, such as formic, acetic, acetoacetic, pyruvic, trifluoroacetic, propionic, butyric, hexanoic, heptanoic, undecanoic, lauric, benzoic, salicylic, 2-(4-hydroxybenzoyl)-benzoic, camphoric, cinnamic, cyclopentanepropionic, digluconic, 3-hydroxy-2-naphthoic, nicotinic, pamoic, pectinic, persulfuric, 3-phenylpropionic, picric, pivalic, 2-hydroxyethanesulfonate, itaconic, sulfamic, trifluoromethane sulfonic, dodecylsulfuric, ethansulfonic, benzenesulfonic, para-toluene sulfonic, methansulfonic, 2-naphthalenesulfonic, naphthalinedisulfonic, camphorsulfonic acid, citric, tartaric, stearic, lactic, oxalic, malonic, succinic, malic, adipic, alginic, maleic, fumaric, D-gluconic, mandelic, ascorbic, glucoheptanoic, glycerophosphoric, aspartic, sulfosalicylic, hemisulfuric, or thiocyanic acid, for example.

Solvates in the context of the invention are described as those forms of the compounds which form a complex in the solid or liquid state by coordination with solvent molecules. Hydrates are a specific form of the solvates in which the coordination is with water.

The present invention includes all possible stereoisomers of the compounds of formula (I) as single stereoisomer, or as any mixture of said stereoisomers, in any ratio. Isolation of a single stereoisomer, e.g. a single enantiomer or a single diastereomer, of a compound of formula (I) can be achieved by any suitable state of the art method, such as chromatography, especially chiral chromatography, for example.

The term "substituted by one or more" means that one or more hydrogen atoms on the designated atom or group are replaced with a selection from the indicated group, provided that the designated atom's normal valency under the existing circumstances is not exceeded. Combinations of substituents are permissible.

The term "$C_1$-$C_6$-alkyl" as used herein refers to straight or branched, saturated aliphatic chains of 1 to 6 carbon atoms and includes, but is not limited to, methyl, ethyl, propyl, isopropyl, butyl, isobutyl, t-butyl, pentyl, isopentyl, and hexyl.

The term "$C_1$-$C_6$-hydroxyalkyl" as used herein designates a $C_1$-$C_6$-alkyl as defined herein which is substituted by one or more hydroxyl groups. Examples of $C_1$-$C_6$-hydroxyalkyl groups include 2-hydroxy-ethyl.

The term "$C_1$-$C_6$-halogenoalkyl" as used herein designates a $C_1$-$C_6$-alkyl as defined herein, which is substituted by one or more halogens. Examples of $C_1$-$C_6$-halogenolalkyl include trifluoromethyl.

The term "halogen" as used herein designates chlorine, bromine, iodine and fluorine.

The term "$C_3$-$C_6$-cycloalkyl" as used herein designates a monocyclic ring system containing from 3 to 6 carbon atoms, where such groups can be saturated or unsaturated, but not aromatic. In some embodiments, cycloalkyl groups are fully saturated. Examples of monocyclic cycloalkyls include cyclopropyl, cyclobutyl, cyclopentyl, cyclohexyl.

The term "$C_1$-$C_6$-alkoxy" as used herein designates a group of formula —O—$C_1$-$C_6$-alkyl wherein $C_1$-$C_6$-alkyl is as defined herein.

The term "$C_1$-$C_6$-halogenoalkoxy" as used herein designates a group of formula —O—$C_1$-$C_6$-halogenoalkyl wherein $C_1$-$C_6$-halogenoalkyl is as defined herein.

The term "$C_1$-$C_6$-hydroxyoalkoxy" as used herein designates a group of formula —O—$C_1$-$C_6$-hydroxyalkyl wherein $C_1$-$C_6$-hydroxyalkyl is as defined herein.

The term "$C_1$-$C_6$-alkoxy-$C_1$-$C_6$-alkoxy" designates a group of formula —O—$C_1$-$C_6$-alkyl-O—$C_1$-$C_6$-alkyl wherein $C_1$-$C_6$-alkyl is as defined herein.

The term "carbamoyl" as used herein designates a group of formula —C(=O)—NH$_2$.

The term "$C_1$-$C_6$-alkylcarbamoyl" as used herein designates a group with formula —C(=O)NH—$C_1$-$C_6$-alkyl.

The term "$C_1$-$C_6$-alkylcarbonylamino" as used herein designates a group with formula —NH—C(=O)—$C_1$-$C_6$-alkyl wherein $C_1$-$C_6$-alkyl is as defined herein.

The term "$C_1$-$C_6$-aminoalkyl" as used herein designates a group with formula —(CH$_2$)$_n$—NH$_2$ with n ranging from 1 to 6.

The term "amidoxime" or "hydroxycarbamimidoyl" means a radical —C(=NH)NHOH or —C(=NOH)NH$_2$.

"indolyl" as used herein includes indol-1-yl, indol-2-yl, indol-3-yl, indol-4-yl, indol-5-yl, indol-6-yl and indol-7-yl.

"pyridyl" as used herein includes pyrid-2-yl, pyrid-3-yl and pyrid-4-yl.

"benzodioxolyl" as used herein includes 1,3-benzodioxol-5-yl and 1,4-benzodioxan-6-yl.

In the above formula (I), when $R^1$ is a phenyl, $R^1$ may be mono-, di- or tri-substituted. Substituents may be at any position on the phenyl ring (i.e. ortho, meta and/or para). The substituents may be as disclosed herein above. Typically, $R^1$ may be substituted by one or more substituents selected from the group consisting of hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy $C_1$-$C_6$-hydroxyalkoxy, ethynyl, carbamoyl, $C_1$-$C_6$-alkylcarbamoyl, polyoxyethylenyl and phenoxy. In some embodiments, $R^1$ is a phenyl which is monosubstituted in position ortho, meta or para.

In some embodiments, $R^1$ is a phenyl which is ortho- and para-substituted. In some embodiments, $R^1$ is a phenyl which is para-substituted and di-ortho substituted.

In some embodiments, $R^1$ is:

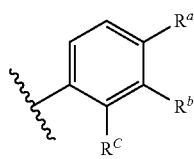

wherein $R^a$, $R^b$ and $R^c$ are independently selected from the group consisting of hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy.

In some embodiments, $R^1$ is:

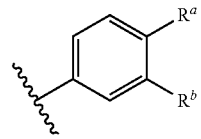

wherein $R^a$ and $R^b$ are independently selected from the group consisting of hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, ethynyl, carbamoyl, $C_1$-$C_6$-alkylcarbamoyl, polyoxyethylenyl, and phenoxy. In some embodiments, $R^a$ and $R^b$ are independently selected from the group consisting of hydrogen, hydroxyl, halogen, $C_1$-$C_6$-alkyl, $C_1$-$C_6$-alkoxy, $C_1$-$C_6$-halogenoalkoxy and phenoxy. In some embodiments, $R^a$ is hydroxyl, cyano, $C_1$-$C_6$-alkoxy (e.g. methoxy, t-butoxy), $C_1$-$C_6$-halogenoalkoxy (e.g. trifluoromethoxy), $C_1$-$C_6$-alkoxy-$C_1$-$C_6$-alkoxy (e.g. methoxyethoxy), amidoxime or phenoxy, typically hydroxyl, $C_1$-$C_6$-alkoxy (e.g. methoxy, t-butoxy), $C_1$-$C_6$-halogenoalkoxy (e.g. trifluoromethoxy) or phenoxy, and $R^b$ is hydrogen. In some embodiments, $R^a$ is hydroxyl or $C_1$-$C_6$-alkoxy (e.g. methoxy) and $R^b$ is halogen (e.g. chlorine or fluorine) or $C_1$-$C_6$-alkoxy (e.g. methoxy).

In the above formula (I), wherein $R^1$ is indolyl, $R^1$ is preferably indol-3-yl that may be substituted by one or more substituents as disclosed herein above. In some embodiments, $R^1$ is unsubstituted indol-3-yl.

In the above formula (I), wherein $R^1$ is naphthalenyl, $R^1$ is preferably naphthalen-2-yl that may be substituted by one or more substituents as disclosed herein above. In some embodiments, $R^1$ is unsubstituted naphthalen-2-yl.

In the above formula (I), wherein $R^1$ benzodioxolyl, $R^1$ is preferably 1,3-benzodioxol-5-yl that may be substituted by one or more substituents as disclosed herein above. In some embodiments, $R^1$ is unsubstituted 1,3-benzodioxol-5-yl.

In the above formula (I), $R^2$ may be hydrogen, $C_1$-$C_3$-alkyl (e.g. methyl), cyclopropyl, typically hydrogen or $C_1$-$C_3$-alkyl (e.g. methyl).

In the above formula (I), $R^3$ may be a 5- or 6-membered heteroaryl selected from the group consisting of thiophenyl, thiazolyl, isothiazolyl, thiopyranyl, dithiinyl and thiazinyl, wherein said 5- or 6-membered heteroaryl may be substituted as disclosed herein.

In some embodiments, in the above formula (I), $R^3$ may be a 5-membered heteroaryl selected from the group consisting of thiophenyl, thiazolyl and isothiazolyl, wherein said thiophenyl, thiazolyl and isothiazolyl may be substituted as disclosed herein.

In some embodiments, in the above formula (I), $R^3$ is a thiophenyl that may be substituted by one or more substituents selected from the group consisting of halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

In some embodiments, $R^3$ is

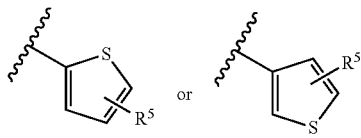

wherein $R^5$ is selected from the group consisting of hydrogen, halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

In some embodiments, $R^3$ is

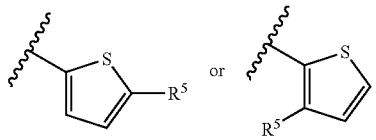

wherein $R^5$ is selected from the group consisting of hydrogen, halogen, $C_1$-$C_6$-alkyl, phenyl and pyridyl (e.g. pyrid-2-yl, pyrid-3-yl and pyrid-4-yl), wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

In some embodiments, $R^3$ is

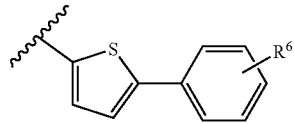

wherein $R^6$ is selected from the group consisting of hydrogen, halogen, $C_1$-$C_6$-alkyl, phenyl, pyridyl, $C_1$-$C_6$-aminoalkyl and $C_1$-$C_6$-alkylcarbamoyl.

In some embodiments, $R^3$ is thiazolyl wherein said thiazolyl may be substituted as disclosed herein.

In the above formula (I), $R^4$ may be hydrogen, $C_1$-$C_3$-alkyl (e.g. methyl) or $C_3$-$C_6$-alkyl (e.g. cyclopropyl), typically hydrogen or $C_1$-$C_3$-alkyl (e.g. methyl).

In some particular embodiments, the compounds of the invention are compounds of formula (I):

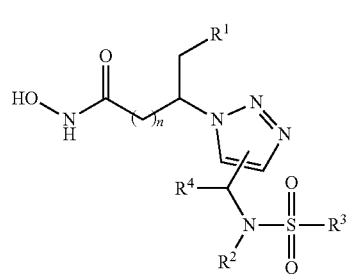

(I)

wherein:
n is 0 or 1;
$R^1$ is indol-3-yl, naphthalen-2-yl, 1,3-benzodioxol-5-yl or substituted phenyl as disclosed herein, in particular:

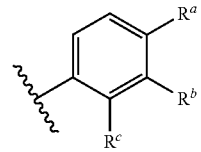

wherein $R^a$, $R^b$ and $R^c$ are independently selected from the group consisting of hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy, or

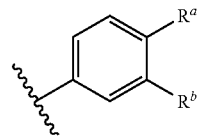

wherein $R^a$ and $R^b$ are independently selected from the group consisting of hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy, typically hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, ethynyl, carbamoyl, $C_1$-$C_6$-alkylcarbamoyl, polyoxyethylenyl and phenoxy;
$R^2$ is hydrogen, $C_1$-$C_6$-alkyl or $C_3$-$C_6$-cycloalkyl, preferably hydrogen or $C_1$-$C_3$-alkyl;
$R^3$ is a 5-membered heteroaryl selected from the group consisting of thiophenyl, thiazolyl and isothiazolyl, wherein said thiophenyl, thiazolyl and isothiazolyl may be substituted by one or more substituents selected from the group consisting of halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl, preferably $R^3$ is a thiophenyl that may be substituted as disclosed herein, more preferably $R^3$ is:

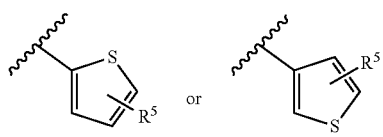

wherein $R^5$ is selected from the group consisting of hydrogen, halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl; and $R^4$ is selected from the group consisting of hydrogen, $C_1$-$C_6$-alkyl, —$CH_2$—O—$R^{a4}$, —$CH_2$—C(=O)$R^{b4}$ and —$CH_2$—NH—C(=O)$R^{c4}$, wherein $R^{a4}$ is hydrogen or $C_1$-$C_6$-alkyl, $R^{b4}$ is hydroxyl, $C_1$-$C_6$-alkoxy, amino or $C_1$-$C_6$-alkylcarbonylamino and $R^{c4}$ is $C_1$-$C_6$-alkoxy, preferably $R^4$ is hydrogen or $C_1$-$C_6$-alkyl; In some of these particular embodiments, $R^1$ is:

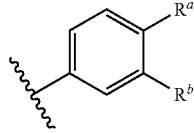

wherein $R^a$ and $R^b$ are independently selected from the group consisting of hydrogen, cyano, hydroxyl, halogen, $C_1$-$C_6$-alkyl, $C_1$-$C_6$-alkoxy, $C_1$-$C_6$-halogenoalkoxy and phenoxy. In some embodiments, $R^a$ is hydroxyl, cyano, $C_1$-$C_6$-alkoxy (e.g. methoxy, t-butoxy), $C_1$-$C_6$-halogenoalkoxy (e.g. trifluoromethoxy), $C_1$-$C_6$-alkoxy-$C_1$-$C_6$-alkoxy (e.g. methoxyethoxy), amidoxime or phenoxy, typically hydroxyl, $C_1$-$C_6$-alkoxy (e.g. methoxy, t-butoxy), $C_1$-$C_6$-halogenoalkoxy (e.g. trifluoromethoxy) or phenoxy, and $R^b$ is hydrogen. In some embodiments, $R^a$ is hydroxyl or $C_1$-$C_6$-alkoxy (e.g. methoxy) and $R^b$ is halogen (e.g. chlorine or fluorine) or $C_1$-$C_6$-alkoxy (e.g. methoxy).

In some of these particular embodiments, $R^3$ is

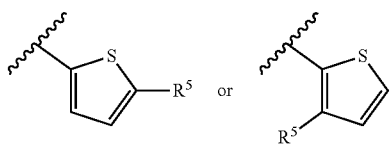

wherein $R^5$ is selected from the group consisting of hydrogen, halogen, $C_1$-$C_6$-alkyl, phenyl and pyridyl (e.g. pyrid-2-yl, pyrid-3-yl and pyrid-4-yl), wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

In some of these particular embodiments, $R^3$ is

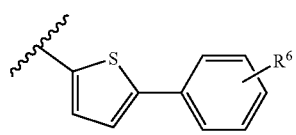

wherein $R^6$ is selected from the group consisting of hydrogen, halogen, $C_1$-$C_6$-alkyl, phenyl, pyridyl, $C_1$-$C_6$-aminoalkyl and $C_1$-$C_6$-alkylcarbamoyl.

In some embodiments, the compounds of the present invention are compounds of formula (I):

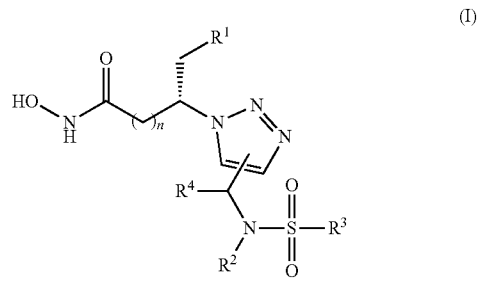

wherein n, $R^1$, $R^2$, $R^3$ and $R^4$ are as disclosed herein; or hydrates, solvates or salts thereof.

The present invention includes any of the compounds of formula (I) disclosed in the "Examples" section (i.e. any of the compounds 1 to 48 disclosed herein as well as their mixtures).

Synthesis of the Compounds of Formula (I)

The compounds of formula (I) can be prepared according to the following schemes (schemes 1, 2, 3 and 4). The schemes and procedures described below illustrate synthetic routes to the compounds of formula (I) of the invention and are not intended to be limiting. In the following, n, $R^1$, $R^2$, $R^3$ and $R^4$, unless provided differently, have the meaning as disclosed herein above.

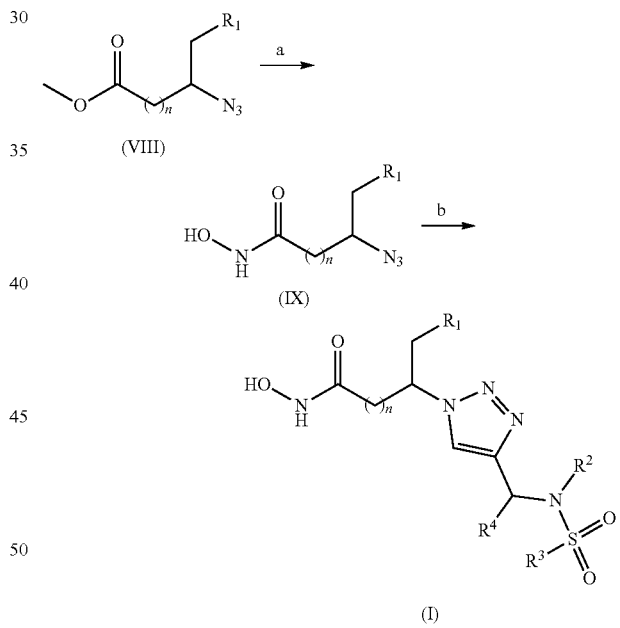

Scheme 1: Route for the preparation of compounds of formula (I) from compounds of formula (VIII), in which n, $R^1$, $R^2$, $R^3$ and $R^4$ have the meaning as defined supra. Compounds of formulae (VIII) can be readily prepared from commercially available precursors by known methods such as disclosed in the Examples section.

Reagent and conditions: (a) KCN, $NH_2OH/H_2O$ (1/1:w/w), methanol, room temperature, overnight; (b) Sulfonamides-Alkynes (compound of formula (V)), $CuSO_4·5H_2O$, Sodium ascorbate, dimethylformamide/$H_2O$ or dioxane/$H_2O$, room temperature, overnight.

Should the reaction sequence require an amino group to be protected, the amino protecting group can be cleaved at the final stage by any conventional methods. For instance, tert-butyloxycarbonyl group (Boc) can cleaved by adding hydrochloric acid to the compound of formula (I) (HCl 4N dioxane, 1 day, room temperature). The compound may be then isolated as potassium salt by adding potassium carbonate (pH 10) in water.

"Sulfonamides-alkynes" as used herein designates a compound of formula (V):

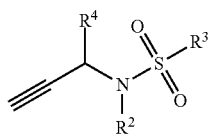

(V)

wherein $R^2$, $R^3$ and $R^4$ are as disclosed herein. Compounds of formulae (V) can be readily prepared from commercially available precursors by known methods such as disclosed in the Examples section. In some aspects, the present invention relates to a process for preparing a compound of formula (I) which comprises the steps of:

(1) reacting a compound of formula (VIII) in methanol with an aqueous solution of hydroxylamine to provide a compound of formula (IX);

(2) reacting the compound of formula (IX) with a compound of formula (V) in presence of copper sulfate pentahydrate and sodium ascorbate to provide a compound of formula (I);

(3) if the compound of formula (I) comprises an amino group protected by an amino protecting group (e.g. Boc), cleaving said amino protecting group and recovering the compound of formula (I) as potassium salt.

Route B

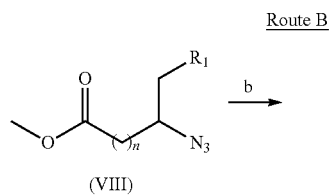

(VIII)

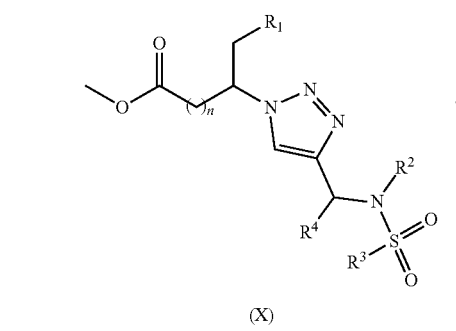

(X)

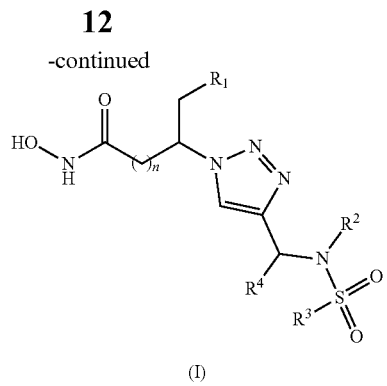

(I)

Scheme 2: Route for the preparation of compounds of formula (I) from compounds of formula (VIII), in which n, $R^1$, $R^2$, $R^3$ and $R^4$ have the meaning as defined supra. Compounds of formulae (VIII) can be readily prepared from commercially available precursors by known methods such as disclosed in the Examples section.

Reagent and conditions: (b) Sulfonamides-Alkynes (compound of formula (V), see supra), $CuSO_4 \cdot 5H_2O$, Sodium ascorbate, dimethylformamide/$H_2O$ or dioxane/$H_2O$, room temperature, overnight; (a) KCN, $NH_2OH/H_2O$ (1/1:w/w), methanol, room temperature, overnight.

As indicated above, should the reaction sequence require an amino group to be protected, the amino protecting group can be cleaved at the final stage by any conventional methods. For instance, tert-butyloxycarbonyl group (Boc) can cleaved by adding hydrochloric acid to the compound of formula (I) (HCl 4N dioxane, 1 day, room temperature). Trimethylsilyl groups can be cleaved by TBAF in THF. The compound may be then converted to potassium salt by adding potassium carbonate (pH 10) in water.

In some aspects, the present invention relates to a process for preparing a compound of formula (I) which comprises the steps of:

(1) reacting a compound of formula (VIII) with a compound of formula (V) in presence of copper sulfate pentahydrate and sodium ascorbate to provide a compound of formula (X);

(2) reacting the compound of formula (X) in methanol with an aqueous solution of hydroxylamine to provide a compound of formula (I).

Route C

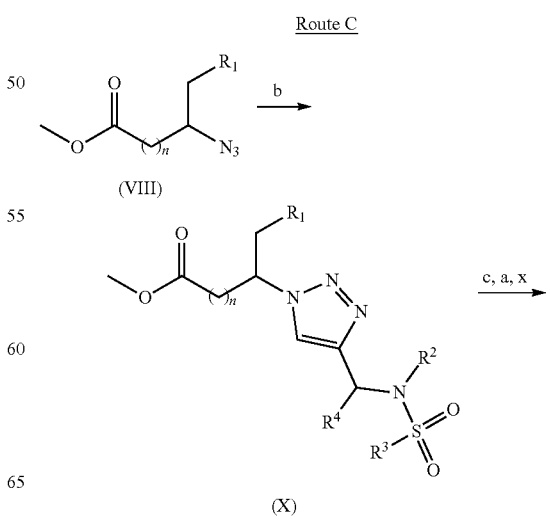

(VIII)

(X)

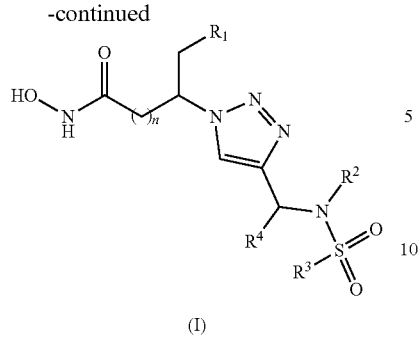

Scheme 3: Route for the preparation of compounds of formula (I) from compounds of formula (VIII), in which n, $R^1$, $R^2$, $R^3$ and $R^4$ have the meaning as defined supra. Compounds of formulae (VIII) can be readily prepared from commercially available precursors by known methods such as disclosed in the Examples section.

Reagent and conditions: (b) Sulfonamides-Alkynes (compound of formula (V)), $CuSO_4 \cdot 5H_2O$, Sodium ascorbate, dimethylformamide/$H_2O$ or dioxane/$H_2O$, room temperature, overnight; (c) Boronic acid ($R^5$—$B(OH)_2$ wherein $R^5$ is a phenyl or pyridyl optionally substituted as disclosed herein), $Pd(PPh_3)_4$, $Cs_2CO_3$, Dioxane/$H_2O$ (4/1:v/v), 70° C., 1 h45 to 4 h; (a) KCN, $NH_2OH/H_2O$ (1/1:w/w), methanol, room temperature, overnight. (x) if necessary for Boc deprotection: HCl 4N dioxane, 1 day, room temperature; then potassium carbonate (pH 10) in water.

As indicated above, should the reaction sequence require an amino group to be protected, the amino protecting group can be cleaved at the final stage by any conventional methods. For instance, tert-butyloxycarbonyl group (Boc) can cleaved by adding hydrochloric acid to the compound of formula (I) (HCl 4N dioxane, 1 day, room temperature). The compound may be then converted to potassium salt by adding potassium carbonate (pH 10) in water.

In some aspects, the present invention relates to a process for preparing a compound of formula (I) which comprises the steps of:
(1) reacting a compound of formula (VIII) with a compound of formula (V) wherein $R^3$ is bromine-substituted thiophenyl in presence of copper sulfate pentahydrate and sodium ascorbate to provide a compound of formula (X);
(2) reacting the compound of formula (X) with $R^5$—$B(OH)_2$ wherein $R^5$ is a phenyl or pyridyl, optionally substituted as disclosed herein, in presence of palladium tetrakis and with cesium carbonate and boronic acid to provide a compound of formula (XI):

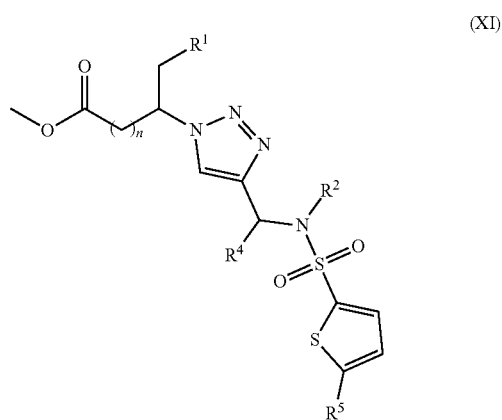

(3) reacting the compound of formula (XI) in methanol with an aqueous solution of hydroxylamine to provide a compound of formula (I);
(4) if the compound of formula (I) comprises an amino group protected by an amino protecting group (e.g. Boc), cleaving said amino protecting group and recovering the compound of formula (I) as potassium salt.

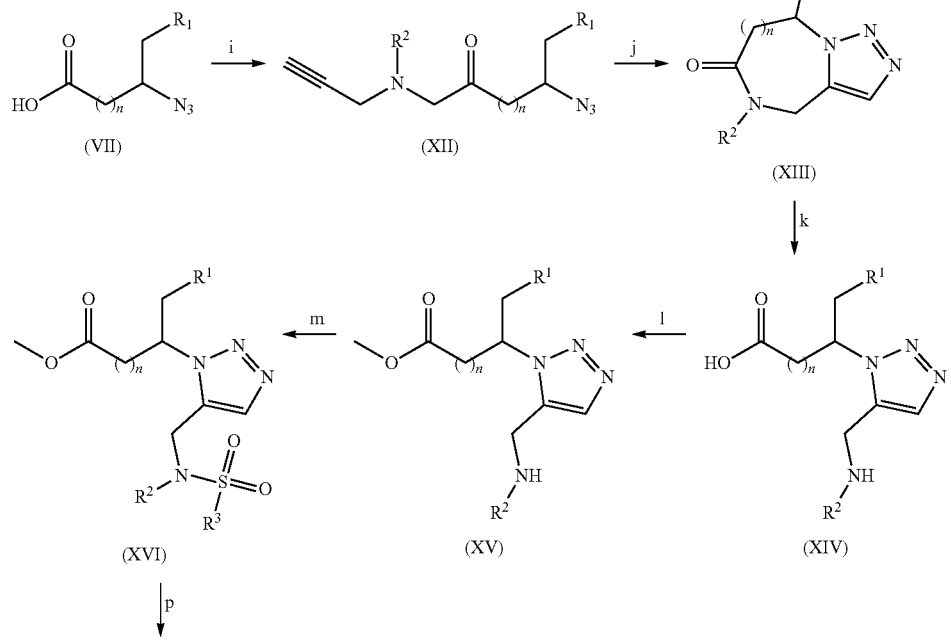

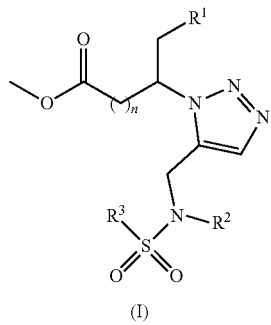

(I)

Scheme 4: Route for the preparation of compounds of formula (I) from compounds of formula (VII), in which n, $R^1$, $R^2$ and $R^3$ have the meaning as defined supra. Compounds of formulae (VII) can be readily prepared from commercially available precursors by known methods such as disclosed in the Examples section.

Reagent and conditions: (i) $R^2$—N-propargylamine, 2-(1H-Benzotriazole-1-yl)-1,1,3,3-tetramethyluronium hexafluorophosphate (HBTU), triethylamine, dimethylformamide, room temperature and overnight; (j) dimethylformamide, reflux, overnight; (k) HCl, $H_2O$, 85° C., MW, 3 h; (l) $SOCl_2$, methanol, 0° C. to room temperature, overnight; (m) $R^3$-SulfonylChloride ($R^3$—$SO_2Cl$), N,N-Diisopropylethylamine (DIPEA), dimethylformamide, 0° C. to room temperature, overnight; (p) KCN, $NH_2OH/H_2O$ (1/1:w/w), methanol, room temperature, overnight.

In some aspects, the present invention relates to a process for preparing a compound of formula (I) which comprises the steps of:

(1) reacting a compound of formula (VII) and $R^2$—N-propargylamine in presence of 2-(1H-Benzotriazole-1-yl)-1,1,3,3-tetramethyluronium hexafluorophosphate (HBTU) and triethylamine to provide a compound of formula (XII);
(2) cyclizing the compound of formula (XII) to provide a compound of formula (XIII);
(3) ring opening of the compound of formula (XIII) to provide a compound of formula (XIV);
(4) reacting the compound of formula (XIV) with thionyl chloride to provide a compound of formula (XV);
(5) reacting the compound of formula (XV) with $R^3$-sulfonyl chloride to provide a compound of formula (XVI);
(6) reacting the compound of formula (XVI) in methanol with an aqueous solution of hydroxylamine to provide a compound of formula (I).

The compounds of formula (I) can be converted to any salt, particularly pharmaceutically acceptable salts, as described herein, by any method which is known to the person skilled in the art. Similarly, any salt of a compound of formula (I) can be converted into the free compound, by any method which is known to the person skilled in the art.

The present invention includes all possible salts of the compounds of the present invention as single salts, or as any mixture of said salts, in any ratio.

Intermediates

The present invention also relates to any intermediates as disclosed supra and in the Examples section.

Therapeutic Applications

In the following, the expression "a compound of formula (I)" refers to a compound of formula (I) as described herein, including any compounds of formula (I) disclosed in the "Examples" section, as well as any salts, hydrates, solvates, isomers, mixtures of isomers in any ratio and any combinations thereof. Therefore, the term "a compound of formula (I)" may refer to a single compound of formula (I) or a combination of two or more compounds of formula (I) or salts, hydrates, solvates, isomers or mixtures of isomers thereof.

The compounds of formula (I) have been found to be efficient inhibitors of ERAP, in particular to be efficient ERAP2 inhibitors. "Inhibitors" refer to molecules that are able to reduce or suppress the activity of the enzyme. The compounds of formula (I) affect the antigenic peptide repertoire presented to cytotoxic T-cells and/or NK-cells. Resultantly, the compounds of formula (I) may be useful in medicine. In particular, the compounds of formula (I) may be useful for modulating the adaptive immune response in humans and animals. More specifically, the compounds of formula (I) may be useful for the treatment or prophylaxis of disorders in which recognition by T-cells and/or NK-cells of antigenic peptides loaded on MHC-1 is implicated, such as proliferative disorders, autoinflammatory disorders and autoimmune disorders. In other terms, the compounds of formula (I) may be useful for the treatment or prophylaxis of disorders in which ERAP2 activity is implicated. The compounds of formula (I) may also be useful for the treatment or prophylaxis of infectious disorders.

The term "disorder" as used herein refers to a disease, condition or illness.

The term "treatment" as used herein refers to combating, alleviating, reducing, relieving, suppressing, repelling, healing or improving the condition of a disorder.

The terms "prophylaxis" as used herein refers to the avoidance or reduction of the risk of contracting, experiencing, suffering from or having a disorder.

The treatment or prophylaxis of a disorder may be partial or complete.

In one aspect, the present invention relates to a compound of formula (I) for use in medicine.

In accordance with a further aspect, the present invention relates to a compound of formula (I) for use in the treatment or prophylaxis of a disorder in which recognition by T-cells and/or NK-cells of antigenic peptides loaded on MHC-1 is implicated/plays a role. In other terms, the present invention relates to a compound of formula (I) for use in the treatment or prophylaxis of a disorder in which ERAP2 activity is implicated.

In another aspect, the present invention relates to a compound of formula (I) for use in the treatment or prophylaxis of a disorder wherein abnormal activity of ERAPs is observed.

In another aspect, the present invention relates to a compound of formula (I) for modulating the antigenic peptide repertoire presented by MHC-1.

In another aspect, the present invention relates to a compound of formula (I) for use as ERAP2 inhibitors.

In another aspect, the present invention relates to a compound of formula (I) for use in the treatment or prophylaxis of proliferative disorders, autoinflammatory disorders and autoimmune disorders. In other words, the present invention relates to the use of a compound of formula (I) for the treatment or prophylaxis of proliferative disorders, autoinflammatory disorders and auto immune disorders.

In one embodiment, the present invention relates to a compound of formula (I) for use in the treatment or prophylaxis of a proliferative disorder, such as cancers. Cancers include, but are not limited to, colon cancer, breast cancer, kidney cancer, liver cancer, pancreatic cancer, prostate cancer, bladder cancer, glioblastoma, lung cancer (e.g. non-small cell lung cancer), neuroblastoma, inflammatory myofibroblastic tumor, leukemia (e.g. acute myeloid leukemia, myelodysplastic syndrome or chronic myelomonocytic leukemia), melanoma, and lymphoma (e.g. diffuse B-cell lymphoma or anaplastic large-cell lymphoma). In particular, cancers include melanoma, non-small cell lung cancer, head and neck squamous cell carcinoma, squamous cell lung cancer, renal cell carcinoma, Hodgkin's lymphoma, cutaneous squamous cell carcinoma (CSCC), urothelial carcinoma, merkel-cell carcinoma, urothelial carcinoma, renal cell carcinoma, colorectal cancer, hepatocellular carcinoma and malignant pleural mesothelioma.

In particular, the compound of formula (I) may be useful in cancer immunotherapy and/or radiotherapy.

In one embodiment, the present invention relates to a compound of formula (I) for use in the treatment or prophylaxis of an autoimmune disorder, such as spondyloarthritis (e.g. ankylosing spondylitis, psoriatic arthritis, reactive arthritis, enteropathic arthritis), psoriasis, Birdshot retinochoroidopathy or type-1 diabetes.

In one embodiment, the present invention relates to a compound of formula (I) for use in the treatment or prophylaxis of an autoinflammatory disorder, such as Behcet's disease or psoriasis.

In accordance with a further aspect, the present invention relates a method of treatment or prophylaxis of disorders, in particular proliferative disorders, inflammatory disorders and immune disorders, particularly cancers, spondyloarthritis (e.g. ankylosing spondylitis, psoriatic arthritis, reactive arthritis, enteropathic arthritis), Birdshot retinochoroidopathy, type-1 diabetes, Behcet's disease or psoriasis, using a therapeutically effective amount of a compound of formula (I). In other words, the present invention relates to a method of treating disorders, in particular proliferative disorders, autoimmune and autoinflammatory disorders, particularly cancers, spondyloarthritis (e.g. ankylosing spondylitis, psoriatic arthritis, reactive arthritis, enteropathic arthritis), Birdshot retinochoroidopathy, type-1 diabetes, Behcet's disease or psoriasis, in a subject comprising administering to the subject, that may be human or animal, a therapeutically effective amount of at least one compound of formula (I).

A "therapeutically effective amount" as used herein refers to an amount that (i) treats or prevents the particular disorder, (ii) attenuates, ameliorates, or eliminates one or more symptoms of the particular disorder, or (iii) prevents or delays the onset of one or more symptoms of the particular disorder described herein. The amount of a compound which constitutes a therapeutically effective amount will vary depending on many factors, such as for instance the compound and its biological activity, the composition used for administration, the route of administration, the type of disorder being treated and its severity, drugs used in combination with or coincidentally with the compounds, and the age, body weight, general health, sex, and diet of the patient. Such an effective amount can be determined routinely by one of ordinary skill in the art having regard to their own knowledge.

In another aspect, the present invention relates to a compound of formula (I) for use in a method of treating disorders, particularly proliferative disorders, autoinflammatory disorders and autoimmune disorders, particularly cancers, spondyloarthritis (e.g. ankylosing spondylitis, psoriatic arthritis, reactive arthritis, enteropathic arthritis), Birdshot retinochoroidopathy, type-1 diabetes, Behcet's disease or psoriasis.

In accordance with a further aspect, the present invention relates to the use of a compound of formula (I) for the preparation of a pharmaceutical composition, preferably a medicament, for the prophylaxis or treatment of disorders, in particular proliferative disorders, autoinflammatory disorders and autoimmune disorders, more particularly cancers, spondyloarthritis (e.g. ankylosing spondylitis, psoriatic arthritis, reactive arthritis, enteropathic arthritis), Birdshot retinochoroidopathy, type-1 diabetes, Behcet's disease or psoriasis.

Pharmaceutical Compositions

The present invention also relates to pharmaceutical compositions, in particular a medicament, comprising a compound of formula (I) and one or more excipients, in particular one or more pharmaceutically acceptable excipient(s) and to their uses for the above mentioned purpose.

In one aspect, the present invention relates to a pharmaceutical composition, in particular a medicament, comprising a therapeutically effective amount of a compound of formula (I) and a pharmaceutically acceptable excipient. The pharmaceutical composition is particularly useful in the treatment or prophylaxis of disorders, in particular proliferative disorders, autoinflammatory disorders and autoimmune disorders, particularly cancers, spondyloarthritis (e.g. ankylosing spondylitis, psoriatic arthritis, reactive arthritis, enteropathic arthritis), Birdshot retinochoroidopathy, type-1 diabetes, Behcet's disease or psoriasis.

Pharmaceutically acceptable excipients include fillers and carriers, ointment bases, bases for suppositories, solvents, surfactants, emulsifiers, dispersants or wetting agents, buffers, acids and bases, isotonicity agents, adsorbent, viscosity-increasing agents, gel formers, thickeners and/or binders, disintegrants, coating materials and film formers for films or diffusion membranes, capsule materials, natural or synthetic polymers, plasticizers, penetration enhancers, stabilizers, preservatives, colourants, flavourings, sweeteners, flavour- and/or odour-masking agents.

The pharmaceutical composition may further comprise one or more additional pharmaceutically active agents, such as anticancer agents, in particular anticancer agents useful in immunotherapy or radiotherapy, disease-modifying anti-rheumatic drugs (DMARD) and current immunotherapy for immune disorders.

The pharmaceutical composition may further comprise one or more antiviral or antibacterial agents.

The pharmaceutical composition may also further comprise other ERAP1 or ERAP2 or IRAP inhibitors.

Pharmaceutical Combinations

The one or more compounds of formula (I) can be administered in therapeutically effective amounts in a combinational therapy with one or more pharmaceutically active agents (pharmaceutical combinations).

Therefore, the present invention also relates to such pharmaceutical combinations. For example, the compounds of the present invention can be combined with anticancer agents, in particular anticancer agents useful in immunotherapy or radiotherapy, disease-modifying anti-rheumatic drugs (DMARD), current immunotherapy for immune disorders or other ERAP1 or ERAP2 or IRAP inhibitors.

The compounds can be administered simultaneously (as a single preparation or separate preparation), sequentially or separately.

In one aspect of the invention, a compound of formula (I) is administered to prior to administration of one or more other pharmaceutically active agents.

In another aspect of the invention, a compound of formula (I) is administered concomitantly with the administration of one or more other pharmaceutically active agents In yet another aspect of the invention, a compound of formula (I) of the invention is administered immediately after administration of one or more other pharmaceutically active agents.

The single pharmaceutically active agents (compounds of formula (I) and other pharmaceutically active agents) may be packaged in a kit or separately.

Administration Routes

The compounds of formula (I) can have systemic and/or local activity. For this purpose, they can be administered in a suitable manner, such as, for example, via the oral, dermal, transdermal or parenteral route.

Suitable administration forms for oral administration include for example, tablets (uncoated or coated tablets, for example with enteric or controlled release coatings that dissolve with a delay or are insoluble), orally-disintegrating tablets, films/wafers, films/lyophilisates, capsules (for example hard or soft gelatine capsules), sugar-coated tablets, granules, pellets, powders, emulsions, suspensions, aerosols or solutions.

Suitable administration forms for parenteral administration are preparations for injection and infusion in the form of solutions, suspensions, emulsions, lyophilisates or sterile powders.

Suitable administration forms for the dermal or transdermal administration routes are, for example, pharmaceutical forms for aqueous suspensions (lotions, shaking mixtures), lipophilic suspensions, emulsions, ointments, creams, transdermal therapeutic systems (for example patches), milk, pastes, foams or dusting powders.

Embodiments of the present invention will now be described by way of the following examples which are provided for illustrative purposes only, and not intended to limit the scope of the disclosure.

EXAMPLES

Synthesis

I. Preparation of 1,4-disubstituted 1,2,3-triazoles of Formula (I)

I.1 Preparation of Amino-Acid Derivatives (S)-methyl 2-((tert-butoxycarbonyl)amino)-3-(4-phenoxyphenyl)propanoate

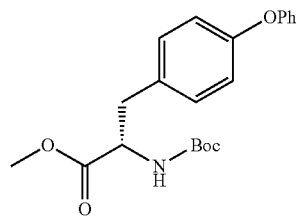 [SMILES: COC(=O)[C@H](Cc1ccc(Oc2ccccc2)cc1)NC(=O)OC(C)(C)C]

A flask was charged with methyl (2S)-2-(tert-butoxycarbonylamino)-3-(4-hydroxyphenyl)propanoate (50 mg, 0.169 mmol, 1 eq) phenylboronic acid (41 mg, 0.339 mmol, 2 eq), copper diacetate (31 mg, 0.169 mmol, 1 eq) and with molecular sieve. Dichloromethane and pyridine were added and the mixture was stirred at room temperature for 2 days. The mixture was diluted in water (5 mL) and extracted three times with ethyl acetate. Combined organic layers were washed three times with brine, dried over $MgSO_4$, filtered and concentrated under reduced pressure. Crude was purified by chromatography eluting with cyclohexane/ethyl acetate (100/0 to 90/10) to give methyl (2S)-2-(tert-butoxycarbonylamino)-3-(4-phenoxyphenyl)propanoate.

Aspect: Colorless oil. Yield: 40%. Purity: 100%. LC tR=3.33 min. MS (ESI−): m/z=372 [M−H]−.

$^1$H NMR, 300 MHz, MeOD-$d_4$, δ (ppm): 7.36-7.28 (m, 2H), 7.22-7.17 (m, 1H), 7.08 (td, J=7.4 and 0.9 Hz, 2H), 6.96-6.88 (m, 4H), 4.35 (dd, J=5.5 and 9.0 Hz, 1H), 3.70 (s, 3H), 3.09 (dd, J=5.5 and 13.8 Hz, 1H), 2.87 (dd, J=9.0 and 13.8 Hz, 1H), 1.39 (s, 9H).

$^{13}$C NMR, 75 MHz, MeOD-$d_4$, δ (ppm): 174.1, 158.9, 157.8, 157.5, 133.4, 131.7, 130.8, 124.2, 119.9, 119.7, 80.6, 56.6, 52.6, 38.1 and 28.7.

(S)-2-((tert-butoxycarbonyl)amino)-3-(4-phenoxyphenyl)propanoic Acid

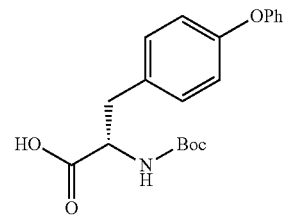 [SMILES: CC(C)(C)OC(=O)N[C@@H](Cc1ccc(Oc2ccccc2)cc1)C(=O)O]

To a solution of methyl (2S)-2-(tert-butoxycarbonylamino)-3-(4-phenoxyphenyl)propanoate (300 mg, 0.808 mmol, 1 eq) in Methanol (4 mL) and Water (3 mL) was added sodium hydroxide (129 mg, 3.23 mmol, 4 eq) and the mixture was stirred overnight at room temperature. The mixture was acidified to pH=2 using HCl 1N, the product was extracted three times with ethyl acetate, the organic phases were dried over MgSO$_4$, filtered and concentrated under reduced pressure to furnish (2S)-2-(tert-butoxycarbonylamino)-3-(4-phenoxyphenyl)propanoic acid.

Aspect: Blue foam. Yield: 91%. Purity: 100%. LC$_{tR}$=2.78 min. MS (ESI-): m/z=356 [M-H]$^-$.

$^1$H NMR, 300 MHz, MeOD-d$_4$, δ (ppm): 7.34-7.28 (m, 2H), 7.21 (m, 2H), 7.08 (tt, J=1.0 and 7.4 Hz, 1H), 6.96-6.87 (m, 4H), 4.34 (br, 1H), 3.16 (br, 1H), 2.89 (br, 2H), 1.38 (s, 9H).

$^{13}$C NMR, 75 MHz, MeOD-d$_4$, δ (ppm): 158.9, 157.9 (br, 2C), 157.4, 134.0, 131.8, 130.8, 124.2, 119.8, 119.6, 80.5, 38.3, 28.7.

(S)-2-amino-3-(4-phenoxyphenyl)propanoic Acid, Hydrochloric Acid Salt

To an ice-cold solution of (2S)-2-(tert-butoxycarbonylamino)-3-(4-phenoxyphenyl)propanoic acid (254 mg, 0.711 mmol) in Dichloromethane (2.8 mL) was added a solution of HCl in dioxane (1.8 mL, 10 eq). The mixture was stirred at room temperature for overnight. Solvents were evaporated under vacuum to furnish (S)-2-amino-3-(4-phenoxyphenyl)propanoic acid, hydrochloric acid salt.

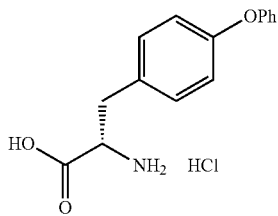 [SMILES: N[C@@H](Cc1ccc(Oc2ccccc2)cc1)C(=O)O ; Cl]

Aspect: Yellow solid. Yield: 93%. Purity: 97%. LC$_{tR}$=1.92 min. MS (ESI+): m/z=258 [M+H]$^+$.

$^1$H NMR, 300 MHz, DMSO-d$_6$, δ (ppm): 13.82 (br, 1H), 8.50 (br, 3H), 7.42-7.35 (m, 2H), 7.33-7.28 (m, 2H), 7.15-7.10 (m, 1H), 7.01-6.94 (m, 4H), 4.13 (t, J=6.1 Hz, 1H), 3.14 (d, J=6.1 Hz, 1H).

$^{13}$C NMR, 75 MHz, DMSO-d$_6$, δ (ppm): 170.3, 156.8, 155.7, 131.2, 130.1, 130.0, 123.3, 118.9, 118.4, 53.2, 34.9.

I.2 Preparation of Compounds of Formula (V)

Propargylamine or R$^2$—N-propargylamine (1.1-1.5 eq) and N,N-diisopropylethylamine or triethylamine (1.2-3 eq) were solubilized in dichloromethane or in dimethylformamide (0.08-0.34M). The reaction media was cooled at 0° C. and R$^3$-sulfonyl chloride (1-1.2 eq.) was added. The mixture was allowed to reach room temperature and was stirred 1 h to one night. Then, products were washed twice with 0.5 or 1M HCl (aq), dried over MgSO$_4$, filtered and concentrated under reduced pressure. Then, the residues were filtered on silica gel (4 g cartridge) or purified by flash chromatography to afford the desired products of formula (V):

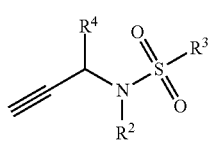
(V)

wherein R$^2$ and R$^a$ are as disclosed herein and R$^4$ is hydrogen.

Compounds of formula (V) wherein R$^4$ is different from hydrogen may be obtained by reacting a compound of formula NH$_2$—CHR$^4$—CCH or NHR$^2$—CHR$^4$—CCH with R$^3$-sulfonyl chloride.

Exemplary procedures are disclosed herein below.

N-[(1S)-1-methylprop-2-ynyl]-5-(2-pyridyl)thiophene-2-sulfonamide (V-10)

To a stirring solution of tert-butyl N-[(1S)-1-methylprop-2-ynyl]carbamate (176 mg, 0.96 mmol, 1.0 eq.) in Methanol (4 mL, 0.25 M) was added HCl (1.2 mL of 4M solution in 1,4-dioxane, 4.81 mmol, 5.0 eq.). The resulting mixture was stirred for 3 h at room temperature before being evaporated to dryness. The obtained residue was dissolved in CH$_2$Cl$_2$ (5.2 mL), NEt$_3$ (0.26 mL, 2.12 mmol, 2.1 eq.) and DMAP (1 crystal) were added and the resulting mixture was cooled to 0° C. 5-(2-pyridyl)thiophene-2-sulfonyl chloride (250 mg, 0.96 mmol, 1.0 eq.) was added. The reaction mixture was allowed to warm to room temperature and stirred for 4 h before being quenched with water. The two layers were separated and the aqueous one was extracted three times with CH$_2$Cl$_2$. Combined organic layers were dried with MgSO$_4$, filtered and concentrated under reduced pressure to afford N-[(1S)-1-methylprop-2-ynyl]-5-(2-pyridyl)thiophene-2-sulfonamide (224 mg, 80%) as a beige powder which was directly used as such.

N-[(1R)-1-methylprop-2-ynyl]-5-(2-pyridyl)thiophene-2-sulfonamide (V-11)

To a stirring solution of tert-butyl N-[(1S)-1-methylprop-2-ynyl]carbamate (141 mg, 0.77 mmol, 1.0 eq.) in Methanol (3.2 mL, 0.25 M) was added HCl (0.96 mL of a 4M solution in 1,4-dioxane, 3.88 mmol, 5.0 eq.). The resulting mixture was stirred for 3 h at room temperature before being evaporated to dryness. The obtained residue was dissolved in CH$_2$Cl$_2$ (4.10 mL), NEt$_3$ (0.23 mL, 1.69 mmol, 2.1 eq.) and 4-dimethylaminopyridine (DMAP) (1 crystal) were added and the resulting mixture was cooled to 0° C. 5-(2-pyridyl)thiophene-2-sulfonyl chloride (200 mg, 0.77 mmol, 1.0 eq.) was added. The reaction mixture was allowed to warm to room temperature and stirred for 4 h before being quenched with water. The two layers were separated and the aqueous one was extracted three times with CH$_2$Cl$_2$. Combined organic layers were dried with MgSO$_4$, filtered and concentrated under reduced pressure. The obtained residue was purified by flash chromatography on silica gel (cyclohexane/ethyl acetate 1:0 to 1:1 (v/v)) to afford N-[(1R)-1-methylprop-2-ynyl]-5-(2-pyridyl)thiophene-2-sulfonamide (150 mg, 67%) as a beige powder.

I.3 Preparation of Compounds of Formula (VIII)

Compounds of formula (VIII) were prepared according to the following schemes:

Protocole VIII-a

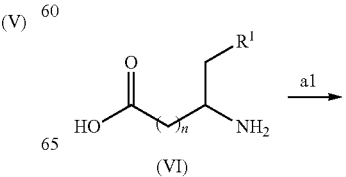
(VI)

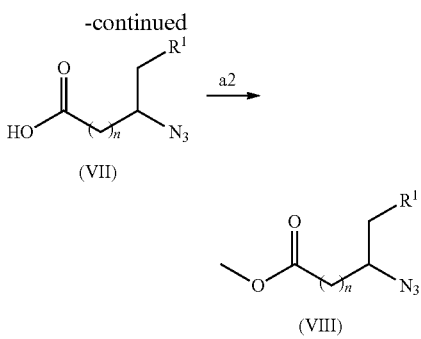

(VII)

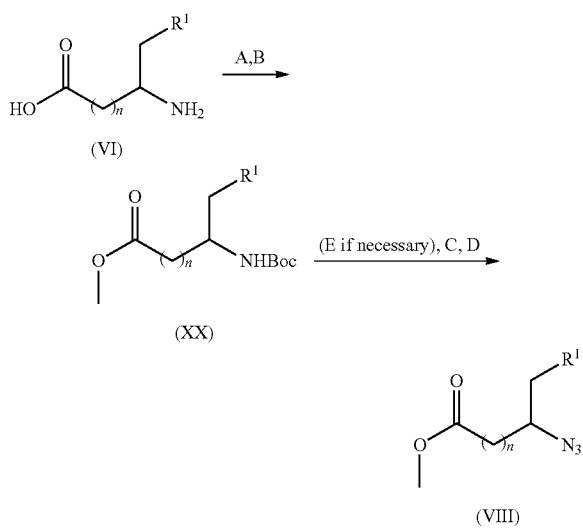

Or Protocole VIII-b (VI)

(XX)

(VIII)

Or Protocole VIII-c

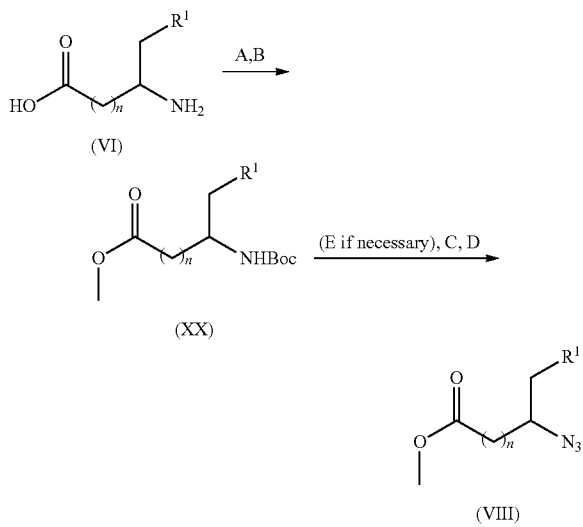

(VI)

(XX)

(VIII)

I.3.1 Protocole VIII-a
I.3.1.1 Preparation of Compounds of Formula (VII)

A mixture of $R^1$-α or β amino acids of formula (VI) (1 eq), $ZnCl_2$ (0.06 eq.) and $K_2CO_3$ (4 eq.) in anhydrous methanol (0.6 M) under inert atmosphere was cooled to 0° C. with an ice-bath. Besides, anhydrous N,N-Diisopropylethylamine (1.1 eq.) was slowly added to a solution of 1H-Imidazole-1-sulfonyl azide hydrogenosulfate (1.2 eq.) solubilized in anhydrous methanol (0.3 M) under inert atmosphere (solution A). The azide-containing solution was immediately added dropwise to the first mixture at 0° C. Then, the cooling bath was removed and the white mixture was stirred at room temperature for one night. The mixture was then cooled down to 0° C., diluted with water (10 mL) and carefully acidified to pH=2 with diluted aq. HCl (1N). It was extracted with ethyl acetate and the aqueous layer was once again extracted with ethyl acetate. Combined organic layers were concentrated under reduced pressure to give a compound of formula (VII).

I.3.1.2 Preparation of Compounds of Formula (VIII)

Compound of formula (VII) (1 eq.) was dissolved in methanol (0.07-0.48M) and cooled down to 0° C. and thionyl chloride (2.0 eq) was added dropwise. The resulting solution was stirred overnight in the melting ice bath. Then, solvents were evaporated under reduced pressure to give the desired products or residues were dissolved in a mixture of ethyl acetate and saturated aqueous $NaHCO_3$ and extracted twice. Organic layers were mixed, dried over $MgSO_4$, filtered and concentrated under reduced pressure to afford desired products of formula (VIII).

I.3.2 Protocole VIIIb or c
I.3.2.1 Preparation of Compounds of Formula (XX)
Protocole XXa To a solution of amino-acid (1.0 eq.) of formula (VI) and TEA (1.5 eq.) in a 1:1 (v/v) mixture of 1,4-dioxane/water (15 mL), cooled to 0° C. was added $Boc_2O$ (1.2 eq.). After stirring at 0° C. for 30 min, the solution was allowed to warm to room temperature and stirred overnight. 1,4-dioxane was then removed under reduced pressure and the remaining aqueous mixture was cooled with an ice bath. If necessary, pH was adjusted to 2 by dropwise addition of 1 M HCl. The product was then extracted with EtOAc. The combined organic layers were washed with brine and dried over $MgSO_4$, filtered and concentrated under reduced pressure to N-Boc protected amino-acid as a light oil.

To a stirring solution of the N-Boc protected amino-acid (1.0 eq.) and $K_2CO_3$ (1.3 eq.) in DMF was added MeI (2.2 eq or 1 eq.). The resulting mixture was stirred overnight before being concentrated under reduced pressure. The obtained residue was portioned between water and EtOAc. The aqueous layer was further extracted with EtOAc and combined organic layers were washed with brine, dried over $MgSO_4$, filtered and concentrated under reduced pressure. The crude mixture was purified by flash column chromatography on silica gel (cyclohexane/EtOAc 1:0 to 0:1 (v/v)) to afford compounds of formula (XX)

Protocole XXb

To a solution of (2S)-2-amino-3-(4-iodophenyl)propanoic acid (VI) (1.00 g, 3.44 mmol, 1 eq.) in dry methanol (9.0 mL) and cooled to 0° C. was slowly added thionyl chloride (1.0 mL, 13.7 mmol, 4.0 eq.).

The reaction mixture was allowed to reach room temperature before being concentrated under reduced pressure to afford [(1S)-1-[(4-iodophenyl)methyl]-2-methoxy-2-oxoethyl]ammonium; chloride (1.20 g, quant.) as a yellowish salt.

The amine function is then protected. To a solution of the amine (1.0 eq.) and TEA (1.5 eq.) in a 1:1 (v/v) mixture of 1,4-dioxane/water (15 mL), cooled to 0° C. was added $Boc_2O$ (1.2 eq.). After stirring at 0° C. for 30 min, the solution was allowed to warm to room temperature and stirred overnight. 1,4-dioxane was then removed under reduced pressure and the remaining aqueous mixture was cooled with an ice bath. The product was then extracted with EtOAc. The combined organic layers were washed with brine and dried over $MgSO_4$, filtered and concentrated under reduced pressure to give the Boc-protected compound (XX).

I.3.2.2 Preparation of Compounds of Formula (VIII)

If needed, a phenol group can be alkylated: to a solution of compound XX (1 eq.), brominated compound (4 eq.) and NaI (0.1 eq.) in dry DMF was added $K_2CO_3$ (2.7 eq.). The reaction vessel was equipped with a condenser and the reaction mixture stirred overnight at 85° C. It was then allowed to cool down to rt and evaporated to dryness. The resulting oil was suspended into a mixture of $CH_2Cl_2$ and sat. aq. $NH_4Cl$. The aqueous layer was extracted twice with $CH_2Cl_2$, combined organic layers were washed with brine several times, dried over $MgSO_4$, filtered and concentrated under reduced pressure to afford the alkylated compound.

Then Boc-group is deprotected in dry DCM using dropwise added TFA (6 eq.) or in dry MeOH using HCl (4M solution in 1,4-dioxane, 1 eq.). The resulting solution was stirred overnight and evaporated to dryness to afford the amine as TFA or HCl salt. Then the amino group is transformed to the corresponding azide (VIII) using conditions described in VIII-a protocol.

Then a solution of the amine (1 eq), ZnCl2 (0.06 eq.) and $K_2CO_3$ (4 eq.) in anhydrous methanol (0.6 M) under inert atmosphere was cooled to 0° C. with an ice-bath. Besides, anhydrous N,N-Diisopropylethylamine (1.1 eq.) was slowly added to a solution of 1H-Imidazole-1-sulfonyl azide hydrogenosulfate (1.2 eq.) solubilized in anhydrous methanol (0.3 M) under inert atmosphere. The azide-containing solution was immediately added dropwise to the amine solution at 0° C. Then, the cooling bath was removed and the white mixture was stirred at room temperature for one night. The mixture was then cooled down to 0° C., diluted with water (10 mL) and carefully acidified to pH=2 with diluted aq. HCl (1N). It was extracted with ethyl acetate and the aqueous layer was once again extracted with ethyl acetate. Combined organic layers were concentrated under reduced pressure to give a compound of formula (VIII).

Or

If needed, a iodo-aromatic group can undergo a sonogashira coupling: To a stirring & degassed solution of methyl (2S)-2-(tert-butoxycarbonylamino)-3-(4-iodophenyl)propanoate (250 mg, 0.62 mmol, 1.0 eq.), CuI (24 mg, 0.12 mmol, 0.2 eq) and $PdCl_2(PPh_3)_2$ (45 mg, 0.06 mmol, 0.1 eq.) in TEA (7 mL) was added ethynyl(trimethyl)silane (0.10 mL, 0.74 mmol, 1.2 eq.). The resulting solution was stirred at rt for 6 h before being quenched with water and diluted with $Et_2O$. It was filtered through a celite pad and the two layers were separated. The aqueous layer was extracted with $Et_2O$ and combined organic layers washed with water, dried over $MgSO_4$, filtered and concentrated under reduced pressure. The obtained residue was purified by flash column chromatography (cyclohexane/EtOAc 1:0 to 1:1 (v/v)) to afford methyl (2S)-2-(tert-butoxycarbonylamino)-3-[4-(2-trimethylsilylethynyl)phenyl]propanoate (166 mg, 72%) as a light oil.

Then Boc-group is deprotected in dry DCM using dropwise added TFA (6 eq.) or in dry MeOH using HCl (4M solution in 1,4-dioxane, 1 eq.). The resulting solution was stirred overnight and evaporated to dryness to afford the amine as TFA or HCl salt. Then the amino group is transformed to the corresponding azide (VIII) using conditions described in VIII-a protocol.

I.4 Preparation of Compounds of Formula (I)

I.4.1 Route A (Scheme 1)

Preparation of Compounds of Formula (IX)

To a solution of Compound of formula (VIII) (1 eq.) in methanol (0.04-0.35M) was added aqueous hydroxylamine (50% w/w in water, 0.04-0.35M) and KCN (0.1-0.5 eq.). The mixture was stirred overnight. Then, the solvents were removed under reduced pressure and residue was purified through flash silica gel column or through C18 gel column.

Preparation of Compounds of Formula (I)—Huisgen Cycloaddition

Compound of formula (IX) (0.9-1 eq.) and compound of formula (V) (1.0-1.1 eq) were mixed in dioxane/$H_2O$ (2/1, 0.07M) or in dimethylformamide/water (2/1 or 1/0.8, 0.02-0.11M) before the addition of copper sulfate pentahydrate (0.1 or 0.2 eq) followed by sodium ascorbate (0.5 eq). The resulting mixture was stirred at room temperature overnight. Then, the mixture was diluted in water and extracted with ethyl acetate, organic layers were mixed and concentrated to dryness in vacuo. Residues were purified by flash chromatography to furnish desired 1,4 triazoles.

I.4.2 Route B (Scheme 2)

Preparation of Compounds of Formula (X)—Huisgen Cycloaddition

Compound of formula (VIII) (0.9-1 eq.) and compound of formula (V) (1.0-1.1 eq) were mixed in dioxane/$H_2O$ (2/1, 0.07M) or in dimethylformamide/water (2/1 or 1/0.8, 0.02-0.11M) before the addition of copper sulfate pentahydrate (0.1 or 0.2 eq) followed by sodium ascorbate (0.5 eq). The resulting mixture was stirred at room temperature overnight. Then, mixture was diluted in water and extracted with ethyl acetate, organic layers were mixed and concentrated to dryness in vacuo. Residues were purified by flash chromatography to furnish desired 1,4 triazoles.

Preparation of Compounds of Formula (I)

To a solution of Compound of formula (X) (1 eq.) in methanol (1 eq) was added aqueous hydroxylamine (50% w/w in water, 18-300 eq) and KCN (0.1-0.5 eq.) at room temperature or 0° C. The mixture was stirred overnight. Then, the solvents were removed under reduced pressure and residue was purified through flash silica gel column or through C18 gel column.

I.4.3 Route C (Scheme 3)

Preparation of Compounds of Formula (X)

Compound of formula (VIII) (0.9-1 eq.) and compound of formula (V) wherein $R^3$ is a bromine-substituted thiophenyl (1.0-1.1 eq) were mixed in dioxane/$H_2O$ (2/1, 0.07M) or in dimethylformamide/water (2/1 or 1/0.8, 0.02-0.11M) before the addition of copper sulfate pentahydrate (0.1 or 0.2 eq) followed by sodium ascorbate (0.5 eq). The resulting mixture was stirred at room temperature overnight. Then, mixture was diluted in water and extracted with ethyl acetate, organic layers were mixed and concentrated to dryness in vacuo. Residues were purified by flash chromatography to furnish desired 1,4 triazoles.

Preparation of Compounds of Formula (X)—Suzuki Coupling

A flask was charged with the compound of formula (X) (1 eq), boronic acid ($R^5$—$B(OH)_2$ wherein $R^5$ is a phenyl or pyridyl optionally substituted as disclosed herein) (1.5 to 2.1 eq), palladium tetrakis (0.15 eq) and with cesium carbonate (1.05 eq). Flask was degassed and flushed with argon three times. Degassed dioxane and water (3.5/1, 0.15-022M) were added, the mixture was warmed up to 70° C. and stirred for 1 h45-4 h. The mixture was diluted in water, treated with a solution of HCl 1N (pH=1-2) and extracted three times with ethyl acetate. Combined organic layers were washed three times with brine, dried over $MgSO_4$, filtered and concentrated under reduced pressure. Crude was purified by chromatography eluting with cyclohexane/ethyl acetate/methanol to furnish desired intermediates of formula (XI).

Preparation of Compounds of Formula (I)

To a solution of compound of formula (XI) (1 eq.) in methanol (0.04-0.35M) was added aqueous hydroxylamine (50% w/w in water, 0.04-0.35M) and KCN (0.1-0.5 eq.). The mixture was stirred overnight. Then, the solvents were removed under reduced pressure and residue was purified through flash silica gel column or through C18 gel column.

If deprotection of an amino-protected group is required to arrive at a compound of formula (I), deprotection by can be performed according to well-known methods. For instance, Boc groups can be cleaved by addition of a solution of HCl 4N in dioxane. Trimethylsilyl groups can be cleaved by TBAF in THF. If appropriate, compounds of formula (I) may be isolated in salt, for instance a potassic salt.

II. Preparation of 1,5-Disubstituted 1,2,3-Triazoles of Formula (I) (Route D—Scheme 4)

Preparation of Compound of Formula (XII)

2-(1H-Benzotriazole-1-yl)-1,1,3,3-tetramethyluronium hexafluorophosphate (HBTU) (1.1 eq.) and triethylamine (3 eq.) were added to a mixture of azido amino acids (compound of formula VII) and $R^2$—N-propargylamine (1.1-1.3 eq.) in dimethylformamide (0.24-0.30M). The mixture was stirred overnight at room temperature, ethyl acetate was added and the organic phase was washed with aq. HCl (0.1 or 1M), NaHCO$_3$, saturated NaCl, and H$_2$O. The organic phase was dried over MgSO$_4$, filtered and concentrated under reduced pressure to give azido-alkynes (compound of formula (XII)).

Preparation of Compound of Formula (XIII)—Intramolecular Huisgen Cycloaddition

The compound of formula (XII) was dissolved in dimethylformamide (0.009-0.04M), was heated to reflux and left stirring overnight to allow cyclisation. After cooling down, the mixture was diluted with ethyl acetate and was washed with water (three times). The organic phase was dried with MgSO$_4$, filtered and concentrated under reduced pressure. Then, the crude product was purified by flash chromatography on silica gel column to provide compound of formula (XIII).

Preparation of Compound of Formula (XIV))

Compound of formula (XIII) (1 eq.) was diluted in a 6M aqueous HCl solution (0.35-0.8M) and heated with microwaves at 85° C. for 1-3 hours. Then, solvents were evaporated under reduced pressure to give compound of formula (XIV) as hydrochloric acid salts which was used in the next step without further purification.

Preparation of Compound of Formula (XV)

Crude intermediate of formula (XIV) was dissolved in methanol (0.09-0.25M) and the mixture was cool down to 0° C. before the addition of thionyl chloride (2 eq). The solution was stirred at room temperature overnight and solvents were evaporated to give the desired compound as hydrochloric acid salt.

Preparation of Compound of Formula (XVI)

Compound of formula (XV) (1.1-1.5 eq) and N,N-diisopropylethylamine or triethylamine (1.2-3 eq) were solubilized in dichloromethane or in dimethylformamide (0.08-0.34M). The reaction media was cooled at 0° C. and $R^3$-sulfonyl chloride (1-1.2 eq.) was added. The mixture was allowed to reach room temperature and was stirred 1 h to one night. Then, products were washed twice with 0.5 or 1M HCl (aq), dried over MgSO$_4$, filtered and concentrated under reduced pressure. Then, the residues were filtered on silica gel (4 g cartridge) or purified by flash chromatography to afford the desired products.

Preparation of Compound of Formula (I)

To a solution of compound of formula (XVI) (1 eq.) in methanol (0.04-0.35M) was added aqueous hydroxylamine (50% w/w in water, 0.04-0.35M) and KCN (0.1-0.5 eq.). The mixture was stirred overnight. Then, the solvents were removed under reduced pressure and residue was purified through flash silica gel column or through C18 gel column.

III. Examples

III.1 Starting Materials and Intermediates Compounds

III.1.1 Compound of Formula (V)

| | Compound of formula (V) Alkyne |
|---|---|
| V-1 | 5-phenyl-N-(prop-2-yn-1-yl)thiophene-2-sulfonamide. |

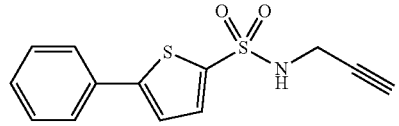

Aspect: Beige Solid. Yield: 97%. Purity: 100%.
$LC_{tR}$ = 2.80 min. MS (ESI–): m/z = 276 [M – H]$^-$.
$^1$H NMR, 300 MHz, CDCl$_3$-d$_1$, δ (ppm): 7.63-7.68 (m, 3H), 7.47-7.39 (m, 3H), 7.27 (d, J = 3.9 Hz, 1H), 4.82 (br, 1H), 3.95 (dd, J = 2.5 and 6.1 Hz, 2H), 2.18 (t, J = 2.5 Hz, 1H, CH).
$^{13}$C NMR, 75 MHz, CDCl$_3$-d$_1$, δ (ppm): 152.1, 138.3, 134.0, 132.8, 129.4 (3C), 126.5, 123.2, 77.8, 73.4, 33.4.

| V-2 | N-methyl-5-phenyl-N-(prop-2-yn-1-yl)thiophene-2-sulfonamide. |
|---|---|

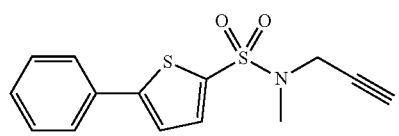 [SMILES: C#CCN(C)S(=O)(=O)c1ccc(-c2ccccc2)s1]

Aspect: Beige Solid. Yield: 83%. Purity: 100%.
$LC_{tR}$ = 3.08 min. MS (ESI+): m/z = 292 [M + H]$^+$.
$^1$H NMR, 300 MHz, CDCl$_3$-d$_1$, δ (ppm): 7.62-7.58 (m, 2H), 7.55 (d, J = 3.9 Hz, 1H), 7.46-7.35 (m, 3H), 7.29 (d, J = 3.9 Hz, 1H), 4.07 (d, J = 2.5 Hz, 2H), 2.94 (s, 3H), 2.14 (t, J = 2.5 Hz, 1H).
$^{13}$C NMR, 75 MHz, CDCl$_3$-d$_1$, δ (ppm): 151.6, 135.5, 133.7, 132.8, 129.4, 129.3, 126.4, 123.3, 76.0, 74.4, 40.1, 34.7.

| V-3 | 5-bromo-N-(prop-2-yn-1-yl)thiophene-2-sulfonamide. |
|---|---|

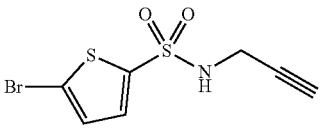

Aspect: Colorless oil. Yield: 95%. Purity: 100%.
$LC_{tR}$ = 2.53 min. MS (ESI–): m/z = 279 [M – H]$^-$.
$^1$H NMR, 300 MHz, DMSO-d$_6$, δ (ppm): 8.49 (s, 1H), 7.46 (d, J = 4.0 Hz, 1H), 7.34 (d, J = 4.0 Hz, 1H), 3.78 (d, J = 2.5 Hz, 2H), 3.14 (t, J = 2.5 Hz, 1H).
$^{13}$C NMR, 75 MHz, DMSO-d$_6$, δ (ppm): 142.1, 132.7, 131.2, 118.4, 78.9, 74.8, 32.1.

| Compound of formula (V) Alkyne | |
|---|---|
| V-4 | N-(prop-2-yn-1-yl)thiophene-2-sulfonamide. |

Aspect: Yellow oil. Yield: 78%. Purity: 99%.
LC$_{tR}$ = 2.08 min. MS (ESI+): m/z = 202 [M + H]$^+$.
$^1$H NMR, 300 MHz, MeOD-d$_4$, δ (ppm): 7.77 (dd, J = 1.4 and 5.0 Hz, 1H), 7.63 (dd, J = 1.4 and 3.8 Hz, 1H), 7.14 (dd, J = 3.0 and 5.0 Hz, 1H), 3.80 (d, J = 2.5 Hz, 2H), 2.50 (t, J = 2.5 Hz, 1H).
$^{13}$C NMR, 75 MHz, MeOD-d4, δ (ppm): 142.4, 133.4, 133.3, 128.4, 79.3, 73.5, 33.3.

| | |
|---|---|
| V-5 | 5-methyl-N-(prop-2-yn-1-yl)thiophene-2-sulfonamide. |

Aspect: Brown oil. Yield: 94%. Purity: 100%.
LC$_{tR}$ = 2.32 min. MS (ESI-): m/z = 214 [M - H]$^-$.
$^1$H NMR, 300 MHz, MeOD-d$_4$, δ (ppm): 7.42 (d, J = 3.7 Hz, 1H), 6.84-6.82 (m, 1H), 3.77 (d, J = 2.6 Hz, 2H), 2.54-2.52 (m, 4H).
$^{13}$C NMR, 75 MHz, MeOD-d4, δ (ppm): 149.0, 139.2, 133.8, 126.9, 79.4, 73.5, 33.3, 15.3.

| | |
|---|---|
| V-6 | N-(prop-2-yn-1-yl)thiophene-3-sulfonamide. |

Aspect: Brown oil. Yield: 87%. Purity: 100%.
LC$_{tR}$ = 2.02 min. MS (ESI-): m/z = 200 [M - H]$^-$.
$^1$H NMR, 300 MHz, MeOD-d$_4$, δ (ppm): 8.08 (dd, J = 1.3 and 3.1 Hz, 1H), 7.58 (dd, J = 3.1 and 5.2 Hz, 1H), 7.38 (dd, J = 1.3 and 5.2 Hz, 1H), 3.78 (dd, J = 2.5 Hz, 2H), 2.48 (t, J = 2.5 Hz, 1H).
$^{13}$C NMR, 75 MHz, MeOD-d$_4$, δ (ppm): 141.6, 131.8, 129.1, 126.7, 79.5, 73.4, 33.1.

| | |
|---|---|
| V-7 | 3-bromo-N-(prop-2-yn-1-yl)thiophene-2-sulfonamide. |

Aspect: Beige solid. Yield: 89%. Purity: 100%.
LC$_{tR}$ = 2.32 min. MS (ESI-): m/z = 280 [M - H]$^-$.
$^1$H NMR, 300 MHz, MeOD-d$_4$, δ (ppm): 7.74 (d, J = 5.3 Hz, 1H), 7.16 (d, J = 5.3 Hz, 1H), 3.86 (d, J = 2.3 Hz, 2H), 2.45 (t, J = 2.5 Hz, 1H).
$^{13}$C NMR, 75 MHz, MeOD-d$_4$, δ (ppm): 133.8, 133.7, 132.6, 114.8, 79.0, 73.2, 33.1.

| | |
|---|---|
| V-8 | N-(prop-2-yn-1-yl)-5-(pyridin-2-yl)thiophene-2-sulfonamide. |

Aspect: Beige solid. Yield: 85%. Purity: 100%.
LC$_{tR}$ = 2.42 min. MS (ESI-): m/z = 277 [M - H]$^-$.
$^1$H NMR, 300 MHz, MeOD-d$_4$, δ (ppm): 8.53 (ddd, J = 4.9, 1.7 and 1.1 Hz, 1H), 7.91-7.82 (m, 2H), 7.67 (d, J = 4.0 Hz, 1H), 7.61 (d, J = 4.0 Hz, 1H), 7.34 (ddd, J = 1.7, 4.9 and 7.0 Hz, 1H), 3.86 (d, J = 2.5 Hz, 2H), 2.53 (t, J = 2.5 Hz, 1H).
$^{13}$C NMR, 75 MHz, MeOD-d$_4$, δ (ppm): 152.4, 152.0, 150.6, 143.6, 138.7, 134.1, 125.5, 124.7, 120.7, 79.3, 73.6, 33.4.

| | |
|---|---|
| V-9 | N-methyl-N-prop-2-ynyl-5-(2-pyridyl)thiophene-2-sulfonamide |

Aspect: white amorphous solid. Yield: 75%. Purity: 100%,
LC tr = 2.70 min, MS (ESI+): m/z = 293 [M + H]$^+$.
$^1$H NMR (300 MHz, CDCl$_3$) δ (ppm) 8.60 (ddd, J = 4.9 and 1.7 and 1.0 Hz, 1H), 7.79-7.67 (m, 2H), 7.58 (d, J = 4.1 Hz, 1H), 7.54 (d, J = 4.1 Hz, 1H), 7.26 (ddd, J = 7.4 and 4.9 and 1.4 Hz, 1H), 4.06 (d, J = 2.5 Hz, 2H), 2.95 (s, 3H), 2.14 (t, J = 2.5 Hz, 1H).
$^{13}$C NMR (75 MHz, CDCl$_3$) δ (ppm) 151.7, 151.0, 149.9, 138.1, 137.2, 133.5, 123.9, 123.6, 119.3, 76.0, 74.4, 40.1, 34.7.

| | |
|---|---|
| V-10 | N-[(1S)-1-methylprop-2-ynyl]-5-(2-pyridyl)thiophene-2-sulfonamide |

Aspect: beige powder. Yield: 80%. Purity: 85%,
LC tr = 2.45 min, MS (ESI+): m/z = 293 [M + H]$^+$.
$^1$H NMR (300 MHz, CDCl$_3$) δ (ppm) 8.66 (ddd, J = 5.1, 1.6 and 0.9 Hz, 1H), 7.88 (ddd, J = 7.8, 7.7 and 1.6 Hz, 1H), 7.78 (d, J = 3.8 Hz, 1H), 7.74 (ddd, J = 7.8, 1.0 and 0.9 Hz, 1H), 7.66 (d, J = 3.8 Hz, 1H), 7.37 (ddd, J = 7.7, 5.1 and 1.0 Hz, 1H), 5.00 (d, J = 8.7 1H), 4.30 (m, 1H), 2.18 (d, J = 2.3, 1H), 1.49 (d, J = 6.93, 3H).
$^{13}$C NMR (75 MHz, CDCl$_3$) δ (ppm) 150.9, 149.8, 137.4, 133.6 (2C), 124.0, 123.6 (2C)) 119.4, 82.5, 72.2, 41.7, 23.5.

| | |
|---|---|
| V-11 | N-[(1R)-1-methylprop-2-ynyl]-5-(2-pyridyl)thiophene-2-sulfonamide |

Aspect: beige powder. Yield 67% Purity: 100%,
LC tr = 2.70 min, MS (ESI+): m/z = 293 [M + H]$^+$.
$^1$H NMR (300 MHz, acetone-$_{d6}$) δ (ppm): 8.56 (ddd, J = 4.8, 1.7 and 1.0 Hz, 1H), 7.96 (ddd, J = 8.0, 1.0 and 1.0 Hz, 1H), 7.88 (ddd, J = 8.0, 7.7 and 1.7 Hz, 1H), 7.75 (d, J = 4.0 Hz, 1H), 7.64 (d, J = 4.0 Hz, 1H), 7.36 (ddd, J = 7.7, 4.8 and 1.0 Hz, 1H), 7.66 (d, J = 3.8 Hz, 1H), 7.37 (ddd, J = 7.7, 5.1 and 1.0 Hz, 1H), 4.29 (m, 1H), 2.95 (br s, 1H), 2.67 (d, J = 2.3, 1H), 1.41 (d, J = 7.0, 3H).

| Compound of formula (V) Alkyne | |
|---|---|
| V-12 | $^{13}$C NMR (75 MHz, acetone-$d_6$) δ (ppm) 152.0, 151.7, 150.5, 144.1, 138.1, 133.7, 124.9, 124.4, 119.9, 83.9, 72.9, 41.9, 23.4.<br>2-ethynyl-1-[(5-phenyl-2-thienyl)sulfonyl]piperidine<br>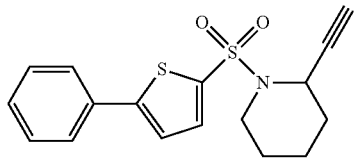 [SMILES: C#CC1CCCCN1S(=O)(=O)c1ccc(-c2ccccc2)s1]<br>Aspect: green solid. Yield: 80%. Purity: 96%, LC tr = 3.37 min, MS (ESI+): m/z = 332 [M + H]⁺.<br>$^1$H NMR (CDCl₃, 300 MHz) δ: 7.62-7.57 (m, 2H), 7.54 (d, J = 3.9 Hz, 1H), 7.45-7.34 (m, 3H), 7.26 (d, J = 3.9 Hz, 1H), 4.89 (m, 1H), 3.76 (m, 1H), 2.99 (m, 1H), 2.07 (d, J = 2.34 Hz, 1H), 1.88-1.60 (m, 6H).<br>$^{13}$C NMR (CDCl₃, 75 MHz) δ: 151.1, 136.9, 133.7, 133.1, 129.3 (2C), 129.1, 126.3 (2C), 123.0, 78.7, 74.9, 46.3, 42.4, 31.4, 25.2, 19.2. |
| V-13 | (2S)-2-ethynyl-1-[(5-phenyl-2-thienyl)sulfonyl]pyrrolidine<br>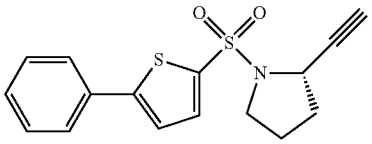 [SMILES: C#C[C@@H]1CCCN1S(=O)(=O)c1ccc(-c2ccccc2)s1]<br>Aspect: white solid. Yield: 88%. Purity : 87%, LC tr : 3.12 min, MS (ESI+) : m/z = 318 [M + H]⁺.<br>$^1$H NMR (CDCl₃, 300 MHz) δ: 7.60 (m, 2H), 7.60 (d, J = 3.9 Hz, 1H), 7.40 (m, 3H), 7.28 (d, J = 3.9 Hz, 1H), 4.52 (m, 1H), 3.55 (m, 1H), 3.38 (m, 1H), 2.32 (d, J = 2.19 Hz, 1H), 2.14-1.84 (m, 4H).<br>$^{13}$C NMR (CDCl₃, 75 MHz) δ: 151.1, 136.1, 133.5, 132.6, 129.2 (2C), 129.2, 126.2 (2C), 123.0, 82.4, 72.2, 50.7, 48.0, 34.0, 24.4. |
| V-14 | 2-phenyl-N-prop-2-ynyl-thiazole-5-sulfonamide<br>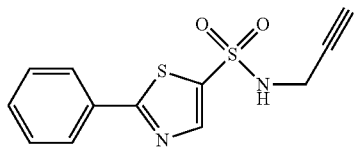 [SMILES: C#CCNS(=O)(=O)c1cnc(-c2ccccc2)s1]<br>Aspect: white solid. Yield: 93%. Purity: 88%, LC tr = 2.63 min, MS (ESI+): m/z = 279 [M + H]⁺.<br>$^1$H NMR (CDCl₃, 300 MHz) δ: 8.27 (s, 1H), 7.96 (m, 2H), 7.50 (m, 3H), 3.99 (d, J = 2.6 Hz, 2H), 2.44 (br s, 1H), 2.18 (t, J = 2.6 Hz, 1H).<br>$^{13}$C NMR (CDCl₃, 75 MHz) δ: 174.2, 148.4, 135.8, 132.5, 131.9, 129.4 (2C), 127.1 (2C), 77.4, 73.7, 33.3. |
| V-15 | N-cyclopropyl-N-prop-2-ynyl-5-(2-pyridyl)thiophene-2-sulfonamide<br>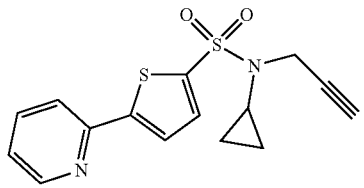 [SMILES: C#CCN(C1CC1)S(=O)(=O)c1ccc(-c2ccccn2)s1]<br>Aspect : brown solid. Yield: 40%. Purity: 97%, LC tr = 2.88 min, MS (ESI+): m/z = 319 [M + H]⁺.<br>$^1$H NMR (CDCl₃, 300 MHz) δ: 8.60 (ddd, J = 4.9, 1.8 and 1.0 Hz, 1H), 7.77 (ddd, J = 8.0, 7.3 and 1.8 Hz, 1H), 7.70 (ddd, J = 8.0, 1.2 and 1.0 Hz, 1H), 7.66 (d, J = 3.8 Hz, 1H), 7.57 (d, J = 3.8 Hz, 1H), 7.26 (ddd, J = 7.3, 4.9 and 1.2 Hz, 1H), 4.14 (d, J = 2.5 |

| Compound of formula (V) Alkyne | |
|---|---|
| | Hz, 2H), 2.45 (tt, J = 10.5 and 3.5 Hz, 1H), 2.06 (t, J = 2.5 Hz, 1H), 0.99 (m, 2H), 0.83 (m, 2H).<br>$^{13}$C NMR (CDCl₃, 300 MHz) δ: 151.0, 149.8 (2C), 139.1, 137.4, 134.0, 124.0, 123.6, 119.4, 76.6, 73.9, 40.2, 31.0, 29.7, 27.0. |

III.1.2 Compound of Formula (VII)

| | Compounds of formula (VII) azides |
|---|---|
| VII-1 | (R)-3-azido-4-(1H-indol-3-yl)butanoic acid.<br>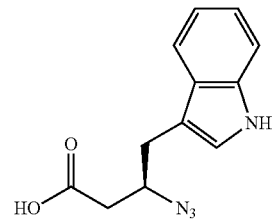<br>Aspect: Brown oil. Yield: 95%. Purity: 95%.<br>LC$_{tR}$ = 2.40 min. MS (ESI-): m/z = 243 [M − H]⁻.<br>$^1$H NMR, 300 MHz, MeOD-d₄, δ (ppm): 7.60-7.56 (m, 1H), 7.37-7.34 (m, 1H), 7.13 (s, 1H), 7.11-7.00 (m, 2H), 4.14-4.05 (m, 1H), 3.08-2.95 (m, 2H), 2.59 (dd, J = 4.5 and 16.3 Hz, 1H), 2.42 (dd, J = 9.0 and 16.3 Hz, 1H).<br>$^{13}$C NMR, 75 MHz, MeOD-d₄, δ (ppm): 174.7, 138.1, 128.7, 124.7, 122.4, 119.9, 119.2, 112.3, 111.4, 61.4, 39.7, 31.3. |
| VII-2 | (R)-2-azido-3-(1H-indol-3-yl)propanoic acid.<br>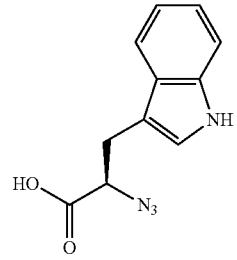 [SMILES: [N-]=[N+]=N[C@H](Cc1c[nH]c2ccccc12)C(=O)O]<br>Aspect: Brown oil. Yield: 89%. Purity: 85%.<br>LC$_{tR}$ = 1.95 min. MS (ESI-): m/z = 229 [M − H]⁻.<br>$^1$H NMR, 300 MHz, MeOD-d₄, δ (ppm): 7.58 (m, 1H), 7.34, (dt, J = 1.6 and 7.9 Hz, 1H), 7.14 (s, 1H), 7.12-7.07 (m, 1H), 7.04-6.99 (m, 1H), 4.19 (dd, J = 5.2 and 8.1 Hz, 1H), 3.34 (ddd, J = 0.66, 5.19 and 14.5 Hz, 1H), 3.18 (ddd, J = 0.4, 8.1 and 14.5 Hz, 1H).<br>$^{13}$C NMR, 75 MHz, MeOD-d₄, δ (ppm): 173.9, 138.0, 128.6, 124.7, 122.4, 119.8, 119.1, 112.2, 110.5, 64.1, 28.7. |
| VII-3 | (S)-2-azido-3-(1H-indol-3-yl)propanoic acid.<br>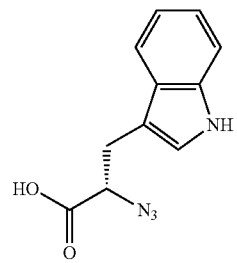 [SMILES: [N-]=[N+]=N[C@@H](Cc1c[nH]c2ccccc12)C(=O)O] |

| | Compounds of formula (VII) azides |
|---|---|
| | Aspect: Brown solid. Yield: 70%. Purity: 70%. LC$_{tR}$ = 1.92 min. MS (ESI−): m/z = 229 [M − H]⁻.<br>¹H NMR, 300 MHz, MeOD-d₄, δ (ppm):<br>7.60-7.56 (m, 1H), 7.36-7.33 (m, 1H), 7.14 (s, 1H), 7.12-7.07 (m, 1H), 7.05-6.99 (m, 1H), 4.20 (dd, J = 5.2 and 8.1 Hz, 1H), 3.38-3.33 (m, 1H), 3.18 (ddd, J = 0.6, 8.1 and 14.7 Hz, 1H).<br>¹³C NMR, 75 MHz, MeOD-d₄, δ (ppm):<br>173.8, 138.0, 128.6, 124.7, 122.4, 119.8, 119.1, 112.3, 110.5, 64.0, 28.7. |
| VII-4 | (R)-3-azido-4-(naphthalen-2-yl)butanoic acid. |
| | 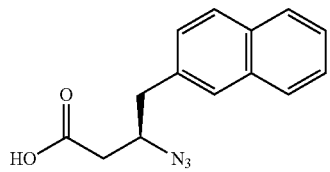 [SMILES: [N-]=[N+]=N[C@@H](CC(=O)O)Cc1ccc2ccccc2c1] |
| | Aspect: Yellow oil. Yield: 100%. LC$_{tR}$ = 2.84 min. MS (ESI−): m/z = 254 [M − H]⁻.<br>¹H NMR, 300 MHz, CDCl₃-d₁ + TMS, δ (ppm):<br>10.34 (br s, 1H), 7.81-7.76 (m, 3H), 7.64 (br s, 1H), 7.48-7.39 (m, 2H), 7.32 (dd, J = 1.7 and 8.4 Hz, 1H), 4.17-4.06 (m, 1H), 3.04 (dd, J = 7.4 and 13.8 Hz, 1H), 2.96 (dd, J = 6.6 and 13.8 Hz, 1H), 2.57 (dd, J = 5.1 and 16.3 Hz, 1H), 2.50 (dd, J = 8.2 and 16.4 Hz, 1H).<br>¹³C NMR, 75 MHz, CDCl₃-d₁ + TMS, δ (ppm):<br>176.4, 134.1, 133.5, 132.5, 128.4, 128.1, 127.7, 127.6, 127.3, 126.3, 125.8, 59.8, 40.6, 38.6. |
| VII-5 | (S)-3-azido-4-(4-hydroxyphenyl)butanoic acid. |
| | 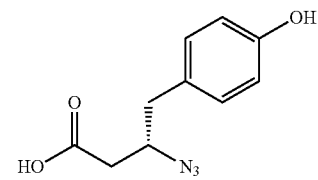 [SMILES: [N-]=[N+]=N[C@H](CC(=O)O)Cc1ccc(O)cc1] |
| | Aspect: Yellow oil. Yield: 92%. Purity: 92%.<br>LC$_{tR}$ = 1.97 min. MS (ESI−): m/z = 220 [M − H]⁻.<br>¹H NMR, 300 MHz, MeOD-d₄, δ (ppm):<br>7.10-7.05 (m, 2H), 6.76-6.72 (m, 2H), 3.99-3.90 (m, 1H), 2.80 (dd, J = 5.8 and 13.8 Hz, 1H), 2.71 (dd, J = 5.8 and 13.8 Hz, 1H), 2.53 (dd, J = 4.4 and 16.3 Hz, 1H), 2.36 (dd, J = 9.2 and 16.3 Hz, 1H).<br>¹³C NMR, 75 MHz, MeOD-d₄, δ (ppm):<br>174.5, 157.4, 131.5, 129.5, 116.3, 62.4, 40.7, 39.6. |
| VII-6 | (R)-2-azido-3-(4-hydroxyphenyl)propanoic acid. |
| | 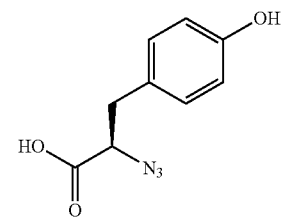 [SMILES: [N-]=[N+]=N[C@H](Cc1ccc(O)cc1)C(=O)O] |
| | Aspect: Brown oil. Yield: 76%. Purity: 97%.<br>LC$_{tR}$ = 1.42 min. MS (ESI−): m/z = 206 [M − H]⁻.<br>¹H NMR, 300 MHz, MeOD-d₄, δ (ppm):<br>7.10-7.06 (m, 2H), 6.75-6.70 (m, 2H), 4.08 (dd, J = 5.2 and 8.5 Hz, 1H), 3.07 (dd, J = 5.2 and 14.1 Hz, 1H), 2.89 (dd, J = 8.5 and 14.1 Hz, 1H).<br>¹³C NMR, 75 MHz, MeOD-d₄, δ (ppm):<br>173.4, 157.5, 131.4, 128.5, 116.3, 64.7, 37.8. |
| VII-7 | (S)-2-azido-3-(4-hydroxyphenyl)propanoic acid. |
| | 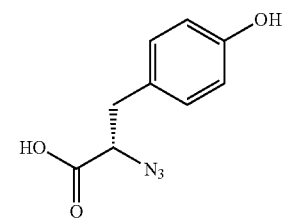 [SMILES: [N-]=[N+]=N[C@@H](Cc1ccc(O)cc1)C(=O)O] |
| | Aspect: Brown oil. Yield: 93%. Purity: 96%.<br>LC$_{tR}$ = 1.40 min. MS (ESI−): m/z = 206 [M − H]⁻.<br>¹H NMR, 300 MHz, MeOD-d₄, δ (ppm):<br>7.10-7.06 (m, 2H), 6.75-6.70 (m, 2H), 4.08 (dd, J = 5.2 and 8.4 Hz, 1H), 3.07 (dd, J = 5.2 and 14.1 Hz, 1H), 2.89 (dd, J = 8.4 and 14.1 Hz, 1H).<br>¹³C NMR, 75 MHz, MeOD-d₄, δ (ppm):<br>173.3, 157.5, 131.4, 128.5, 116.3, 64.7, 37.8. |
| VII-8 | S)-2-azido-3-(4-(trifluoromethoxy)phenyl)propanoic acid |
| | 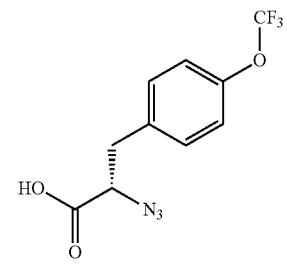 [SMILES: [N-]=[N+]=N[C@@H](Cc1ccc(OC(F)(F)F)cc1)C(=O)O] |
| | Aspect: Yellow oil. Yield: 100%. Purity: 98%.<br>LC$_{tR}$ = 2.32 min. MS (ESI−): m/z = 274 [M − H]⁻.<br>¹H NMR, 300 MHz, MeOD-d₄, δ (ppm):<br>7.39-7.36 (2H, m), 7.22-7.19 (2H, m), 4.25 (1H, dd, J = 5.0 and 8.6 Hz), 3.20 (1H, dd, J = 5.0 and 13.8 Hz), 3.01 (1H, dd, J = 8.6 and 13.8 Hz).<br>¹³C NMR, 75 MHz, MeOD-d₄, δ (ppm):<br>173.0, 149.5 (m), 137.5, 132.1, 122.0, 121.9 (q, J$_{C-F}$ = 252 Hz), 61.1, 37.7.<br>¹⁹F NMR (282 MHz, MeOD-d₄) δ: −58.5 |
| VII-9 | (S)-2-azido-3-(4-phenoxyphenyl)propanoic acid. |
| | 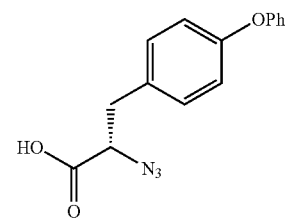 [SMILES: [N-]=[N+]=N[C@@H](Cc1ccc(Oc2ccccc2)cc1)C(=O)O] |
| | Aspect: Yellow oil. Yield: 77%. Purity: 94%.<br>LC$_{tR}$ = 2.50 min. MS (ESI−): m/z = 282 [M − H]⁻.<br>¹H NMR, 300 MHz, MeOD-d₄, δ (ppm):<br>7.37-7.25 (m, 4H), 7.12-7.06 (m, 1H), 6.98-6.90 (m, 4H), 4.19 (dd, J = 5.1 and 8.4 Hz, 1H), 3.16 (dd, J = 5.1 and 14.1 Hz, 1H), 2.98 (dd, J = 8.4 and 14.1 Hz, 1H).<br>¹³C NMR, 75 MHz, MeOD-d₄, δ (ppm):<br>173.2, 158.8, 157.8, 132.9, 131.9, 130.9, 124.3, 119.9, 119.7, 56.4, 37.8. |

| | Compounds of formula (VII) azides |
|---|---|
| VII-10 | (S)-2-azido-3-(4-methoxyphenyl)propanoic acid. |

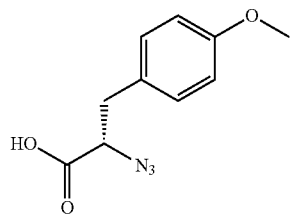 [SMILES: COc1ccc(C[C@H](N=[N+]=[N-])C(=O)O)cc1]

Aspect: Orange oil. Yield: 100%. Purity: 96%.
LC$_{tR}$ = 1.83 min. MS (ESI–): m/z = 220 [M – H]⁻
¹H NMR, 300 MHz, MeOD-d$_4$, δ (ppm):
7.19-7.16 (m, 2H), 6.88-6.83 (m, 2H), 4.11 (dd, J = 5.2 and 8.4 Hz, 1H), 3.77 (s, 3H), 3.11 (dd, J = 5.2 and 14.1 Hz, 1H), 2.92 (dd, J = 8.4 and 14.1 Hz, 1H).
¹³C NMR, 75 MHz, MeOD-d$_4$, δ (ppm):
173.3, 160.2, 131.4, 129.8, 114.9, 64.7, 55.6, 37.7.

| VII-11 | (S)-2-azido-3-(4-(tert-butoxy)phenyl)propanoic acid |
|---|---|

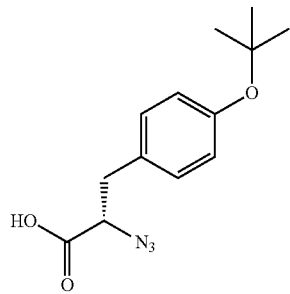 [SMILES: CC(C)(C)Oc1ccc(C[C@H](N=[N+]=[N-])C(=O)O)cc1]

Aspect: Orange oil. Yield: 63%. Purity: 63% (mixture with phenol). LC$_{tR}$ = 2.35 min. MS (ESI–): m/z = 262 [M – H]⁻.
¹H NMR, 300 MHz, MeOD-d$_4$, δ (ppm):
7.20-7.17 (m, 2H), 6.96-6.91 (m, 2H), 4.15 (dd, J = 5.1 and 8.5 Hz, 1H), 3.14 (5.1 and 14.1 Hz, 1H), 2.95 (dd, J = 8.5 and 14.1 Hz, 1H), 1.32 (s, 9H).
¹³C NMR, 75 MHz, MeOD-d$_4$, δ (ppm): 173.2, 155.6, 133.1, 130.9, 125.3, 79.6, 64.5, 37.9, 29.1.

| VII-12 | (2S)-2-azido-3-(1,3-benzodioxol-5-yl)propanoic acid |
|---|---|

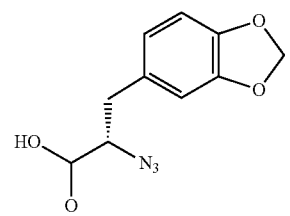

Aspect: brown oil. Yield: quantitative. Purity: 81%, LC tr = 1.97 min, MS (ESI-): m/z = 234 [M – H]⁻.
¹H NMR (MeOD, 300 MHz) δ (ppm):
6.77-6.68 (m, 3H), 5.91 (s, 2H), 4.12 (dd, J = 5.2 and 8.4 Hz, 1H), 3.08 (dd, J = 5.2 and 14.1 Hz, 1H) and 2.90 (dd, J = 8.4 and 14.1 Hz, 1H).
¹³C NMR (MeOD, 75 MHz) δ (ppm):
173.2, 149.2, 148.1, 131.6, 123.6, 110.5, 109.1, 102.3, 64.7 and 38.3.

| | Compounds of formula (VII) azides |
|---|---|
| VII-13 | (2S)-2-azido-3-(3-chloro-4-hydroxy-phenyl)propanoic acid |

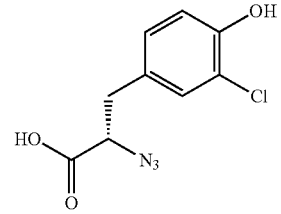 [SMILES: [N-]=[N+]=N[C@@H](Cc1ccc(O)c(Cl)c1)C(=O)O]

Aspect: orange oil. Yield: quantitative. Purity 92%, LC tr = 1.65 mn, MS (ESI–) : m/z = 240 [M – H]⁻.
¹H NMR (CD$_3$OD, 300 MHz) δ (ppm):
7.21 (d, J = 2.1 Hz, 1H), 7.03 (dd, J = 2.1 and 8.3 Hz, 1H), 6.84 (d, J = 8.3 Hz, 1H), 4.15 (dd, J = 5.2 and 8.3 Hz, 1H), 3.06 (dd, J = 5.2 and 13.9 Hz, 1H) and 2.88 (dd, J = 8.3 and 13.9 Hz, 1H).
¹³C NMR (MeOD, 75 MHz) δ (ppm): 173.1, 153.3 ,131.7, 130.1, 129.9, 121.5, 117.5, 64.5, 37.4.

| VII-14 | (2S)-2-azido-3-(3,4-dimethoxyphenyl)propanoic acid |
|---|---|

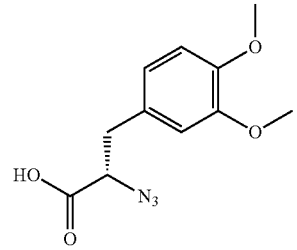 [SMILES: COc1ccc(C[C@H](N=[N+]=[N-])C(=O)O)cc1OC]

Aspect: yellow oil. Yield: quantitative. Purity 96%, LC tr = 1.72 mn, MS (ESI–) : m/z = 250 [M – H]⁻.
¹H NMR (CD$_3$OD, 300 MHz) δ (ppm):
6.89 (d, J = 8.2 Hz, 1H), 6.88 (d, J = 1.9 Hz, 1H), 6.82 (dd, J = 1.9 and 8.2 Hz, 1H), 4.15 (dd, J = 5.1 and 8.3 Hz, 1H), 3.82 (s, 3H), 3.81 (s, 3H), 3.12 (dd, J = 5.1 and 14.0 Hz, 1H) and 2.93 (dd, J = 8.3 and 14 Hz, 1H).
¹³C NMR (MeOD, 75 MHz) δ (ppm):
173.3, 150.4, 149.6, 130.7, 122.9, 114.2, 113.0, 64.6, 56.5, 56.4 and 38.2.

| VII-15 | (2S)-2-azido-3-(3-fluoro-4-hydroxy-phenyl)propanoic acid |
|---|---|

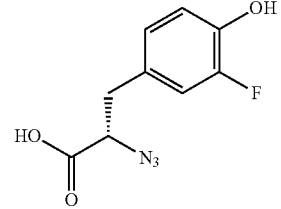 [SMILES: [N-]=[N+]=N[C@@H](Cc1ccc(O)c(F)c1)C(=O)O]

Aspect: yellow oil. Yield: quantitative. Purity: 93%, LC tr = 1.55 min, MS (ESI–): m/z = 224 [M – H]⁻.
¹H NMR (MeOD, 300 MHz) δ (ppm):
6.98 (dd, J = 1.7 and 12.0 Hz, 1H), 6.89 (dd, J = 1.7 and 8.3 Hz, 1H), 6.85 (q, J = 8.3 Hz, 1H), 4.14 (dd, J = 5.2 and 8.3 Hz, 1H), 3.07 (dd, J = 5.2 and 14.1 Hz, 1H) and 2.89 (dd, J = 8.3 and 14.1 Hz, 1H).
¹⁹F NMR (MeOD, 282 MHz) δ: –140.1.
¹³C NMR (MeOD, 75 MHz) δ (ppm):
152.65 (d, J = 240.0 Hz), 145.09 (d, J = 13.1 Hz), 129.68 (d, J = 6.0 Hz), 126.45 (d, J = 3.6 Hz), 118.65 (d, J = 3.0 Hz), 117.77 (d, J = 18.4 Hz), 64.56, and 37.59.

III.1.3 Compound of Formula (VIII)

| | Compound of formula (VIII) | Protocole |
|---|---|---|
| VIII-1 | (R)-methyl 3-azido-4-(1H-indol-3-yl)butanoate. | VIII-a |

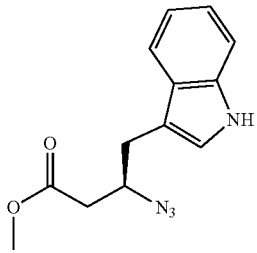 [SMILES: COC(=O)C[C@@H](Cc1c[nH]c2ccccc12)N=[N+]=[N-]]

Aspect: Yellow oil. Yield: 77%. Purity: 94%.
LC$_{tR}$ = 2.83 min. MS (ESI+): m/z = 231 [M − 2N + H]$^+$.
$^1$H NMR, 300 MHz, CDCl$_3$-d$_1$ + TMS, δ (ppm): 8.15 (br s, 1H), 7.61-7.58 (m, 1H), 7.35-7.32 (m, 1H), 7.23-7.10 (m, 2H), 7.03 (d, J = 2.4 Hz, 1H), 4.21-4.10 (m, 1H), 3.66 (s, 3H), 3.07 (ddd, J = 0.6, 7.0 and 14.6 Hz, 1H), 2.98 (ddd, J = 0.6, 6.8 and 14.6 Hz, 1H), 2.58 (dd, J = 5.0 and 16.2 Hz, 1H), 2.48 (dd, J = 8.5 and 16.2 Hz, 1H).
$^{13}$C NMR, 75 MHz, CDCl$_3$-d$_1$ + TMS, δ (ppm): 171.4, 136.2, 127.3, 123.1, 122.2, 119.7, 118.5, 111.3, 110.9, 59.4, 51.9, 38.8, 30.3

| VIII-2 | (R)-methyl 3-azido-4-(naphthalen-2-yl)butanoate. | VIII-a |
|---|---|---|

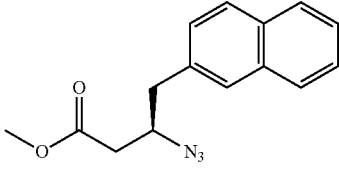 [SMILES: COC(=O)C[C@@H](Cc1ccc2ccccc2c1)N=[N+]=[N-]]

Aspect: Yellow oil. Yield: 50%. Purity: 70%.
LC$_{tR}$ = 3.08 min. MS (ESI+): m/z = Undetected.
$^1$H NMR, 300 MHz, CDCl$_3$-d$_1$ + TMS, δ (ppm): 7.84-7.79 (m, 3H), 7.67 (br s, 1H), 7.51-7.43 (m, 2H), 7.35 (dd, J = 1.7 and 8.4 Hz, 1H), 4.22-4.13 (m, 1H), 3.69 (s, 3H), 3.07 (dd, J = 7.5 and 13.7 Hz, 1H), 2.99 (dd, J = 6.6 and 13.7 Hz, 1H), 2.57 (dd, J = 5.4 and 16.2 Hz, 1H), 2.50 (dd, J = 8.0 and 16.2 Hz, 1H).
$^{13}$C NMR, 75 MHz, CDCl$_3$-d$_1$ + TMS, δ (ppm): 171.1, 134.2, 133.5, 132.4, 128.4, 128.1, 127.7, 127.6, 127.3, 126.2, 125.8, 60.0, 51.9, 40.7, 38.7.

| VIII-3 | (S)-methyl 3-azido-4-(4-hydroxyphenyl)butanoate. | VIII-a |
|---|---|---|

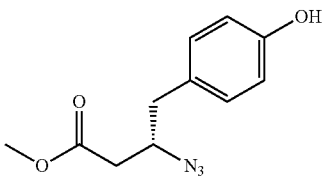 [SMILES: COC(=O)C[C@H](Cc1ccc(O)cc1)N=[N+]=[N-]]

Aspect: Orange oil Yield: 100%. Purity: 100%.
LC$_{tR}$ = 2.37 min. MS (ESI−): m/z = 234 [M − H]$^-$.
$^1$H NMR, 300 MHz, MeOD-d$_4$, δ (ppm): 7.08-7.05 (m, 2H), 6.76-6.72 (m, 2H), 4.01-3.92 (m, 1H), 3.67 (s, 3H), 2.82-2.66 (m, 2H), 2.60-2.53 (m ,1H), 2.45-2.36 (m, 1H).
$^{13}$C NMR, 75 MHz, MeOD-d$_4$, δ (ppm): 173.0, 157.4, 131.5, 129.3, 116.3, 62.4, 52.3, 40.7, 39.5.

| | Compound of formula (VIII) | Protocole |
|---|---|---|
| VIII-4 | (R)-methyl 2-azido-3-(1H-indol-3-yl)propanoate. | VIII-a |

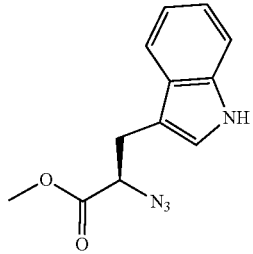 [SMILES: COC(=O)[C@@H](Cc1c[nH]c2ccccc12)N=[N+]=[N-]]

Aspect: Orange oil. Yield: 45%. Purity: 51%.
LC$_{tR}$ = 2.78 min. MS (ESI−): m/z = 243 [M − H]$^-$.
$^1$H NMR, 300 MHz, MeOD-d$_4$, δ (ppm): 7.54 (ddd, J = 0.7, 1.2 and 7.8 Hz, 1H), 7.34, (dt, J = 1.2 and 7.8 Hz, 1H), 7.14 (s, 1H), 7.10-7.07 (m, 1H), 7.04-6.99 (m, 1H), 4.25 (dd, J = 5.9 and 7.6 Hz, 1H), 3.71 (s, 3H), 3.32 (ddd, J = 0.7, 4.6 and 14.6 Hz, 1H), 3.20 (ddd, J = 0.8, 4.6 and 14.6 Hz, 1H).
$^{13}$C NMR, 75 MHz, MeOD-d$_4$, δ (ppm): 172.5, 138.0, 128.5, 124.8, 122.5, 119.9, 119.1, 112.3, 110.1, 63.9, 52.9, 28.6.

| VIII-5 | (S)-methyl 2-azido-3-(1H-indol-3-yl)propanoate. | VIII-a |
|---|---|---|

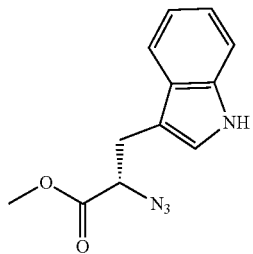 [SMILES: COC(=O)[C@H](Cc1c[nH]c2ccccc12)N=[N+]=[N-]]

Aspect: Brown oil. Yield: 61%. Purity: 65%.
LC$_{tR}$ = 2.77 min. MS (ESI−): m/z = 243 [M − H]$^-$.
$^1$H NMR, 300 MHz, DMSO-d$_6$, δ (ppm): 7.52 (d, J = 7.9 Hz, 1H), 7.38-7.34 (m, 1H), 7.20 (d, J = 2.7 Hz, 1H), 7.11-7.05 (m, 1H), 7.02-6.97 (m, 2H), 4.50 (dd, J = 5.5 and 7.7 Hz, 1H), 3.69 (s, 3H), 3.27-3.20 (m, 1H), 3.15-3.07 (m, 1H).
$^{13}$C NMR, 75 MHz, DMSO-d$_6$, δ (ppm): 170.5, 136.1, 127.1, 124.1, 121.1, 118.6, 118.1, 111.5, 108.4, 61.9, 52.5, 27.1.

| VIII-6 | (R)-methyl 2-azido-3-(4-hydroxyphenyl)propanoate. | VIII-a |
|---|---|---|

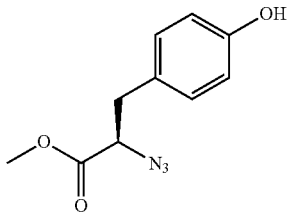 [SMILES: COC(=O)[C@@H](Cc1ccc(O)cc1)N=[N+]=[N-]]

Aspect: Orange oil. Yield: 79%. Purity: 90%.
LC$_{tR}$ = 2.37 min. MS (ESI−): m/z = 220 [M − H]$^-$.
$^1$H NMR, 300 MHz, MeOD-d$_4$, δ (ppm): 7.07-7.02 (m, 2H), 6.74-6.70 (m, 2H), 4.14 (dd, J = 5.7 and 8.1 Hz, 1H), 3.73 (s, 3H), 3.05 (dd, J = 5.7 and 14.0 Hz, 1H), 2.90 (dd, J = 8.1 and 14.0 Hz, 1H).
$^{13}$C NMR, 75 MHz, MeOD-d$_4$, δ (ppm): 172.2, 157.6, 131.3, 128.1, 116.3, 64.6, 52.9, 37.7.

| Compound of formula (VIII) | | Protocole |
|---|---|---|
| VIII-7 | (S)-methyl 2-azido-3-(4-hydroxyphenyl)propanoate. | VIII-a |

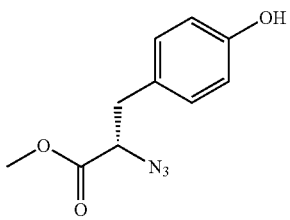 [SMILES: COC(=O)[C@H](Cc1ccc(O)cc1)N=[N+]=[N-]]

Aspect: Orange oil. Yield: 77%. Purity: 80%.
$LC_{tR}$ = 2.37 min. MS (ESI-): m/z = 220 [M − H]⁻.
¹H NMR, 300 MHz, MeOD-d₄, δ (ppm): 7.07-7.02 (m, 2H), 6.74-6.70 (m, 2H), 4.13 (dd, J = 5.7 and 8.1 Hz, 1H), 3.73 (s, 3H), 3.04 (dd, J = 5.7 and 14.0 Hz, 1H), 2.90 (dd, J = 8.1 and 14.0 Hz, 1H).
¹³C NMR, 75 MHz, MeOD-d₄, δ (ppm): 172.2, 157.6, 131.3, 128.1, 116.3, 64.6, 52.9, 37.7.

| VIII-8 | (S)-methyl 2-azido-3-(4-(trifluoromethoxy)phenyl)propanoate. | VIII-a |
|---|---|---|

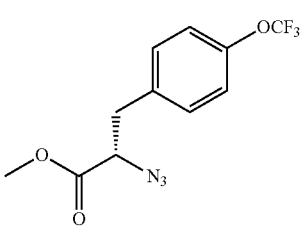 [SMILES: COC(=O)[C@H](Cc1ccc(OC(F)(F)F)cc1)N=[N+]=[N-]]

Aspect: Yellow oil. Yield: 93%. Purity: 97%.
$LC_{tR}$ = 3.22 min. MS (ESI-/ESI+): No ionization.
¹H NMR, 300 MHz, MeOD-d₄, δ (ppm): 7.37-7.32 (m, 2H), 7.23-7.20 (m, 2H), 4.32 (dd, J = 5.4 and 8.4 Hz, 1H), 3.76 (s, 3H) 3.18 (dd, J = 5.4 and 14.1 Hz, 1H), 3.01 (dd, J = 8.4 and 14.1 Hz, 1H).
¹³C NMR, 75 MHz, MeOD-d₄, δ (ppm): 171.8, 149.6 (m), 137.0, 132.1, 122.1, 121.9 (q, $J_{C-F}$ = 253 Hz), 64.1, 53.1, 37.6.
¹⁹F NMR (282 MHz, MeOD-d₄) δ: −60.5.

| VIII-9 | (S)-methyl 2-azido-3-(4-phenoxyphenyl)propanoate. | VIII-a |
|---|---|---|

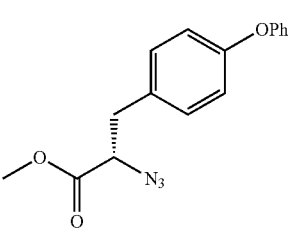 [SMILES: COC(=O)[C@H](Cc1ccc(Oc2ccccc2)cc1)N=[N+]=[N-]]

Aspect : Yellow oil. Yield: 77%. Purity: 82%.
$LC_{tR}$ = 3.32 min. MS (ESI-/ESI+): m/z = No ionization.
¹H NMR, 300 MHz, MeOD-d₄, δ (ppm): 7.37-7.30 (m, 2H), 7.25-7.20 (m, 2H), 7.12-7.06 (m, 1H), 6.98-6.90 (m, 4H), 4.25 (dd, J = 5.5 and 8.2 Hz, 1H), 3.76 (s, 3H) 3.14 (dd, J = 5.5 and 13.1 Hz, 1H), 2.98 (dd, J = 8.2 and 13.1 Hz, 1H).
¹³C NMR, 75 MHz, MeOD-d₄, δ (ppm): 172, 158.7, 157.9, 132.5, 131.8, 130.8, 124.4, 119.9, 119.8, 64.4, 53.0, 37.7

| VIII-10 | (S)-methyl 2-azido-3-(4-methoxyphenyl)propanoate. | VIII-a |
|---|---|---|

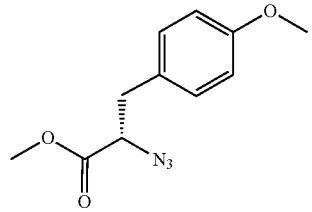

Aspect: Orange oil. Yield: 83%. Purity: 90%.
$LC_{tR}$ = 2.85 min. MS (ESI-/ESI+): No ionization.
¹H NMR, 300 MHz, MeOD-d₄, δ (ppm): 7.16-7.13 (m, 2H), 6.87-6.84 (m, 2H), 4.18 (dd, J = 5.6 and 8.1 Hz, 1H), 3.77 (s, 3H), 3.74 (s, 3H), 3.08 (dd, J = 5.6 and 14.0 Hz, 1H), 2.92 (dd, J = 8.1 and 14.0 Hz, 1H).
¹³C NMR, 75 MHz, MeOD-d₄, δ (ppm): 172.1, 160.3, 131.4, 129.4, 114.9, 64.5, 55.6, 52.9, 37.7.

| VIII-11 | (S)-methyl 2-azido-3-(4-(tert-butoxy)phenyl)propanoate. | VIII-a |
|---|---|---|

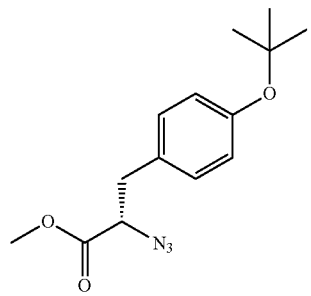 [SMILES: COC(=O)[C@H](Cc1ccc(OC(C)(C)C)cc1)N=[N+]=[N-]]

Aspect: Yellow oil. Yield: 50%. Purity: 51% (mixture with phenol). $LC_{tR}$ = 3.23 min. MS (ESI-/ESI+): m/z = No ionization.
¹H NMR, 300 MHz, MeOD-d₄, δ (ppm): 7.18-7.13 (m, 2H), 6.96-6.91 (m, 2H), 4.21 (dd, J = 5.7 and 8.4 Hz, 1H), 3.74 (s, 3H), 3.12 (dd, J = 5.7 and 14.1 Hz, 1H), 2.96 (dd, J = 8.4 and 14.1 Hz, 1H), 1.32 (s, 9H).
¹³C NMR, 75 MHz, MeOD-d₄, δ (ppm): 172.0, 155.7, 131.4, 130.9, 125.3, 79.6, 64.4, 53.0, 37.9, 29.2.

| VIII-12 | methyl (2S)-2-azido-3-(1,3-benzodioxol-5-yl)propanoate | VIII-a |
|---|---|---|

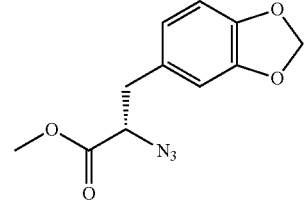 [SMILES: COC(=O)[C@H](Cc1ccc2c(c1)OCO2)N=[N+]=[N-]]

Aspect: orange oil. Yield: 80%. Purity (LC-MS): 96%, LC tr = 2.80 min, MS (ESI+): No ionisation of the compound.
¹H NMR (MeOD, 300 MHz) δ (ppm): 6.74 (d, J = 8 Hz, 1H), 6.73 (d, J = 1.6 Hz, 1H), 6.68 (dd, J = 1.6 and 8 Hz, 1H), 5.90 (s, 2H), 4.18 (dd, J = 5.6 and 8.2 Hz, 1H), 3.74 (s, 3H), 3.06 (dd, J = 5.6 and 14.1 Hz, 1H) and 2.90 (dd, J = 8.2 and 14.1 Hz, 1H).
¹³C NMR (MeOD, 75 MHz) δ (ppm): 172.0, 149.2, 148.1, 131.1, 123.5, 110.5, 109.1, 102.3, 64.4, 53.0 and 38.1.

-continued

| Compound of formula (VIII) | | Protocole |
|---|---|---|
| VIII-13 | methyl (2S)-2-azido-3-(3-chloro-4-hydroxyphenyl)propanoate | VIII-a |

Aspect: orange oil. Yield: 88%. Purity (LC-MS): 89%, LC tr = 2.60 min, MS (ESI+): m/z = 254 [M − H]⁻.
$^1$H NMR (MeOD-$d_4$, 300 MHz) δ (ppm): 7.18 (d, J = 2.1 Hz, 1H), 6.99 (dd, J = 2.1 and 8.3 Hz, 1H), 6.84 (d, J = 8.3 Hz, 1H), 4.21 (dd, J = 5.6 and 8.2 Hz, 1H), 3.75 (s, 3H), 3.04 (dd, J = 5.6 and 14.1 Hz, 1H) and 2.88 (dd, J = 8.2 and 14.1 Hz, 1H).
$^{13}$C NMR (MeOD-$d_4$, 300 MHz) δ (ppm): 171.9, 153.4, 131.7, 129.9, 129.7, 121.5, 117.6, 64.3, 53.0 and 37.3.

| VIII-14 | methyl (2S)-2-azido-3-(3,4-dimethoxyphenyl)propanoate | VIII-a |
|---|---|---|

Aspect: orange oil. Yield: 99%. Purity (LC-MS): 97%, LC tr = 2.65 min, MS (ESI+): no ionisation.
$^1$H NMR (MeOD-$d_4$, 300 MHz) δ (ppm): 6.88 (d, J = 8.2 Hz, 1H), 6.85 (d, J = 1.9 Hz, 1H), 6.78 (dd, J = 1.9 and 8.2 Hz, 1H), 4.21 (dd, J = 5.7 and 8.2 Hz, 1H), 3.82 (s, 3H), 3.80 (s, 3H), 3.75 (s, 3H), 3.09 (dd, J = 5.7 and 14 Hz, 1H) and 2.94 (dd, J = 8.2 and 14 Hz, 1H).
$^{13}$C NMR (MeOD-$d_4$, 300 MHz) δ (ppm): 172.1, 150.4, 149.7, 130.3, 122.8, 114.2, 113.0, 64.4, 56.4 (2C), 53.0 and 38.1.

| VIII-15 | methyl (2S)-2-azido-3-(3-fluoro-4-hydroxyphenyl)propanoate | VIII-a |
|---|---|---|

Aspect: yellow oil. Yield: 80%. Purity (LC-MS): 96%, LC tr = 2.43 min, MS (ESI−): 238 [M − H]⁻.
$^1$H NMR (MeOD, 300 MHz) δ (ppm): 6.97-6.83 (m, 3H), 4.20 (dd, J = 5.6 and 8.1 Hz, 1H), 3.74 (s, 3H), 3.05 (dd, J = 5.6 and 14.1 Hz, 1H) and 2.90 (dd, J = 8.1 and 14.1 Hz, 1H).
$^{19}$F NMR (MeOD, 282 MHz) δ: −139.9.
$^{13}$C NMR (MeOD, 75 MHz) δ (ppm): 172.0, 152.7 (d, J = 240 Hz), 145.2 (d, J = 13.1 Hz), 129.2 (d, J = 6.0 Hz), 126.4 (d, J = 3.6 Hz), 118.7 (d, J = 3.7 Hz), 117.8 (d, J = 18.8 Hz), 64.3, 53.0 and 37.5.

| VIII-16 | methyl (2S)-2-azido-3-(3-methoxyphenyl)propanoate | VIII-a |
|---|---|---|

Aspect: brownish oil. Yield: 80%. Purity 100%, LC tr = 2.87 mn, MS (EI−): no ionization
$^1$H NMR (acetone-$d_6$, 300 MHz) δ: 7.23 (m, 1H), 6.84 (m, 3H), 4.34 (dd, J = 8.6 and 5.5 Hz, 1H), 3.78 (s, 3H), 3.75 (s, 3H), 3.16 (dd, J = 13.9 and 5.5 Hz, 1H), 2.98 (dd, J = 13.9 and 8.6 Hz, 1H).
$^{13}$C NMR (acetone-$d_6$, 75 MHz) δ: 170.1, 159.7, 137.8, 129.6, 121.5, 114.9, 112.5, 62.8, 55.5, 53.0, 37.3.

| VIII-17 | methyl (2S)-2-azido-3-(2-methoxyphenyl)propanoate | VIII-a |
|---|---|---|

Aspect: brownish oil. Yield: 92%. Purity 89%, LC tr = 2.97 mn, MS (EI): no ionization.
$^1$H NMR (acetone-$d_6$, 300 MHz) δ: 7.25 (td, J = 11.9 and 1.7 Hz, 1H), 7.19 (dd, J = 7.3 and 1.7 Hz, 1H), 6.98 (m, 1H), 6.89 (td, J = 7.3 and 1.1 Hz, 1H), 4.22 (dd, J = 8.9 and 5.7 Hz, 1H), 3.86 (s, 3H), 3.73 (s, 3H), 3.20 (dd, J = 13.7 and 5.7 Hz, 1H), 2.98 (dd, J = 13.7 and 8.9 Hz, 1H).
$^{13}$C NMR (acetone-$d_6$, 75 MHz) δ: 171.5, 158.5, 131.7, 129.4, 125.1, 121.1, 111.3, 61.9, 55.7, 52.7, 33.1.

| VIII-18 | methyl (2S)-2-azido-3-[4-(2-methoxyethoxy)phenyl]propanoate | VIII-b |
|---|---|---|

Aspect: clear oil. Yield: 54%. Purity 100%, LC tr = 2.77 mn: no ionization.
$^1$H NMR (acetone-$d_6$ 300 MHz) δ: 7.19 (m, 2H), 6.89 (m, 2H), 4.27 (dd, J = 8.4 and 5.5 Hz, 1H), 4.10 (m, 2H), 3.74 (s, 3H), 3.69 (m, 2H), 3.35 (s, 3H), 3.10 (dd, J = 14.1 and 5.5 Hz, 1H), 2.95 (d, J = 14.1 and 8.4 Hz, 1H).
$^{13}$C NMR (acetone-$d_6$ 75 MHz) δ: 171.1, 159.0, 131.2 (2C), 129.2, 115.3 (2C), 71.7, 68.1, 63.8, 58.9, 52.8, 37.2.

| Compound of formula (VIII) | | Protocole |
|---|---|---|
| VIII-19 | methyl (2S)-2-azido-3-(3-chloro-4-methoxyphenyl)propanoate | VIII-b |

Aspect: yellow oil. Yield: 74%. Purity (LC-MS): 96%, LC tr = 2.43 min, MS (ESI–): 238 [M – H]⁻.
$^1$H NMR (300 MHz, CDCl$_3$) δ: 7.24 (d, J = 2.0 Hz, 1H), 7.08 (dd, J = 8.5 Hz and 2.0 Hz, 1H), 6.87 (d, J = 8.5 Hz, 1H), 4.04 (dd, J = 8.5 Hz and 5.5 Hz, 1H), 3.89 (s, 3H), 3.79 (s, 3H), 3.09 (dd, J = 14.5 and 5.5 Hz, 1H), 3.15 (dd, J = 14.5 Hz and 8.5 Hz, 1H).
$^{13}$C NMR (75 MHz, CDCl$_3$) δ: 170.3, 154.4, 131.1, 129.1, 128.7, 122.6, 112.3, 63.3, 56.3, 52.9, 36.7.

| | | |
|---|---|---|
| VIII-20 | methyl (2S)-2-azido-3-(3-fluoro-4-methoxyphenyl)propanoate | VIII-b |

Aspect: yellow oil. Yield: 83%. Purity: 60%, LC tr = 2.85 min, no ionization.
$^1$H NMR (Acetone-d$_6$, 300 MHz) δ: 7.11-7.01 (m, 3H), 4.35 (dd, J = 8.4 and 5.5 Hz, 1H), 3.86 (s, 3H), 3.81 (s, 3H), 3.12 (dd, J = 14.2 and 5.5 Hz, 1H), 2.96 (dd, J = 14.2 and 8.4 Hz, 1H).
$^{19}$F NMR (Acetone-d$_6$, 282 MHz) δ: –137.14.
$^{13}$C NMR (Acetone-d$_6$, 75 MHz) δ: 170.9, 152.8 (d, J = 244.2 Hz), 147.6 (d, J = 10.8 Hz), 130.1 (d, J = 6.4 Hz), 126.3 (d, J = 3.6 Hz), 117.6 (d, J = 18.4 Hz), 114.4 (d, J = 2.1 Hz), 63.5, 56.4, 52.8, 36.9.

| | | |
|---|---|---|
| VIII-21 | methyl (2S)-2-azido-3-[4-(2-trimethylsilylethynyl)phenyl]propanoate | VIII-c |

Aspect: clear oil. Yield: 48%. Purity: 60%, LC tr = 3.67 min, MS (ESI+): m/z = 302 [M + H]⁺.
$^1$H NMR (CDCl$_3$, 300 MHz) δ: 7.43 (m, 2H), 7.17 (m, 2H), 4.05 (dd, J = 8.5 and 5.6 Hz, 1H), 3.76 (s, 3H), 3.15 (dd, J = 14.0 and 5.6 Hz, 1H), 2.99 (dd, J = 14.0 and 8.5 Hz, 1H), 0.24 (s, 9H).

| | | |
|---|---|---|
| VIII-22 | methyl (2S)-2-azido-3-(4-cyanophenyl)propanoate | VIII-b |

Aspect: clear oil. Yield: 44%. Purity (LC-MS): 100%, LC tr = 2.67 min, no ionization.
$^1$H NMR (CDCl$_3$, 300 MHz) δ: 7.62 (m, 2H), 7.35 (m, 2H), 4.13 (dd, J = 8.6 and 5.2 Hz, 1H), 3.80 (s, 3H), 3.21 (dd, J = 14.1 and 5.2 Hz, 1H), 3.04 (dd, J = 14.1 and 8.6 Hz, 1H).
$^{13}$C NMR (CDCl$_3$, 75 MHz) δ: 169.9, 141.6, 132.5 (2C), 130.2 (2C), 118.7, 111.5, 62.7, 53.0, 37.6.

III.1.4 Compound of Formula (IX)

| Compound of formula (IX) | |
|---|---|
| IX-1 | (R)-methyl 3-azido-4-(1H-indol-3-yl)butanamide. |

Aspect: Yellow oil. Yield: 77%. Purity: 94%.
LC$_{tR}$ = 2.08 min. MS (ESI–): m/z = 258 [M – H]⁻.
$^1$H NMR, 300 MHz, MeOD-d$_4$, δ (ppm): 8.57 (s, 1H), 7.60 (d, J = 7.9 Hz, 1 H), 7.38 (d, J = 7.9 Hz, 1H), 7.03-7.17 (m, 3H), 4.13-4.22 (m, 1H), 2.99-3.12 (m, 2H), 2.21-2.43 (m, 2H).
$^{13}$C NMR, 75 MHz, MeOD-d$_4$, δ (ppm): 170.8, 138.9, 129.6, 125.6, 123.3, 120.7, 120.1, 113.2, 112.1, 62.4, 39.5, 32.3.

| | |
|---|---|
| IX-2 | (R)-3-azido-N-hydroxy-4-(naphthalen-2-yl)butanamide. |

Aspect: Colorless oil. Yield: 88%. Purity: 80%.
LC$_{tR}$ = 2.43 min. MS (ESI+): m/z = 271 [M + H]⁺.
$^1$H NMR, 300 MHz, DMSO-d$_6$, δ (ppm): 7.83-7.77 (m, 3H), 7.66 (br, 1H), 7.50-7.44 (m, 2H), 7.33 (d, J = 8.4 Hz, 1H), 4.22 (br, 1H), 3.04 (d, J = 6.7 Hz, 2H), 2.44-2.17 (m, 2H).
$^{13}$C NMR, 75 MHz, DMSO-d$_6$, δ (ppm): 168.7, 134.2, 133.7, 132.7, 128.6, 128.4, 127.9, 127.8, 127.5, 126.5, 126.0, 60.3, 40.9, 37.7.

Compound of formula (IX)

| | |
|---|---|
| IX-3 | (S)-3-azido-N-hydroxy-4-(4-hydroxyphenyl)butanamide. |

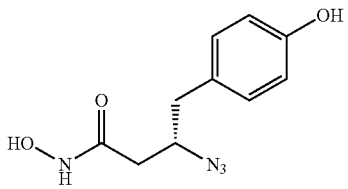 [SMILES: [N-]=[N+]=N[C@H](CC(=O)NO)Cc1ccc(O)cc1]

Aspect: Colorless oil. Yield: 59%. $LC_{tR}$ = 1.67 min. MS (ESI−): m/z = 235 [M − H]⁻.
$^{1}$H NMR, 300 MHz, MeOD-d$_{4}$, δ (ppm): 8.56 (s, 1H), 7.06 (d, J = 8.3 Hz, 2H), 6.75 (d, J = 8.3 Hz, 2H), 3.95-4.04 (m, 1H), 2.67-2.83 (m, 2H), 2.14-2.34 (m, 2H).
$^{13}$C NMR, 75 MHz, MeOD-d$_{4}$, δ (ppm): 170.5, 158.1, 132.3, 130.2, 117.2, 63.2, 41.7, 39.3.

III.1.5 Compound of Formula (X)

Compound of formula (X)

| | |
|---|---|
| X-1 | (R)-methyl 3-(1H-indol-3-yl)-2-(4-((5-phenylthiophene-2-sulfonamido)methyl)-1H-1,2,3-triazol-1-yl) propanoate |

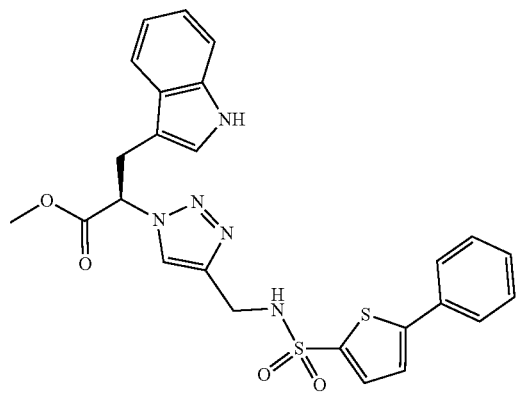 [SMILES: COC(=O)[C@@H](Cc1c[nH]c2ccccc12)n1cc(CNS(=O)(=O)c2ccc(-c3ccccc3)s2)nn1]

Aspect: White solid. Yield: 77%. Purity: 95%. $LC_{tR}$ = 2.97 min. MS (ESI+): m/z = 522 [M + H]⁺.
$^{1}$H NMR, 300 MHz, DMSO-d$_{6}$, δ (ppm): 9.27 (br, 1H), 8.56 (d, J = 1.6 Hz,1H), 8.08 (s, 1H), 8.02 (d, J = 8.0 Hz, 1H), 7.88 (td, J = 7.6 and 1.6 Hz, 1H), 7.81 (d, J = 4 Hz, 1H), 7.58 (d, J = 4 Hz, 1H), 7.37 (m, 1H), 6.90 (d, J = 8.4 Hz, 2H), 6.60 (d, J = 8.4 Hz, 2H), 5.19 (t, J = 7.8 Hz, 1H), 4.16 (s, 2H), 3.20 (dd, J = 7.5 and 14.0 Hz, 1H), 3.07 (dd, J = 8.1 and 14.0 Hz, 1H).
$^{13}$C NMR, 75 MHz, DMSO-d$_{6}$, δ (ppm): 163.8, 156.2, 150.4, 150.0, 149.7, 143.2, 142.0, 137.5, 132.6, 129.9, 125.7, 124.9, 123.7, 122.1, 119.3, 115.1, 62.0, 38.3, 36.7.

| | |
|---|---|
| X-2 | (S)-methyl 3-(1H-indol-3-yl)-2-(4-((N-methyl-5-phenylthiophene-2-sulfonamido)methyl)-1H-1,2,3-triazol-1-yl)propanoate. |

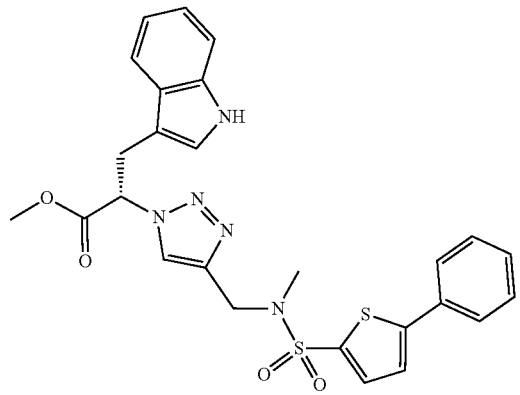 [SMILES: COC(=O)[C@H](Cc1c[nH]c2ccccc12)n1cc(CN(C)S(=O)(=O)c2ccc(-c3ccccc3)s2)nn1]

Aspect: beige solid. Yield: 72%. Purity: 98%. $LC_{tR}$ = 2.77 min. MS (ESI+): m/z = 536 [M + H]⁺.
$^{1}$H NMR, 300 MHz, MeOD-d$_{4}$, δ (ppm): 7.72 (s, 1H), 7.66-7.63 (m, 2H), 7.46 (d, J = 3.7 Hz, 1H), 7.44-7.42 (m, 1H), 7.42-7.36 (m, 3H), 7.33 (d, J = 3.7 Hz, 1H), 7.31-7.28 (m, 1H), 7.10-7.05 (m, 1H), 7.01-6.96 (m, 1H), 6.83 (bs, 1H), 5.72 (dd, J = 3.1 and 8.8 Hz 1H), 4.33 (s, 2H), 3.73 (s, 3H), 3.69-3.60 (dd, J = 3.1 and 8.8 Hz, 2H), 2.59 (s, 3H).
$^{13}$C NMR, 75 MHz, MeOD-d$_{4}$, δ (ppm): 170.0, 143.2, 134.6, 130.3, 130.3, 127.2, 125.7, 124.8, 122.6, 120.1, 118.8, 112.4, 109.3, 65.1, 53.5, 46.1, 35.2, 29.3.

| Compound of formula (X) | |
|---|---|
| X-3 | (S)-methyl 3-(1H-indol-3-yl)-2-(4-((5-phenylthiophene-2-sulfonamido)methyl)-1H-1,2,3-triazol-1-yl)propanoate |

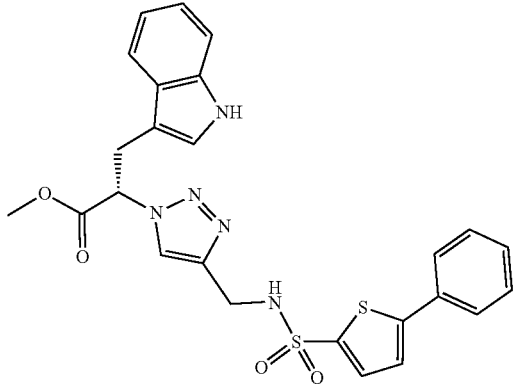 [SMILES: COC(=O)[C@H](Cc1c[nH]c2ccccc12)n1cc(CNS(=O)(=O)c2ccc(-c3ccccc3)s2)nn1]

Aspect: Yellow solid. Yield: 43%. Purity: 92%. $LC_{tR}$ = 2.95 min. MS (ESI+): m/z = 522 [M + H]$^+$.
$^1$H NMR, 300 MHz, MeOD-d$_4$, δ (ppm): 7.71 (s, 1H), 7.59-7.56 (m, 2H), 7.41 (d, J = 3.9 Hz, 1H), 7.37-7.29 (m, 5H), 7.18 (d, J = 3.9 Hz, 1H), 7.11-7.06 (m, 1H), 7.02-6.97 (m, 1H), 6.80 (s, 1H), 5.63 (dd, J = 5.7 and 9.2 Hz, 1H), 4.23 (s, 2H), 3.64 (s, 3H), 3.58-3.46 (m, 2H).
$^{13}$C NMR, 75 MHz, MeOD-d$_4$, δ (ppm): 170.3, 151.9, 145.0, 140.8, 137.8, 134.1, 134.0, 130.3, 130.1, 128.1, 127.1, 124.8, 124.7, 124.4, 122.6, 120.1, 118.8, 112.4, 109.2, 64.9, 53.4, 39.2, 29.4.

| X-4 | (S)-methyl 2-(4-((5-bromothiophene-2-sulfonamido)methyl)-1H-1,2,3-triazol-1-yl)-3-(1H-indol-3-yl)propanoate. |
|---|---|

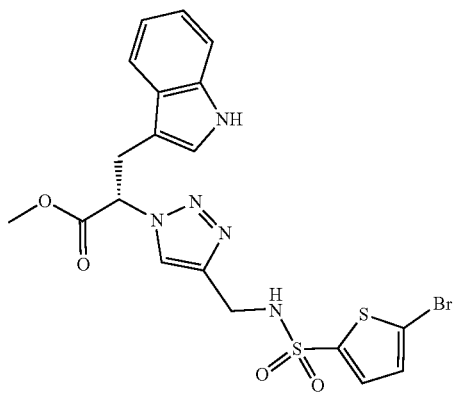 [SMILES: COC(=O)[C@H](Cc1c[nH]c2ccccc12)n1cc(CNS(=O)(=O)c2ccc(Br)s2)nn1]

Aspect: White powder. Yield: 27%. Purity: 92%. $LC_{tR}$ = 2.82 min. MS (ESI+): m/z = 525 [M + H]$^+$.
$^1$H NMR, 300 MHz, MeOD-d$_4$, δ (ppm): 10.29 (br, 1H), 7.76 (s, 1H), 7.86 (d, J = 7.9 Hz, 1H), 7.32-7.28 (m, 1H), 7.22 (d, J = 4.0 Hz, 1H), 7.11-7.06 (m, 1H), 7.03-6.98 (m, 2H), 6.86-6.85(m, 1H), 5.69 (dd, J = 5.4 and 9.2 Hz, 1H), 4.18 (s, 2H), 3.73-3.53 (m, 5H).
$^{13}$C NMR, 75 MHz, MeOD-d$_4$, δ (ppm): 170.3, 144.8, 143.8, 138.0, 137.8, 133.4, 131.9, 128.1, 124.9, 122.6, 120.1, 120.0, 119.8, 118.8, 112.5, 109.3, 64.9, 53.5, 39.2, 29.4.

| X-5 | (R)-methyl 3-(4-hydroxyphenyl)-2-(4-((5-phenylthiophene-2-sulfonamido)methyl)-1H-1,2,3-triazol-1-yl)propanoate |
|---|---|

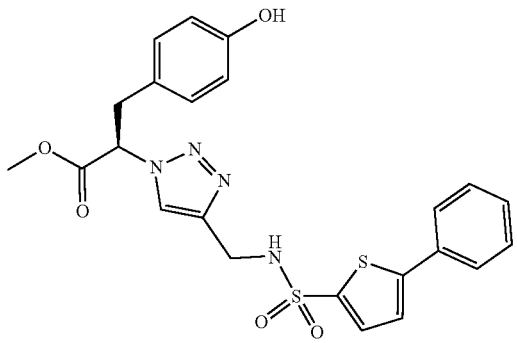 [SMILES: COC(=O)[C@@H](Cc1ccc(O)cc1)n1cc(CNS(=O)(=O)c2ccc(-c3ccccc3)s2)nn1]

| Compound of formula (X) |
|---|
| Aspect: White solid. Yield: 73%. Purity: 100%. LC$_{tR}$ = 2.70 min. MS (ESI+): m/z = 499 [M + H]$^+$.<br>$^1$H NMR, 300 MHz, DMSO-d$_6$, δ (ppm): 9.25 (s, 1H), 8.46 (s, 1H), 8.03 (s, 1H), 7.74-7.71 (m, 2H), 7.58 (d, J = 3.9 Hz, 1H), 7.55 (d, J = 3.9 Hz, 1H), 7.50-7.38 (m, 3H), 6.87 (d, J = 8.6 Hz, 2H), 6.58 (d, J = 8.6 Hz, 2H), 5.71-5.66 (m, 1H), 4.15 (s, 2H), 3.63 (s, 3H), 3.42-3.26 (m, 2H).<br>$^{13}$C NMR, 75 MHz, DMSO-d$_6$, δ (ppm): 168.7, 156.2, 149.1, 143.2, 139.6, 132.8, 132.2, 129.9, 129.4, 129.1, 125.9, 125.6, 124.0, 123.5, 115.1, 63.3, 52.7, 38.3, 36.0. |
| X-6    (S)-methyl 4-(4-hydroxyphenyl)-3-(4-((N-methyl-5-phenylthiophene-2-sulfonamido)methyl)-1H-1,2,3-triazol-1-yl)butanoate |

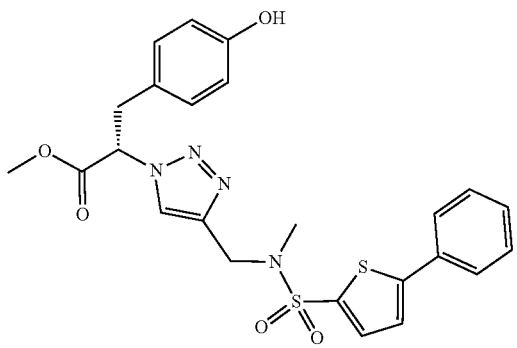 [SMILES: COC(=O)[C@H](Cc1ccc(O)cc1)n1cc(CN(C)S(=O)(=O)c2ccc(-c3ccccc3)s2)nn1]

| Aspect: White solid. Yield: 37%. Purity: 100%. LC$_{tR}$ = 2.75 min. MS (ESI−): m/z = 525 [M − H]$^-$.<br>$^1$H NMR, 300 MHz, MeOD-d$_4$, δ (ppm): 7.68-7.63 (m, 2H), 7.58 (s, 1H), 7.55 (d, J = 4.0 Hz, 1H), 7.45-7.34 (m, 4H), 6.78-6.73 (m, 2H), 6.63-6.58 (m, 2H), 5.08-4.99 (m, 1H), 4.36-4.26 (m, 2H), 3.55 (s, 3H), 3.15-2.95 (m, 4H), 2.65 (s, 3H).<br>$^{13}$C NMR, 75 MHz, MeOD-d$_4$, δ (ppm): 172.0, 157.5, 152.5, 142.8, 136.9, 134.8, 133.9, 131.1, 130.4, 130.3, 128.3, 127.2, 125.6, 124.8, 116.3, 61.5, 52.4, 46.2, 41.6; 39.5, 35.2. |
| X-7    (S)-N-hydroxy-3-(4-hydroxyphenyl)-2-(4-((5-phenylthiophene-2-sulfonamido)methyl)-1H-1,2,3-triazol-1-yl)propanamide |

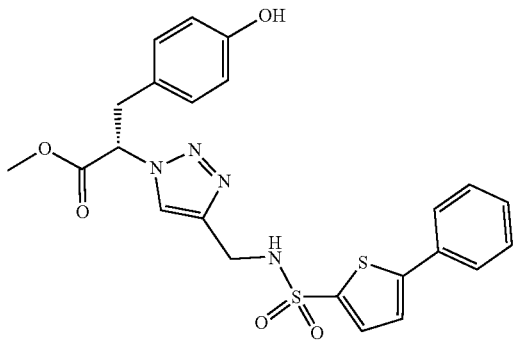 [SMILES: COC(=O)[C@H](Cc1ccc(O)cc1)n1cc(CNS(=O)(=O)c2ccc(-c3ccccc3)s2)nn1]

| Aspect: White solid. Yield: 44%. Purity: 99%. LC$_{tR}$ = 2.70 min. MS (ESI−): m/z = 497 [M − H]$^-$.<br>$^1$H NMR, 300 MHz, DMSO-d$_6$, δ (ppm): 9.24 (s, 1H), 8.45 (s, 1H), 8.02 (s, 1H), 7.74-7.69 (m, 2H), 7.58-7.53 (m, 2H), 7.50-7.38 (m, 3H), 6.88-6.85 (m ,2H), 6.60-6.55 (m, 2H), 5.71.5-65 (m, 1H), 4.15 (s, 2H), 3.64 (s, 3H), 3.40-3.25 (m, 2H).<br>$^{13}$C NMR, 75 MHz, DMSO-d$_6$, δ (ppm): 168.7, 156.2, 149.1, 143.2, 139.6, 132.7, 132.2, 129.9, 129.4, 129.1, 125.9, 125.6, 124.0, 123.5, 115.1, 63.3, 52.8, 38.3, 36.0. |
| X-8    (S)-methyl 3-(4-hydroxyphenyl)-2-(4-((N-methyl-5-phenylthiophene-2-sulfonamido)methyl)-1H-1,2,3-triazol-1-yl)propanoate. |

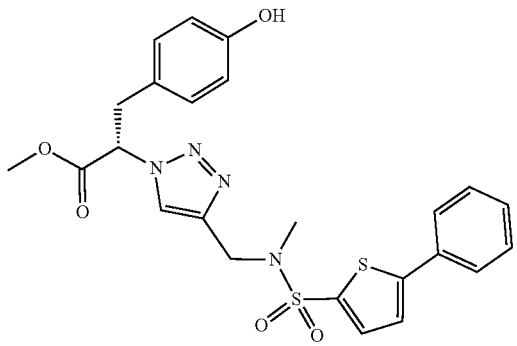 [SMILES: COC(=O)[C@H](Cc1ccc(O)cc1)n1cc(CN(C)S(=O)(=O)c2ccc(-c3ccccc3)s2)nn1]

| Compound of formula (X) |
|---|

Aspect: White solid. Yield: 68%. Purity: 100%. $LC_{tR}$ = 2.90 min. MS (ESI−): m/z = 511 [M − H]⁻.

$^1$H NMR, 300 MHz, MeOD-$d_4$, δ (ppm): 7.84 (s, 1H), 7.66-7.63 (m, 2H), 7.53 (d, J = 3.9 Hz, 1H), 7.44-7.33 (m, 4H), 6.83-6.80 (m, 2H), 6.62-6.58 (m, 2H), 5.60 (dd, J = 5.5 and 10.2 Hz, 1H), 4.37 (d, J = 14.9 Hz, 1H), 4.31 (d, J = 14.9 Hz, 1H), 3.70 (s, 3H), 3.44 (dd, J = 5.5 and 14.3 Hz, 1H), 3.29 (dd, J = 10.2 and 14.3 Hz, 1H), 2.68 (s, 3H).

$^{13}$C NMR, 75 MHz, MeOD-$d_4$, δ (ppm): δ: 170.0, 157.7, 152.5, 143.4, 136.8, 134.8, 133.9, 131.1, 130.4, 130.3, 127.2, 127.1, 125.7, 124.8, 116.4, 65.7, 53.5, 46.2, 38.2, 35.3.

X-9     (S)-methyl 2-(4-((5-bromothiophene-2-sulfonamido)methyl)-1H-1,2,3-triazol-1-yl)-3-(4-hydroxyphenyl)propanoate.

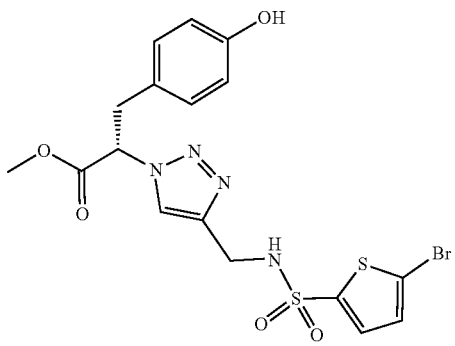 [SMILES: COC(=O)[C@H](Cc1ccc(O)cc1)n1cc(CNS(=O)(=O)c2ccc(Br)s2)nn1]

Aspect: Yellow solid. Yield: 91%. Purity: 93%. $LC_{tR}$ = 2.52 min. MS (ESI−): m/z = 501 [M − H]⁻.

$^1$H NMR, 300 MHz, DMSO-$d_6$, δ (ppm): 9.25 (s, 1H), 8.52 (t, J = 5.8 Hz, 1H), 8.03 (s, 1H), 7.40 (d, J = 4.0 Hz, 1H), 7.31 (d, J = 4.0 Hz, 1H), 6.89 (d, J = 8.5 Hz, 2H), 6.59 (d, J = 8.5 Hz, 2H), 5.72-5.67 (m, 1H), 4.12-4.10 (m, 2H), 3.68 (s, 3H), 3.44-3.28 (m, 2H).

$^{13}$C NMR, 75 MHz, DMSO-$d_6$, δ (ppm): δ: 168.7, 156.2, 142.9, 142.3, 132.3, 131.3, 129.9, 125.6, 123.5, 118.2, 115.1, 63.3, 52.8, 38.2, 36.0.

X-10     (S)-methyl 3-(4-hydroxyphenyl)-2-(4-((thiophene-2-sulfonamido)methyl)-1H-1,2,3-triazol-1-yl)propanoate.

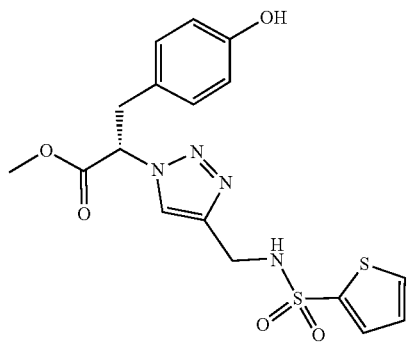 [SMILES: COC(=O)[C@H](Cc1ccc(O)cc1)n1cc(CNS(=O)(=O)c2cccs2)nn1]

Aspect: Brown oil. Yield: 86%. Purity: 94%. $LC_{tR}$ = 2.25 min. MS (ESI−): m/z = 421 [M − H]⁻.

$^1$H NMR, 300 MHz, DMSO-$d_6$, δ (ppm): 9.25 (s, 1H), 8.36 (t, J = 6.0 Hz, 1H), 8.00 (s, 1H), 7.91 (dd, J = 1.3 and 5.0 Hz, 1H), 7.58 (dd, J = 1.3 and 3.7 Hz, 1H), 7.16 (dd, J = 3.7 and 5.0 Hz, 1H), 6.89 (d, J = 8.5 Hz, 2H), 6.59 (d, J = 8.4 Hz, 2H), 5.72-5.67 (m, 1H), 4.08 (d, J = 5.9 Hz, 2H), 3.67 (s, 3H), 3.44-3.28 (m, 2H).

$^{13}$C NMR, 75 MHz, DMSO-$d_6$, δ (ppm): δ: 168.8, 156.2, 143.2, 141.1, 132.5, 131.7, 129.9, 127.7, 125.7, 123.5, 115.1, 63.3, 52.8, 38.2, 36.0.

| Compound of formula (X) | |
|---|---|
| X-11 | (S)-methyl 3-(4-hydroxyphenyl)-2-(4-(phenylsulfonamidomethyl)-1H-1,2,3-triazol-1-yl)propanoate. |

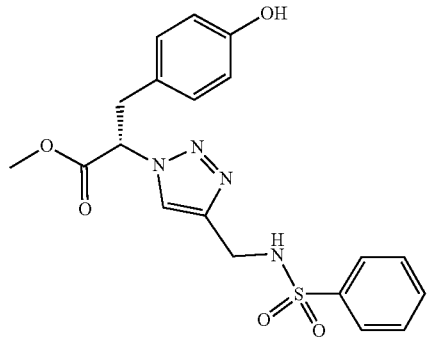 [SMILES: COC(=O)[C@H](Cc1ccc(O)cc1)n1cc(CNS(=O)(=O)c2ccccc2)nn1]

Aspect: Colorless oil. Yield: 81%. Purity: 99%. LC$_{tR}$ = 2.27 min. MS (ESI–): m/z = 415 [M – H]⁻.
¹H NMR, 300 MHz, MeOD-d₄, δ (ppm): 7.86-7.82 (m, 2H), 7.75 (s, 1H), 7.63-7.50 (m, 3H), 6.90-6.85 (m, 2H), 6.65-6.60 (m, 2H), 5.56 (dd, J = 9.9 and 5.6 Hz, 1H), 4.13 (s, 2H), 3.74 (s, 3H), 3.45 (dd, J = 5.6 and 14.3 Hz, 1H), 3.35-3.27 (m, 1H).
¹³C NMR, 75 MHz, MeOD-d₄, δ (ppm): δ: 170.1, 157.7, 145.4, 141.7, 133.7, 131.1, 130.2, 128.0, 127.2, 124.8, 116.4, 65.7, 53.4, 39.1, 38.2.

| | |
|---|---|
| X-12 | (S)-methyl 3-(4-hydroxyphenyl)-2-(4-((5-methylthiophene-2-sulfonamido)methyl)-1H-1,2,3-triazol-1-yl)propanoate. |

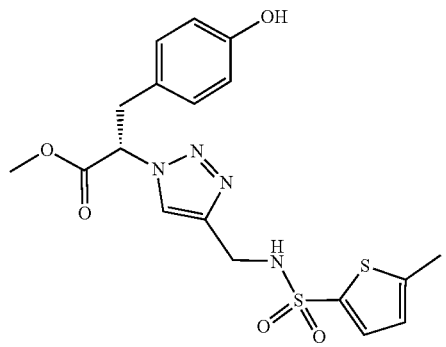

Aspect: Colorless oil. Yield: 78%. Purity: 100%. LC$_{tR}$ = 2.37 min. MS (ESI–): m/z = 435 [M – H]⁻.
¹H NMR, 300 MHz, MeOD-d₄, δ (ppm): 7.80 (s, 1H), 7.37 (d, J = 3.7 Hz, 1H), 6.90-6.86 (m, 2H), 6.77 (dq, J = 1.2 and 3.7 Hz, 1H), 6.66-6.61 (m, 2H), 5.58 (dd, J = 5.5 and 9.9 Hz, 1H), 4.19 (s, 2H), 3.72 (s, 3H), 3.46 (dd, J = 5.5 and 14.3 Hz, 1H), 3.33 (dd, J = 10.2 and 14.0 Hz, 1H), 2.48 (d, J = 1.2 Hz, 3H).
¹³C NMR, 75 MHz, MeOD-d₄, δ (ppm): δ: 170.0, 157.6, 149.0, 145.2, 139.1, 133.6, 131.1, 127.2, 127.0, 124.8, 116.4, 65.6, 53.5, 39.3, 38.1, 15.4.

| | |
|---|---|
| X-13 | (S)-methyl 3-(4-hydroxyphenyl)-2-(4-((thiophene-3-sulfonamido)methyl)-1H-1,2,3-triazol-1-yl)propanoate. |

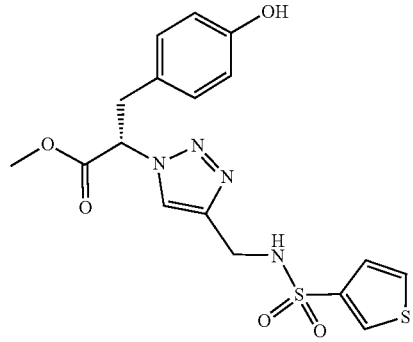 [SMILES: COC(=O)[C@H](Cc1ccc(O)cc1)n1cc(CNS(=O)(=O)c2ccsc2)nn1]

| Compound of formula (X) |
|---|

Aspect: Colorless oil. Yield: 62%. Purity: 91%. LC$_{tR}$ = 2.22 min. MS (ESI−): m/z = 421 [M − H]⁻.

¹H NMR, 300 MHz, MeOD-d$_4$, δ (ppm): 8.01 (dd, J = 1.3 and 3.1 Hz, 1H), 7.77 (s, 1H), 7.51 (dd, J = 3.1 and 5.1 Hz, 1H), 7.29 (dd, J = 1.3 and 5.1 Hz, 1H), 6.91-6.84 (m, 2H), 6.66-6.62 (m, 2H), 5.57 (dd, J = 5.6 and 10.0 Hz, 1H), 4.18 (s, 2H), 3.72 (s, 3H), 3.47 (dd, J = 5.6 and 14.3 Hz, 1H), 3.33 (dd, J = 10.0 and 14.3 Hz, 1H).

¹³C NMR, 75 MHz, MeOD-d$_4$, δ (ppm): δ: 170.1, 157.6, 145.3, 141.5, 131.6, 131.1, 129.5, 127.2, 126.4, 124.8, 116.4, 65.6, 53.5, 39.1, 38.0.

X-14    (S)-methyl 2-(4-((3-bromothiophene-2-sulfonamido)methyl)-1H-1,2,3-triazol-1-yl)-3-(4-hydroxyphenyl)propanoate.

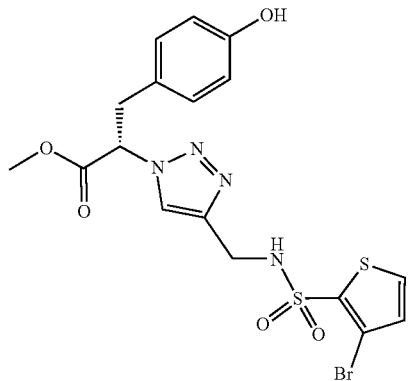 [SMILES: COC(=O)[C@H](Cc1ccc(O)cc1)n1cc(CNS(=O)(=O)c2sccc2Br)nn1]

Aspect: Colorless oil. Yield: 72%. Purity: 99%. LC$_{tR}$ = 2.35 min. MS (ESI−): m/z = 501 [M − H]⁻.

¹H NMR, 300 MHz, MeOD-d$_4$, δ (ppm): 7.79 (br s, 1H), 7.65 (d, J = 5.2 Hz, 1H), 7.06 (d, J = 5.2 Hz, 1H), 6.89 (d, J = 8.1 Hz, 2H), 6.64 (d, J = 8.1 Hz, 2H), 5.57 (dd, J = 5.3 and 9.4 Hz, 1H), 4.29 (s, 2H), 3.71 (s, 3H), 3.46 (dd, J = 5.3 and 14.2 Hz, 1H), 3.32 (dd, J = 10.1 and 14.0 Hz, 1H).

¹³C NMR, 75 MHz, MeOD-d$_4$, δ (ppm): δ: 170.0, 157.5, 145.1 (br), 137.6, 133.8, 132.6, 131.1, 127.2, 124.9, 116.4, 114.2, 65.6, 53.5, 39.0, 38.1.

X-15    (S)-methyl 3-(4-hydroxyphenyl)-2-(4-((5-(pyridin-2-yl)thiophene-2-sulfonamido)methyl)-1H-1,2,3-triazol-1-yl)propanoate.

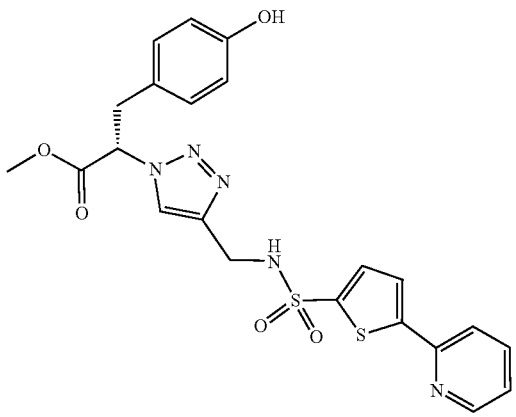 [SMILES: COC(=O)[C@H](Cc1ccc(O)cc1)n1cc(CNS(=O)(=O)c2ccc(-c3ccccn3)s2)nn1]

Aspect: White powder. Yield: 66%. Purity: 100%. LC$_{tR}$ = 2.43 min. MS (ESI−): m/z = 498 [M − H]⁻.

¹H NMR, 300 MHz, DMSO-d$_6$, δ (ppm): 9.25 (s, 1H), 8.57 (ddd, J = 1.0, 1.7 and 4.8 Hz, 1H), 8.46 (br s, 1H), 8.04 (dt, J = 1.0 and 8.0 Hz, 1H), 8.03 (s, 1H), 7.89 (td, J = 1.7 and 11.5 Hz, 1H), 7.82 (d, J = 3.9 Hz, 1H), 7.59 (d, J = 3.9 Hz, 1H), 7.38 (ddd, J = 1.0, 4.8 and 7.5 Hz, 1H), 6.89-6.84 (m, 2H), 6.60-6.55 (m, 2H), 5.68 (dd, J = 5.8 and 9.9 Hz, 1H), 4.14 (s, 2H), 3.64 (s, 3H), 3.38 (dd, J = 5.8 and 14.5 Hz, 1H), 3.28 (dd, J = 9.9 and 14.3 Hz, 1H).

¹³C NMR, 75 MHz, DMSO-d$_6$, δ (ppm): δ: 168.7, 156.2, 150.4, 150.0, 149.7, 143.2, 142.0, 137.5, 132.6, 129.9, 125.6, 124.9, 123.8, 123.5, 119.3, 115.1, 63.3, 52.7, 38.3, 36.0.

| Compound of formula (X) |
|---|

X-16     (R)-methyl-3-(4-hydroxyphenyl)-2-(4-((5-(pyridin-2-yl)thiophene-2-sulfonamido) methyl)-1H-1,2,3-triazol-1-yl)propanoate.

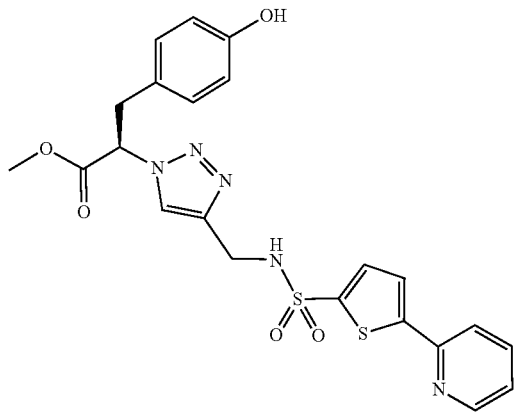 [SMILES: COC(=O)[C@@H](Cc1ccc(O)cc1)n1cc(CNS(=O)(=O)c2ccc(-c3ccccn3)s2)nn1]

Aspect: Beige solid. Yield: 31%. Purity: 100%. $LC_{tR}$ = 2.42 min. MS (ESI−): m/z = 498 [M − H]⁻.

$^1$H NMR, 300 MHz, DMSO-$d_6$, δ (ppm): 9.30 (br, 1H), 8.57 (ddd, J = 0.9, 1.6 and 4.8 Hz, 1H), 8.03 (dt, J = 0.9 and 7.9 Hz, 1H), 8.02 (s, 1H), 7.90 (1H, td, J = 1.6 and 7.9 Hz), 7.82 (d, J = 3.9 Hz, 1H), 7.58 (d, J = 3.9 Hz, 1H), 7.37 (ddd, J = 0.9, 4.8 and 7.5 Hz, 1H), 6.89-6.84 ( m, 2H), 6.60-6.55 (m, 2H), 5.67 (dd, J = 5.8 and 8.9 Hz, 1H), 4.13 (s, 2H), 3.64 (m, 3H), 3.37 (dd, J = 5.7 and 14.4 Hz, 1H), 3.28 (dd, J = 9.9 and 14.4 Hz, 1H).

$^{13}$C NMR, 75 MHz, DMSO-$d_6$, δ (ppm): 168.7, 156.2, 150.5, 149.9, 149.7, 143.3, 142.2, 137.5, 132.5, 129.9, 125.6, 124.9, 123.7, 123.5, 119.3, 115.1, 63.3, 52.7, 38.3, 36.1.

X-17     (R)-methyl 3-(4-hydroxyphenyl)-2-(4-((5-(4-propylphenyl)thiophene-2-sulfonamido)methyl)-1H-1,2,3-triazol-1-yl)propanoate.

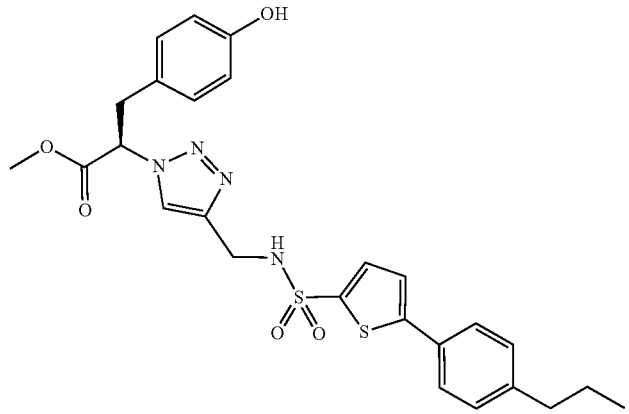 [SMILES: CCCc1ccc(-c2ccc(S(=O)(=O)NCc3cn([C@H](Cc4ccc(O)cc4)C(=O)OC)nn3)s2)cc1]

Aspect: White solid. Yield: 50%. Purity: 99%. $LC_{tR}$ = 2.68 min. MS (ESI−): m/z = 457 [M − H]⁻.

$^1$H NMR, 300 MHz, MeOD-$d_4$, δ (ppm): 7.74-7.71 (m, 3H), 7.37-7.33 (m, 2H), 6.89-6.84 (m, 2H), 6.65-6.60 (m, 2H), 5.56 (dd, J = 5.6 and 9.9 Hz, 1H), 4.12 (s, 2H), 3.74 (m, 3H), 3.45 (dd, J = 5.6 and 14.2 Hz, 1H), 3.31 (dd, J = 9.9 and 14.2 Hz, 1H), 2.67 (t, J = 7.4 Hz, 2H), 1.73-1.61 (m, 2H), 0.95 (t, J = 7.3 Hz, 3H).

$^{13}$C NMR, 75 MHz, MeOD-$d_4$, δ (ppm): 170.1, 157.7, 149.4, 145.5, 139.0, 131.1, 130.0, 128.1, 127.2, 124.7, 116.4, 65.7, 53.4, 39.1, 38.8, 38.2, 25.4, 14.0.

| Compound of formula (X) |
|---|

X-18    (S)-methyl-2-(4-((5-(pyridin-2-yl)thiophene-2-sulfonamido)methyl)-1H-1,2,3-triazol-1-yl)-3-(4-(trifluoromethoxy)phenyl)propanoate.

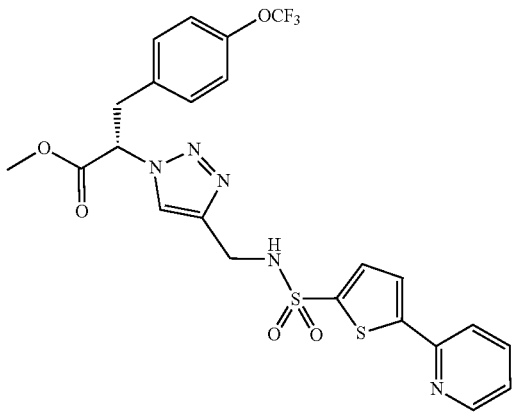 [SMILES: COC(=O)[C@H](Cc1ccc(OC(F)(F)F)cc1)n1cc(CNS(=O)(=O)c2ccc(-c3ccccn3)s2)nn1]

Aspect: White solid. Yield: 65%. Purity: 100%. LC$_{tR}$ = 2.98 min. MS (ESI−): m/z = 566 [M − H]⁻.

$^1$H NMR, 300 MHz, DMSO-d$_6$, δ (ppm): 8.57 (ddd, J = 0.9, 1.6 and 4.9 Hz, 1H), 8.45 (br, 1H), 8.05 (s, 1H), 8.07 (s, 1H), 8.03 (dt, J = 2.4 and 8.0 Hz, 1H), 7.89 (td, J = 1.7 and 7.6 Hz, 1H), 7.83 (d, J = 4 Hz, 1H), 7.60 (d, J = 4 Hz, 1H), 7.37 (ddd, J = 0.9, 4.9 and 7.6 Hz, 1H), 7.23-7.17 (m, 4H), 5.85 (dd, J = 5.7 and 10.0 Hz, 1H), 4.13 (s, 2H), 3.66 (s, 3H), 3.55 (dd, J = 5.7 and 14.4 Hz, 1H), 3.55 (dd, J = 10.0 and 14.4 Hz, 1H).

$^{13}$C NMR, 75 MHz, DMSO-d$_6$, δ (ppm): 168.4, 150.4, 150.0, 149.6, 147.2 (m), 143.4; 142.0, 137.5, 135.3, 132.6, 130.8, 124.9, 123.7, 123.6, 120.8, 119.9 (q, J$_{C-F}$ = 255 Hz), 119.3, 62.6, 52.9, 38.2, 35.9.

$^{19}$F NMR (282 MHz, DMSO-d$_6$) δ: −57.3.

X-19    (S)-N-hydroxy-2-(4-((5-phenylthiophene-2-sulfonamido)methyl)-1H-1,2,3-triazol-1-yl)-3-(4-(trifluoromethoxy)phenyl)propanamide.

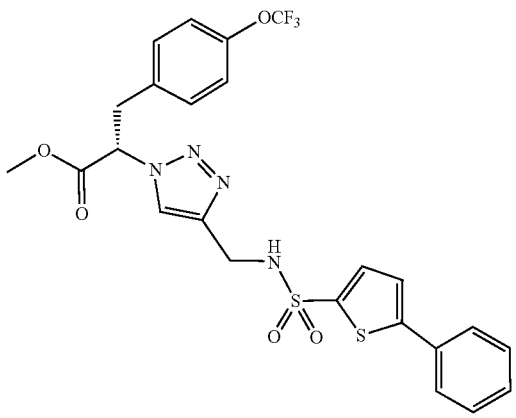 [SMILES: COC(=O)[C@H](Cc1ccc(OC(F)(F)F)cc1)n1cc(CNS(=O)(=O)c2ccc(-c3ccccc3)s2)nn1]

Aspect: White solid. Yield: 69%. Purity: 100%. LC$_{tR}$ = 3.23 min. MS (ESI−): m/z = 565 [M − H]⁻.

$^1$H NMR, 300 MHz, DMSO-d$_6$, δ (ppm): 8.43 (br, 1H), 8.07 (s, 1H), 7.73-7.70 (m, 2H), 7.58 (d, J = 3.9 Hz, 1H), 7.55 (d, J = 3.9 Hz, 1H), 7.50-7.38 (m, 3H), 7.23-7.17 (m, 4H), 5.86 (dd, J = 5.7 and 10.1 Hz, 1H), 4.14 (s, 2H), 3.65 (s, 3H), 3.56 (dd, J = 5.6 and 11.3 Hz, 1H), 3.46 (dd, J = 10.1 and 11.3 Hz, 1H).

$^{13}$C NMR, 75 MHz, DMSO-d$_6$, δ (ppm): 168.4, 149.1, 147.2 (m), 143.4, 139.5, 135.3, 132.7, 132.2, 130.8, 129.3, 129.1, 125.9, 124.0, 123.7, 120.8, 120.0 (q, J$_{C-H}$ = 254.6 Hz), 62.6, 52.8, 38.2, 35.9.

$^{19}$F NMR (282 MHz, DMSO-d$_6$) δ: −57.3.

| Compound of formula (X) |
|---|

X-20    (S)-methyl-3-(4-phenoxyphenyl)-2-(4-((5-(pyridin-2-yl)thiophene-2-sulfonamido)methyl)-1H-1,2,3-triazol-1-yl)propanoate.

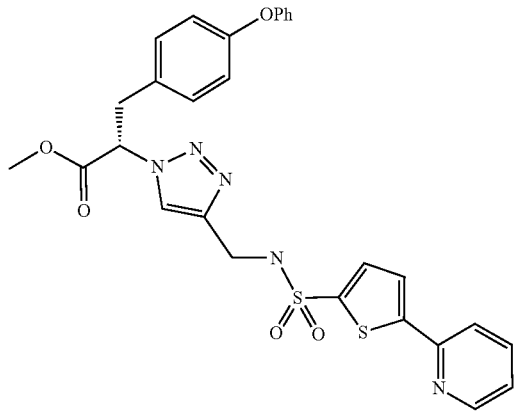 [SMILES: COC(=O)[C@H](Cc1ccc(Oc2ccccc2)cc1)n1cc(CNS(=O)(=O)c2ccc(-c3ccccn3)s2)nn1]

Aspect: White solid. Yield: 77%. Purity: 100%. $LC_{tR}$ = 3.07 min. MS (ESI–): m/z = 574 [M – H]⁻.

$^1$H NMR, 300 MHz, DMSO-$d_6$, δ (ppm): 8.56 (ddd, J = 0.9, 1.6 and 4.8 Hz, 1H), 8.46 (t, J = 6 Hz, 1H), 8.05 (s, 1H), 8.03 (dt, J = 8.1 and 9 Hz, 1H), 7.99 (td, J = 1.7 and 7.5 Hz, 1H), 7.83 (d, J = 4 Hz, 1H), 7.60 (d, J = 4 Hz, 1H), 7.39-7.32 (m, 3H), 7.13-7.07 (m, 3H), 6.95-6.90 (m, 2H), 6.85-6.82 (m, 2H), 5.79 (dd, J = 5.7 and 10.0 Hz, 1H), 4.14 (d, J = 6 Hz, 2H), 3.66 (m, 3H), 3.50 (dd, J = 5.7 and 14.4 Hz, 1H), 3.39 (dd, J = 10.0 and 14.4 Hz, 1H).

$^{13}$C NMR, 75 MHz, DMSO-$d_6$, δ (ppm): 169.1, 157.1, 155.9, 150.9, 150.5, 150.1, 143.7, 142.4, 138.0, 133.1, 131.2, 131.0, 130.5, 125.4, 124.2, 124.1, 123.9, 119.8, 119.0, 63.4, 53.3, 38.7, 36.5.

X-21    (S)-methyl-3-(4-methoxyphenyl)-2-(4-((5-phenylthiophene-2-sulfonamido)methyl)-1H-1,2,3-triazol-1-yl)propanoate.

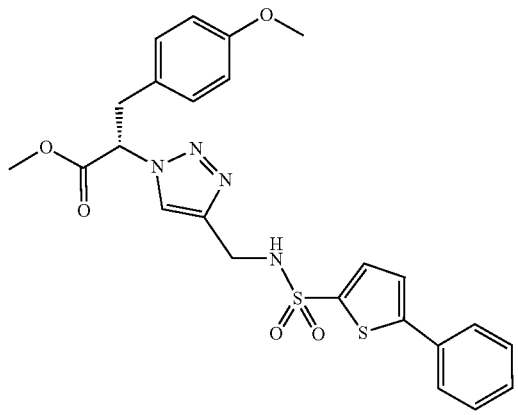 [SMILES: COC(=O)[C@H](Cc1ccc(OC)cc1)n1cc(CNS(=O)(=O)c2ccc(-c3ccccc3)s2)nn1]

Aspect: White solid. Yield: 71%. Purity: 99%. $LC_{tR}$ = 2.98 min. MS (ESI–): m/z = 511 [M – H]⁻.

$^1$H NMR, 300 MHz, DMSO-$d_6$, δ (ppm): 8.45 (br, 1H), 8.04 (s, 1H), 7.74-7.70 (m, 2H), 7.58 (d, J = 3.9 Hz, 1H), 7.54 (d, J = 3.9 Hz, 1H), 7.50-7.38 (m, 3H), 7.01-6.98 (m, 2H), 6.77-6.72 (m, 2H), 5.74 (dd, J = 5.7 and 9.9 Hz, 1H), 4.14 (s, 2H), 3.67 (m, 3H), 3.65 (m, 3H), 3.44 (dd, J = 5.7 and 14.7 Hz, 1H), 3.35 (dd, J = 9.9 and 14.7 Hz, 1H).

$^{13}$C NMR, 75 MHz, DMSO-$d_6$, δ (ppm): 168.7, 158.1, 149.1, 143.2, 139.6, 132.7, 132.2, 129.9, 129.4, 129.1, 127.5, 125.9, 124.0, 123.5, 113.7, 63.1, 54.9, 52.8, 38.3, 35.9.

| | Compound of formula (X) |
|---|---|
| X-22 | (S)-methyl-3-(4-methoxyphenyl)-2-(4-((5-phenylthiophene-2-sulfonamido)methyl)-1H-1,2,3-triazol-1-yl)propanoate. |

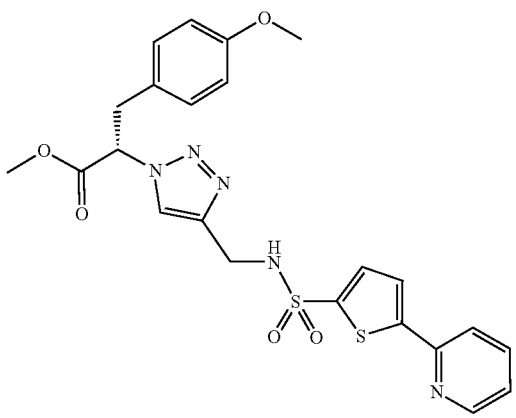

Aspect: White solid. Yield: 65%. Purity: 100%. $LC_{tR}$ = 2.70 min. MS (ESI−): m/z = 512 [M − H]⁻.

$^1$H NMR, 300 MHz, DMSO-d$_6$, δ (ppm): 8.57 (ddd, J = 1.0, 1.7 and 4.9 Hz, 1H), 8.46 (br, 1H), 8.04 (s, 1H), 8.04 (dt, J = 1.0 and 8.0 Hz, 1H), 7.90 (td, J = 1.7 and 8.0 Hz, 1H), 7.83 (d, J = 4 Hz ,1H), 7.60 (d, J = 4 Hz, 1H), 7.37 (ddd, J = 1.0, 4.9 and 7.5, 4.9 Hz, 1H), 7.01-6.97 (m, 2H), 6.77-6.73 (m, 2H), 5.73 (dd, J = 5.7 and 9.9 Hz, 1H), 4.14 (s, 2H), 3.67 (m, 3H), 3.65 (m, 3H), 3.44 (dd, J = 5.7 and 14.3 Hz, 1H), 3.34 (dd, J = 9.9 and 14.3 Hz, 1H).

$^{13}$C NMR, 75 MHz, DMSO-d$_6$, δ (ppm): 168.7, 158.1, 150.4, 150.0, 149.7, 143.2, 142.0, 137.5, 132.6, 129.9, 127.5, 124.9, 123.8, 119.3, 113.7, 63.1, 54.9, 52.8, 38.3, 35.9.

| | |
|---|---|
| X-23 | (S)-methyl-3-(4-(tert-butoxy)phenyl)-2-(4-((5-phenylthiophene-2-sulfonamido)methyl)-1H-1,2,3-triazol-1-yl)propanoate. |

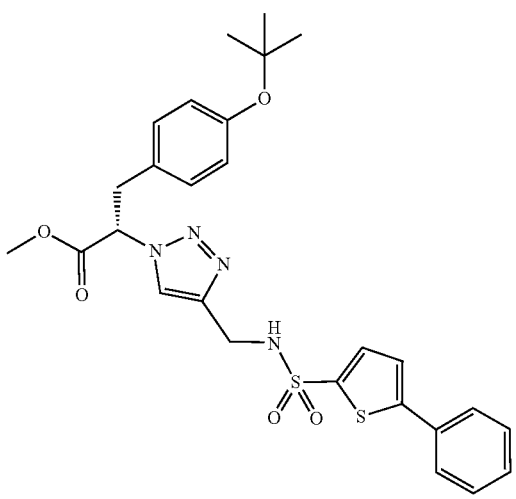 [SMILES: COC(=O)[C@H](Cc1ccc(OC(C)(C)C)cc1)n1cc(CNS(=O)(=O)c2ccc(-c3ccccc3)s2)nn1]

Aspect: White solid. Yield: 56%. Purity: 95%. $LC_{tR}$ = 3.25 min. MS (ESI−): m/z = 553 [M − H]⁻.

$^1$H NMR, 300 MHz, DMSO-d$_6$, δ (ppm): 8.45 (t, J = 5.9 Hz, 1H), 8.02 (s, 1H), 7.74-7.70 (m, 2H), 7.57 (d, J = 3.9 Hz, 1H), 7.55 (d, J = 3.9 Hz, 1H), 7.50-7.38 (m, 3H), 7.00-6.95 (m, 2H), 6.80-6.76 (m, 2H), 5.76 (dd, J = 5.9 and 9.9 Hz, 1H), 4,13 (d, J = 5.9 Hz, 2H), 3.64 (s, 3H), 3.46 (dd, J = 5.9 and 14.3 Hz, 1H), 3.36 (dd, J = 9.9 and 14.3 Hz, 1H), 1,22 (s, 9H).

$^{13}$C NMR, 75 MHz, DMSO-d$_6$, δ (ppm): 168.7, 153.9, 149.1, 143.2, 139.6, 132.8, 132.2, 130.2, 129.5, 129.4, 129.1, 125.9, 124.0, 123.6, 123.5, 77.8, 63.0, 52.8, 38.3, 36.2, 28.5.

| Compound of formula (X) |
|---|

X-24     (S)-methyl 3-(4-(tert-butoxy)phenyl)-2-(4-((5-(pyridin-2-yl)thiophene-2-sulfonamido)methyl)-1H-1,2,3-triazol-1-yl)propanoate.

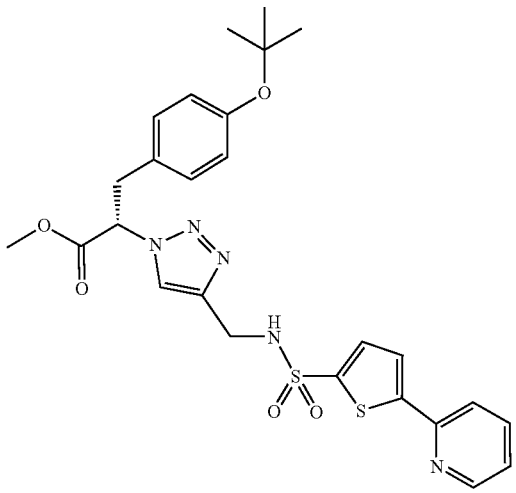

Aspect: White powder. Yield: 32%. Purity: 99%. $LC_{tR}$ = 2.98 min. MS (ESI−): m/z = 554 [M − H]⁻.

$^1$H NMR, 300 MHz, DMSO-$d_6$, δ (ppm): 8.57 (ddd, J = 1.0, 1.7 and 4.8 Hz, 1H), 8.44 (br s, 1H), 8.04 (dt, J = 1.0 and 8.1 Hz, 1H), 8.00 (s, 1H), 7.88 (td, J = 1.8 and 11.5 Hz, 1H), 7.82 (d, J = 4.0 Hz, 1H), 7.59 (d, J = 4.0 Hz, 1H), 7.37 (ddd, J = 1.0, 7.5 and 7.5 Hz, 1H), 6.98-6.96 (m, 2H), 6.80-6.76 (m, 2H), 5.75 (dd, J = 6.0 and 9.7 Hz, 1H), 4.13 (s, 2H), 3.64 (s, 3H), 3.45 (dd, J = 6.0 and 14.2 Hz, 1H), 3.35 (dd, J = 9.8 and 14.2 Hz, 1H), 1.22 (s, 9H).

$^{13}$C NMR, 75 MHz, DMSO-$d_6$, δ (ppm): 168.6, 153.8, 150.4, 150.0, 149.6, 143.2, 142.0, 137.5, 132.6, 130.2, 129.5, 124.9, 123.7, 123.6, 123.5, 119.3, 77.8, 62.9, 52.7, 38.2, 36.2, 28.5.

X-25     (S)-methyl-2-(4-((5-bromothiophene-2-sulfonamido)methyl)-1H-1,2,3-triazol-1-yl)-3-(4-methoxyphenyl)propanoate

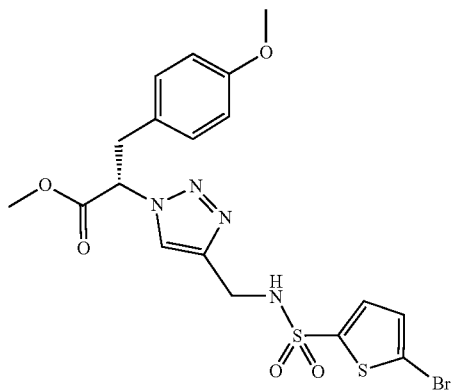 [SMILES: COC(=O)[C@H](Cc1ccc(OC)cc1)n1cc(CNS(=O)(=O)c2ccc(Br)s2)nn1]

Aspect: White solid. Yield: 56%. Purity: 91%. $LC_{tR}$ = 2.80 min. MS (ESI−): m/z = 515 [M − H]⁻.

$^1$H NMR, 300 MHz, DMSO-$d_6$, δ (ppm): 8.52 (t, J = 5.6 Hz, 1H), 8.03 (s, 1H), 7.41 (d, J = 4.0 Hz, 1H), 7.31 (d, J = 4.0 Hz, 1H), 7.02 (d, J = 6.7 Hz, 2H), 6.77 (d, J = 6.7 Hz, 2H), 5.76 (dd, J = 5.7 and 10.0 Hz, 1H), 4.10 (d, J = 5.1 Hz, 2H), 3.68 (s, 3H), 3.67 (s, 3H), 3.46 (dd, J = 5.7 and 14.4 Hz, 1H), 3.37 (dd, J = 10.0 and 14.3 Hz, 1H).

$^{13}$C NMR, 75 MHz, DMSO-$d_6$, δ (ppm): 168.7, 158.0, 142.9, 142.2, 132.3, 131.2, 129.9, 127.4, 123.6, 118.2, 113.7, 63.1, 54.9, 52.8, 38.1, 35.9.

| Compound of formula (X) | |
|---|---|
| X-26 | methyl (2S)-3-(1,3-benzodioxol-5-yl)-2-[4-[[[5-(2-pyridyl)-2-thienyl]sulfonylamino]methyl]triazol-1-yl]propanoate |

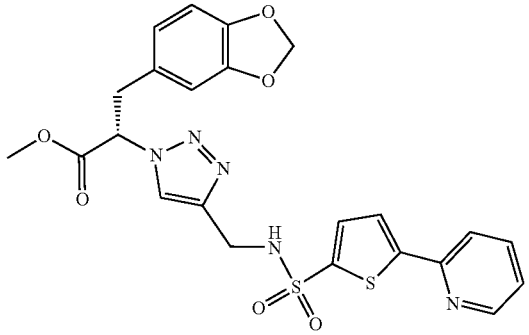 [SMILES: COC(=O)[C@H](Cc1ccc2c(c1)OCO2)n1cc(CNS(=O)(=O)c2ccc(-c3ccccn3)s2)nn1]

Aspect: white amorphous solid. Yield: 28%. Purity: 98%, LC tr = 2.65 min, MS (ESI−): m/z = 526 [M − H]⁻.

$^{1}$H NMR ((CD$_{3}$)$_{2}$CO-d$_{6}$, 300 MHz) δ: 8.56 (ddd, J = 1.0, 1.7 and 4.9 Hz, 1H), 7.96 (dt, J = 1.1 and 8 Hz, 1H), 7.91 (s, 1H), 7.87 (td, J = 1.8 and 8.0 Hz, 1H), 7.74 (d, J = 4.0 Hz, 1H), 7.61 (d, J = 4.0 Hz, 1H), 7.35 (ddd, J = 1.1, 4.9 and 7.4 Hz, 1H), 6.67 (d, J = 1.7 Hz, 1H), 6.66 (d, J = 7.9 Hz, 1H), 6.55 (d, J = 1.7 and 7.9 Hz, 1H), 5.92 (s, 2H), 5.61 (dd, J = 5.9 and 9.6 Hz, 1H), 4.32 (s, 2H), 3.69 (s, 3H), 3.48 (d, J = 5.9 and 14.2 Hz, 1H) and 3.48 (d, J = 9.6 and 14.2 Hz, 1H).

$^{13}$C NMR ((CD$_{3}$)$_{2}$CO-d$_{6}$, 75 MHz) δ: 169.4, 154.4, 152.0, 150.7, 148.7, 147.6,144.6, 142.9, 138.3, 133.6, 130.3, 125.2, 124.8, 123.8, 123.2, 120.1, 110.0, 109.9, 101.9, 65.1, 53.5, 40.0 and 38.5.

| X-27 | methyl (2S)-3-(3-chloro-4-hydroxy-phenyl)-2-[4-[[(5-phenyl-2-thienyl)sulfonylamino]methyl]triazol-1-yl]propanoate |
|---|---|

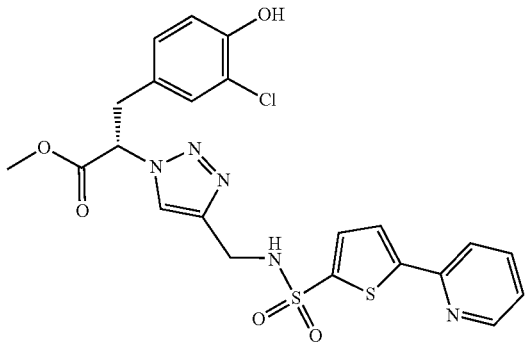

Aspect: white amorphous solid. Yield: 42%. Purity: 93%, LC tr = 2.52 min, MS (ESI+): m/z = 534 [M + H]⁺.

$^{1}$H NMR (DMSO-d$_{6}$, 300 MHz) δ: 10.01 (s, 1H), 8.57 (ddd, J = 1, 1.7 and 4.9 Hz, 1H), 8.46 (t, J = 6 Hz, 1H), 8.01-8.05 (m, 2H), 7.90 (td, J = 1.7 and 7.6 Hz, 1H), 7.81 (d, J = 4 Hz, 1H), 7.51 (d, J = 4 Hz, 1H), 7.38 (ddd, J = 1, 4.9 and 7.5 Hz, 1H), 7.13 (d, J = 1.8 Hz, 1H), 6.81 (dd, J = 1.8 and 8.4 Hz, 1H), 6.75 (d, J = 8.4 Hz, 1H), 5.76 (dd, J = 5.7 and 10.0 Hz, 1H), 4.11 (d, J = 6 Hz, 1H), 3.64 (s, 3H), 3.40 (dd, J = 5.7 and 14.3 Hz, 1H) and 3.29 (dd, J = 10.0 and 14.1 Hz, 1H).

$^{13}$C NMR (DMSO-d$_{6}$, 75 MHz) δ: 168.6, 151.9, 150.4, 150.1, 149.7, 143.3, 142.0, 137.5, 132.6, 130.2, 128.5, 127.3, 124.9, 123.8, 123.6, 119.3 (2C), 116.4, 62.9, 52.8, 38.3 and 35.6.

| X-28 | methyl (2S)-3-(3-chloro-4-hydroxy-phenyl)-2-[4-[[(5-phenyl-2-thienyl)sulfonylamino]methyl]triazol-1-yl]propanoate |
|---|---|

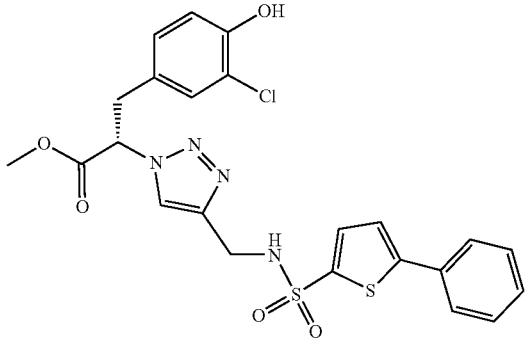 [SMILES: COC(=O)[C@H](Cc1ccc(O)c(Cl)c1)n1cc(CNS(=O)(=O)c2ccc(-c3ccccc3)s2)nn1]

Aspect: white amorphous solid. Yield: 29%. Purity: 100%, LC tr = 2.80 min, MS (ESI–): m/z = 533 [M – H]⁻.

¹H NMR (DMSO-d₆, 300 MHz) δ: 10.02 (br, 1H), 8.45 (br, 1H), 8.05 (s, 1H), 7.71-7.74 (m, 2H), 7.55 (d, J = 3.9 Hz, 1H), 7.54 (d, J = 3.9 Hz, 1H), 7.37-7.49 (m, 3H), 7.13 (d, J = 1.9 Hz, 1H), 6.81 (dd, J = 1.9 and 8.3 Hz, 1H), 6.76 (d, J = 8.3 Hz, 1H), 5.76 (dd, J = 5.7 and 10.1 Hz, 1H), 4.14 (s, 2H), 3.64 (s, 3H), 3.41 (dd, J = 5.7 and 14.1 Hz, 1H) and 3.30 (dd, J = 10.1 and 14.1 Hz, 1H).

¹³C NMR (DMSO-d₆, 75 MHz) δ: 168.6, 151.9, 149.0, 143.2, 139.6, 132.7, 132.2, 130.2, 129.3, 129.1, 128.5, 127.3, 125.9, 124.0, 123.6, 119.3, 116.4, 62.8, 52.8, 38.2 and 35.5.

X-29  methyl (2S)-3-(3,4-dimethoxyphenyl)-2-[4-[[[5-(2-pyridyl)-2-thienyl]sulfonylamino]methyl]triazol-1-yl]propanoate

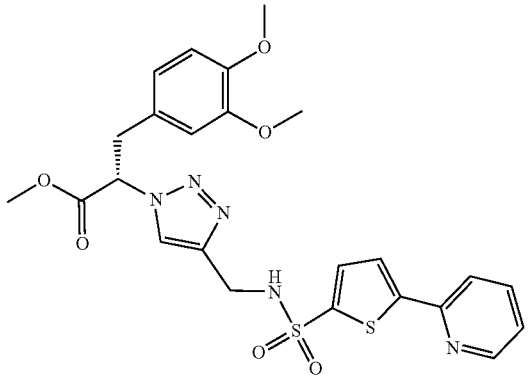 [SMILES: COC(=O)[C@H](Cc1ccc(OC)c(OC)c1)n1cc(CNS(=O)(=O)c2ccc(-c3ccccn3)s2)nn1]

Aspect: white amorphous solid. Yield: 48%. Purity: 100%, LC tr = 2.58 min, MS (ESI–): m/z = 542 [M – H]⁻.

¹H NMR (DMSO, 300 MHz) δ: 8.57 (ddd, J = 0.96, 1.7 and 4.8 Hz, 1H), 8.46 (br, 1H), 8.06 (s, 1H), 8.04 (dt, J = 8.1 and 1.1 Hz, 1H), 7.92 (td, J = 1.7 and 7.5 Hz, 1H), 7.83 (d, J = 4.0, 1H), 7.60 (d, J = 4.0, 1H), 7.38 (ddd, J = 1.1, 4.8 and 7.5 Hz, 1H), 6.75 (d, J = 8.3 Hz, 1H), 6.67 (d, J = 2 Hz, 1H), 6.58 (dd, J = 2 and 8.3 Hz, 1H), 5.76 (dd, J = 5.4 and 10.1 Hz, 1H), 4.13 (br, 2H), 3.66 (s, 6H), 3.64 (s, 3H), 3.43 (dd, J = 5.4 and 14.3 Hz, 1H) and 3.33 (dd, J = 10.1 and 14.3 Hz, 1H).

¹³C NMR (DMSO, 300 MHz) δ: 168.7, 150.4, 150.0, 149.6, 148.4, 147.6, 143.2, 141.9, 137.5, 132.6, 127.9, 124.9, 123.7, 123.6, 120.9, 119.3, 112.4, 111.5, 63.2, 55.3 (2C), 52.8, 38.2 and 36.4.

X-30  methyl (2S)-3-(3,4-dimethoxyphenyl)-2-[4-[[(5-phenyl-2-thienyl)sulfonylamino]methyl]triazol-1-yl]propanoate

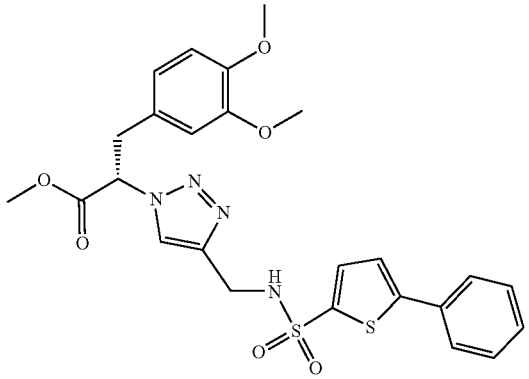 [SMILES: COC(=O)[C@H](Cc1ccc(OC)c(OC)c1)n1cc(CNS(=O)(=O)c2ccc(-c3ccccc3)s2)nn1]

Aspect: white amorphous solid. Yield: 79%. Purity: 100%, LC tr = 2.87 min, MS (ESI–): m/z = 541 [M – H]⁻.

¹H NMR (DMSO, 300 MHz) δ: 8.46 (t, J = 6.0 Hz, 1H), 8.06 (s, 1H), 7.74-7.71 (m, 2H), 7.58 (d, J = 3.9 Hz, 1H), 7.55 (t, J = 3.9 Hz, 1H), 7.50-7.38 (m, 3H), 6.75 (d, J = 8.2 Hz, 1H), 6.67 (d, J = 1.9 Hz, 1H), 6.58 (dd, J = 1.9 and 8.2 Hz, 1H), 5.77 (dd, J = 5.6 and 10.3Hz, 1H), 4.14 (d, J = 6.0 Hz, 2H), 3.66 (s, 6H), 3.64 (s, 3H), 3.44 (dd, J = 5.6 and 14.3 Hz, 1H) and 3.34 (dd, J = 10.3 and 14.3 Hz, 1H).

¹³C NMR (DMSO, 300 MHz) δ: 169.2, 149.5, 148.9, 146.1, 143.7, 140.0, 133.2, 132.7, 129.8, 129.6, 128.4, 126.4, 124.5, 124.1, 121.4, 112.9, 112.0, 63.6, 55.8 (2C), 53.3, 38.7 and 36.8.

| | Compound of formula (X) |
|---|---|
| X-31 | methyl (2S)-3-(3-fluoro-4-hydroxy-phenyl)-2-[4-[[[5-(2-pyridyl)-2-thienyl]sulfonylamino]methyl]triazol-1-yl]propanoate |

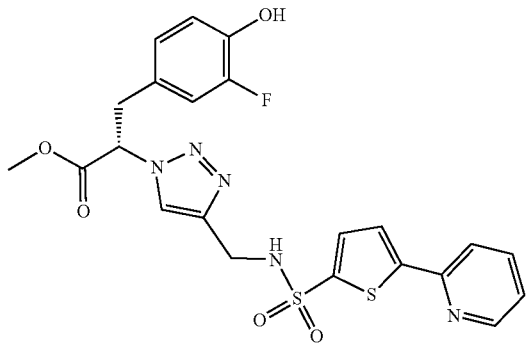

Aspect: white amorphous solid. Yield: 68%. Purity: 94%, LC tr = 2.45 min, MS (ESI−): m/z = 516 [M − H]⁻.

¹H NMR (DMSO, 300 MHz) δ: 9.68 (br, 1H), 8.57 (ddd, J = 0.9, 1.7 and 4.8Hz, 1H), 8.45 (br, 1H), 8.05 (s, 1H), 8.03 (dt, J = 1 and 7.9 Hz, 1H), 7.90 (td, J = 1.7 and 7.5 Hz, 1H), 7.82 (d, J = 4.0 Hz, 1H), 7.59 (d, J = 4.0 Hz, 1H), 7.38 (ddd, J = 1, 4.8 and 7.5 Hz, 1H), 6.93 (dd, J = 2 and 12.4 Hz, 1H), 6.73 (q, J = 8.3 Hz, 1H), 6.67 (d, J = 2 and 8.3 Jz, 1H), 5.75 (dd, J = 5.7 and 10.1 Hz, 1H), 4.13 (s, 2H), 3.64 (s, 3H), 3.40 (dd, J = 5.7 and 14.2 Hz, 1H) and 3.30 (dd, J = 10.1 and 14.2 Hz, 1H).

¹⁹F NMR (DMSO, 282 MHz) δ: −136.90.

¹³C NMR (DMSO, 75 MHz) δ: 168.6, 150.6 (d, J = 240.4 Hz), 150.4, 150.0, 149.7, 143.6 (d, J = 12.1 Hz), 143.3, 142.0, 137.5, 132.6, 126.8 (d, J = 6.1 Hz), 125.1 (d, J = 3.0 Hz), 124.9, 123.8, 123.5, 119.4, 117.5 (d, J = 3.6 Hz), 116.5 (d, J = 18.5 Hz), 62.9, 52.8, 38.3 and 35.7.

| | |
|---|---|
| X-32 | methyl (2S)-3-(3-fluoro-4-hydroxy-phenyl)-2-[4-[[(5-phenyl-2-thienyl)sulfonylamino]methyl]triazol-1-yl]propanoate |

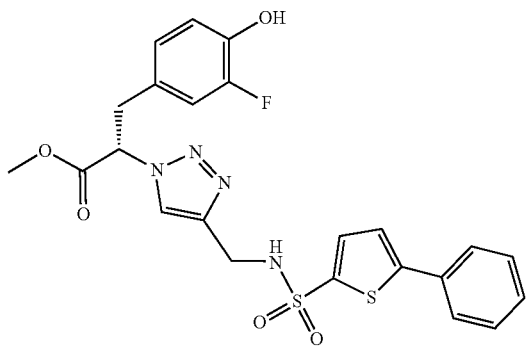 [SMILES: COC(=O)[C@H](Cc1ccc(O)c(F)c1)n1cc(CNS(=O)(=O)c2ccc(-c3ccccc3)s2)nn1]

Aspect: yellowish amorphous solid. Yield: 60%. Purity: 96%, LC tr = 2.73 min, MS (ESI+): m/z = 517 [M + H]⁺.

¹H NMR (DMSO, 300 MHz) δ: 8.04 (s, 1H), 7.74-7.70 (m, 2H), 7.55 (d, J = 3.9 Hz, 1H), 7.54 (d, J = 3.9 Hz, 1H), 7.50-7.38 (m, 3H), 6.92 (dd, J = 2.0 and 12.5 Hz, 1H), 6.72 (q, J = 8.3 Hz, 1H), 6.66 (dd, J = 2.0 and 8.3 Hz, 1H), 5.76 (d, J = 5.7 and 10.1 Hz, 1H), 4.13 (s, 2H), 3.64 (s, 3H), 3.41 (dd, J = 5.7 and 14.1 Hz, 1H) and 3.30 (dd, J = 10.1 and 14.1 Hz, 1H).

¹⁹F NMR (DMSO, 282 MHz) δ: −136.89.

¹³C NMR (DMSO, 75 MHz) δ: 168.6, 150.6 (d, J = 240.4 Hz), 149.0, 143.6 (d, J = 12.0 Hz), 143.7, 139.6, 132.7, 132.2, 129.3, 129.1, 126.7 (d, J = 6.3 Hz), 125.9, 125.1 (d, J = 2.9 Hz), 124.0, 123.5, 117.5 (d, J = 3.2 Hz), 116.5 (d, J = 18.4 Hz), 62.8, 52.3, 38.3 and 35.7.

| Compound of formula (X) | |
|---|---|
| X-33 | methyl (2S)-3-(4-methoxyphenyl)-2-[4-[methyl-[[5-(2-pyridyl)-2-thienyl]sulfonyl]amino]methyl]triazol-1-yl]propanoate |

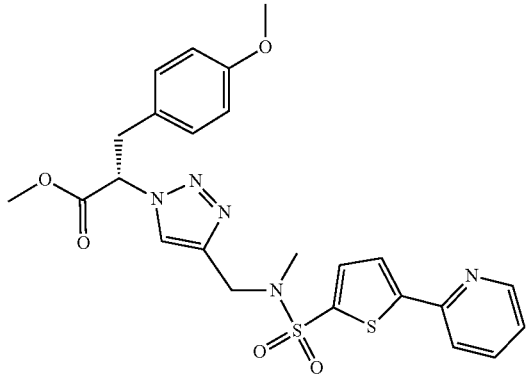 [SMILES: COC(=O)[C@H](Cc1ccc(OC)cc1)n1cc(CN(C)S(=O)(=O)c2ccc(-c3ccccn3)s2)nn1]

Aspect: white amorphous solid. Yield: 80%. Purity: 100%, LC tr = 2.90 min, MS (ESI+): m/z = 528 [M + H]+.

$^1$H NMR (acetone-d$_6$, 300 MHz) δ (ppm) 8.57 (ddd, J = 4.8, 1.7 and 1.0 Hz, 1H), 8.57 (ddd, J = 8.0, 1.0 and 1.0 Hz, 1H), 7.94 (s, 1H), 7.89 (m, 1H), 7.82 (d, J = 3.9 Hz, 1H), 7.63 (d, J = 3.9 Hz), 7.37 (ddd, J = 8.0, 4.8, 1.2 Hz, 1H), 7.02 (m, 2H), 6.76 (m, 2H), 5.66 (dd, J = 10.0 and 5.7 Hz, 1H), 4.38 (s, 2H), 3.72 (s, 3H), 3.71 (s, 3H), 3.53 (dd, J = 14.3 and 5.7 Hz, 1H), 3.42 (dd, J = 14.3 and 10.0 Hz, 1H), 2.73 (s, 3H).

$^{13}$C NMR (acetone-d$_6$, 75 MHz) δ (ppm) 169.5, 159.7, 152.4, 151.8, 150.6, 142.8, 139.4, 138.2, 134.0, 130.9 (2C), 128.3, 125.4, 124.7, 124.5, 120.0, 114.7 (2C), 64.8, 55.4, 53.2, 46.1, 37.7, 35.1.

| X-34 | methyl (2S)-3-(4-methoxyphenyl)-2-[4-[(1S)-1-[[5-(2-pyridyl)-2-thienyl]sulfonylamino]ethyl]triazol-1-yl]propanoate |
|---|---|

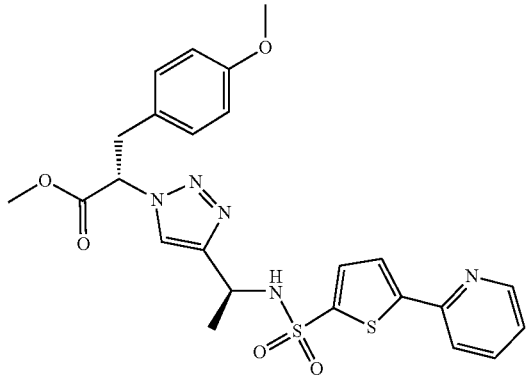 [SMILES: COC(=O)[C@H](Cc1ccc(OC)cc1)n1cc([C@H](C)NS(=O)(=O)c2ccc(-c3ccccn3)s2)nn1]

Aspect: white amorphous solid. Yield: quantitative. Purity: 100%, LC tr = 2.75 min, MS (ESI+): m/z = 528 [M + H]+.

$^1$H NMR (acetone-d$_6$, 300 MHz) δ (ppm) 8.55 (ddd, J = 4.9, 1.7 and 1.0 Hz, 1H), 7.95 (ddd, J = 8.0, 1.1 and 1.1 Hz, 1H), 7.86 (m, 1H), 7.80 (s, 0.75H, maj), 7.80 (s, 0.25, min), 7.70 (d, J = 3.9 Hz, 0.25H, min), 7.70 (d, J = 4.0 Hz, 0.75H, maj), 7.56 (d, J = 4.0 Hz, 0.75H, maj), 7.56 (d, J = 3.9 Hz, 0.25H, min), 7.34 (m, 0.25H, min), 7. 34 (ddd, J = 7.4, 4.9 and 1.2 Hz, 0.75H, maj), 6.98 (m, 2H), 6.76 (m, 2H), 5.54 (dd, J = 9.2 and 6.3 Hz, 0.75H, maj), 5.54 (dd, J = 9.3 and 6.2 Hz, 0.25H, min), 4.75 (m, 1H), 3.72 (s, 2.25H, maj), 3.72 (s, 0.75H, min), 3.67 (s, 0.75H, min), 3.66 (s, 2.25H, maj), 3.44 (dd, J = 14.1 and 6.3 Hz, 1.5H, maj), 3.42 (dd, J = 14.1 and 6.2 Hz, 0.5H, min), 3.33 (dd, J = 14.1 and 9.2, 1.5H, maj), 3.31 (dd, J = 14.1 and 9.3 Hz, 0.5H, min), 1.48 (d, J = 6.9, 2.25H, maj), 1.47 (d, J = 6.9, 0.75H, min).

$^{13}$C NMR (acetone-d$_6$, 75 MHz) δ (ppm) 169.4, 159.7, 151.9, 151.5, 150.5, 149.8, 144.6 (0.75C, maj), 144.5 (0.25C, min), 1378.0, 133.3 (0.25C, min), 133.3 (0.75C, maj), 130.9 (2C), 128.2, 125.0, 124.3, 122.4 (0.75C, maj), 122.3 (0.25C, min), 119.9, 114.6 (2C), 64.7, 55.4, 53.1, 47.4 (0.25C, min), 47.2 (0.75C, maj), 38.0 (0.25C, min), 37.9 (0.75C, maj), 22.3 (s, 0.25C, min), 22.1 (0.75C, maj). Mixture of cis/trans conformational isomers.

| X-35 | methyl (2S)-3-(4-methoxyphenyl)-2-[4-[(1R)-1-[[5-(2-pyridyl)-2-thienyl]sulfonylamino]ethyl]triazol-1-yl]propanoate |
|---|---|

| Compound of formula (X) |
|---|
| 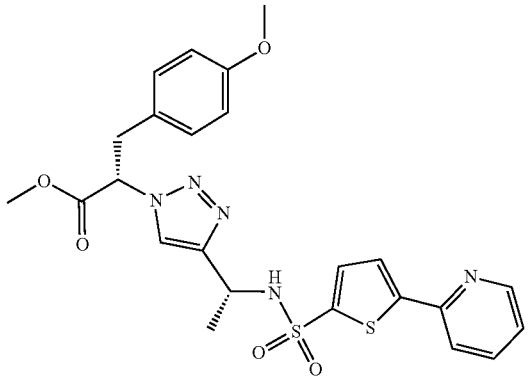 [SMILES: COC(=O)[C@H](Cc1ccc(OC)cc1)n1cc([C@@H](C)NS(=O)(=O)c2ccc(-c3ccccn3)s2)nn1] |
| Aspect: white amorphous solid. Yield : 78%. Purity: 97%, LC tr = 2.77, MS (ESI+): m/z = 528 [M + H]⁺. ¹H NMR (acetone-d₆, 300 MHz) δ (ppm): 8.55 (ddd, J = 4.9, 1.7 and 1.0 Hz, 1H), 7.95 (m, 1H), 7.86 (m, 1H), 7.80 (s, 0.25H, min), 7.80 (s, 0.75, maj), 7.69 (d, J = 4.0 Hz, 0.75H, maj), 7.69 (d, J = 4.0 Hz, 0.25H, min), 7.56 (d, J = 4.0 Hz, 0.25H, min), 7.56 (d, J = 4.0 Hz, 0.75H, min), 7.34 (m, 0.25H, min), 7. 33 (ddd, J = 7.4, 4.9 and 1.2 Hz, 0.75H, maj), 6.97 (m, 2H), 6.75 (m, 2H), 5.54 (dd, J = 9.2 and 6.3 Hz, 0.25H, min), 5.54 (dd, J = 9.3 and 6.2 Hz, 0.75H, maj), 4.75 (m, 1H), 3.72 (s, 0.75H, min), 3.72 (s, 2.25H, maj), 3.67 (s, 2.25H, maj), 3.67 (s, 0.75H, min), 3.44 (dd, J = 14.1 and 6.3 Hz, 0.5H, min), 3.42 (dd, J = 14.1 and 6.2 Hz, 1.5H, maj), 3.33 (dd, J = 14.1 and 9.2, 0.5H, min), 3.31 (dd, J = 14.1 and 9.3 Hz, 1.5, maj), 1.48 (d, J = 6.9, 0.7H, min), 1.47 (d, J = 6.9, 2.25H, maj). ¹³C NMR (acetone-d₆, 75 MHz) δ (ppm): 169.5, 159.7, 152.0, 151.6, 150.6, 150.0, 144.6, 138.1, 133.4 (0.75C, maj), 133.3 (0.25C, min), 130.9 (2C), 128.3 (0.25C, min), 128.3 (0.75C, maj), 125.0, 124.4, 122.4 (0.25C, min), 122.3 (0.75C, maj), 120.0, 114.6 (2C), 64.8, 55.4, 53.1, 47.4 (0.75C, maj), 47.3 (0.25C, min), 38.0 (0.75C, maj), 37.9 (0.25C, min), 22.3 (s, 0.75C, maj), 22.1 (0.25C, min). Mixture of cis/trans conformational isomers. |

X-36    methyl (2S)-3-(3-methoxyphenyl)-2-[4-[[[5-(2-pyridyl)-2-thienyl]sulfonylamino]methyl]triazol-1-yl]propanoate

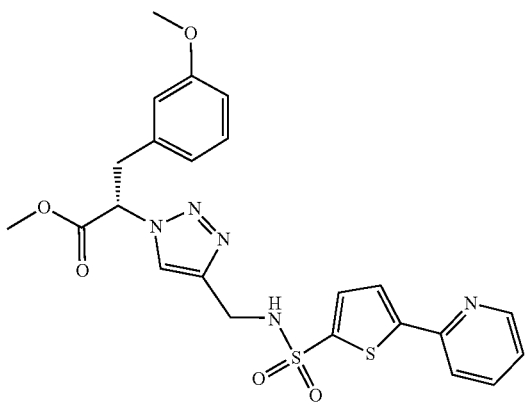 [SMILES: COC(=O)[C@H](Cc1cccc(OC)c1)n1cc(CNS(=O)(=O)c2ccc(-c3ccccn3)s2)nn1]

Aspect : white amorphous solid. Yield: quant. Purity: 100%, LC tr = 2.73 min, MS (ESI+): m/z = 514 [M + H]⁺.

¹H NMR (acetone-d₆, 300 MHz) δ: 8.56 (ddd, J = 4.9, 1.8 and 1.0 Hz, 1H), 7.97 (ddd, J = 8.0, 1.0 and 1.0 Hz, 1H), 7.92 (s, 1H), 7.88 (ddd, J = 8.0, 7.5 and 1.8 Hz, 1H), 7.74 (d, J = 4.0 Hz, 1H), 7.61 (d, J = 4.0 Hz, 1H), 7.35 (ddd, J = 7.5, 4.9 and 1.0 Hz, 1H), 7.12 (ddd, J = 8.0, 7.2 and 0.8 Hz, 1H), 6.71 (m, 3H), 5.67 (dd, J = 9.9 and 5.8 Hz, 1H), 4.32 (s, 2H), 3.71 (s, 3H), 3.70 (s, 3H), 3.54 (dd, J = 14.3 and 5.8, 1H), 3.43 (dd, J = 14.3 and 9.9 Hz, 1H).

¹³C NMR (acetone-d₆, 300 MHz) δ: 169.5, 160.7, 151.9, 150.6 (2C), 144.5,143.4, 138.2, 138.1, 133.5, 130.3, 125.1, 124.4, 123.8, 122.0, 120.0, 115.2, 113.6, 64.5, 55.4, 53.2, 39.6, 38.5.

X-37    methyl (2S)-3-(2-methoxyphenyl)-2-[4-[[[5-(2-pyridyl)-2-thienyl]sulfonylamino]methyl]triazol-1-yl]propanoate

| Compound of formula (X) | |
|---|---|
| | 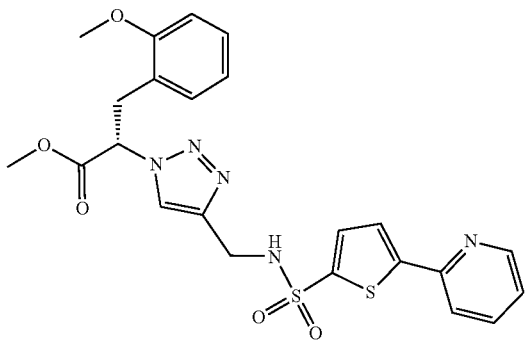 [SMILES: COC(=O)[C@H](Cc1ccccc1OC)n1cc(CNS(=O)(=O)c2ccc(-c3ccccn3)s2)nn1]<br>Aspect: white solid. Yield: 94%. Purity: 94%, LC tr = 2.77 min, MS (ESI+): m/z = 514 [M + H]⁺.<br>$^1$H NMR (acetone-$d_6$, 300 MHz) δ: 8.55 (ddd, J = 4.9, 1.8 and 1.0 Hz, 1H), 7.96 (ddd, J = 8.0, 1.0 and 1.0 Hz, 1H), 7.92 (s, 1H), 7.86 (ddd, J = 8.0, 7.5 and 1.8 Hz, 1H), 7.73 (d, J = 4.0 Hz, 1H), 7.61 (d, J = 4.0 Hz, 1H), 7.34 (ddd, J = 7.5, 4.9 and 1.0 Hz, 1H), 7.17 (ddd, J = 8.3, 7.4 and 1.7 Hz, 1H), 6.92 (m, 2H), 6.73 (ddd, J = 7.4, 7.4 and 1.1 Hz, 1H), 5.70 (dd, J = 9.5 and 56.1 Hz, 1H), 4.31 (s, 2H), 3.83 (s, 3H), 3.67 (s, 3H), 3.56 (dd, J = 13.7 and 6.1, 1H), 3.34 (dd, J = 13.7 and 9.5 Hz, 1H).<br>$^{13}$C NMR (acetone-$d_6$, 75 MHz) δ: 169.7, 158.5, 151.9, 151.8, 150.5, 144.3, 143.4, 138.1, 133.5, 131.6, 129.6, 125.1, 124.4, 124.2, 123.5, 121.1, 120.0, 111.3, 62.8, 55.8, 53.1, 39.6, 34.2. |
| X-38 | methyl (2S)-3-[4-(2-methoxyethoxy)phenyl]-2-[4-[[5-(2-pyridyl)-2-thienyl]sulfonylamino]methyl]triazol-1-yl]propanoate |
| | 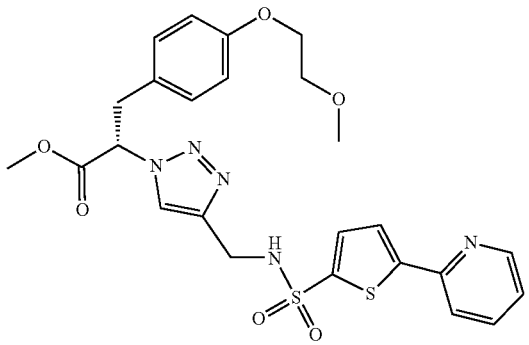 [SMILES: COCCOc1ccc(C[C@@H](C(=O)OC)n2cc(CNS(=O)(=O)c3ccc(-c4ccccn4)s3)nn2)cc1]<br>Aspect: white solid. Yield: 60%. Purity: 100%, LC tr = 2.68 min, MS (ESI+): m/z = 558 [M + H]⁺.<br>$^1$H NMR (acetone-$d_6$, 300 MHz) δ: 8.56 (ddd, J = 4.8, 1.7 and 1.0 Hz, 1H), 7.96 (ddd, J = 8.0, 1.1 and 1.0 Hz, 1H), 7.88 (s, 1H), 7.87 (ddd, J = 8.0, 7.4 and 1.7 Hz, 1H), 7.74 (d, J = 4.0, 1H), 7.61 (d, J = 4.0 Hz, 1H), 7.35 (ddd, J = 7.4, 4.8 and 1.1 Hz, 1H), 7.01 (m, 2H), 6.77 (m, 2H), 5.60 (dd, J = 9.5 and 6.0 Hz, 1H), 4.32 (s, 2H), 4.03 (m, 2H), 3.68 (s, 3H), 3.66 (m, 2H), 3.48 (dd, J = 14.2 and 6.0, 1H), 3.38 (dd, J = 14.2 and 9.5 Hz, 1H), 3.33 (s, 3H).<br>$^{13}$C NMR (acetone-$d_6$, 75 MHz) δ: 169.5, 159.0, 151.9, 151.8, 150.6, 144.4, 143.4, 138.1, 133.5, 130.9 (2C), 128.4, 125.1, 124.4, 123.7, 120.0, 115.3 (2C), 71.6, 68.0, 64.8, 58.9, 53.1, 39.5, 37.7. |
| X-39 | methyl (2S)-3-(3-fluoro-4-methoxy-phenyl)-2-[4-[[[5-(2-pyridyl)-2-thienyl]sulfonylamino]methyl]triazol-1-yl]propanoate |
| | 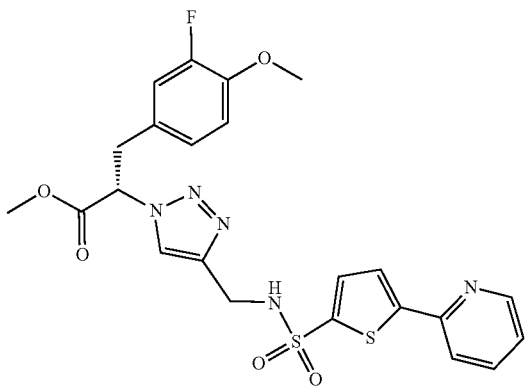 [SMILES: COC(=O)[C@H](Cc1ccc(OC)c(F)c1)n1cc(CNS(=O)(=O)c2ccc(-c3ccccn3)s2)nn1] |

| Compound of formula (X) |
|---|
| Aspect: white solid. Yield: 59%. Purity: 100%, LC tr = 2.73 min, MS (ESI+): m/z = 532 [M + H]$^+$. <br> $^1$H NMR (acetone-$d_6$, 300 MHz) δ: 8.56 (ddd, J = 4.9, 1.8 and 1.0 Hz, 1H), 7.96 (ddd, J = 8.0, 1.0 and 1.0 Hz, 1H), 7.92 (s, 1H), 7.86 (ddd, J = 8.0, 7.5 and 1.8 Hz, 1H), 7.73 (d, J = 4.0 Hz, 1H), 7.61 (d, J = 4.0 Hz, 1H), 7.34 (ddd, J = 7.5, 4.9 and 1.0 Hz, 1H), 6.93 (m, 3H), 6.82 (m, 1H), 5.65 (dd, J = 9.8 and 5.8 Hz, 1H), 4.32 (s, 2H), 3.80 (s, 3H), 3.69 (s, 3H), 3.52 (dd, J = 14.3 and 5.8 Hz, 1H), 3.40 (dd, J = 14.3 and 9.8 Hz, 1H). <br> $^{19}$F NMR (acetone-$d_6$, 282 MHz) δ: −136.8 (dd, J = 12.3 and 9.1 Hz). <br> $^{13}$C NMR (acetone-$d_6$, 75 MHz) δ: 169.3, 152.7 (d, J = 244 Hz), 151.9, 151.8, 150.5, 147.6 (d, J = 10.5 Hz), 144.5, 143.3, 138.1, 133.5, 129.3 (d, J = 6.6 Hz), 126.0 (d, J = 3.9 Hz), 125.1, 124.4, 123.8, 120.0, 117.2 (d, J = 18.6 Hz), 114.3 (d, J = 2.2 Hz), 64.4, 56.3, 53.2, 39.5, 37.5. |
| X-40    methyl (2S)-3-(3-chloro-4-methoxy-phenyl)-2-[4-[5-(2-pyridyl)-2-thienyl]sulfonylamino]methyl]triazol-1-yl]propanoate |

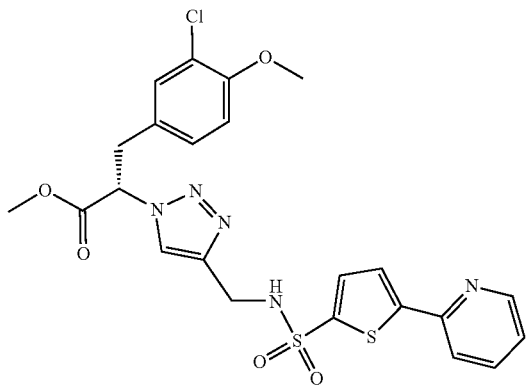 [SMILES: COC(=O)[C@H](Cc1ccc(OC)c(Cl)c1)n1cc(CNS(=O)(=O)c2ccc(-c3ccccn3)s2)nn1]

| |
|---|
| Aspect: white solid. Yield: 23%. Purity 97%, LC tr = 2.82 min, MS (ESI+) : m/z = 548 [M + H]$^+$. <br> $^1$H NMR (300 MHz, CDCl$_3$) δ: 8.56 (d, J = 4.5 Hz, 1H), 7.76 (dt, J = 7.5 Hz, 2.0 Hz, 1H), 7.67 (d, J = 8.0 Hz, 1H), 7.65 (s, 1H), 7.58 (d, J = 4.0 Hz, 1H), 7.51 (d, J = 4.0 Hz, 1H), 7.26 (dd, J = 7.0 Hz, 5.5 Hz, 1H), 7.03 (d, J = 2.0 Hz, 1H), 6.81 (dd, J = 8.5 Hz, 2.0 Hz, 1H), 6.77 (d, J = 8.5 Hz, 1H), 5.89 (t, J = 5.5 Hz, 1H), 5.45 (dd, J = 8.5 Hz, 6.5 Hz, 1H), 4.40 (d, J = 6.5 Hz, 1H), 3.84 (s, 3H), 3.72 (s, 3H), 3.39 (dd, J = 14.0 Hz, 6.5 Hz, 1H), 3.29 (dd, J = 14.0 Hz, 8.5 Hz, 1H). <br> $^{13}$C NMR (CDCl$_3$, 75 MHz) δ: 168.4, 154.5, 151.0, 150.7, 149.6, 143.8, 141.6, 137.5, 133.6, 130.6, 128.5, 127.6, 124.3, 123.6, 122.7, 122.6, 119.5, 112.3, 64.1, 56.2, 53.2, 39.0, 37.7. |
| X-41    methyl (2S)-3-(4-ethynylphenyl)-2-[4-[[(5-phenyl-2-thienyl)sulfonylamino]methyl]triazol-1-yl]propanoate |

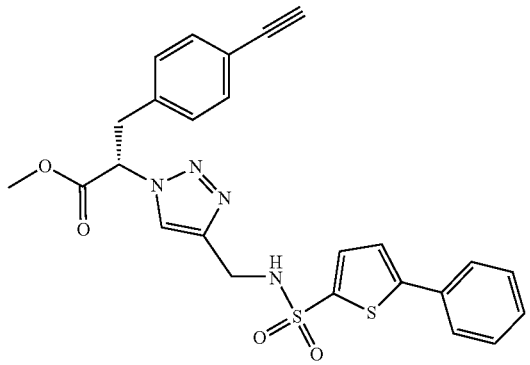 [SMILES: C#Cc1ccc(C[C@@H](C(=O)OC)n2cc(CNS(=O)(=O)c3ccc(-c4ccccc4)s3)nn2)cc1]

| |
|---|
| Aspect: clear oil. Yield: 75%. Purity: 94%, LC tr = 2.90 min, MS (ESI+): m/z = 507 [M + H]$^+$. <br> $^1$H NMR (MeOD-$d_4$, 300 MHz) δ: 7.83 (s, 1H), 7.65 (m, 2H), 7.53 (d, J = 3.9 Hz, 1H), 7.41 (m, 3H), 7.35 (d, J = 3.9 Hz, 1H), 7.28 (m, 2H), 7.01 (m, 2H), 5.65 (dd, J = 10.1 and 5.6 Hz, 1H), 4.27 (s, 2H), 3.69 (s, 3H), 3.55 (dd, J = 14.3 and 5.6 Hz, 1H), 3.44 (s, 1H), 3.40 (dd, J = 14.3 and 10.1 Hz). <br> $^{13}$C NMR (MeOD-$d_4$, 75 MHz) δ: 169.8, 152.0, 145.5, 141.0, 137.6, 134.2, 134.1, 133.2 (2C), 130.3 (2C), 130.2 (3C), 127.3 (2C), 124.8, 124.4, 122.7, 84.0, 78.9, 65.0, 53.5, 39.3, 38.7. |
| X-42    methyl (2S)-3-(4-cyanophenyl)-2-[4-[(5-phenyl-2-thienyl)sulfonylamino]methyl]triazol-1-yl]propanoate |

| Compound of formula (X) |
|---|

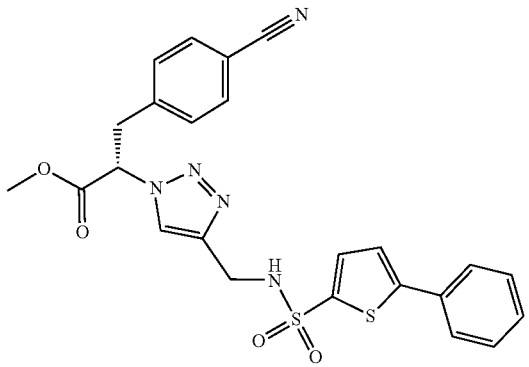 [SMILES: COC(=O)[C@H](Cc1ccc(C#N)cc1)n1cc(CNS(=O)(=O)c2ccc(-c3ccccc3)s2)nn1]

Aspect: clear oil. Yield: 75%. Purity: 100%, LC tr = 2.92 min, MS (ESI+): m/z = 508 [M + H]+.
$^1$H NMR (acetone-$d_6$, 300 MHz) δ: 7.94 (s, 1H), 7.72 (m, 2H), 7.60 (m, 3H), 7.45 (m, 4H), 7.34 (m, 2H), 5.78 (dd, J = 10.0 and 5.7 Hz, 1H), 4.31 (s, 2H), 3.70 (s, 3H), 3.70 (dd, J = 14.2 and 5.7 Hz, 1H), 3.59 (dd, J = 14.2 and 10.0 Hz, 1H).
$^{13}$C NMR (acetone-$d_6$, 75 MHz) δ: 169.0, 150.9, 144.7, 142.5, 140.8, 133.8, 133.6, 133.0 (2C), 131 (2C), 130.1 (2C), 129.9, 126.9 (2C), 124.4, 124.0, 119.1, 111.6, 63.8, 53.3, 39.4, 38.3.

X-43  methyl (2S)-3-(4-methoxyphenyl)-2-[4-[[(2-phenylthiazol-5-yl)sulfonylamino]methyl]triazol-1-yl]propanoate

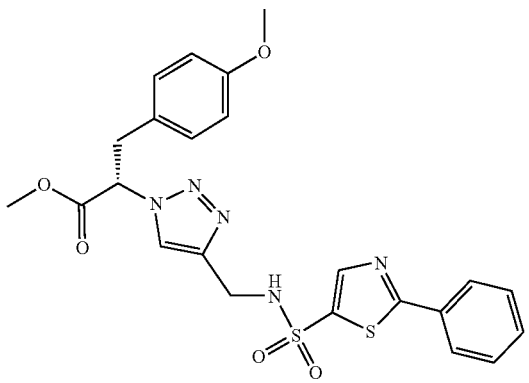 [SMILES: COC(=O)[C@H](Cc1ccc(OC)cc1)n1cc(CNS(=O)(=O)c2cnc(-c3ccccc3)s2)nn1]

Aspect: clear oil. Yield: 47%. Purity: 100%, LC tr = 2.88 min, MS (ESI+): m/z = 514 [M + H]+.
$^1$H NMR (CDCl$_3$, 300 MHz) δ: 8.17 (s, 1H), 7.90 (m, 2H), 7.60 (s, 1H), 7.45 (m, 3H), 6.88 (m, 2H), 6.74 (m, 2H), 6.05 (t, J = 6.0 Hz, 1H), 5.47 (dd, J = 8.3 and 6.6 Hz, 1H), 4.38 (d, J = 6.0 Hz, 2H), 3.73 (s, 3H), 3.68 (s, 3H), 3?38 (dd, J = 14.1 and 6.6 Hz, 1H), 3.29 (dd, J = 14.1 and 8.3 Hz, 1H).
$^{13}$C NMR (CDCl$_3$, 75 MHz) δ: 173.9, 168.6, 159.1, 147.8, 143.1, 136.1, 132.4, 131.7, 130.0 (2C), 129.3 (2C), 127.1 (2C), 126.4, 122.6, 114.3 (2C), 64.4, 55.3, 53.2, 38.8, 38.2.

X-44  methyl (2S)-2-[4-[[cyclopropyl-[[5-(2-pyridyl)-2-thienyl]sulfonyl]amino]methyl]triazol-1-yl]-3-(4-methoxyphenyl)propanoate

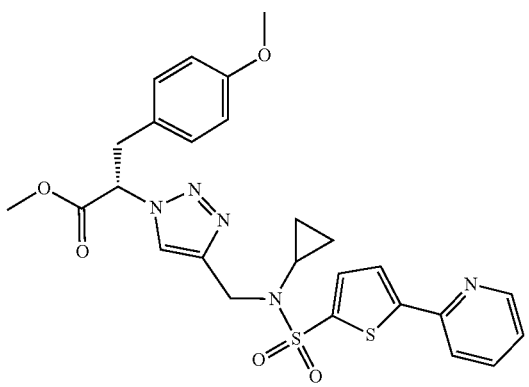 [SMILES: COC(=O)[C@H](Cc1ccc(OC)cc1)n1cc(CN(C2CC2)S(=O)(=O)c2ccc(-c3ccccn3)s2)nn1]

Aspect: white amorphous solid. Yield: 40%. Purity: 100%, LC tr = 2.95 min, MS (ESI+): m/z = 554 [M + H]+.
$^1$H NMR (acetone-$d_6$, 300 MHz) δ: 8.57 (ddd, J = 4.9, 1.8 and 1.1 Hz, 1H), 7.99 (ddd, J = 8.0, 1.2 and 1.1 Hz, 1H), 7.90 (ddd, J = 8.0, 7.4 and 1.8 Hz, 1H), 7.85 (s, 1H), 7.79 (d, J = 4.0 Hz, 1H), 7.59 (d, J =

| Compound of formula (X) |
|---|
| 4.0 Hz, 1H), 7.38 (ddd, J = 7.4, 4.9 and 1.2 Hz, 1H), 7.02 (dt, J = 9.6 and 2.6 Hz, 2H), 6.74 (dt, J = 9.6 and 2.6 Hz, 2H), 5.66 (dd, J = 9.9 and 5.8 Hz, 1H), 4.57 (d, J = 15.4 Hz, 1H), 4.50 (d, J = 15.4 Hz, 1H), 3.71 (s, 3H), 3.70 (s, 3H), 3.52 (dd, J = 14.5 and 5.8, 1H), 3.41 (dd, J = 14.5 and 9.9 Hz, 1H), 2.14 (tt, J = 10.4 and 3.5 Hz, 1H), 0.79 (m, 2H), 0.66 (m, 2H).<br>$^{13}$C NMR (acetone-$d_6$, 75 MHz) δ: 169.5, 159.6, 152.0, 151.6, 150.3, 143.4, 140.5, 138.4, 134.3, 130.9 (2C), 128.3, 125.4, 124.9, 124.5, 120.2, 114.6 (2C), 64.6, 55.4, 53.2, 46.6, 37.6, 31.3, 8.0, 7.0. |
| X-45    methyl (2S)-3-(4-methoxyphenyl)-2-[4-[1-[(5-phenyl-2-thienyl)sulfonyl]-2-piperidyl]triazol-1-yl]propanoate |

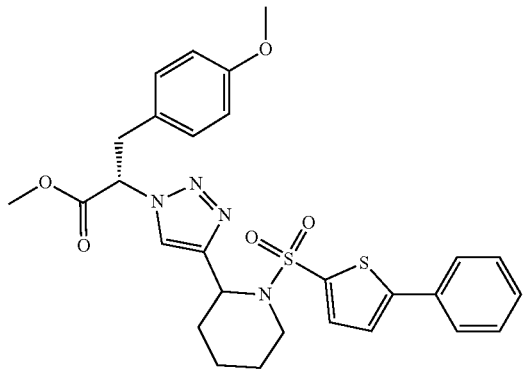 [SMILES: COC(=O)[C@H](Cc1ccc(OC)cc1)n1cc(C2CCCCN2S(=O)(=O)c2ccc(-c3ccccc3)s2)nn1]

Aspect: clear oil. Yield: 45%. Purity : 100%, LC tr = 3.35 min, MS (ESI+): m/z = 567 [M + H]⁺.
$^1$H NMR (acetone-$d_6$, 300 MHz) δ: 7.78 (d, J = 0.8 Hz, 1H), 7.73-7.69 (m, 4H), 7.71 (d, J = 0.7 Hz, 1H), 7.50 (d, J = 4.0 Hz, 1H), 7.50-7.38 (m, 6H), 7.48 (d, J = 4.0 Hz, 1H), 7.42 (d, J = 4.0 Hz, 1H), 7.41 (d, J = 4.0 Hz, 1H), 7.04-6.96 (m, 4H), 6.78- 6.73 (m, 4H), 5.64 (dd, J = 9.5 and 6.0 Hz, 1H), 5.59 (dd, J = 9.8 and 5.9 Hz, 1H), 5.35 (m, 2H), 3.80 (m, 2H), 3.71 (s, 3H), 3.71 (s, 6H), 3.69 (s, 3H), 3.50 (dd, J = 14.2 and 6.0 Hz, 1H), 3.49 (dd, J = 14.1 and 5.9 Hz, 1H), 3.40 (dd, J = 14.2 and 9.5 Hz, 1H), 3.35 (dd, J = 14.1 and 9.5 Hz, 1H), 3.10 (m, 2H), 2.15 (m, 2H), 1.80 (m, 2H), 1.52 (m, 8H).
$^{13}$C NMR (acetone-$d_6$, 75 MHz) δ: 169.5, 169.4, 159.8, 159.7, 150.9, 150.9, 146.8, 146.6, 141.1, 141.1, 133.7, 133.7, 131.0 (2C), 131.0 (2C), 130.1 (6C), 129.9 (2C), 128.4, 128.3, 126.9 (4C), 124.4, 124.4, 124.1, 128.8, 114.7 (2C), 114.7 (2C), 64.7 (2C), 55.4 (2C), 53.2 (2C), 50.8 (2C), 42.8, 42.7, 38.0, 37.8, 29.4, 29.4, 25.4, 25.4, 19.5, 19.4. (1:1 diastereomeric mix).

X-46    methyl (2S)-3-(4-methoxyphenyl)-2-[4-[(2S)-1-[(5-phenyl-2-thienyl)sulfonyl]pyrrolidin-2-yl]triazol-1-yl]propanoate

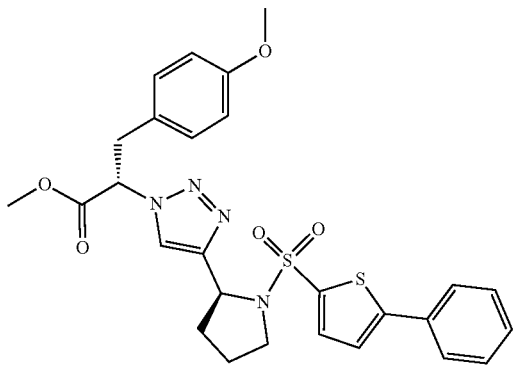 [SMILES: COC(=O)[C@H](Cc1ccc(OC)cc1)n1cc([C@@H]2CCCN2S(=O)(=O)c2ccc(-c3ccccc3)s2)nn1]

Aspect: clear oil. Yield: 61%. Purity: 100%, LC tr = 3.23 min, MS (ESI+): m/z = 553 [M + H]⁺.
$^1$H NMR (CDCl$_3$, 300 MHz) δ: 7.76 (s, 1H), 7.60 (m, 2H), 7.51 (d, J = 3.9 Hz, 1H), 7.40 (m, 3H), 7.28 (d, J = 3.9 Hz, 1H), 6.96 (m, 2H), 6.78 (m, 2H), 5.50 (dd, J = 8.4 and 6.6 Hz, 1H), 4.96 (dd, J = 7.4 and 2.7 Hz, 1H), 3.75 (s, 6H), 3.61 (m, 1H), 3.47 (dd, J = 14.1 and 6.6 Hz, 1H), 3.38 (dd, J = 14.1 and 8.4 Hz, 1H), 3.36 (m, 1H), 2.41 (m, 1H), 1.91 (m, 3H).
$^{13}$C NMR (CDCl$_3$, 75 MHz) δ: 168.7, 159.0, 151.3, 149.3, 135.6, 133.4, 132.7, 130.2 (2C), 129.4 (2C),129.3, 126.7, 126.4 (2C), 123.2, 123.2, 114.3 (2C), 64.4, 56.3, 55.3, 53.1, 49.4, 38.2, 32.0, 24.7.

III.1.6 Compound of Formula (XI)

| Compound of formula (XI) |
| --- |

XI-1     (S)-methyl 3-(4-hydroxyphenyl)-2-(4-((5-(4-(methylcarbamoyl)phenyl)thiophene-2-sulfonamido)methyl)-1H-1,2,3-triazol-1-yl)propanoate.

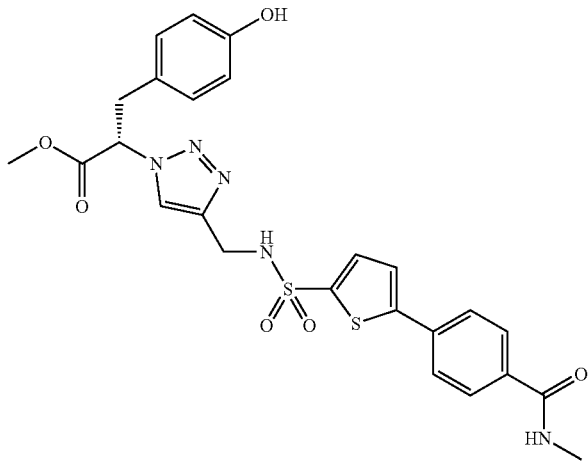

Aspect: White foam. Yield: 18%. Purity: 93%. LC$_{tR}$ = 2.57 min. MS (ESI–): m/z = 554 [M – H]$^-$.

$^1$H NMR, 300 MHz, MeOD-d$_4$, δ (ppm): 7.88-7.84 (m, 2H), 7.77 (s, 1H), 7.76-7.72 (m, 2H), 7.53 (d, J = 3.9 Hz, 1H), 7.54 (d, J = 3.9 Hz, 1H), 6.85-6.84 (m, 2H), 6.62-6.58 (m, 2H), 5.54 (dd, J = 5.9 and 9.6 Hz, 1H), 4.28 (s, 2H), 3.67 (s, 3H), 3.40 (dd, J = 5.9 and 14.2 Hz, 1H), 3.26 (dd, J = 9.6 and 14.2 Hz, 1H), 2.93 (s, 3H).

$^{13}$C NMR, 75 MHz, MeOD-d$_4$, δ (ppm): 170.0, 169.7, 157.7, 150.4, 145.2, 142.2, 137.0, 135.7, 134.2, 131.1, 129.2, 127.2, 125.6, 124.7, 116.4, 65.7, 53.4, 39.3, 38.3, 27.0.

XI-2     (S)-methyl-2-(4-((5-(4-(((tert-butoxycarbonyl)amino)methyl)phenyl)thiophene-2-sulfonamido)methyl)-1H-1,2,3-triazol-1-yl)-3-(4-hydroxyphenyl)propanoate.

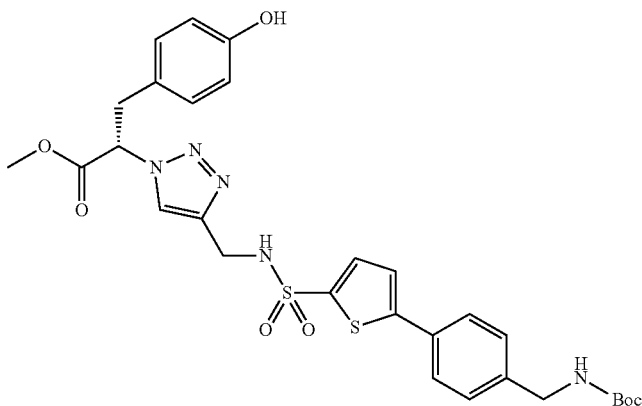 [SMILES: COC(=O)[C@H](Cc1ccc(O)cc1)n1cc(CNS(=O)(=O)c2ccc(-c3ccc(CNC(=O)OC(C)(C)C)cc3)s2)nn1]

Aspect: Yellow solid. Yield: 30%. Purity: 100%. LC$_{tR}$ = 2.82 min. MS (ESI–): m/z = 626 [M – H]$^-$.

$^1$H NMR, 300 MHz, MeOD-d$_4$, δ (ppm): 7.77 (s, 1H), 7.63 (d, J = 8.1 Hz, 2H), 7.51 (d, J = 3.9 Hz, 2H), 7.35-7.33 (m, 3H), 6.62-6.59 (m, 2H), 5.55 (dd, J = 5.9 and 9.7 Hz, 1H), 4.27 (s, 2H), 4.25 (s, 2H), 3.67 (s, 3H), 3.44-3.37 (m, 1H), 3.27-3.23 (m, 1H), 1.46 (s, 9H).

XI-3     (S)-methyl 3-(4-methoxyphenyl)-2-(4-((5-(4-(methylcarbamoyl)phenyl)thiophene-2-sulfonamido)methyl)-1H-1,2,3-triazol-1-yl)propanoate.

| Compound of formula (XI) |
|---|

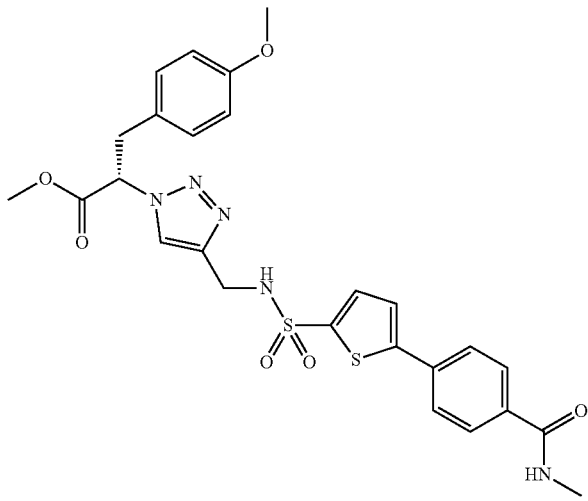

Aspect: White solid. Yield: 32%. Purity: 91%. $LC_{tR}$ = 2.50 min. MS (ESI–): m/z = 568 [M – H]⁻.
$^1$H NMR, 300 MHz, DMSO-$d_6$, δ (ppm): 8.54-8.50 (m, 2H), 8.04 (s, 1H), 7.91 (d, J = 8.4 Hz, 2H), 7.81 (d, J = 8.4 Hz, 2H), 7.65 (d, J = 3.9 Hz, 1H), 7.60 (d, J = 3.9 Hz, 1H), 6.99 (d, J = 8.6 Hz, 2H), 6.74 (d, J = 8.6 Hz, 2H), 5.74 (dd, J = 5.6 and 9.8 Hz, 1H), 4.14 (s, 2H), 3.66 (s, 3H), 3.64 (s, 3H), 3.44 (dd, J = 5.6 and 14.4 Hz, 2H), 3.32 (dd, J = 9.8 and 14.4 Hz, 2H), 2.80 (d, J = 4.4 Hz, 3H).
$^{13}$C NMR, 75 MHz, DMSO-$d_6$, δ (ppm): 168.7, 165.8, 158.1, 147.9, 148.2, 140.5, 134.6, 134.55, 134.52, 132.8, 129.9, 128.1, 125.7, 125.0, 123.6, 113.7, 68.1, 54.9, 52.8, 38.3, 35.9, 26.3.

| XI-4 | (S)-methyl 3-(4-hydroxyphenyl)-2-(4-((5-(pyridin-3-yl)thiophene-2-sulfonamido)methyl)-1H-1,2,3-triazol-1-yl)propanoate. |
|---|---|

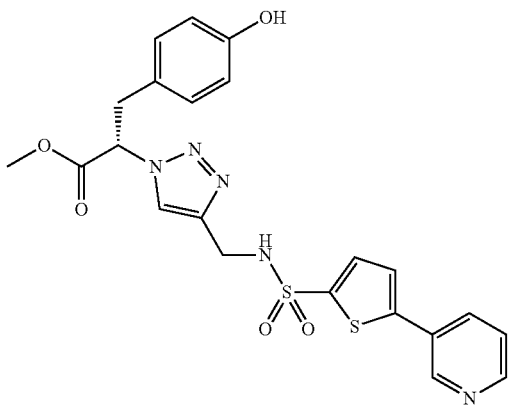 [SMILES: COC(=O)[C@H](Cc1ccc(O)cc1)n1cc(CNS(=O)(=O)c2ccc(-c3cccnc3)s2)nn1]

Aspect: White solid. Yield: 27%. Purity: 95%. $LC_{tR}$ = 2.27 min. MS (ESI–): m/z = 498 [M – H]⁻.
$^1$H NMR, 300 MHz, DMSO-$d_6$, δ (ppm): 9.26 (br, 1H), 9.98 (br, 1H), 8.61 (d, J = 4.8 Hz, 1H), 8.53 (t, J = 6.0 Hz, 1H), 8.14 (ddd, J = 1.6, 2.3 and 8.0 Hz, 1H), 8.03 (s, 1H), 7.68 (d, J = 3.9 Hz, 1H), 7.62 (d, J = 3.9 Hz, 1H), 7.51 (dd, J = 4.1 and 7.9 Hz), 6.88 (d, J = 8.5 Hz, 2H), 6.58 (d, J = 8.5 Hz, 2H), 5.69 (dd, J = 5.9 and 9.8 Hz, 1H), 4.17 (d, J = 4.8 Hz, 2H), 3.64 (s, 3H), 3.38 (dd, J = 5.9 and 14.3 Hz, 1H), 3.30 (dd, J = 9.8 and 14.3 Hz, 1H).
$^{13}$C NMR, 75 MHz, DMSO-$d_6$, δ (ppm): 168.7, 156.2, 149.7, 146.5, 145.2, 143.1, 140.9, 133.5, 132.7, 129.9, 128.4, 125.6, 125.4, 124.2, 123.5, 115.1, 63.3, 52.7, 38.3, 36.0.

| XI-5 | Methyl (2S) 3 (4 methoxyphenyl) 2 [4 [[[5 (4 pyridyl) 2 thienyl]sulfonylamino]methyl]triazol 1 yl]propanoate |
|---|---|

| Compound of formula (XI) |
|---|

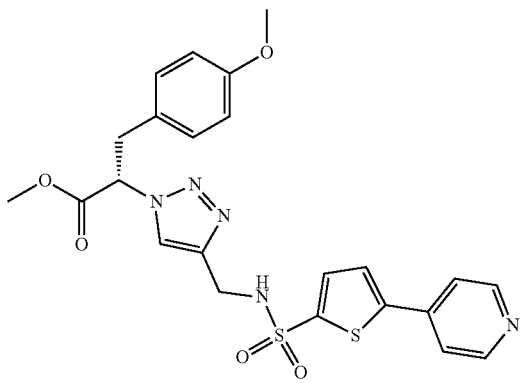 [SMILES: COC(=O)[C@H](Cc1ccc(OC)cc1)n1cc(CNS(=O)(=O)c2ccc(-c3ccncc3)s2)nn1]

Aspect: white solid. Yield: 9%. Purity (LC-MS): 97%, LC tr = 2.48 min, MS (ESI−): 512 [M − H]−.
$^1$H NMR (MeOD, 300 MHz) δ: 8.57 (d, J = 5.0 Hz, 2H), 7.82 (s, 1H), 7.96 (m, 2H), 7.64 (d, J = 4.0 Hz, 1H), 7.58 (d, J = 4.0 Hz, 1H), 6.92 (d, J = 8.7 Hz, 2H), 6.73 (d, J = 8.7 Hz, 2H), 5.59 (dd, J = 5.7 and 9.9 Hz, 1H), 4.29 (s, 2H), 3.70 (s, 3H), 3.69 (s, 3H), 3.46 (dd, J = 5.7 and 14.3 Hz, 1H) and 3.31 (dd, J = 9.9 and 14.3 Hz, 1H).
$^{13}$C NMR (MeOD, 75 MHz) δ: 170.0, 160.3, 151.1, 147.5, 145.1, 144.4, 142.3, 134.0, 131.0, 128.4, 127.5, 124.8, 121.7, 115.0, 66.6, 55.6, 53.4, 39.3 and 36.2.

XI-6  methyl (2S)-3-(4-methoxyphenyl)-2-[4-[[[5-(3-pyridyl)-2-thienyl]sulfonylamino]methyl]triazol-1-yl]propanoate

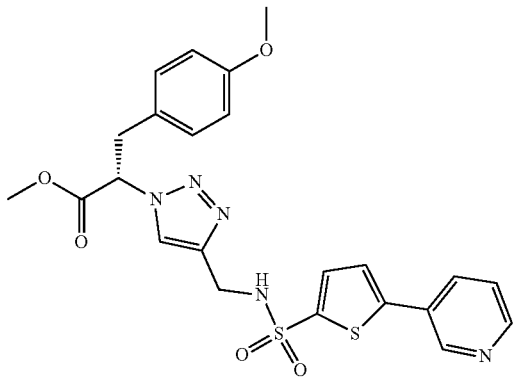 [SMILES: COC(=O)[C@H](Cc1ccc(OC)cc1)n1cc(CNS(=O)(=O)c2ccc(-c3cccnc3)s2)nn1]

Aspect: white solid. Yield: 28%. Purity: 100%, LC tr = 2.53 mn, MS (ESI−): m/z = 512 [M − H]−.
$^1$H NMR (DMSO-d$_6$, 300 MHz) δ: 8.96 (d, J = 1.9 Hz, 1H), 8.59 (d, J = 1.4 and 4.7 Hz, 1H), 8.52 (t, J = 6.0 Hz, 1H), 8.13 (ddd, J = 1.6, 2.4 and 8.0 Hz, 1H), 8.03 (s, 1H), 7.67 (d, J = 3.9 Hz, 1H), 7.62 (d, J = 3.9 Hz, 1H), 7.50 (ddd, J = 0.7, 4.7 and 8.0 Hz, 1H), 6.99 (d, J = 8.7 Hz, 2H), 6.74 (d, J = 8.7 Hz, 2H), 5.74 (dd, J = 5.6 and 9.9 Hz, 1H), 4.16 (d, J = 6.0 Hz, 2H), 3.67 (s, 3H), 3.65 (s, 3H), 3.44 (dd, J = 5.6 and 14.3 Hz, 1H) and 3.39 (dd, J = 9.9 and 14.3 Hz, 1H).
$^{13}$C NMR (DMSO-d$_6$, 75 MHz) δ: 168.7, 158.1, 149.8, 146.6, 145.3, 143.1, 140.9, 133.4, 132.7, 129.9, 128.4, 127.4, 125.3, 124.2, 123.5, 113.7, 63.1, 54.9, 52.8, 38.2, and 35.9.

XI-7  methyl (2S)-3-(4-methoxyphenyl)-2-[4-[[[5-[3-(methylcarbamoyl)phenyl]-2-thienyl]sulfonylamino]methyl]triazol-1-yl]propanoate

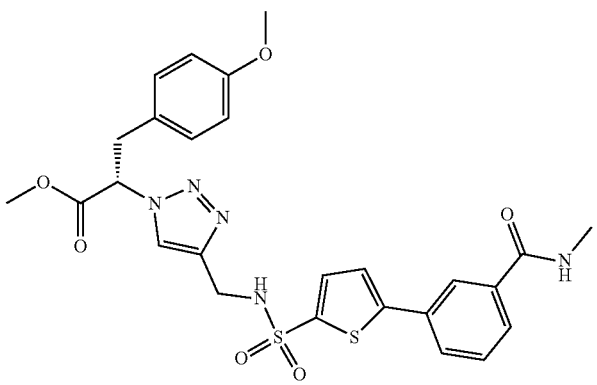

| Compound of formula (XI) |
| --- |
| Aspect: white solid. Yield: 34%. Purity: 97%, LC tr = 2.53 mn, MS (ESI–): m/z = 568 [M – H]⁻.
$^1$H NMR (DMSO, 300 MHz) δ: 8.60 (q, J = 4.5 Hz, 1H), 8.49 (s, 1H), 8.14 (t, J = 1.9 Hz, 1H), 8.04 (s, 1H), 7.89-7.84 (m, 2H), 7.61 (s, 2H), 7.55 (t, J = 10.4 Hz, 1H), 7.00 (d, J = 8.6 Hz, 2H), 6.74 (d, J = 8.6 Hz, 2H), 5.74 (dd, J = 5.7 and 10 Hz, 1H), 4.15 (s, 2H), 3.67 (s, 3H), 3.65 (s, 3H), 3.44 (dd, J = 5.7 and 14.7 Hz, 1H), 3.35 (dd, J = 10 and 14.7 Hz, 1H) and 2.81 (d, J = 4.5 Hz, 3H).
$^{13}$C NMR (DMSO, 300 MHz) δ: 168.7, 165.8, 158.1, 148.3, 143.2, 140.0, 135.4, 132.7, 132.3, 129.9, 129.5, 128.3, 127.7, 127.4, 124.6, 124.3, 123.5, 113.7, 63.1, 54.9, 52.8, 38.3, 35.9 and 26.2. |

III.1.7 Compound of Formula (XII)

| Compound of formula (XII) | |
| --- | --- |
| XII-1 | (3R)-3-azido-4-(1H-indol-3-yl)-N-prop-2-ynyl-butanamide. |

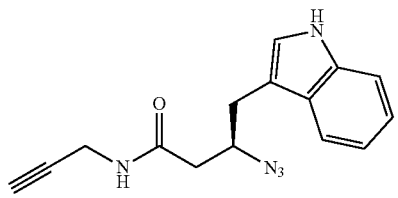 [SMILES: C#CCNC(=O)C[C@@H](Cc1c[nH]c2ccccc12)N=[N+]=[N-]]

Aspect: Brown oil. Yield: 57%. Purity: 82%. LC$_{tR}$ = 2.50 min. MS (ESI–): m/z = 280 [M – H]⁻.
$^1$H NMR, 300 MHz, MeOD-d$_4$, δ (ppm): 7.59-7.56 (m, 1H), 7.36-7.33 (m, 1H), 7.13 (s, 1H), 7.10-7.00 (m, 2H), 4.19-4.11 (m, 1H), 3.94-3.93 (m, 2H), 3.07-2.95 (m, 2H), 2.57 (t, J = 2.6 Hz, 1H), 2.46 (dd, J = 14.7 and 5.0 Hz, 1H), 2.36 (dd, J = 14.7 and 8.9 Hz, 1H)
$^{13}$C NMR, 75 MHz, MeOD-d$_4$, δ (ppm): 172.6, 138.1, 128.8, 124.7, 122.4, 119.9, 119.3, 112.3, 111.4, 80.4, 72.2, 61.7, 41.5, 31.4, 29.4.

| | |
| --- | --- |
| XII-2 | (3S)-3-azido-4-(4-hydroxyphenyl)-N-prop-2-ynyl-butanamide. |

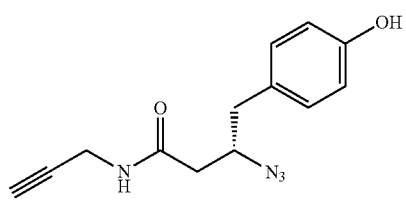 [SMILES: C#CCNC(=O)C[C@H](Cc1ccc(O)cc1)N=[N+]=[N-]]

Aspect: Yellow oil. Yield: 90%. Purity: 95%. LC$_{tR}$ = 2.07 min. MS (ESI–): m/z = 257 [M – H]⁻.
$^1$H NMR, 300 MHz, MeOD-d$_4$, δ (ppm): 7.09-7.04 (m, 2H), 6.76-6.71 (m, 2H), 4.03-3.97 (m, 1H), 3.96-3.94 (m, 2H), 2.79 (dd, J = 5.7 and 13.9 Hz, 1H), 2.70 (dd, J = 8.0 and 13.9 Hz, 1H), 2.58 (t, J = 2.6 Hz, 1H), 2.40 (dd, J = 5.0 and 14.8 Hz, 1H), 2.31 (dd, J = 8.9 and 14.7 Hz, 1H).
$^{13}$C NMR, 75 MHz, MeOD-d$_4$, δ (ppm): 172.4, 157.4, 131.5, 129.4, 116.3, 80.4, 72.2, 62.6, 41.3, 40.9, 29.5.

| | |
| --- | --- |
| XII-3 | (S)-3-azido-4-(4-hydroxyphenyl)-N-methyl-N-(prop-2-yn-1-yl)butanamide. |

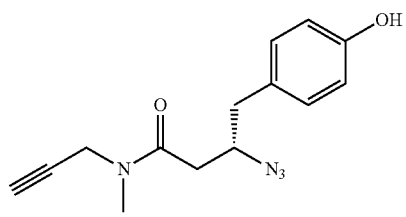 [SMILES: C#CCN(C)C(=O)C[C@H](Cc1ccc(O)cc1)N=[N+]=[N-]]

Aspect: Yellow oil. Yield: 63%. Purity: 93%. LC$_{tR}$ = 2.33 min. MS (ESI–): m/z = 271 [M – H]⁻.
$^1$H NMR, 300 MHz, MeOD-d$_4$, δ (ppm): 7.10-7.07 (m, 2H), 6.81-6.76 (m, 2H), 4.20-4.18 (m, 1H), 4.13-4.11 (m, 0.7H), 4.10-4.00 (m, 1H), 3.04 (s, 1.7H), 2.97 (s, 1H), 2.84-2.45 (m, 5H).
$^{13}$C NMR, 75 MHz, MeOD-d$_4$, δ (ppm): 171.1, 170.8, 156.0, 130.2, 128.3, 115.0, 78.1, 77.6, 73.1, 71.9, 61.2, 39.6, 39.5, 38.9, 37.1, 37.1, 35.8, 33.7, 32.6. Mixture of cis/trans amide with a ratio of 1/0.7 (NMR ratio).

| | |
| --- | --- |
| XII-4 | (2S)-2-azido-3-(4-hydroxyphenyl)-N-prop-2-ynyl-propanamide |

| Compound of formula (XII) |
|---|
| 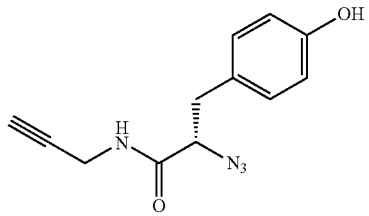 [SMILES: C#CCNC(=O)[C@H](Cc1ccc(O)cc1)N=[N+]=[N-]] |
| Aspect: Brown oil. Yield: 50%. Purity: 95%. LC$_{tR}$ = 2.05 min. MS (ESI−): m/z = 243 [M − H]⁻.<br>¹H NMR, 300 MHz, MeOD-d$_4$, δ (ppm): 7.09-7.03 (m, 2H), 6.74-6.69 (m, 2H), 3.98-3.92 (m, 3H), 3.08 (dd, J = 6.1 and 13.8 Hz, 1H), 2.89 (dd, J = 7.9 and 13.8 Hz, 1H), 2.57 (t, J = 2.6 Hz, 1H).<br>¹³C NMR, 75 MHz, MeOD-d$_4$, δ (ppm): 171.6, 157.6, 131.4, 128.2, 116.3, 80.1, 72.3, 65.7, 38.1, 29.4. |
| XII-5      (2R)-2-azido-3-(4-hydroxyphenyl)-N-prop-2-ynyl-propanamide |
| 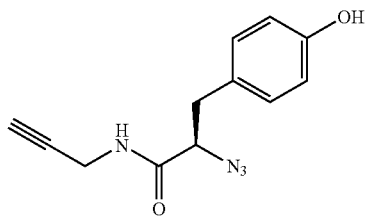 [SMILES: C#CCNC(=O)[C@@H](Cc1ccc(O)cc1)N=[N+]=[N-]] |
| Aspect: Brown oil. Yield: 72%. Purity: 90%. LC$_{tR}$ = 2.03 min. MS (ESI−): m/z = 243 [M − H]⁻.<br>¹H NMR, 300 MHz, MeOD-d$_4$, δ (ppm): 7.09-7.04 (m, 2H), 6.76-6.70 (m, 2H), 3.96 (dd, J = 6.1 and 7.9 Hz, 1H), 3.93 (d, J = 2.5 Hz, 2H), 3.08 (dd, J = 6.1 and 13.8 Hz, 1H), 2.89 (dd, J = 7.9 and 13.8 Hz, 1H), 2.58 (t, J = 2.6 Hz, 1H).<br>¹³C NMR, 75 MHz, MeOD-d$_4$, δ (ppm): 171.6, 157.5, 131.4, 128.2, 116.3, 80.1, 72.3, 65.7, 38.1, 29.4. |

III.1.8 Compound of Formula (XIII)

| Compound of formula (XIII) |
|---|
| XIII-1      (8R)-8-(1H-indol-3-ylmethyl)-4,5,7,8-tetrahydrotriazolo[1,5-a][1,4]diazepin-6-one. |
| 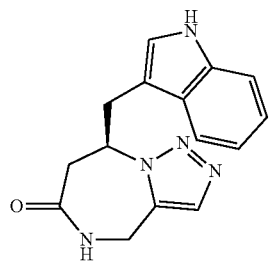 [SMILES: O=C1C[C@@H](Cc2c[nH]c3ccccc23)n2nncc2CN1] |
| Aspect: Bown oil. Yield: 45%. Purity: 100%. LC$_{tR}$ = 1.90 min. MS (ESI+): m/z = 282 [M + H]⁻.<br>¹H NMR, 300 MHz, MeOD-d$_4$, δ (ppm): 7.56 (s, 1H), 7.54-7.51 (m, 1H), 7.36-7.32 (m, 1H), 7.12-6.99 (m, 3H), 5.13-5.05 (m, 1H), 4.39 (d, J = 17.0 Hz, 1H), 4.30 (d, J = 17.0 Hz, 1H), 3.69 (dd, J = 14.3 and 3.1 Hz, 1H), 3.43-3.38 (m, 1H), 3.08-2.95 (m, 2H).<br>¹³C NMR, 75 MHz, MeOD-d$_4$, δ (ppm): 175.4, 138.0, 135.5, 131.8, 128.7, 125.6, 122.6, 120.1, 119.1, 112.4, 109.6, 59.0, 36.6, 35.6, 33.1. |
| XIII-2      (8S)-8-[(4-hydroxyphenyl)methyl]-4,5,7,8-tetrahydrotriazolo[1,5-a][1,4]diazepin-6-one. |
| 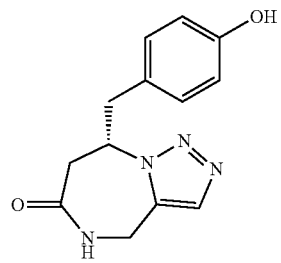 [SMILES: O=C1C[C@H](Cc2ccc(O)cc2)n2nncc2CN1] |

| Compound of formula (XIII) |
|---|
| Aspect: Bown solid. Yield: 70%. Purity: 100%. LC$_{tR}$ = 1.48 min. MS (ESI+): m/z = 259 [M + H]⁻.<br>¹H NMR, 300 MHz, MeOD-d₄, δ (ppm): 7.57 (s, 1H), 7.03-6.99 (m, 2H), 6.74-6.70 (m, 2H), 5.05-4.97 (m, 1H), 4.41 (m, 2H), 3.43 (dd, J = 3.5 and 13.7 Hz, 1H), 3.15 (dd, J = 9.1 and 13.7 Hz, 1H), 3.03 (dd, J = 4.4 and 14.4 Hz, 1H), 2.95 (dd, J = 8.3 and 14.5 Hz, 1H).<br>¹³C NMR, 75 MHz, MeOD-d₄, δ (ppm): 175.1, 157.7, 135.5, 131.9, 131.8, 127.6, 116.4, 59.8, 42.1, 36.1, 35.6. |

XIII-3 (S)-8-(4-hydroxybenzyl)-5-methyl-7,8-dihydro-4H-[1,2,3]triazolo[1,5-a][1,4]diazepin-6 (5H)-one.

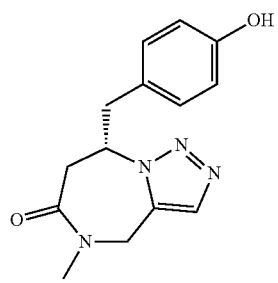 [SMILES: CN1Cc2cnnn2[C@@H](Cc2ccc(O)cc2)CC1=O]

Aspect: White solid. Yield: 47%. Purity: 100%. LC$_{tR}$ = 1.58 min. MS (ESI−): m/z = 271 [M − H]⁻.
¹H NMR, 300 MHz, DMSO-d₆, δ (ppm): 9.31 (s, 1H), 7.62 (s, 1H), 7.01-7.00 (m, 2H), 6.71-6.68 (m, 2H), 4.91-4.82 (m, 1H), 4.62 (s, 2H), 3.39-3.33 (m, 2H), 2.96-2.89 (m, 2H), 2.87 (s, 3H).
¹³C NMR, 75 MHz, DMSO-d₆, δ (ppm): 169.9, 156.2, 132.9, 131.2, 130.7, 126.0, 115.2, 57.6, 42.0, 40.6, 35.1, 34.4.

XIII-4 (7S)-7-[(4-hydroxyphenyl)methyl]-5,7-dihydro-4H-triazolo[1,5-a]pyrazin-6-one.

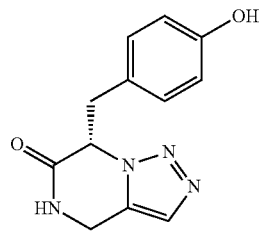 [SMILES: O=C1NCc2cnnn2[C@H]1Cc1ccc(O)cc1]

Aspect: Orange powder. Yield: 48%. Purity: 90%. LC$_{tR}$ = 1.42 min. MS (ESI+): m/z = 245 [M + H]⁻.
¹H NMR, 300 MHz, DMSO-d₆, δ (ppm): 9.31 (s, 1H), 8.42 (br d, J = 2.0 Hz, 1H), 7.53 (s, 1H), 6.52 (d, J = 8.5 Hz, 2H), 6.42 (d, J = 8.5 Hz, 2H), 5.38 (t, J = 3.9 Hz, 1H), 4.28 (dd, J = 2.7 and 16.7 Hz, 1H), 3.39-3.16 (m, 3H).
¹³C NMR, 75 MHz, DMSO-d₆, δ (ppm): 165.9, 156.6, 130.2, 129.2, 128.5, 124.2, 115.0, 60.0, 37.8, 35.4.

XIII-5 (7R)-7-[(4-hydroxyphenyl)methyl]-5,7-dihydro-4H-triazolo[1,5-a]pyrazin-6-one

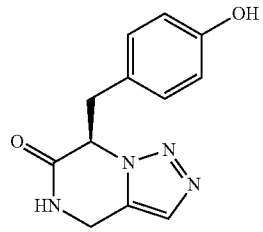 [SMILES: O=C1NCc2cnnn2[C@@H]1Cc1ccc(O)cc1]

Aspect: Orange powder. Yield: 41%. Purity: 71%. LC$_{tR}$ = 1.40 min. MS (ESI−): m/z = 243 [M − H]⁻.
¹H NMR, 300 MHz, DMSO-d₆, δ (ppm): 9.30 (br s, 1H), 8.42 (br d, J = 2.0 Hz, 1H), 7.53 (s, 1H), 6.53-6.49 (m, 2H), 6.44-6.40 (m, 2H), 5.38 (dd, J = 3.4 and 4.5 Hz, 1H), 4.28 (dd, J = 2.7 and 16.5 Hz, 1H), 3.34-3.27 (m, 3H).
¹³C NMR, 75 MHz, DMSO-d₆, δ (ppm): 165.9, 156.6, 130.2, 129.2, 128.5, 124.2, 115.0, 60.0, 37.8, 35.4.

III.1.9 Compound of Formula (XV)

| Compound of formula (XV) | |
|---|---|
| XV-1 | Methyl (3R)-3-[5-(aminomethyl)triazol-1-yl]-4-(1H-indol-3-yl)butanoate; hydrochloride. |

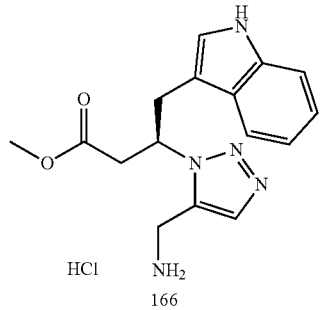

166

Aspect: Brown solid. Yield: 100%. Purity: 100%. $LC_{tR}$ = 1.95 min. MS (ESI+): m/z = 314 [M + H]$^+$.
$^1$H NMR, 300 MHz, MeOD-d$_4$, δ (ppm): 7.90 (s, 1H), 7.43 (d, J = 7.8 Hz, 1H), 7.33 (d, J = 8.0 Hz, 1H), 7.13-6.99 (m, 2H), 6.84 (s, 1H), 5.34-5.24 (m, 1H), 3.77-3.72 (m, 1H), 3.64 (s, 3H), 3.62-3.37 (m, 5H).
$^{13}$C NMR, 75 MHz, MeOD-d$_4$, δ (ppm): 173.3, 137.8, 134.4, 132.7, 127.9, 125.0, 122.9, 120.4, 118.6, 112.7, 109.9, 59.9, 52.8, 39.4, 32.5, 32.1.

| | |
|---|---|
| XV-2 | Methyl (3S)-3-[5-(aminomethyl)triazol-1-yl]-4-(4-hydroxyphenyl)butanoate; hydrochloride |

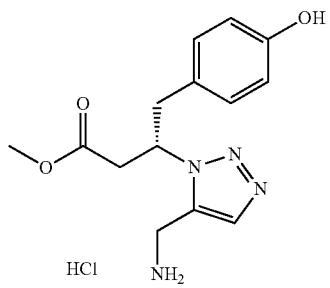 [SMILES: COC(=O)C[C@H](Cc1ccc(O)cc1)n1nncc1CN ; Cl]

Aspect: Brown solid. Yield: 90%. Purity: 100%. $LC_{tR}$ = 1.60 min. MS (ESI+): m/z = 291 [M + H]$^+$.
$^1$H NMR, 300 MHz, MeOD-d$_4$, δ (ppm): 7.87 (s, 1H), 6.78 (d, J = 8.5 Hz, 2H), 6.63 (d, J = 8.5 Hz, 2H), 5.20-5.11 (m, 1H), 3.87 (dd, J = 15.3 and 22.7 Hz, 2H), 3.63 (s, 3H), 3.47 (dd, J = 10.5 and 18.0 Hz, 1H), 3.28-3.22 (m, 2H), 3.08 (dd, J = 10.6 and 13.6 Hz, 1H).
$^{13}$C NMR, 75 MHz, MeOD-d$_4$, δ (ppm): 173.3, 158.0, 134.1, 133.3, 131.1, 128.0, 116.6, 60.3, 52.8, 41.8, 39.4, 32.4.

| | |
|---|---|
| XV-3 | (S)-methyl 4-(4-hydroxyphenyl)-3-(4-((methylamino)methyl)-1H-1,2,3-triazol-1-yl)butanoate-hydrochloric acid salt. |

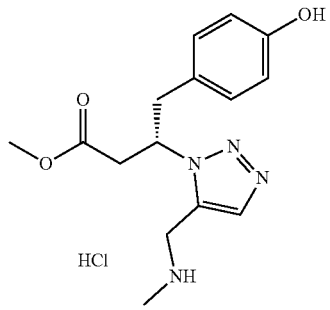 [SMILES: CNCc1cnnn1[C@H](CC(=O)OC)Cc1ccc(O)cc1 ; Cl]

Aspect: White solid. Yield: 99%. Purity: 100%. $LC_{tR}$ = 1.48 min. MS (ESI–): m/z = 303 [M – H]$^+$.
$^1$H NMR, 300 MHz, DMSO-d$_6$, δ (ppm): 7.83 (s, 1H), 6.88-6.79 (m, 2H), 6.67-6.59 (m, 2H), 5.08-4.99 (m, 1H), 4.04-3.85 (m, 2H), 3.52 (s, 3H), 3.25-2.98 (m, 4H), 3.36-3.34 (m, 3H).
$^{13}$C NMR, 75 MHz, DMSO-d$_6$, δ (ppm): 170.8, 156.3, 133.7, 130.5, 130.2 (2C), 126.4, 115.1, 56.4, 51.7, 38.1, 31.7.
Nb: One carbon signal hide by DMSO residual peak.

| | |
|---|---|
| XV-4 | Methyl (2S)-2-[5-(aminomethyl)triazol-1-yl]-3-(4-hydroxyphenyl)propanoate; hydrochloride |

-continued

| Compound of formula (XV) |
|---|

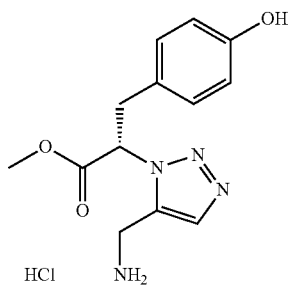 [SMILES: COC(=O)[C@H](Cc1ccc(O)cc1)n1nncc1CN ; Cl]

Aspect: Yellow oil. Yield: 39%. Purity: 80%. $LC_{tR}$ = 1.55 min. MS (ESI+): m/z = 277 [M + H]$^+$.
$^1$H NMR, 300 MHz, MeOD-d$_4$, δ (ppm): 7.81 (s, 1H), 6.90-6.85 (m, 2H), 6.66-6.62 (m, 2H), 5.70 (dd, J = 4.8 and 10.9 Hz, 1H), 4.15-3.94 (m, 2H), 3.80 (s, 3H), 3.64 (dd, J = 4.8 and 14.3 Hz, 1H), 3.44 (dd, J = 10.9 and 14.3 Hz, 1H).
$^{13}$C NMR, 75 MHz, MeOD-d$_4$, δ (ppm): 169.6, 157.8, 134.2, 133.6, 131.2, 127.4, 116.5, 64.1, 53.8, 37.6, 32.9.

XV-5  Methyl (2R)-2-[5-(aminomethyl)triazol-1-yl]-3-(4-hydroxyphenyl)propanoate; hydrochloride.

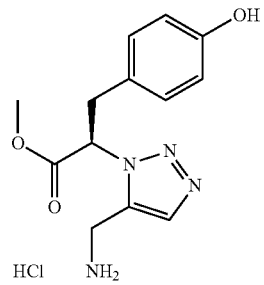 [SMILES: COC(=O)[C@@H](Cc1ccc(O)cc1)n1nncc1CN ; Cl]

Aspect: Brow oil. Yield: 30%. Purity: 72%. $LC_{tR}$ = 1.55 min. MS (ESI+): m/z = 277 [M + H]$^+$.
$^1$H NMR, 300 MHz, MeOD-d$_4$, δ (ppm): 7.78 (s, 1H), 6.90-6.85 (m, 2H), 6.65-6.61 (m, 2H), 5.70-5.65 (m, 1H), 4.11-4.04 (m, 1H), 3.81 (s, 3H), 3.66-3.59 (m, 1H), 3.52-3.43 (m, 1H), 3.25-3.18 (m, 1H).
$^{13}$C NMR, 75 MHz, MeOD-d$_4$, δ (ppm): 169.6, 157.9, 131.6, 131.2, 131.0, 127.4, 116.5, 64.2, 53.8, 37.6, 32.9.

III.1.10 Compound of Formula (XVI)

| Compound of formula (XVI) |
|---|

XVI-1  Methyl (3R)-4-(1H-indol-3-yl)-3-[5-[[[(5-phenyl-2-thienyl)sulfonylamino]methyl]triazol-1-yl]butanoate.

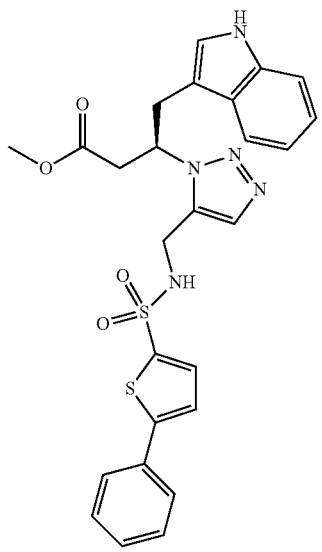 [SMILES: COC(=O)C[C@@H](Cc1c[nH]c2ccccc12)n1nncc1CNS(=O)(=O)c1ccc(-c2ccccc2)s1]

-continued

Compound of formula (XVI)

Aspect: Brown solid. Yield: 61%. Purity: 100%. $LC_{tR}$ = 2.98 min. MS (ESI+): m/z = 536 [M + H]⁺.
$^1$H NMR, 300 MHz, DMSO-$d_6$, δ (ppm): 10.90-10.89 (m, 1H), 8.45 (t, J = 5.9 Hz, 1H), 7.75-7.71 (m, 2H), 7.55 (d, J = 3.9 Hz, 1H), 7.53-7.43 (m, 4H), 7.39 (s, 1H), 7.37 (d, J = 3.9 Hz, 1H), 7.32 (d, J = 8.0 Hz, 1H), 7.08-6.90 (m, 3H), 5.03-4.94 (m, 1H), 3.92 (dd, J = 5.4 and 15.6 Hz, 1H), 3.66 (dd, J = 6.3 and 15.5 Hz, 1H), 3.49 (s, 3H), 3.38-3.30 (m, 1H), 3.23 (dd, J = 9.2 and 16.9 Hz, 2H), 3.09 (dd, J = 4.8 and 17.0 Hz, 1H).
$^{13}$C NMR, 75 MHz, DMSO-$d_6$, δ (ppm): 170.7, 162.3, 149.5, 138.6, 136.0, 134.0, 133.0, 132.2, 132.1, 129.4, 129.2, 126.8, 125.9, 124.1, 121.1, 118.7, 118.0, 111.5, 108.9, 55.9, 51.6, 38.3, 35.6, 31.1.

XVI-2    Methyl (3R)-3-[5-[[4-(4-fluorophenyl)phenyl]sulfonylamino]methyl]triazol-1-yl]-4-(1H-indol-3-yl)butanoate.

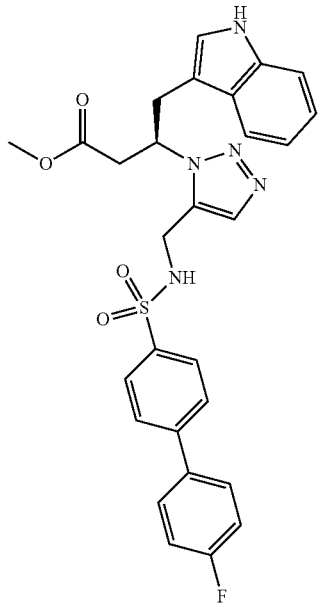 [SMILES: COC(=O)C[C@@H](Cc1c[nH]c2ccccc12)n1nncc1CNS(=O)(=O)c1ccc(-c2ccc(F)cc2)cc1]

Aspect: White powder. Yield: 30%. Purity: 100%. $LC_{tR}$ = 2.98 min. MS (ESI+): m/z = 548 [M + H]⁺.
$^1$H NMR, 300 MHz, MeOD-$d_4$, δ (ppm): 7.71-7.66 (m, 4H), 7.63-7.61 (m, 2H), 7.44-7.41 (m, 1H), 7.34-7.31 (m, 1H), 7.26-7.20 (m, 3H), 7.12-7.07 (m, 1H), 7.01-6.95 (m, 1H), 6.74 (s, 1H), 5.08-4.98 (m, 1H), 3.58 (s, 3H), 3.46-3.34 (m, 2H), 3.29-3.23 (m, 1H), 3.20-3.13 (m, 1H), 1.44-1.28 (m, 2H).
$^{13}$C NMR, 75 MHz, MeOD-$d_4$, δ (ppm): 172.7, 162.6 (d, J = 248.1 Hz, 1C), 145.7, 139.6, 137.8, 136.8 (d, J = 3.2 Hz, 1C), 136.7, 133.0, 130.3 (d, J = 8.3 Hz, 2C), 128.6 (4C), 128.2, 124.8, 122.7, 120.2, 118.9, 116.9 (d, J = 21.8 Hz, 2C), 112.5, 110.6, 58.3, 52.4, 39.7, 36.4, 32.7.

XVI-3    Methyl (3R)-4-(1H-indol-3-yl)-3-[5-[[(4-propylphenyl)sulfonylamino]methyl]triazol-1-yl]butanoate.

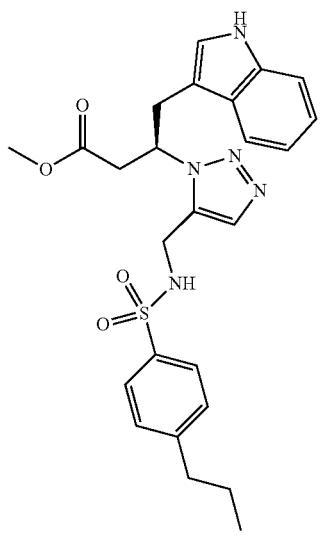 [SMILES: CCCc1ccc(S(=O)(=O)NCc2cnnn2[C@@H](CC(=O)OC)Cc2c[nH]c3ccccc23)cc1]

Aspect: White powder. Yield: 22%. Purity: 100%. $LC_{tR}$ = 2.97 min. MS (ESI+): m/z = 496 [M + H]⁺.
$^1$H NMR, 300 MHz, MeOD-$d_4$, δ (ppm): 7.50-7.47 (m, 2H), 7.43-7.40 (m, 1H), 7.35-7.29 (m, 2H), 7.18

| Compound of formula (XVI) |
|---|

(s, 1H), 7.14-7.08 (m, 1H), 7.02-6.97 (m, 1H), 6.74 (s, 1H), 5.07-4.97 (m, 1H), 3.60 (s, 3H), 3.42 (br t, J = 2.2 Hz, 1H), 3.38-3.34 (m, 2H), 3.28-3.13 (m, 2H), 2.67 (t, J = 7.7 Hz, 2H), 1.74-1.62 (m, 2H), 0.96 (t, J = 7.4 Hz, 2H).
$^{13}$C NMR, 75 MHz, MeOD-d$_4$, δ (ppm): 172.7, 149.5, 138.4, 137.8, 136.7, 133.0, 130.3, 128.2, 128.1, 124.8, 122.7, 120.2, 118.9, 112.5, 110.6, 58.3, 52.4, 39.7, 38.8, 36.4, 32.8, 25.4, 14.0.

XVI-4  Methyl (3S)-4-(4-hydroxyphenyl)-3-[5-[[(5-phenyl-2-thienyl)sulfonylamino]methyl]triazol-1-yl]butanoate.

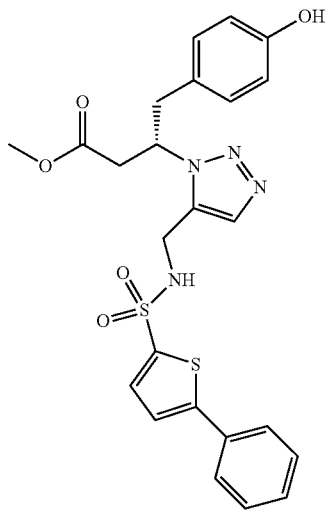 [SMILES: COC(=O)C[C@H](Cc1ccc(O)cc1)n1nncc1CNS(=O)(=O)c1ccc(-c2ccccc2)s1]

Aspect: White solid. Yield: 65%. Purity: 100%. LC$_{tR}$ = 2.73 min. MS (ESI+): m/z = 513 [M + H]$^+$.
$^1$H NMR, 300 MHz, MeOD-d$_4$, δ (ppm): 7.71-7.67 (m, 2H), 7.52-7.40 (m, 5H), 7.37 (s, 1H), 6.77-6.74 (m, 2H), 6.64-6.61 (m, 2H), 4.99-4.91 (m, 1H), 3.87 (d, J = 15.6, 1H), 3.78 (d, J = 15.6 Hz, 1H), 3.59 (s, 3H), 3.35-3.26 (m, 1H), 3.16-3.02 (m, 3H).
$^{13}$C NMR, 75 MHz, MeOD-d$_4$, δ (ppm): 172.5, 161.0, 157.7, 152.5, 136.4, 134.5, 134.0, 133.2, 131.3, 130.4, 130.3, 128.5, 127.2, 124.5, 116.5, 59.2, 52.4, 42.1, 39.5, 36.7.

XVI-5  Methyl (3S)-4-(4-hydroxyphenyl)-3-[5-[[(4-propylphenyl)sulfonylamino]methyl]triazol-1-yl]butanoate.

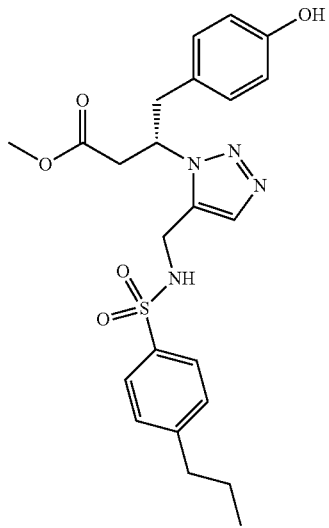 [SMILES: CCCc1ccc(S(=O)(=O)NCc2cnnn2[C@H](CC(=O)OC)Cc2ccc(O)cc2)cc1]

Aspect: Colorless oil. Yield: 37%. Purity: 99%. LC$_{tR}$ = 2.68 min. MS (ESI+): m/z = 473 [M + H]$^+$.
$^1$H NMR, 300 MHz, MeOD-d$_4$, δ (ppm): 7.70-7.68 (m, 2H), 7.40-7.38 (m, 2H), 7.27 (br s, 1H), 6.74-6.71 (m, 2H), 6.63-6.60 (m, 2H), 4.99-4.79 (m, 1H), 3.76 (d, J = 15.6 Hz, 1H), 3.67 (d, J = 15.2 Hz, 1H), 3.58 (s, 3H), 3.30-3.23 (m, 1H), 3.12-3.02 (m, 2H), 3.00-2.96 (m, 1H), 2.69 (t, J = 7.6 Hz, 2H), 1.68 (sext, J = 7.5 Hz, 2H), 0.96 (t, J = 7.4 Hz, 3H).
$^{13}$C NMR, 75 MHz, MeOD-d$_4$, δ (ppm): 172.5, 164.99, 157.7, 149.7, 138.4, 136.7, 131.2, 130.4, 128.5, 128.2, 116.4, 59.1, 52.4, 42.0, 39.5, 38.7, 36.5, 25.4, 14.0.

XVI-6  (S)-methyl 4-(4-hydroxyphenyl)-3-(4-((N-methyl-5-phenylthiophene-2-sulfonamido)methyl)-1H-1,2,3-triazol-1-yl)butanoate.

| Compound of formula (XVI) |
|---|

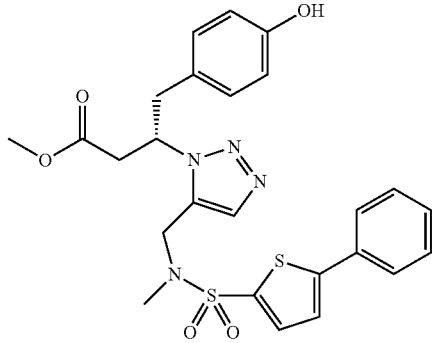 [SMILES: COC(=O)C[C@H](Cc1ccc(O)cc1)n1nncc1CN(C)S(=O)(=O)c1ccc(-c2ccccc2)s1]

Aspect: White solid. Yield: 72%. Purity: 97%. LC$_{tR}$ = 2.90 min. MS (ESI−): m/z = 525 [M − H]⁻.

¹H NMR, 300 MHz, CDCl+hd 3+l -d+hd 1+l , δ (ppm): 7.62-7.59 (m, 2H), 7.51 (d, J = 3.9 Hz, 1H), 7.46-7.38 (m, 4H), 7.31 (d, J = 3.9 Hz, 1H), 6.90-6.87 (m, 2H), 6.74-6.71 (m, 2H), 5.21-5.15 (m, 1H), 4.30 (d, J = 14.6 Hz, 1H), 3.67 (d, J = 14.6 Hz, 1H), 3.59 (s, 3H), 3.45-3.36 (m, 1H), 3.28-2.96 (m, 3H), 2.37 (s, 3H).

¹³C NMR, 75 MHz, CDCl+hd 3+l -d+hd 1+l , δ (ppm): 170.9, 155.7, 152.1, 134.0, 133.8, 133.6, 132.7, 132.5, 130.7, 129.5, 129.4, 127.6, 126.4, 123.5, 115.8, 57.4, 52.1, 42.9, 41.3, 39.1, 34.6.

XVI-7  Methyl (3S)-4-(4-hydroxyphenyl)-3-[5-[(2-thienylsulfonylamino)methyl]triazol-1-yl]butanoate.

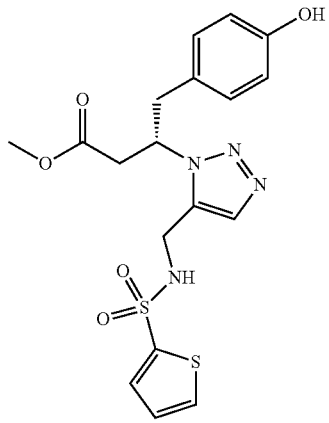 [SMILES: COC(=O)C[C@H](Cc1ccc(O)cc1)n1nncc1CNS(=O)(=O)c1cccs1]

Aspect: Colorless oil. Yield: 30%. Purity: 99%. LC$_{tR}$ = 2.23 min. MS (ESI+): m/z = 437 [M + H]⁺.

¹H NMR, 300 MHz, MeOD-d₄, δ (ppm): 7.81 (dd, J = 1.3 and 5.0 Hz, 1H), 7.56 (dd, J = 1.3 and 3.8 Hz, 1H), 7.33 (s, 1H), 7.17 (dd, J = 3.8 and 5.0 Hz, 1H), 6.77-6.72 (m, 2H), 6.64-6.60 (m, 2H), 4.97-4.89 (m, 1H), 3.84 (d, J = 15.6 Hz, 1H), 3.73 (d, J = 15.8 Hz, 1H), 3.59 (s, 3H), 3.35-3.26 (m, 1H), 3.16-3.10 (m, 2H), 3.05-3.02 (m, 1H).

¹³C NMR, 75 MHz MeOD-d₄, δ (ppm): 172.5, 157.7, 141.8, 136.4, 133.7, 133.6, 133.1, 131.2, 128.7, 128.5, 116.5, 59.2, 52.4, 42.0, 39.6, 36.7.

XVI-8  Methyl (3S)-4-(4-hydroxyphenyl)-3-[5-[[[5-(2-pyridyl)-2-thienyl]sulfonylamino]methyl]triazol-1-yl]butanoate.

| Compound of formula (XVI) |
|---|

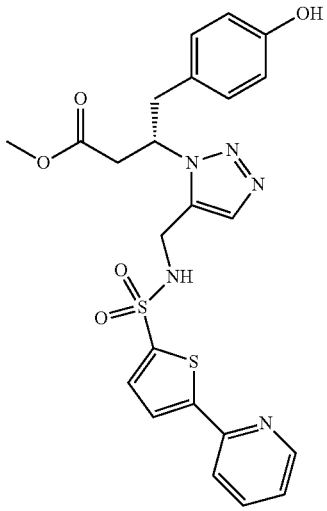 [SMILES: COC(=O)C[C@H](Cc1ccc(O)cc1)n1nncc1CNS(=O)(=O)c1ccc(-c2ccccn2)s1]

Aspect: Colorless oil. Yield: 54%. Purity: 100%. $LC_{tR}$ = 2.43 min. MS (ESI+): m/z = 514 [M + H]⁺.
¹H NMR, 300 MHz, DMSO-d₆, δ (ppm): 9.43-9.04 (m, 1H), 8.60-8.56 (m, 2H), 8.09-7.92 (m, 2H), 7.88 (d, J = 3.9 Hz, 1H), 7.54 (d, J = 3.9 Hz, 1H), 7.42-7.38 (m, 2H), 6.81-6.78 (m, 2H), 6.63-6.61 (m, 2H), 4.91-4.82 (m, 1H), 3.96 (dd, J = 5.3 and 15.6 Hz, 1H), 3.79 (dd, J = 6.1 and 15.6 Hz, 1H), 3.16 (s, 3H), 3.11-2.89 (m, 4H).
¹³C NMR, 75 MHz, DMSO-d₆, δ (ppm): 170.5, 156.3, 150.4, 150.3, 149.7, 141.1, 137.6, 134.0, 133.0, 132.1, 130.0, 126.5, 125.0, 123.9, 119.4, 115.2, 56.6, 51.6, 38.1, 35.5, 33.9.

XVI-9  Methyl (2S)-3-(4-hydroxyphenyl)-2-[5-[[(5-phenyl-2-thienyl)sulfonylamino]methyl]triazol-1-yl]propanoate.

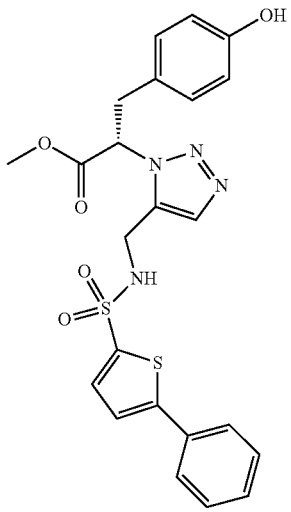 [SMILES: COC(=O)[C@H](Cc1ccc(O)cc1)n1nncc1CNS(=O)(=O)c1ccc(-c2ccccc2)s1]

Aspect: Yellow solid. Yield: 29%. Purity: 100%. $LC_{tR}$ = 2.70 min. MS (ESI-): m/z = 497 [M − H]⁻.
¹H NMR, 300 MHz, DMF-d+hd 7+l , δ (ppm): 9.51 (br s, 1H), 8.43 (br s, 1H), 7.82-7.78 (m, 2H), 7.64 (d, J = 3.9 Hz, 1H), 7.62 (d, J = 3.9 Hz, 1H), 7.57 (s, 1H), 7.55-7.44 (m, 3H), 7.00-6.95 (m, 2H), 6.73-6.68 (m, 2H), 5.72 (dd, J = 5.2 and 10.3 Hz, 1H), 4.18 (d, J = 16.0 Hz, 1H), 4.09 (d, J = 16.0 Hz, 1H), 3.74 (s, 3H), 3.63 (dd, J = 5.1 and 14.1 Hz, 1H), 3.50-3.41 (m, 1H).
¹³C NMR, 75 MHz, DMF-d+hd 7+l , δ (ppm): 168.9, 157.2, 150.5, 139.6, 135.3, 133.6, 133.0, 130.4, 130.5, 129.7, 129.5, 126.6, 126.4, 124.3, 115.6, 62.1, 52.8, 36.6, 36.2.

XVI-10  Methyl (2R)-3-(4-hydroxyphenyl)-2-[5-[[(5-phenyl-2-thienyl)sulfonylamino]methyl]triazol-1-yl]propanoate.

| Compound of formula (XVI) |
|---|

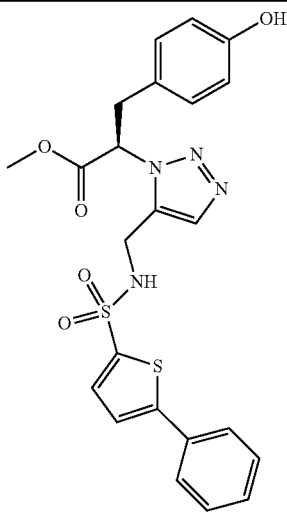

Aspect: Yellow solid. Yield: 46%. Purity: 100%. LC$_{tR}$ = 2.70 min. MS (ESI-): m/z = 497 [M − H]⁻.
¹H NMR, 300 MHz, DMSO-d₆, δ (ppm): 9.28 (br s, 1H), 8.51 (br s, 1H), 7.74-7.71 (m, 2H), 7.56 (d, J = 3.9 Hz, 1H), 7.50 (d, J = 3.9 Hz, 1H), 7.49-7.39 (m, 4H), 6.85-6.82 (m, 2H), 6.61-6.57 (m, 2H), 5.58 (dd, J = 5.2 and 10.4 Hz, 1H), 3.96 (d, J = 16.1 Hz, 1H), 3.82 (d, J = 16.1 Hz, 1H), 3.66 (s, 3H), 3.49 (dd, J = 5.1 and 14.1 Hz, 1H), 3.30 (dd, J = 10.4 and 14.0 Hz, 1H).
¹³C NMR, 75 MHz, DMSO-d₆, δ (ppm): 168.3, 156.2, 149.5, 138.8, 134.8, 133.1, 132.4, 132.2, 129.9, 129.4, 129.2, 126.0, 125.8, 124.1, 115.1, 61.2, 52.8, 35.9, 35.5.

III.1.11 Compound of Formula (XX)

| Compound of formula (XX) N-Boc Esters AA | |
|---|---|
| XX-1 | methyl (2S)-2-(tert-butoxycarbonylamino)-3-[4-(2-methoxyethoxy)phenyl]propanoate. |

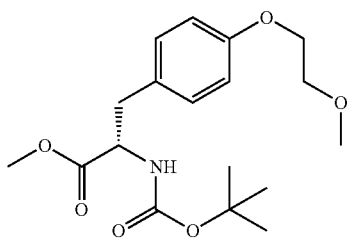

Aspect: orange oil. Yield: 88%. Purity: 100%. LC tr = 2.78 min, MS (ESI+): m/z = 354 [M + H]⁺.
¹H NMR (300 MHz, CDCl+hd 3+l ) δ: 7.02 (m, 2H), 6.84 (m, 2H), 4.95 (d, J = 7.9 Hz, 1H), 4.52 (m, 1H), 4.09 (m, 2H), 3.74 (m, 2H), 3.70 (s, 3H), 3.44 (s, 3H), 3.04 (dd, J = 13.8 and 5.8 Hz, 2H), 2.98 (dd, J = 13.8 and 5.2 Hz, 2H), 1.41 (s, 9H).
¹³C NMR (75 MHz, CDCl+hd 3+l ) δ: 172.6, 158.0, 155.2, 130.4 (2C), 128.3, 114.8 (2C), 80.0, 71.2, 67.3, 59.3, 54.6, 52.3, 37.6, 28.4 (3C).

| XX-2 | methyl (2S)-2-(tert-butoxycarbonylamino)-3-(3-fluoro-4-methoxy-phenyl)propanoate. |
|---|---|

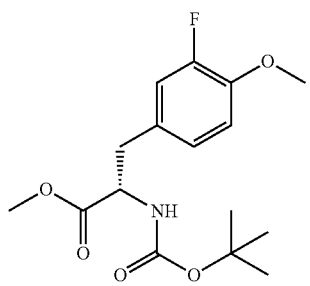

Aspect: yellow oil. Yield: 67%. Purity 82%, LC tr = 2.85 min, MS (ESI+): m/z = 328 [M + H]⁺.
¹H NMR (300 MHz, CDCl+hd 3+l ) δ: 6.94-6.77 (m, 3H), 5.14 (d, J = 8.8 Hz, 1H), 4.48 (m, 1H), 3.79 (s,

| Compound of formula (XX) N-Boc Esters AA |
|---|
| 3H), 3.67 (s, 3H), 3.01 (dd, J = 13.9 and 5.4 Hz, 1H), 2.90 (dd, J = 13.9 and 6.2 Hz, 1H), 1.37 (s, 9H). $^{13}$C NMR (75 MHz, CDCl+hd 3+l ) δ: 172.1, 155.0, 152.0 (d, J = 245 Hz), 146.5 (d, J = 10.7 Hz), 129.0 (d, J = 6.2 Hz), 124.9 (d, J = 3.9 Hz), 116.9 (d, J = 18.2 Hz), 113.3 (d, J = 2.4 Hz), 79.8, 56.0, 54.4, 52.1, 37.2, 28.1. |
| XX-3     methyl (2S)-2-(tert-butoxycarbonylamino)-3-(3-chloro-4-methoxy-phenyl)propanoate. 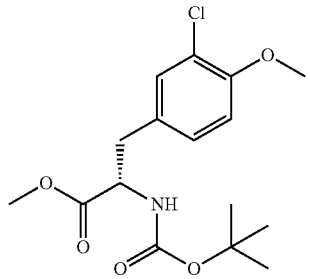 Aspect: Colorless oil. Yield: 75%. Purity: 100%. LC$_{tR}$ = 3.00 min. MS (ESI+): m/z = 344 [M + H]$^+$. $^1$H NMR (300 MHz, CDCl+hd 3+l ) δ: 7.13 (d, J = 2.0 Hz, 1H), 6.99 (dd, J = 8.5, 2.0 Hz, 1H), 6.85 (d, J = 8.5 Hz, 1H), 5.01 (d, J = 8.0 Hz, 1H), 4.53 (q, J = 7.0 Hz, 1H), 3.88 (s, 3H), 3.73 (s, 3H), 3.06 (dd, J = 14.5 Hz and 6.0 Hz, 1H), 2.95 (dd, J = 14.5 Hz and 6.0 Hz, 1H), 1.43 (s, 9H). |
| XX-4     methyl (2S)-2-(tert-butoxycarbonylamino)-3-(4-cyanophenyl)propanoate 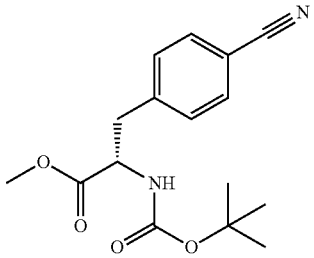 [SMILES: COC(=O)[C@H](Cc1ccc(C#N)cc1)NC(=O)OC(C)(C)C] Aspect: Yellow oil. Yield: quant. Purity 100%, LC tr = 2.73 mn, MS (ESI+): m/z = 205 [M − Boc + H]$^+$. $^1$H NMR (CDCl+hd 3+l , 300 MHz) δ: 7.58 (m, 2H), 7.25 (m, 2H), 5.03 (d, J = 7.4 Hz, 1H), 4.60 (m, 1H), 3.72 (s, 3H), 3.21 (dd, J = 13.6 and 5.8 Hz, 1H), 3.05 (dd, J = 13.6 and 6.3 Hz, 1H), 1.40 (s, 9H). |

III.2 Compounds of Formula (I)

| | Compound of formula (I) | Synthesis route |
|---|---|---|
| 1 | (R)-N-hydroxy-4-(1H-indol-3-yl)-3-(4-((5-phenylthiophene-2-sulfonamido)methyl)-1H-1,2,3-triazol-1-yl)butanamide 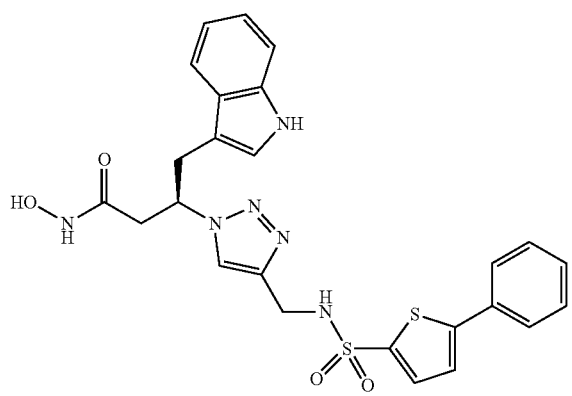 [SMILES: O=C(C[C@@H](Cc1c[nH]c2ccccc12)n1cc(CNS(=O)(=O)c2ccc(-c3ccccc3)s2)nn1)NO] Aspect: White solid. Yield: 55%. Purity: 96%. LC$_{tR}$ = 10.02 min. MS (ESI+): m/z = 537 [M + H]$^+$. $^1$H NMR, 300 MHz, DMSO-d$_6$, δ (ppm): 10.82 (s, 1H), 10.49 (s, 1H), 8.79 (s, 1H), 8.39 (s, 1H), 7.90 (s, 1H), 7.73-7.64 (m, 2H), 7.60-7.34 (m, 6H), 7.34-7.17 (m, 1H), 7.10-6.93 (m, 2H), 6.86 (d, J = 2.3 Hz, 1H), 5.23-5.09 (m, J = 7.1 Hz, 1H), 4.11 (s, 2H), 3.25-3.13 (m, 2H), 2.75-2.57 (m, 2H). | A |

| | Compound of formula (I) | Synthesis route |
|---|---|---|
| | -continued | |
| | $^{13}$C NMR, 75 MHz, DMSO-$d_6$, δ (ppm): 166.2, 149.5, 143.0, 140.0, 136.5, 133.2, 132.7, 129.8, 129.5, 127.5, 126.4, 124.5, 124.1, 123.1, 121.5, 118.9, 118.5, 111.9, 109.7, 58.9, 37.7, 31.4, 26.0. HRMS – ESI+ (m/z): calcd for $C_{25}H_{25}N_6O_4S_2$ [M + H]$^+$: 537.1379, found: 537.1368. | |
| 2 | (R)-N-hydroxy-3-(1H-indol-3-yl)-2-(4-((5-phenylthiophene-2-sulfonamido)methyl)-1H-1,2,3-triazol-1-yl)propanamide | B |

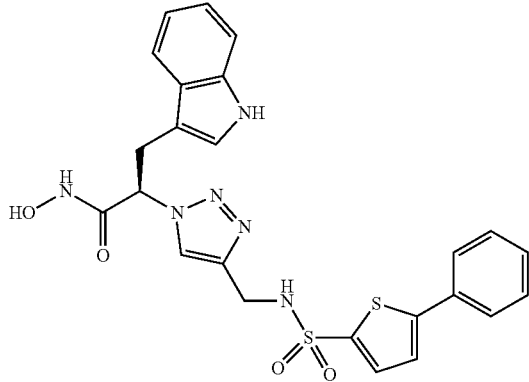 [SMILES: O=C(NO)[C@@H](Cc1c[nH]c2ccccc12)n1cc(CNS(=O)(=O)c2ccc(-c3ccccc3)s2)nn1]

Aspect: White solid. Yield: 53%. Purity: 95%. LC$_{tR}$ = 2.58 min. MS (ESI+): m/z = 523 [M + H]$^+$.
$^1$H NMR, 300 MHz, DMSO-$d_6$, δ (ppm): 11.17 (br, 1H), 10.85 (br, 1H), 9.21 (br, 1H), 8.45 (br, 1H), 8.18 (s, 1H), 7.71-7.69 (m, 2H), 7.57 (d, J = 7.7 Hz, 1H), 7.54-7.39 (m, 5H), 7.31 (d, J = 7.7 Hz, 1H), 7.09-7.04 (m, 1H), 7.09- 6.96 (m, 3H), 5.40-5.35 (m, 1H), 4,16 (s, 2H), 3.47 (dd, J = 7.4 and 14.4 Hz, 1H), 3.36 (dd, J = 8.4 and 14.4 Hz, 1H).
$^{13}$C NMR, 75 MHz, DMSO-$d_6$, δ (ppm): 164.2, 149.0, 143.1, 139.6, 136.0, 132.9, 132.3, 129.4, 126.9, 125.9, 124.0, 123.9, 122.1, 121.1, 118.5, 118.3, 111.4, 108.0, 60.9, 38.3, 20.0.
HRMS – ESI+ (m/z): calcd for $C_{24}H_{22}N_6O_4S_2$ [M + H]$^+$: 523.1222, found: 523.1223.

| 3 | (S)-N-hydroxy-3-(1H-indol-3-yl)-2-(4-((N-methyl-5-phenylthiophene-2-sulfonamido)methyl)-1H-1,2,3-triazol-1-yl)propanamide | B |

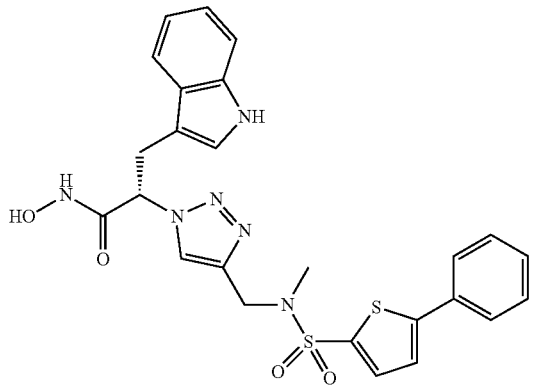 [SMILES: CN(Cc1cn([C@@H](Cc2c[nH]c3ccccc23)C(=O)NO)nn1)S(=O)(=O)c1ccc(-c2ccccc2)s1]

Aspect: White powder. Yield: 30%. Purity: 99%. LC$_{tR}$ = 2.75 min. MS (ESI+): m/z = 537 [M + H]$^+$.
$^1$H NMR, 300 MHz, DMSO-$d_6$, δ (ppm): 11.24 (br, 1H), 10.85 (br, 1H), 9.24 (br, 1H), 8.35 (s, 1H), 7.75-7.71 (m, 2H), 7.62-7.56 (m, 3H), 7.50-7.41 (m, 3H), 7.31-7.29 (m, 1H), 7.09-6.97 (m, 3H), 5.46-5.41 (m, 1H), 4.37-4.24 (m, 2H), 3.48-3.45 (m, 2H), 2.68 (m, 3H).
$^{13}$C NMR, 75 MHz, DMSO-$d_6$, δ (ppm): 164.3, 149.9, 141.2, 136.0, 134.8, 133.8, 132.0, 129.4, 129.3, 126.8, 126.0, 124.5, 124.0, 123.3, 121.1, 118.5, 118.3, 111.4, 108.0, 61.0, 45.0, 34.8, 27.9.
HRMS – ESI+ (m/z): calcd for $C_{25}H_{25}N_6O_4S_2$ [M + H]$^+$: 537.1375, found: 537.1379.

| 4 | (S)-N-hydroxy-3-(1H-indol-3-yl)-2-(4-((5-phenylthiophene-2-sulfonamido)methyl)-1H-1,2,3-triazol-1-yl)propanamide | B |

-continued

| Compound of formula (I) | Synthesis route |
|---|---|

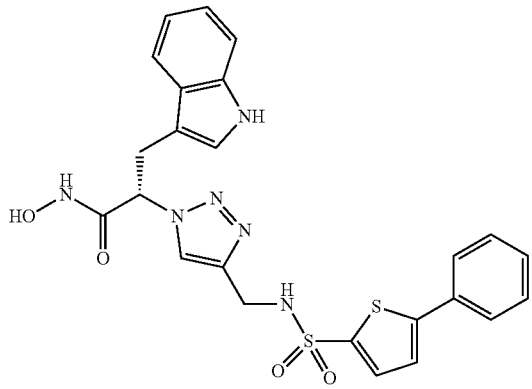 [SMILES: O=C(NO)[C@H](Cc1c[nH]c2ccccc12)n1cc(CNS(=O)(=O)c2ccc(-c3ccccc3)s2)nn1]

Aspect: White solid. Yield: 61%. Purity: 95%. $LC_{tR}$ = 2.60 min. MS (ESI+): m/z = 523 [M + H]$^+$.
$^1$H NMR, 500 MHz, DMSO-$d_6$, δ (ppm): 11.20 (br s, 1H), 10.86 (d, J = 1.8 Hz, 1H), 9.22 (s, 1H),
8.46 (br s, 1H), 8.18 (s, 1H), 7.71-7.69 (m, 2H), 7.59-7.57 (m, 1H), 7.53 (d, J = 3.9 Hz, 1H), 7.48
(d, J = 3.9 Hz, 1H), 7.45-7.44 (m, 2H), 7.41-7.39 (m, 1H), 7.31 (dt, J = 1.0 and 8.0 Hz, 1H),
7.08-7.06 (m, 1H), 7.01-6.98 (m, 1H), 6.97 (d, J = 2.3 Hz, 1H), 5.41-5.36 (m, 1H), 4.17 (s, 2H),
3.47 (dd, J = 7.0 and 14.7 Hz, 1H), 3.39-3.36 (m, 1H).
$^{13}$C NMR, 125 MHz, DMSO-$d_6$, δ (ppm): 164.2, 149.0, 143.1, 139.6, 136.0, 132.8, 132.3, 129.4,
129.1, 126.8, 125.9, 124.0, 123.9, 122.2, 121.1, 118.5, 118.3, 111.4, 108.0, 60.8, 38.3, 28.0.
HRMS − ESI+ (m/z): calcd for $C_{24}H_{23}N_6O_4S_2$ [M + H]$^+$: 523.1222, found: 523.1218.

| 5 | (S)-2-(4-((5-bromothiophene-2-sulfonamido)methyl)-1H-1,2,3-triazol-1-yl)-N-hydroxy-3-(1H-indol-3-yl)propanamide | B |

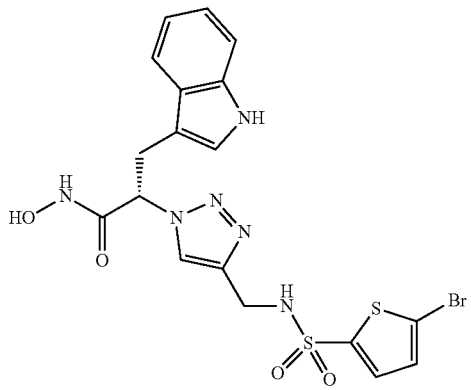 [SMILES: O=C(NO)[C@H](Cc1c[nH]c2ccccc12)n1cc(CNS(=O)(=O)c2ccc(Br)s2)nn1]

Aspect: White powder. Purity: 99%. $LC_{tR}$ = 2.38 min. MS (ESI+): m/z = 525 [M + H]$^+$.
$^1$H NMR, 300 MHz, DMSO-$d_6$, δ (ppm): 10.87 (br, 1H), 9.22 (br, 1H), 9.24 (br, 1H), 8.18 (s, 1H),
7.36-7.31 (m, 2H), 7.25 (d, J = 4.0 Hz, 1H), 7.10-6.99 (m, 3H), 5.41 (t, J = 8.2 Hz, 1H), 4.14 (s,
2H), 3.50 (dd, J = 7.3 and 14.8 Hz, 1H), 3.39 (dd, J = 8.5 and 14.8 Hz, 1H).
$^{13}$C NMR, 75 MHz, DMSO-$d_6$, δ (ppm): 164.2, 142.9, 142.3, 136.0, 132.3, 131.2, 126.8, 124.0,
122.2, 121.1, 118.5, 118.3, 118.2, 111.4, 108.0, 60.8, 38.2, 28.01.
HRMS − ESI+ (m/z): calcd for $C_{18}H_{18}N_6O_4S_2$ [M + H]$^+$: 524.9999, found: 525.0014.

| 6 | (R)-N-hydroxy-4-(naphthalen-2-yl)-3-(4-((5-phenylthiophene-2-sulfonamido)methyl)-1H-1,2,3-triazol-1-yl)butanamide | A |

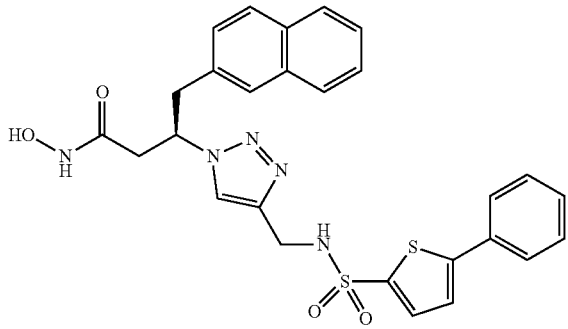 [SMILES: O=C(C[C@@H](Cc1ccc2ccccc2c1)n1cc(CNS(=O)(=O)c2ccc(-c3ccccc3)s2)nn1)NO]

| | Compound of formula (I) | Synthesis route |
|---|---|---|
| | Aspect: Pale yellow solid. Yield: 47%. Purity: 98%. LC$_{tR}$ = 11.23 min. MS (ESI+): m/z = 548 [M + H]$^+$.  <br>$^1$H NMR, 300 MHz, DMSO-d$_6$, δ (ppm): 10.5 (s, 1H), 8.81 (d, J = 1.3 Hz, 1H), 8.41 (t, J = 5.4 Hz, 1H), 7.9 (s, 1H), 7.84-7.69 (m, 5H), 7.55-7.39 (m, 8H), 7.14 (dd, J = 1.6 and 8.3 Hz, 1H), 5.30-5.21 (m, 1H), 4.10 (d, J = 5.3 Hz, 2H), 3.26 (d, J = 7.3 Hz, 2H), 2.77-2.61 (m, 2H).  <br>$^{13}$C NMR, 75 MHz, DMSO-d$_6$, δ (ppm): 165.5, 149.0, 142.7, 139.6, 134.5, 132.9,132.7,132.2, 131.9, 129.4, 129.1, 127.8, 127.5, 127.4, 127.3, 126.1, 125.9, 125.7, 124.0, 122.9, 58.8, 40.9, 38.3, 37.1.  <br>HRMS – ESI+ (m/z): calcd for C$_{27}$H$_{26}$N$_5$O$_4$S$_2$ [M + H]$^+$: 548.1426, found: 548.1427. | |
| 7 | (S)-N-hydroxy-4-(4-hydroxyphenyl)-3-(4-((N-methyl-5-phenylthiophene-2-sulfonamido)methyl)-1H-1,2,3-triazol-1-yl)butanamide | A |

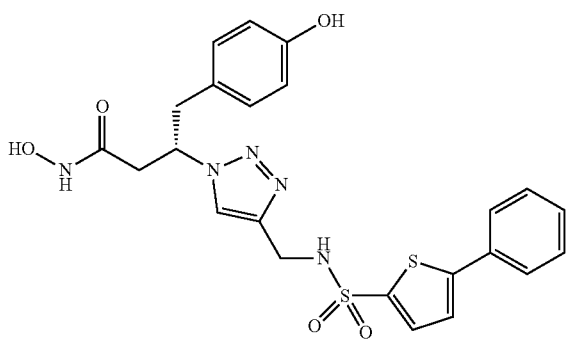 [SMILES: O=C(C[C@H](Cc1ccc(O)cc1)n1cc(CNS(=O)(=O)c2ccc(-c3ccccc3)s2)nn1)NO]

| | | |
|---|---|---|
| | Aspect: White solid. Yield: 29%. Purity: 98%. LC$_{tR}$ = 8.73 min. MS (ESI+): m/z = 514 [M + H]$^+$.  <br>$^1$H NMR, 300 MHz, DMSO-d$_6$, δ (ppm): 10.47 (s, 1H), 9.22 (s, 1H), 8.78 (s, 1H), 8.41 (s, NH), 7.82 (s, 1H), 7.75-7.68 (m, 2H), 7.58-7.52 (m, 2H), 7.50-7.37 (m, 3H), 6.75 (d, J = 8.5 Hz, 2H), 6.58 (d, J = 8.4 Hz, 2H), 5.08-4.96 (m, 1H), 4.11 (d, J = 3.2 Hz, 2H), 2.95 (d, J = 7.1 Hz, 2H), 2.74-2.54 (m, 2H).  <br>$^{13}$C NMR, 75 MHz, DMSO-d$_6$, δ (ppm): 166.0, 156.5, 149.5, 143.0, 140.0, 133.2, 132.7, 130.3, 129.8, 129.6, 127.3, 126.4, 124.5, 123.3, 115.6, 59.6, 40.8, 38.8, 37.3.  <br>HRMS – ESI+ (m/z): calcd for C$_{23}$H$_{24}$N$_5$O$_4$S$_2$ [M + H]$^+$: 514.1219, found: 514.1212. | |
| 8 | (R)-N-hydroxy-3-(4-hydroxyphenyl)-2-(4-((5-phenylthiophene-2-sulfonamido)methyl)-1H-1,2,3-triazol-1-yl)propanamide | B |

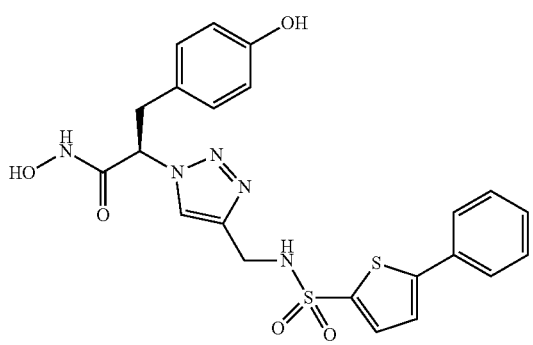 [SMILES: O=C(NO)[C@@H](Cc1ccc(O)cc1)n1cc(CNS(=O)(=O)c2ccc(-c3ccccc3)s2)nn1]

| | | |
|---|---|---|
| | Aspect: White solid. Yield: 74%. Purity: 100%. LC$_{tR}$ = 2.09 min. MS (ESI+): m/z = 500 [M + H]$^+$.  <br>$^1$H NMR, 300 MHz, DMSO-d$_6$, δ (ppm): 9.32 (br s, 3H), 8.09 (s, 1H), 7.72 (br d, J = 6.9 Hz, 2H), 7.57-7.53 (m, 2H), 7.49-7.39 (m, 3H), 6.90 (br d, J = 8.3 Hz, 2H), 6.60 (br d, J = 8.3 Hz, 2H), 5.20 (t, J = 7.6 Hz, 1H), 4.17 (s, 2H), 3.22 (dd, J = 7.6 and 13.8 Hz, 1H), 3.09 (dd, J = 8.3 and 13.8 Hz, 1H).  <br>$^{13}$C NMR, 75 MHz, DMSO-d$_6$, δ (ppm): 163.8, 156.2, 149.0, 143.2, 139.7, 132.8, 132.2, 129.9, 129.3, 129.1, 125.9, 125.7, 124.0, 122.2, 115.1, 62.0, 38.3, 36.7.  <br>HRMS – ESI+ (m/z): calcd for C$_{22}$H$_{22}$N$_5$O$_5$S$_2$ [M + H]$^+$: 500.1042; found: 500.1062. | |
| 9 | (S)-N-hydroxy-4-(4-hydroxyphenyl)-3-(4-((N-methyl-5-phenylthiophene-2-sulfonamido)methyl)-1H-1,2,3-triazol-1-yl)butanamide | B |

| Compound of formula (I) | Synthesis route |
|---|---|
| 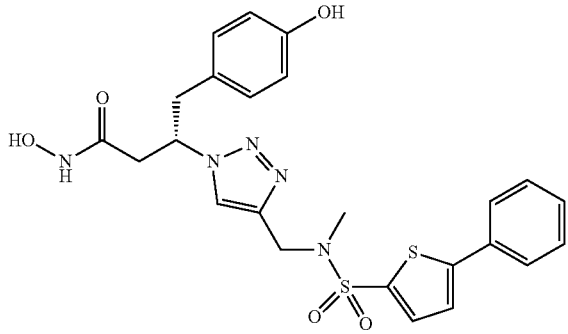 [SMILES: CN(Cc1cn([C@H](CC(=O)NO)Cc2ccc(O)cc2)nn1)S(=O)(=O)c1ccc(-c2ccccc2)s1] | |
| Aspect: White solid. Yield: 49%. Purity: 100%. LC$_{tR}$ = 2.37 min. MS (ESI–): m/z = 526 [M – H]⁻.<br>¹H NMR, 300 MHz, DMSO-d$_6$, δ (ppm): 10.49 (s, 1H), 9.22 (s, 1H), 8.80 (s, 1H), 7.85 (s, 1H), 7.77-7.74 (m, 2H), 7.68-7.65 (m, 2H), 7.50-7.42 (m, 3H), 6.72-6.70 (m, 2H), 6.57-6.54 (m, 2H), 5.07-4.98 (m, 1H), 4.24 (m, 2H), 3.05-2.89 (m, 2H), 2.75-2.62 (m, 2H), 2.58 (s, 3H).<br>¹³C NMR, 75 MHz, DMSO-d$_6$, δ (ppm): 165.5, 156.0, 150.0, 140.4, 134.7, 133.8, 132.0, 129.8, 129.4, 129.3, 126.8, 126.0, 124.5, 124.0, 115.1, 59.5, 45.0, 40.1, 37.0, 34.4.<br>HRMS – ESI+ (m/z): calcd for C$_{24}$H$_{26}$N$_5$O$_5$S$_2$ [M + H]⁺: 528.1375, found: 528.1376. | |
| 10  (S)-N-hydroxy-3-(4-hydroxyphenyl)-2-(4-((5-phenylthiophene-2-sulfonamido)methyl)-1H-1,2,3-triazol-1-yl)propanamide | B |
| 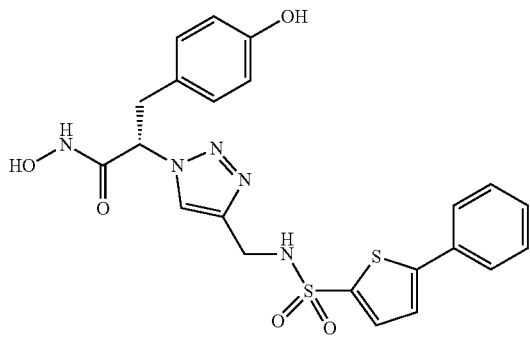 [SMILES: O=C(NO)[C@H](Cc1ccc(O)cc1)n1cc(CNS(=O)(=O)c2ccc(-c3ccccc3)s2)nn1] | |
| Aspect: White solid. Yield: 71%. Purity: 99%. LC$_{tR}$ = 2.47 min. MS (ESI–): m/z = 498 [M – H]⁻.<br>¹H NMR, 300 MHz, DMSO-d$_6$, δ (ppm): 8.09 (s, 1H), 7.73-7.71 (m, 2H), 7.57-7.53 (m, 2H), 7.49-7.38 (m, 3H), 7.91-7.89 (m, 2H), 6.62-6.59 (m, 2H), 5.20 (t, J = 7.9 Hz, 1H), 4.17 (s, 2H), 3.25-3.18 (m, 1H), 3.13-3.05 (m, 1H).<br>¹³C NMR, 75 MHz, DMSO-d$_6$, δ (ppm): 163.8, 156.2, 149.1, 143.2, 139.7, 132.8, 132.3, 130.0, 129.4, 129.1, 125.9, 125.8, 124.0, 122.2, 115.1, 62.0, 38.3, 36.8.<br>HRMS – ESI+ (m/z): calcd for C$_{22}$H$_{22}$N$_5$O$_5$S$_2$ [M + H]⁺: 500.1062, found: 500.1064. | |
| 11  (S)-4-(5-(N-((1-(1-(hydroxyamino)-3-(4-hydroxyphenyl)-1-oxopropan-2-yl)-1H-1,2,3-triazol-4-yl)methyl)sulfamoyl)thiophen-2-yl)-N-methylbenzamide | C |
| 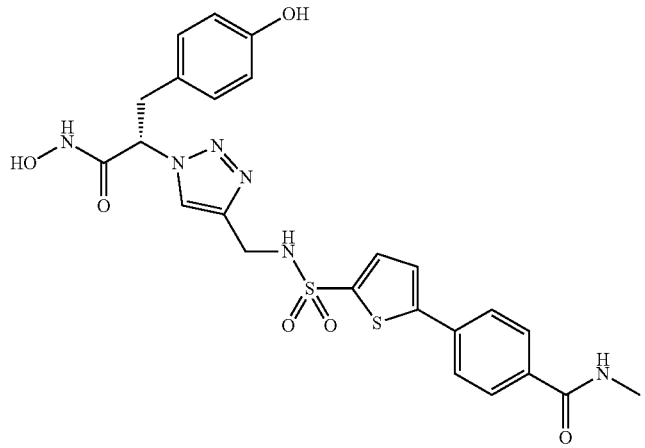 [SMILES: CNC(=O)c1ccc(-c2ccc(S(=O)(=O)NCc3cn([C@@H](Cc4ccc(O)cc4)C(=O)NO)nn3)s2)cc1] | |

| | Compound of formula (I) | Synthesis route |
|---|---|---|
| | Aspect: Beige solid. Yield: 23%. Purity: 100%. $LC_{tR}$ = 1.93 min. MS (ESI-): m/z = 555 [M – H]⁻.
$^1$H NMR, 300 MHz, MeOD-$d_4$, δ (ppm): 7.95 (s, 1H), 7.85 (d, J = 8.4 Hz, 2H), 7.75 (d, J = 8.4 Hz, 2H), 7.52 (d, J = 3.9 Hz, 1H), 7.46 (d, J = 3.9 Hz, 1H), 6.88 (d, J = 8.4 Hz, 2H), 6.63 (d, J = 8.4 Hz, 2H), 5.17 (dd, J = 7.1 and 8.5 Hz, 1H), 4.33 (s, 2H), 3.27 (dd, J = 8.5 and 13.5 Hz, 1H), 3.03 (dd, J = 7.1 and 13.5 Hz, 1H), 2.93 (s, 3H).
$^{13}$C NMR, 75 MHz, DMSO-$d_6$, δ (ppm): 165.8, 163.8, 156.2, 147.9, 143.1, 140.5, 134.53, 134.51, 132.8, 129.9, 128.1, 152.7, 125.0, 122.2, 115.1, 61.9, 38.3, 36.7, 26.3.
HRMS – ESI+ (m/z): calcd for $C_{24}H_{25}N_6O_6S_2$ [M + H]⁺: 557.1277, found: 557.1298. | |
| 12 | (S)-2-(4-((5-(4-(aminomethyl)phenyl)thiophene-2-sulfonamido)methyl)-1H-1,2,3-triazol-1-yl)-N-hydroxy-3-(4-hydroxyphenyl)propanamide, dipotassium salt | C |
| | 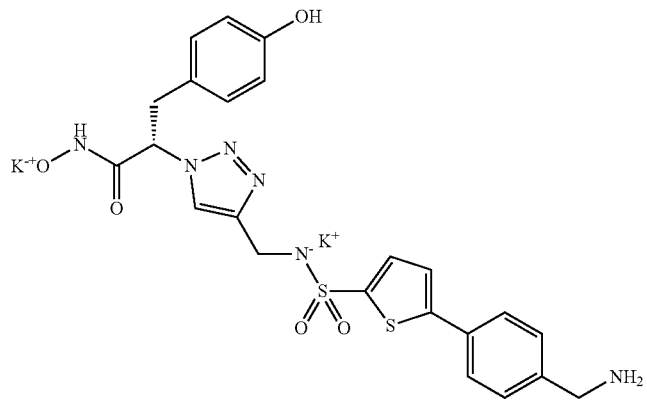
Aspect: Pink solid. Yield: 10%. Purity: 97%. $LC_{tR}$ = 1.80 min. MS (ESI-): m/z = 527 [M – H]⁻.
$^1$H NMR, 500 MHz, DMSO-$d_6$, δ (ppm): 9.30 (br, 1H), 8.09 (s, 1H), 7.66 (d, J = 8.2 Hz, 2H), 7.55 (d, J = 3.9 Hz, 1H), 7.51 (d, J = 3.9 Hz, 1H), 7.41 (d, J = 8.2 Hz, 2H), 6.91 (d, J = 8.3 Hz, 2H), 6.60 (d, J = 8.3 Hz, 2H), 5.18 (t, J = 7.9 Hz, 1H), 4.15 (s, 2H), 3.74 (s, 2H), 3.20 (1H, dd, J = 7.9 and 13.7 Hz), 3.08 (dd, J = 7.9 and 13.7 Hz, 1H).
$^{13}$C NMR, 125 MHz, DMSO-$d_6$, δ (ppm): 163.8, 156.2, 149.3, 143.2, 139.0, 132.9, 130.3, 130.0, 128.0, 125.8, 125.7, 123.6, 122.2, 115.1, 62.0, 43.1, 38.3, 36.7.
HRMS – ESI+ (m/z): calcd for $C_{23}H_{25}N_6O_5S_2$ [M + H]⁺: 529.1332, found: 529.1328. | |
| 13 | (S)-N-hydroxy-3-(4-hydroxyphenyl)-2-(4-((N-methyl-5-phenylthiophene-2-sulfonamido)methyl)-1H-1,2,3-triazol-1-yl)propanamide | B |
| | 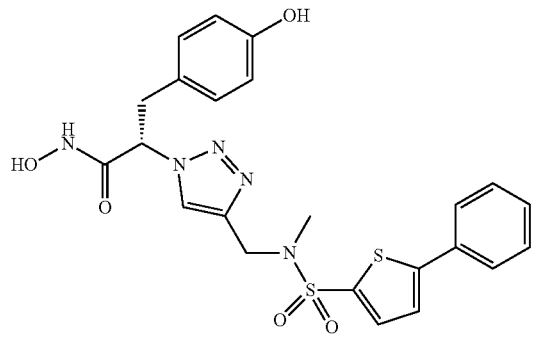 [SMILES: CN(Cc1cn([C@@H](Cc2ccc(O)cc2)C(=O)NO)nn1)S(=O)(=O)c1ccc(-c2ccccc2)s1]
Aspect: White solid. Yield: 79%. Purity: 99%. $LC_{tR}$ = 2.53 min. MS (ESI+): m/z = 514 [M + H]⁺.
$^1$H NMR, 500 MHz, DMSO-$d_6$, δ (ppm): 11.12 (br s, 1H), 9.26 (s, 1H), 9.23 (br s, 1H), 8.26 (s, 1H), 7.77-7.75 (m, 2H), 7.66 (d, J = 3.9 Hz, 1H), 7.64 (d, J = 3.9 Hz, 1H), 7.49-7.46 (m, 2H), 7.44-7.40 (m, 1H), 6.92-6.90 (m, 2H), 6.60-6.58 (m, 2H), 5.25 (dd, J = 7.1 and 8.8 Hz, 1H), 4.31 (q, J = 16.0 Hz, 2H), 3.23 (dd, J = 6.9 and 13.9 Hz, 1H), 3.19-3.15 (m, 1H), 2.68 (s, 3H).
$^{13}$C NMR, 125 MHz, DMSO-$d_6$, δ (ppm): 164.0, 156.2, 150.0, 141.3, 134.9, 133.8, 132.1, 130.0, 129.4, 129.3, 126.0, 125.8, 124.5, 123.4, 115.1, 62.1, 45.0, 36.6, 34.7.
HRMS – ESI+ (m/z): calcd for $C_{23}H_{24}N_5O_5S_2$ [M + H]⁺: 514.1219, found: 514.1234. | |
| 14 | (S)-2-(4-((5-bromothiophene-2-sulfonamido)methyl)-1H-1,2,3-triazol-1-yl)-N-hydroxy-3-(4-hydroxyphenyl)propanamide | B |

| Compound of formula (I) | Synthesis route |
|---|---|
| 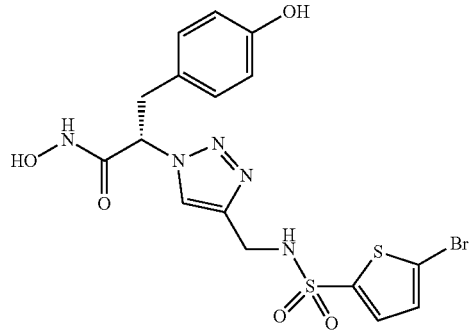 [SMILES: O=C(NO)[C@H](Cc1ccc(O)cc1)n1cc(CNS(=O)(=O)c2ccc(Br)s2)nn1]<br>Aspect: White solid. Yield: 38%. Purity: 95%. LC$_{tR}$ = 2.13 min. MS (ESI−): m/z = 500 [M − H]⁻.<br>¹H NMR, 300 MHz, DMSO-d$_6$, δ (ppm): 10.98 (br s, 1H), 9.28-9.17 (m, 2H), 8.10 (s, 1H), 7.39 (d, J = 3.9 Hz, 1H), 7.30 (d, J = 3.9 Hz, 1H), 6.97-6.94 (m, 2H), 6.64-6.61 (m, 2H), 5.22 (t, J = 7.8 Hz, 1H), 4.13 (s, 2H), 3.24 (dd, J = 7.4 and 14.1 Hz, 1H), 3.14 (dd, J = 8.4 and 13.7 Hz, 1H).<br>¹³C NMR, 75 MHz, DMSO-d$_6$, δ (ppm): 163.8, 156.2, 143.0, 142.3, 132.4, 131.3, 130.0 (2C), 125.8, 122.3, 118.3, 115.2 (2C), 62.0, 38.2, 36.8.<br>HRMS − ESI+ (m/z): calcd for C$_{16}$H$_{17}$N$_5$O$_5$S$_2$Br [M + H]⁺: 501.9854, found: 501.9839.<br>15 (S)-N-hydroxy-3-(4-hydroxyphenyl)-2-(4-((thiophene-2-sulfonamido)methyl)-1H-1,2,3-triazol-1-yl)propanamide | B |
| 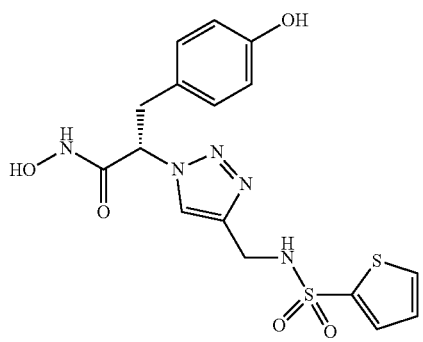 [SMILES: O=C(NO)[C@H](Cc1ccc(O)cc1)n1cc(CNS(=O)(=O)c2cccs2)nn1]<br>Aspect: White solid. Yield: 70%. Purity: 99%. LC$_{tR}$ = 1.82 min. MS (ESI−): m/z = 422 [M − H]⁻.<br>¹H NMR, 300 MHz, DMSO-d$_6$, δ (ppm): 11.03 (br s, 1H), 9.27 (s, 1H), 9.19 (br s, 1H), 8.33 (br s, 1H), 8.06 (s, 1H), 7.91 (dd, J = 1.3 and 5.0 Hz, 1H), 7.58 (dd, J = 1.3 and 3.7 Hz, 1H), 7.16 (dd, J = 3.7 and 5.0 Hz, 1H), 6.97-6.93 (m, 2H), 6.65-6.60 (m, 2H), 5.22 (t, J = 7.8 Hz, 1H), 4.10 (s, 2H), 3.24 (dd, J = 7.3 and 13.9 Hz, 1H), 3.14 (dd, J = 8.3 and 13.9 Hz, 1H).<br>¹³C NMR, 75 MHz, DMSO-d$_6$, δ (ppm): 163.8, 156.2, 143.2, 141.2, 132.5, 131.7, 130.0, 127.7, 125.8, 122.1, 115.2, 62.0, 38.3, 36.7.<br>HRMS − ESI+ (m/z): calcd for C$_{16}$H$_{18}$N$_5$O$_5$S$_2$ [M + H]⁺: 424.0719; found: 424.0749.<br>16 (S)-N-hydroxy-3-(4-hydroxyphenyl)-2-(4-((thiophene-2-sulfonamido)methyl)-1H-1,2,3-triazol-1-yl)propanamide | B |
| 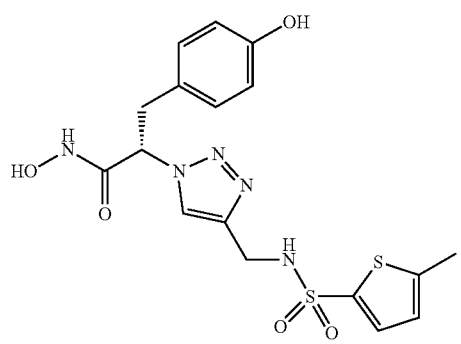 [SMILES: Cc1ccc(S(=O)(=O)NCc2cn([C@@H](Cc3ccc(O)cc3)C(=O)NO)nn2)s1] | |

| | Compound of formula (I) | Synthesis route |
|---|---|---|
| | Aspect: White solid. Yield: 59%. Purity: 99%. LC$_{tR}$ = 1.97 min. MS (ESI+): m/z = 438 [M + H]$^+$.<br>$^1$H NMR, 300 MHz, DMSO-d$_6$, δ (ppm): 9.27 (br s, 2H), 9.13 (br s, 1H), 8.04 (s, 1H), 7.39 (d, J = 3.7 Hz, 1H), 6.96-6.93 (m, 2H), 6.88 (dd, J = 1.0 and 3.7 Hz, 1H), 6.64-6.61 (m, 2H), 5.21 (t, J = 7.8 Hz, 1H), 4.08 (s, 2H), 3.24 (dd, J = 7.3 and 13.9 Hz, 1H), 3.13 (dd, J = 8.3 and 13.9 Hz, 1H), 2.49 (s, 3H).<br>$^{13}$C NMR, 75 MHz, DMSO-d$_6$, δ (ppm): 163.8, 156.2, 146.7, 143.3, 138.0, 132.0, 130.0, 126.2, 125.8, 122.1, 115.2, 62.0, 38.3, 36.8, 15.1.<br>HRMS – ESI+ (m/z): calcd for C$_{17}$H$_{20}$N$_5$O$_5$S$_2$ [M + H]$^+$: 438.0904; found: 438.0906. | |
| 17 | (2S)-3-(4-hydroxyphenyl)-2-[4-[(3-thienylsulfonylamino)methyl]triazol-1-yl]propanehydroxamic acid | B |
| | 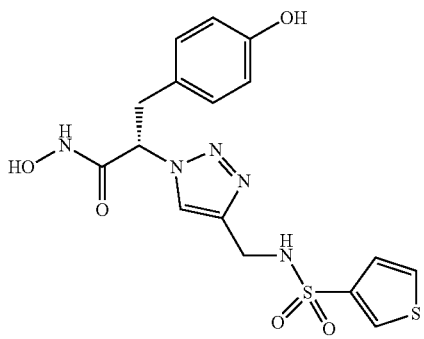 [SMILES: O=C(NO)[C@H](Cc1ccc(O)cc1)n1cc(CNS(=O)(=O)c2ccsc2)nn1] | |
| | $^1$H NMR, 300 MHz, DMSO-d$_6$, δ (ppm): 9.27 (br s, 2H), 9.14 (br s, 1H), 8.14 (dd, J = 1.3 and 3.0 Hz, 1H), 8.04 (s, 1H), 7.71 (dd, J = 3.0 and 5.1 Hz, 1H), 7.31 (dd, J = 1.3 and 5.1 Hz, 1H), 6.97-6.92 (m, 2H), 6.65-6.60 (m, 2H), 5.21 (t, J = 7.8 Hz, 1H), 4.06 (s, 2H), 3.24 (dd, J = 7.3 and 13.9 Hz, 1H), 3.14 (dd, J = 8.4 and 13.9 Hz, 1H).<br>$^{13}$C NMR, 75 MHz, DMSO-d$_6$, δ (ppm): 163.8, 156.2, 143.4, 140.3, 130.5, 130.0, 129.0, 125.8, 125.3, 122.1, 115.2, 62.0, 38.1, 36.7.<br>HRMS – ESI+ (m/z): calcd for C$_{16}$H$_{18}$N$_5$O$_5$S$_2$ [M + H]$^+$: 424.0728; found: 424.0749. | |
| 18 | (2S)-2-[4-[[(3-bromo-2-thienyl)sulfonylamino]methyl]triazol-1-yl]-3-(4-hydroxyphenyl)propanehydroxamic acid | B |
| | 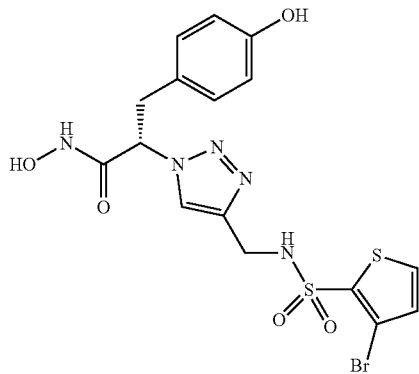 [SMILES: O=C(NO)[C@H](Cc1ccc(O)cc1)n1cc(CNS(=O)(=O)c2sccc2Br)nn1] | |
| | Aspect: White solid. Yield: 52%. Purity: 99%. LC$_{tR}$ = 1.95 min. MS (ESI+): m/z = 502 [M + H]$^+$.<br>$^1$H NMR, 300 MHz, DMSO-d$_6$, δ (ppm): 11.07 (br s, 1H), 9.27-9.19 (m, 2H), 8.71 (br s, 1H), 8.00 (s, 1H), 7.9 1 (d, J = 5.2 Hz, 1 H), 7.23 (d, J = 5.2 Hz, 1H), 6.96-6.93 (m, 2H), 6.64-6.61 (m, 2H), 5.19 (t, J = 7.7 Hz, 1H), 4.21 (s, 2H), 3.23 (dd, J = 7.4 and 14.0 Hz, 1H), 3.11 (dd, J = 8.2 and 14.0 Hz, 1H).<br>$^{13}$C NMR, 75 MHz, DMSO-d$_6$, δ (ppm): 163.7, 156.2, 143.4, 136.8, 132.6, 132.3, 130.0 (2C), 125.7, 121.9, 115.2 (2C), 112.6, 61.9, 38.1, 36.8.<br>HRMS – ESI+ (m/z): calcd for C$_{16}$H$_{17}$N$_5$O$_5$S$_2$Br [M + H]$^+$: 501.9854; found: 501.9827. | |
| 19 | (2S)-3-(4-hydroxyphenyl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

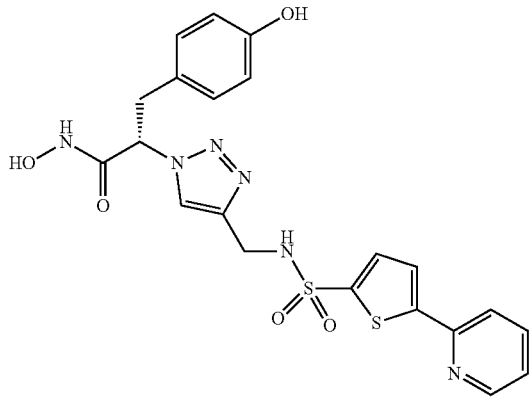 [SMILES: O=C(NO)[C@H](Cc1ccc(O)cc1)n1cc(CNS(=O)(=O)c2ccc(-c3ccccn3)s2)nn1]

Aspect: White solid. Yield: 63%. Purity: 99%. LC$_{tR}$ = 2.09 min. MS (ESI−): m/z = 499 [M − H]⁻.

$^1$H NMR, 300 MHz, DMSO-d$_6$, δ (ppm): 9.27 (s, 2H), 8.09 (s, 1H), 7.74-7.71 (m, 2H), 7.57 (d, J = 3.9 Hz, 1H), 7.54 (d, J = 3.9 Hz, 1H), 7.49-7.38 (m, 3H), 6.91-6.88 (m, 2H), 6.62-6.59 (m, 2H), 5.20 (t, J = 7.8 Hz, 1H), 4.17 (s, 2H), 3.21 (dd, J = 7.5 and 13.8 Hz, 1H), 3.09 (dd, J = 8.2 and 13.8 Hz, 1H).

$^{13}$C NMR, 75 MHz, DMSO-d$_6$, δ (ppm): 163.8, 156.2, 149.1, 143.2, 139.6, 132.8, 132.2, 130.0, 129.3, 129.1, 125.9 (2C), 125.7, 124.0, 122.2, 115.1, 62.0, 38.3, 36.7.

HRMS − ESI+ (m/z): calcd for C$_{21}$H$_{21}$N$_6$O$_5$S$_2$ [M + H]⁺: 501.0996; found: 501.1015.

| 20 | (R)-N-hydroxy-3-(4-hydroxyphenyl)-2-(4-((5-(pyridin-2-yl)thiophene-2-sulfonamido)methyl)-1H-1,2,3-triazol-1-yl)propanamide | B |

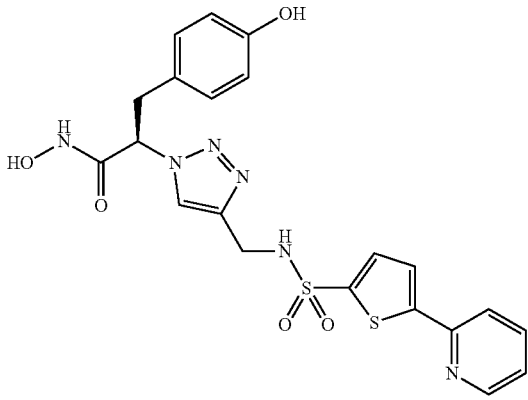 [SMILES: O=C(NO)[C@@H](Cc1ccc(O)cc1)n1cc(CNS(=O)(=O)c2ccc(-c3ccccn3)s2)nn1]

Aspect: White solid. Yield: 52%. Purity: 99%. LC$_{tR}$ = 2.50 min. MS (ESI−): m/z = 499 [M − H]⁻.

$^1$H NMR, 300 MHz, DMSO-d$_6$, δ (ppm): 11.07 (br, 1H), 9.25 (br, 1H), 9.17 (br, 1H), 8.56 (d, J = 4.4 Hz, 1H), 8.46 (br, 1H), 8.08 (s, 1H), 8.02 (d, J = 8.0 Hz, 1H), 7.88 (td, J = 1.6 and 7.6 Hz, 1H), 7.81 (d, J = 4 Hz, 1H), 7.58 (d, J = 4 Hz, 1H), 7.37 (m, 1H), 6.90 (d, J = 8.4 Hz, 2H), 6.60 (d, J = 8.4 Hz, 2H), 5.19 (t, J = 7.8 Hz, 1H), 4.16 (s, 2H), 3.20 (dd, J = 7.5 and 14.0 Hz, 1H), 3.07 (dd, J = 8.1 and 14.0 Hz, 1H).

$^{13}$C NMR, 75 MHz, DMSO-d$_6$, δ (ppm): 163.8, 156.2, 150.4, 150.0, 149.7, 143.2, 142.0, 137.5, 132.6, 129.9, 125.7, 124.9, 123.7, 122.1, 119.3, 115.1, 62.0, 38.3, 36.7.

HRMS − ESI+ (m/z): calcd for C$_{21}$H$_{21}$N$_6$O$_5$S$_2$ [M + H]⁺: 501.1015, found: 501.1004.

| 21 | (S)-N-hydroxy-2-(4-((5-(pyridin-2-yl)thiophene-2-sulfonamido)methyl)-1H-1,2,3-triazol-1-yl)-3-(4-(trifluoromethoxy)phenyl)propanamide | B |

| Compound of formula (I) | Synthesis route |
|---|---|

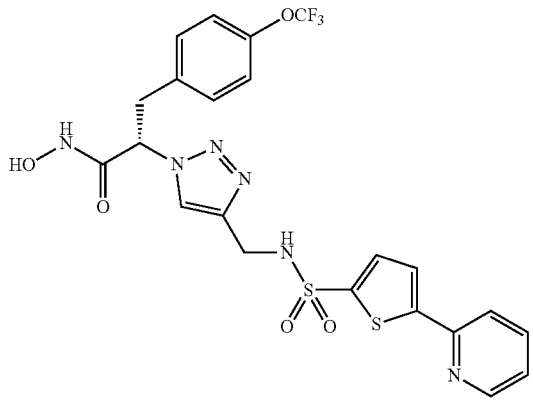 [SMILES: O=C(NO)[C@H](Cc1ccc(OC(F)(F)F)cc1)n1cc(CNS(=O)(=O)c2ccc(-c3ccccn3)s2)nn1]

Aspect: White solid. Yield: 60%. Purity: 98%. LC$_{tR}$ = 2.67 min. MS (ESI–): m/z = 567 [M – H]⁻.
¹H NMR, 300 MHz, DMSO-d$_6$, δ (ppm): 11.11 (br, 1H), 9.23 (s, 1H), 8.56 (ddd, J = 0.9, 1.7 and 4.8 Hz, 1H), 8.45 (s, 1H), 8.12 (s, 1H), 8.02 (dt, J = 8.0 and 0.9 Hz, 1H), 7.87 (dt, J = 1.7 and 7.6 Hz, 1H), 7.83 (d, J = 4 Hz, 1H), 7.59 (d, J = 4 Hz, 1H), 7.36 (ddd, J = 0.9, 4.8 and 7.6 Hz, 1H), 7.23-7.19 (m, 4H), 5.29 (t, J = 7.9 Hz, 1H), 4.17 (s, 1H), 3.37 (dd, J = 7.5 and 13.8 Hz, 1H), 3.26 (dd, J = 8.2 and 13.8 Hz, 1H).
¹³C NMR, 75 MHz, DMSO-d$_6$, δ (ppm): 163.0, 150.4, 150.0, 149.6, 147.3 (m), 143.4, 142.0, 137.5, 135.3, 132.6, 130.9, 124.9, 123.7, 122.3, 120.9, 120.03 (q, Jc-F = 245.5 Hz), 119.3, 61.4, 38.3 and 36.6.
¹⁹F NMR (282 MHz, DMSO-d$_6$) δ: – 57.6.
HRMS – ESI+ (m/z): calcd for C$_{19}$H$_{20}$N$_6$O$_5$F$_3$S$_2$ [M + H]⁺: 569.0889; found: 569.0963.

| 22 | (S)-N-hydroxy-2-(4-((5-phenylthiophene-2-sulfonamido)methyl)-1H-1,2,3-triazol-1-yl)-3-(4-(trifluoromethoxy)phenyl)propanamide | B |

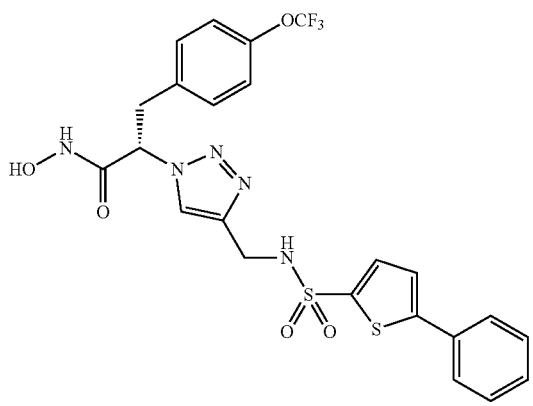 [SMILES: O=C(NO)[C@H](Cc1ccc(OC(F)(F)F)cc1)n1cc(CNS(=O)(=O)c2ccc(-c3ccccc3)s2)nn1]

Aspect: White solid. Yield: 59%. Purity: 99%. LC$_{tR}$ = 2.87 min. MS (ESI–): m/z = 566 [M – H]⁻.
¹H NMR, 300 MHz, DMSO-d$_6$, δ (ppm): 11.12 (br, 1H), 9.23 (br, 1H), 8.46 (br, 1H), 8.13 (s, 1H), 7.73-7.70 (m, 2H), 7.58 (d, J = 4.0 Hz, 1H), 7.55 (d, J = 4.0 Hz, 1H), 7.49-7.37 (m, 3H), 7.26-7.19 (m, 4H), 5.30 (t, J = 7.9 Hz, 1H), 4.17 (br, 2H), 3.38 (dd, J = 7.6 and 14.0 Hz, 1H), 3.28 (dd, J = 8.2 and 14.0 Hz, 1H).
¹³C NMR, 75 MHz, DMSO-d$_6$, δ (ppm): 163.5, 149.1, 147.3 (m), 143.4, 139.6, 135.3, 132.8, 132.2, 130.9, 129.4, 129.1, 125.9, 124.0, 122.3, 121.7, 120.9, 120.03 (Jc-F = 120.0 Hz), 61.4, 38.3, 36.5.
¹⁹F NMR (282 MHz, DMSO-d$_6$) δ: – 57.3.
HRMS – ESI+ (m/z): calcd for C$_{23}$H$_{21}$N$_5$O$_5$F$_3$S$_2$ [M + H]⁺: 568.0936; found: 568.0916.

| 23 | (S)-N-hydroxy-3-(4-phenoxyphenyl)-2-(4-((5-(pyridin-2-yl)thiophene-2-sulfonamido)methyl)-1H-1,2,3-triazol-1-yl)propanamide | B |

| Compound of formula (I) | Synthesis route |
|---|---|

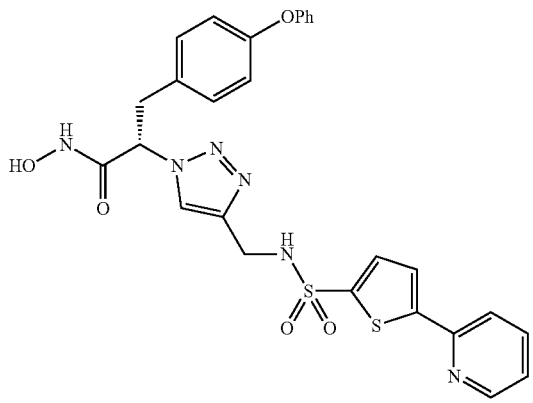 [SMILES: O=C(NO)[C@H](Cc1ccc(Oc2ccccc2)cc1)n1cc(CNS(=O)(=O)c2ccc(-c3ccccn3)s2)nn1]

Aspect: White solid. Yield: 77%. Purity: 98%. LC$_{tR}$ = 2.68 min. MS (ESI−): m/z = 575 [M − H]⁻.
$^1$H NMR, 300 MHz, DMSO-d$_6$, δ (ppm): 11.10 (br, 1H), 9.22 (s, 1H), 8.56-8.55 (m, 1H), 8.47 (t, J = 5.6 Hz, 1H), 8.11 (s, 1H), 8.03 (dt, J = 1.1 and 9.0 Hz, 1H), 7.88 (td, J = 1.7 and 7.7 Hz, 1H) 7.83 (d, J = 4 Hz, 1H), 7.59 (d, J = 4 Hz, 1H), 7.40-7.34 (m, 3H), 7.15-7.10 (m, 3H), 6.97-6.94 (m, 2H), 6.89-6.85 (m, 2H), 5.27 (t, J = 7.9 Hz, 1H), 4.17 (d, J = 5.6 Hz, 2H), 3.31 (dd, J = 7.6 and 13.6 Hz, 1H), 3.30 (dd, J = 8.2 and 13.6 Hz, 1H).
$^{13}$C NMR, 75 MHz, DMSO-d$_6$, δ (ppm): 163.7, 156.6, 155.5, 150.4, 150.1, 149.7, 143.3, 142.1, 137.5, 132.7, 130.8, 130.6, 130.1, 124.9, 123.8, 123.5, 122.3, 119.4, 118.6, 118.5, 61.7, 38.3, 36.7.
HRMS − ESI+ (m/z): calcd for C$_{27}$H$_{25}$N$_6$OsS$_2$ [M + H]⁺: 577.1328; found: 577.1337.

| 24 | (S)-N-hydroxy-3-(4-methoxyphenyl)-2-(4-((5-phenylthiophene-2-sulfonamido)methyl)-1H-1,2,3-triazol-1-yl)propanamide | B |

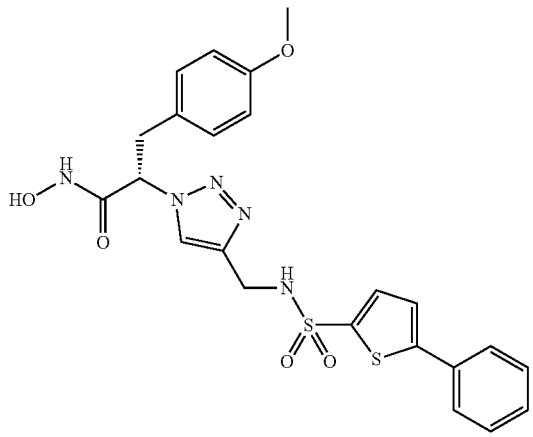 [SMILES: COc1ccc(C[C@@H](C(=O)NO)n2cc(CNS(=O)(=O)c3ccc(-c4ccccc4)s3)nn2)cc1]

Aspect: White solid. Yield: 28%. Purity: 98%. LC$_{tR}$ = 2.60 min. MS (ESI−): m/z = 512 [M − H]⁻.
$^1$H NMR, 300 MHz, DMSO-d$_6$, δ (ppm): 9.31 (br, 1H), 8.11 (s, 1H), 7.74-7.71 (m, 2H), 7.58 (d, J = 3.9 Hz, 1H), 7.54 (d, J = 3.9 Hz, 1H), 7.49-7.38 (m, 3H), 7.04-7.01 (m, 2H), 6.79-6.76 (m, 2H), 5.24 (t, J = 8 Hz, 1H), 4.17 (s, 2H), 3.68 (m, 3H), 3.26 (dd, J = 7.3 and 13.8 Hz, 1H), 3.16 (dd, J = 8.3 and 13.8 Hz, 1H).
$^{13}$C NMR, 75 MHz, DMSO-d$_6$, δ (ppm): 163.7, 156.6, 155.5, 150.4, 150.1, 149.7, 143.3, 142.1, 137.5, 132.7, 130.8, 130.6, 130.1, 124.9, 123.8, 123.5, 122.3, 119.4, 118.6, 118.5, 61.7, 38.3, 36.7.
HRMS − ESI+ (m/z): calcd for C$_{23}$H$_{23}$N$_5$O$_5$S$_2$ [M + H]⁺: 514.1219; found: 514.1218.

| 25 | (S)-N-hydroxy-3-(4-methoxyphenyl)-2-(4-((5-(pyridin-2-yl)thiophene-2-sulfonamido)methyl)-1H-1,2,3-triazol-1-yl)propanamide | B |

| Compound of formula (I) | Synthesis route |
|---|---|
| 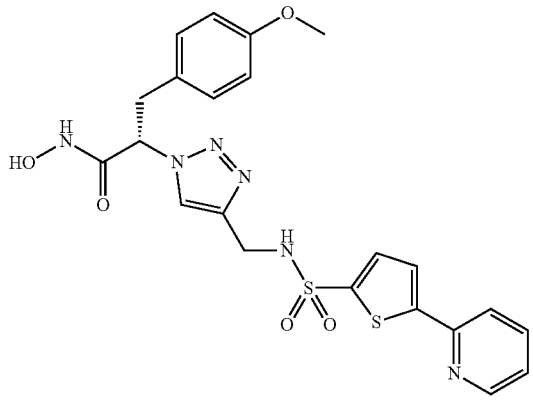 [SMILES: COc1ccc(C[C@@H](C(=O)NO)n2cc(CNS(=O)(=O)c3ccc(-c4ccccn4)s3)nn2)cc1]<br>Aspect: White solid. Yield: 69%. Purity: 98%. LC$_{tR}$ = 2.30 min. MS (ESI−): m/z = 513 [M − H]⁻.<br>¹H NMR, 300 MHz, DMSO-d$_6$, δ (ppm): 11.60 (br, 1H), 9.19 (br, 1H), 8.56 (ddd, J = 0.9, 1.7 and 4.8 Hz, 1H), 8.46 (br, 1H), 8.09 (s, 1H), 8.02 (dt, J = 1.0 and 8.0 Hz, 1H), 7.88 (td, J = 1.7 and 7.5 Hz, 1H), 7.82 (d, J = 4.0 Hz, 1H), 7.59 (d, J = 4.0 Hz, 1H), 7.37 (ddd, J = 1.0, 4.8 and 7.5 Hz, 1H), 7.04-7.00 (m, 2H), 6.81-6.77 (m, 2H), 5.22 (t, J = 7.9 Hz, 1H), 4.15 (s, 2H), 3.69 (m, 3H)3.44 (dd, J = 7.5 and 13.8 Hz, 1H), 3.14 (dd, J = 8.2 and 13.8 Hz, 1H).<br>¹³C NMR, 75 MHz, DMSO-d$_6$, δ (ppm): 163.7, 158.1, 150.4, 150.0, 149.7, 143.2, 142.1, 137.5, 132.6, 130.0, 127.5, 124.9, 123.7, 122.2, 119.3, 113.7, 61.9, 59.9, 38.3, 36.6.<br>HRMS − ESI+ (m/z): calcd for C$_{22}$H$_{23}$N$_6$O$_5$S$_2$ [M + H]⁺: 515.1178; found: 515.1178. | |
| 26 (2S)-3-(4-tert-butoxyphenyl)-2-[4-[[(5-phenyl-2-thienyl)sulfonylamino]methyl]triazol-1-yl]propanehydroxamic acid | B |
| 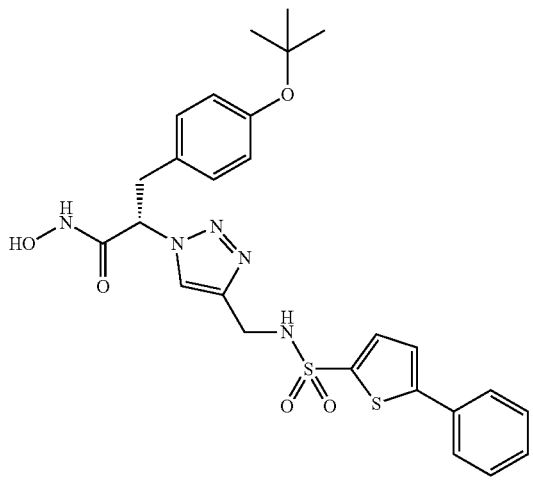 [SMILES: CC(C)(C)Oc1ccc(C[C@@H](C(=O)NO)n2cc(CNS(=O)(=O)c3ccc(-c4ccccc4)s3)nn2)cc1]<br>Aspect: White solid. Yield: 90%. Purity: 99%. LC$_{tR}$ = 2.85 min. MS (ESI−): m/z = 554 [M − H]⁻.<br>¹H NMR, 300 MHz, DMSO-d$_6$, δ (ppm): 8.11 (s, 1H), 7.75-7.72 (m, 2H), 7.58 (d, J = 3.9 Hz, 1H), 7.55 (d, J = 3.9 Hz, 1H), 7.50-7.38 (m, 3H), 7.03-6.99 (m, 2H), 6.85-6.81 (m, 2H), 5.26 (t, J = 7.8 Hz, 1H), 4.18 (s, 2H), 3.30 (dd, J = 7.4 and 13.8 Hz, 1H), 3.18 (dd, J = 8.1 and 13.8 Hz, 1H), 1.25 (s, 9H).<br>¹³C NMR, 75 MHz, DMSO-d$_6$, δ (ppm): 163.7, 153.9, 149.1, 143.3, 139.7, 132.8, 132.2, 130.2, 129.5, 129.4, 129.1, 125.9, 124.0, 123.4, 122.2, 77.8, 61.7, 38.3, 36.8, 28.5.<br>HRMS − ESI+ (m/z): calcd for C$_{26}$H$_{30}$N$_5$O$_5$S$_2$ [M + H]⁺: 556.1680; found: 556.1688. | |
| 27 (2S)-3-(4-tert-butoxyphenyl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

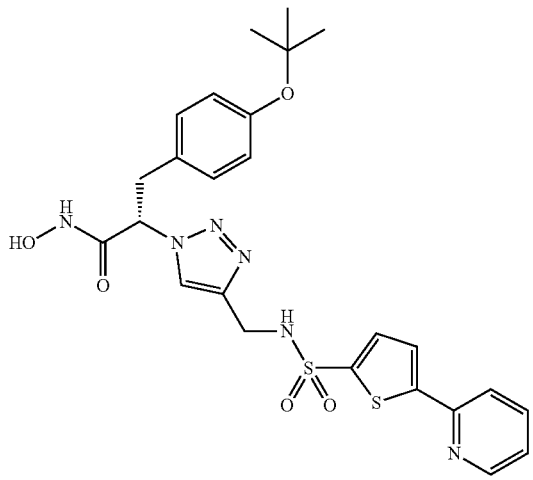 [SMILES: CC(C)(C)Oc1ccc(C[C@@H](C(=O)NO)n2cc(CNS(=O)(=O)c3ccc(-c4ccccn4)s3)nn2)cc1]

Aspect: White solid. Yield: 86%. Purity: 99%. $LC_{tR}$ = 2.57 min. MS (ESI+): m/z = 557 [M + H]$^+$.
$^1$H NMR, 300 MHz, DMSO-d$_6$, δ (ppm): 11.09 (s, 1H), 9.21 (s, 1H), 8.56 (ddd, J = 0.9, 1.7 and 4.9 Hz, 1H), 8.47 (t, J = 5.9 Hz, 1H), 8.09 (s, 1H), 8.02 (dt, J = 1.0 and 7.9 Hz, 1H), 7.88 (td, J = 1.7 and 7.8 Hz, 1H), 7.82 (d, J = 4.0 Hz, 1H), 7.58 (d, J = 4.0 Hz, 1H), 7.36 (ddd, J = 1.0, 4.9 and 7.5 Hz, 1H), 7.02-6.99 (m, 2H), 6.83-6.80 (m, 2H), 5.24 (t, J = 7.8 Hz, 1H), 4.16 (d, J = 4.8 Hz, 2H), 3.28 (dd, J = 7.4 and 14.1 Hz, 1H), 3.15 (dd, J = 8.0 and 14.0 Hz, 1H), 1.24 (s, 9H).
$^{13}$C NMR, 75 MHz, DMSO-d$_6$, δ (ppm): 163.7, 153.9, 150.4, 150.0, 149.7, 143.3, 142.1, 137.5, 132.6, 130.2, 129.5, 124.9, 123.7, 123.4, 122.2, 119.4, 77.8, 61.7, 38.3, 36.8, 28.5.
HRMS – ESI+ (m/z): calcd for $C_{25}H_{29}N_6O_5S_2$ [M + H]$^+$: 557.1641; found: 557.1669.

| 28 | (S)-4-(5-(N-((1-(1-(hydroxyamino)-3-(4-methoxyphenyl)-1-oxopropan-2-yl)-1H-1,2,3-triazol-4-yl)methyl)sulfamoyl)thiophen-2-yl)-N-methylbenzamide | C |

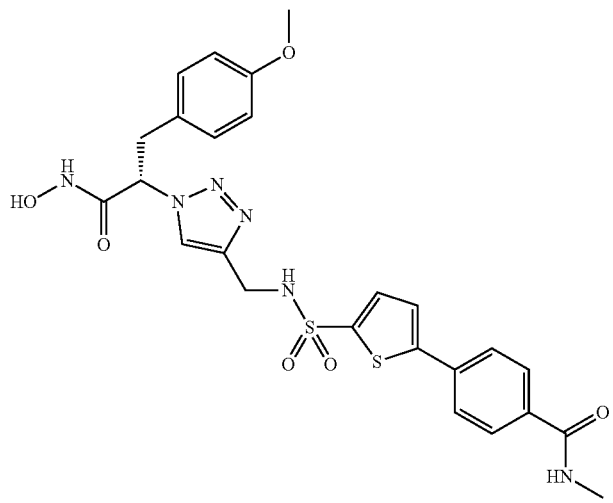 [SMILES: CNC(=O)c1ccc(-c2ccc(S(=O)(=O)NCc3cn([C@@H](Cc4ccc(OC)cc4)C(=O)NO)nn3)s2)cc1]

Aspect: White solid. Yield: 11%. Purity: 100%. $LC_{tR}$ = 2.13 min. MS (ESI–): m/z = 569 [M – H]$^-$.
$^1$H NMR, 300 MHz, DMSO-d$_6$, δ (ppm): 9.20 (s, 1H), 8.53 (q, J = 4.7 Hz, 1H), 8.10 (s, 1H), 7.90 (d, J = 8.4 Hz, 2H), 7.81 (d, J = 8.4 Hz, 2H), 7.65 (d, J = 3.9 Hz, 1H), 7.59 (d, J = 3.9 Hz, 1H), 7.01 (d, J = 8.6 Hz, 2H), 6.77 (d, J = 8.4 Hz, 2H), 5.23 (t, J = 7.2 Hz, 1H), 4.18 (2H, s), 3.68 (s, 3H), 3.26 (dd, J = 7.3 and 13.9 Hz, 1H), 3.14 (dd, J = 8.3 and 13.9 Hz, 1H), 2.80 (d, J = 4.7 Hz, 3H).
$^{13}$C NMR, 75 MHz, DMSO-d$_6$, δ (ppm): 165.7, 163.7, 158.1, 147.9, 143.2, 140.5, 134.5, 134.5, 132.8, 130.0, 128.1, 127.5, 125.7, 125.0, 122.2, 113.7, 61.9, 54.9, 38.3, 36.6, 26.3.
HRMS – ESI+ (m/z): calcd for $C_{25}H_{26}N_6O_6S_2$ [M + H]$^+$: 571.1434, found: 571.1445.

| 29 | (S)-N-hydroxy-3-(4-hydroxyphenyl)-2-(4-((5-(pyridin-3-yl)thiophene-2-sulfonamido)methyl)-1H-1,2,3-triazol-1-yl)propanamide | C |

| Compound of formula (I) | Synthesis route |
|---|---|
| 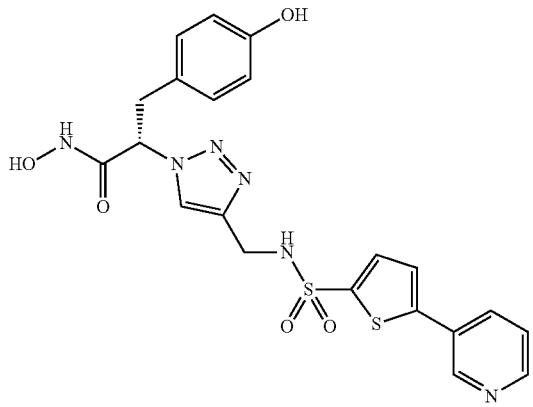 [SMILES: O=C(NO)[C@H](Cc1ccc(O)cc1)n1cc(CNS(=O)(=O)c2ccc(-c3cccnc3)s2)nn1]<br>Aspect: White solid. Yield: 59%. Purity: 95%. LC$_{tR}$ = 1.92 min. MS (ESI−): m/z = 499 [M − H]⁻.<br>¹H NMR, 300 MHz, DMSO-d$_6$, δ (ppm): 9.27 (br, 1H), 8.97 (dd, J = 0.6 and 1.8 Hz, 1H), 8.60 (dd, J = 1.6 and 4.8 Hz, 1H), 8.14 (ddd, J = 1.6, 2.4 and 8.0 Hz, 1H), 8.10 (s, 1H), 7.68 (d, J = 3.9 Hz, 1H), 7.61 (d, J = 3.9 Hz, 1H), 7.50 (ddd, J = 0.6, 4.8 and 8.0 Hz, 1H), 6.90 (d, J = 8.5 Hz, 2H), 6.61 (d, J = 8.5 Hz, 2H), 5.20 (t, J = 7.9 Hz, 1H), 4.19 (s, 2H), 3.21 (dd, J = 7.7 and 14.0 Hz, 1H), 3.09 (dd, J = 8.4 and 14.0 Hz, 1H).<br>¹³C NMR, 75 MHz, DMSO-d$_6$, δ (ppm): 163.8, 156.2, 149.8, 146.6, 145.2, 143.1, 141.0, 133.4, 132.7, 129.9, 128.4, 125.7, 125.3, 124.2, 122.2, 115.1, 62.0, 38.3, 36.8.<br>HRMS − ESI+ (m/z): calcd for C$_{21}$H$_{21}$N$_6$O$_6$S$_2$ [M + H]⁺: 501.1015, found: 501.1001. | |
| 30  (3R)-4-(1H-indol-3-yl)-3-[5-[[(5-phenyl-2-thienyl)sulfonylamino]methyl]triazol-1-yl]butanehydroxamic acid | D |
| 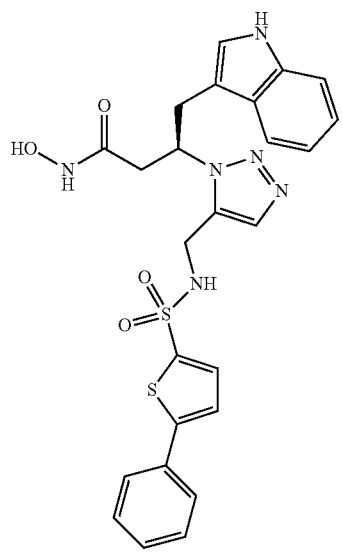 [SMILES: O=C(C[C@@H](Cc1c[nH]c2ccccc12)n1nncc1CNS(=O)(=O)c1ccc(-c2ccccc2)s1)NO]<br>Aspect: Yellow solid. Yield: 84%. Purity: 99%. LC$_{tR}$ = 2.62 min. MS (ESI+): m/z = 537 [M + H]⁺.<br>¹H NMR, 300 MHz, DMSO-d$_6$, δ (ppm): 10.87 (br s, 1H), 8.79 (br s, 1H), 7.75-7.71 (m, 2H), 7.54-7.29 (m, 8H), 7.06-7.00 (m, 1H), 6.95-6.90 (m, 1H), 6.87 (d, J = 2.3 Hz, 1H), 5.03-4.92 (m, 1H), 3.85 (d, J = 15.4 Hz, 1H), 3.71 (d, J = 15.5 Hz, 1H), 3.20-3.12 (m, 2H), 2.94-2.71 (m, 2H).<br>¹³C NMR, 75 MHz, DMSO-d$_6$, δ (ppm): 166.0, 149.5, 138.6, 136.0, 133.8, 133.1, 132.2, 131.9, 129.4, 129.2, 126.8, 126.0, 124.1, 123.8, 121.1, 118.6, 117.9, 111.5, 109.2, 56.0, 37.1, 35.5, 31.0.<br>HRMS − ESI+ (m/z): calcd for C$_{25}$H$_{25}$N$_6$O$_4$S$_2$ [M + H]⁺: 537.1394; found: 537.1379. | |
| 31  (3S)-4-(4-hydroxyphenyl)-3-[5-[[(5-phenyl-2-thienyl)sulfonylamino]methyl]triazol-1-yl]butanehydroxamic acid | D |

| Compound of formula (I) | Synthesis route |
|---|---|

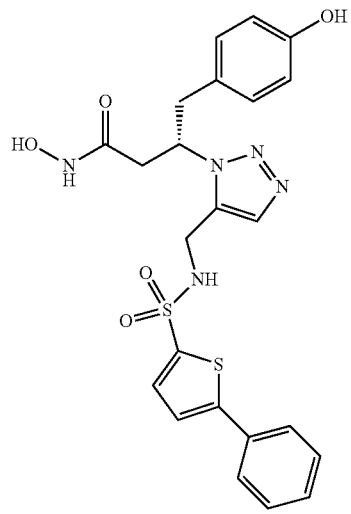 [SMILES: O=C(C[C@H](Cc1ccc(O)cc1)n1nncc1CNS(=O)(=O)c1ccc(-c2ccccc2)s1)NO]

Aspect: White solid. Yield: 53%. Purity: 99%. LC$_{tR}$ = 2.37 min. MS (ESI+): m/z = 514 [M + H]$^+$.

$^1$H NMR, 300 MHz, MeOD-d$_4$, δ (ppm): . 71-7.67 (m, 2H), 7.53 (d, J = 3.9 Hz, 1H), 7.48-7.40 (m, 4H), 7.37 (s, 1H), 6.71 (d, J = 8.6 Hz, 2H), 6.61 (d, J = 8.6 Hz, 2H), 4.97-4.91 (m, 1H), 3.97-3.82 (m, 2H), 3.14-2.97 (m, 3H), 2.84 (dd, J = 4.9 and 15.3 Hz, 1H).

$^{13}$C NMR, 75 MHz, MeOD-d$_4$, δ (ppm): 168.7, 157.7, 152.4, 140.0, 136.3, 134.7, 134.0, 133.2, 131.1, 130.4, 130.2, 128.6, 127.2, 124.6, 116.5, 59.3, 41.9, 38.4, 36.5.

HRMS – ESI+ (m/z): calcd for C$_{23}$H$_{24}$N$_5$O$_5$S$_2$ [M + H]$^+$: 514.1226; found: 514.1219.

| 32 | (S)-N-hydroxy-4-(4-hydroxyphenyl)-3-(4-((N-methyl-5-phenylthiophene-2-sulfonamido)methyl)-1H-1,2,3-triazol-1-yl)butanamide | D |

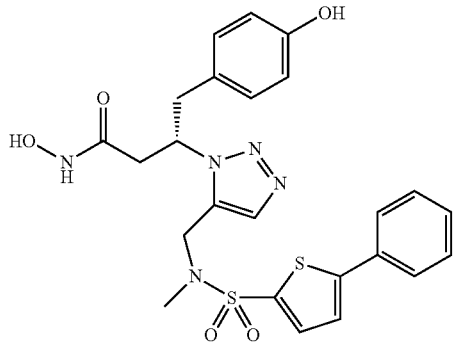 [SMILES: CN(Cc1cnnn1[C@H](CC(=O)NO)Cc1ccc(O)cc1)S(=O)(=O)c1ccc(-c2ccccc2)s1]

Aspect: White solid. Yield: 74%. Purity: 99%. LC$_{tR}$ = 3.98 min. MS (ESI–): m/z = 526 [M – H]$^-$.

$^1$H NMR, 300 MHz, MeOD-d$_4$, δ (ppm): 7.74-7.71 (m, 2H), 7.60 (t, J = 3.9 Hz, 1H), 7.52-7.41 (m, 5H), 6.82-6.80 (m, 2H), 6.64-6.61 (m, 2H), 5.21-5.12 (m, 1H), 4.17 (d, J = 14.9 Hz, 1H), 3.78 (d, J = 14.9 Hz, 1H), 3.17 (d, J = 7.5 Hz, 2H) 3.07-2.98 (m, 1H), 2.88-2.82 (m, 1H), 2.35 (s, 3H).

$^{13}$C NMR, 75 MHz, MeOD-d$_4$, δ (ppm): 168.7, 157.6, 153.0, 135.5, 135.2, 135.0, 134.2, 133.9, 131.5, 130.4, 130.4, 128.6, 127.3, 125.0, 116.4, 59.1, 44.0, 41.9, 38.9, 35.2.

HRMS – ESI+ (m/z): calcd for C$_{24}$H$_{26}$N$_5$O$_4$S$_2$ [M + H]$^+$: 528.1375. found 528.1375.

| 33 | (3S)-4-(4-hydroxyphenyl)-3-[5-[[[5-(2-pyridyl)-2-thienyl]sulfonylamino]methyl]triazol-1-yl]butanehydroxamic acid | D |

| Compound of formula (I) | Synthesis route |
|---|---|
| 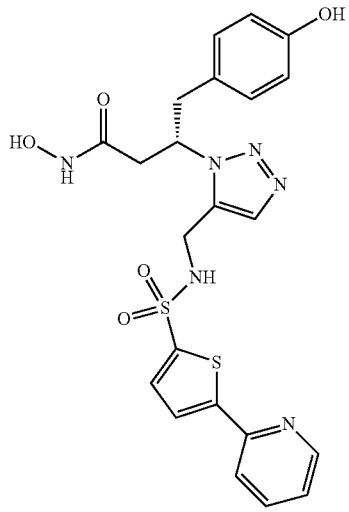 [SMILES: O=C(C[C@H](Cc1ccc(O)cc1)n1nncc1CNS(=O)(=O)c1ccc(-c2ccccn2)s1)NO]<br><br>Aspect: White solid. Yield: 34%. Purity: 99%. LC$_{tR}$ = 2.07 min. MS (ESI+): m/z = 515 [M + H]$^+$.<br>$^1$H NMR, 300 MHz, DMSO-d$_6$, δ (ppm): 10.54 (br s, 1H), 9.26 (s, 1H), 8.79 (br s, 1H), 8.60 (ddd, J = 0.9, 1.7 and 4.8 Hz, 1H), 8.38 (br s, 1H), 8.07 (dt, J = 1.0 and 7.9 Hz, 1H), 7.92 (td, J = 1.8 and 11.5 Hz, 1H), 7.85 (d, J = 4.0 Hz, 1H), 7.55 (d, J = 4.0 Hz, 1H), 7.41 (ddd, J = 1.0, 4.8 and 7.5 Hz, 1H), 6.75-6.72 (m, 2H), 6.59-6.57 (m, 2H), 4.86- 4.76 (m, 1H), 3.92-3.82 (m, 2H), 3.03 (dd, J = 6.2 and 13.6 Hz, 1H), 2.93 (dd, J = 8.7 and 13.6 Hz, 1H), 2.85 (dd, J = 10.1 and 15.5 Hz, 1H), 2.65 (dd, J = 4.5 and 15.5 Hz, 1H).<br>$^{13}$C NMR, 75 MHz, DMSO-d$_6$, δ (ppm): 165.8, 156.1, 150.4, 150.3, 149.7, 141.0, 137.6, 133.7, 133.1, 131.9, 129.8, 126.8, 125.0, 123.9, 119.4, 115.2, 56.7, 40.2, 36.8, 35.4.<br>HRMS – ESI+ (m/z): calcd for C$_{22}$H$_{23}$N$_6$O$_5$S$_2$ [M + H]$^+$: 515.1171; found: 515.1181.<br>34  (2S)-3-(4-hydroxyphenyl)-2-[5-[[(5-phenyl-2-thienyl)sulfonylamino]methyl]triazol-1-yl]propanehydroxamic acid | D |
| 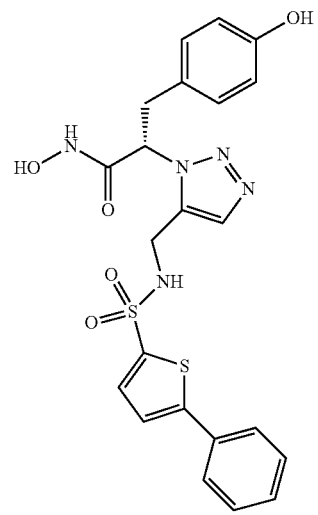 [SMILES: O=C(NO)[C@H](Cc1ccc(O)cc1)n1nncc1CNS(=O)(=O)c1ccc(-c2ccccc2)s1]<br><br>Aspect: White solid. Yield: 28%. Purity: 98%. LC$_{tR}$ = 2.60 min. MS (ESI–): m/z = 512 [M – H]$^−$.<br>$^1$H NMR, 300 MHz, DMSO-d$_6$, δ (ppm): 9.31 (br, 1H), 8.11 (s, 1H), 7.74-7.71 (m, 2H), 7.58 (d, J = 3.9 Hz, 1H), 7.54 (d, J = 3.9 Hz, 1H), 7.49-7.38 (m, 3H), 7.04-7.01 (m, 2H), 6.79-6.76 (m, 2H), 5.24 (t, J = 8 Hz, 1H), 4.17 (s, 2H), 3.68 (m, 3H), 3.26 (dd, J = 7.3 and 13.8 Hz, 1H), 3.16 (dd, J = 8.3 and 13.8 Hz, 1H).<br>$^{13}$C NMR, 75 MHz, DMSO-d$_6$, δ (ppm): 163.7, 156.6, 155.5, 150.4, 150.1, 149.7, 143.3, 142.1, 137.5, 132.7, 130.8, 130.6, 130.1, 124.9, 123.8, 123.5, 122.3, 119.4, 118.6, 118.5, 61.7, 38.3, 36.7.<br>HRMS – ESI+ (m/z): calcd for C$_{23}$H$_{23}$N$_5$O$_5$S$_2$ [M + H]$^+$: 514.1219; found: 514.1218.<br>35  (2R)-3-(4-hydroxyphenyl)-2-[5-[[(5-phenyl-2-thienyl)sulfonylamino]methyl]triazol-1-yl]propanehydroxamic acid | D |

| Compound of formula (I) | Synthesis route |
|---|---|

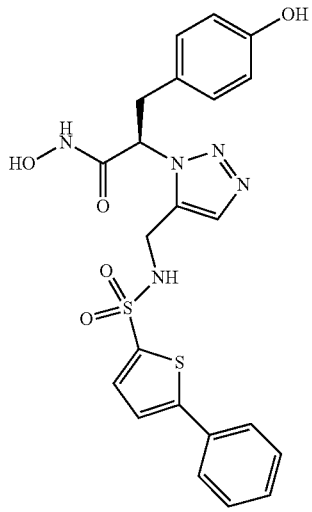 [SMILES: O=C(NO)[C@@H](Cc1ccc(O)cc1)n1nncc1CNS(=O)(=O)c1ccc(-c2ccccc2)s1]

Aspect: White solid. Yield: 17%. Purity: 98%. LC$_{tR}$ = 2.30 min. MS (ESI−): m/z = 498 [M + H]⁻.
¹H NMR, 500 MHz, DMSO-d$_4$, δ (ppm): 11.13 (br s, 1H), 9.35 (s, 1H), 9.17 (s, 1H), 7.73 (d, J = 7.2 Hz, 2H), 7.55 (d, J = 3.4 Hz, 2H), 7.49-7.42 (m, 4H), 6.94 (d, J = 9.7 Hz, 2H), 6.62 (d, J = 7.9 Hz, 2H), 5.21 (t, J = 7.3 Hz, 1H), 4.21 (d, J = 5.1 Hz, 2H), 3.79 (br s, 1H), 3.60-3.50 (m, 1H), 3.21 (dd, J = 8.6 and 13.5 Hz, 1H), 2.08 (s, 1H).
¹³C NMR, 125 MHz, MeOD-d$_4$, δ (ppm): 163.5, 156.2, 149.4, 139.1, 134.5, 133.1, 132.8, 132.2, 130.0, 129.4, 129.2, 126.1, 125.9, 124.1, 115.1, 60.7, 35.9, 35.7.

| 36 | (2S)-3-(4-methoxyphenyl)-2-[4-[[[5-(4-pyridyl)-2-thienyl]sulfonylamino]methyl]triazol-1-yl]propanehydroxamic acid | C |

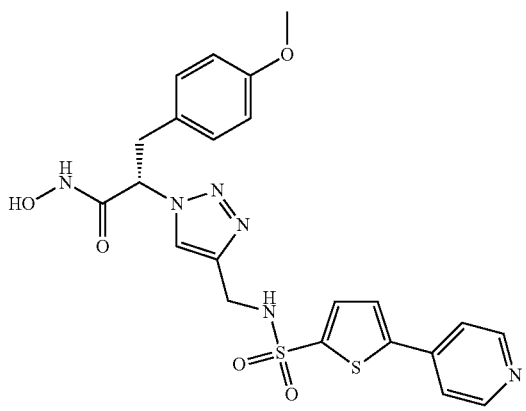 [SMILES: COc1ccc(C[C@@H](C(=O)NO)n2cc(CNS(=O)(=O)c3ccc(-c4ccncc4)s3)nn2)cc1]

Aspect: white amorphous solid. Yield: 34%. Purity: 100%, LC tr = 2.08 min. MS (ESI−): m/z = 513 [M − H]⁻.
HRMS − ESI+ (m/z): calcd for C$_{22}$H$_{23}$N$_6$O$_5$S$_2$ [M + H]⁺: 515.1171; found: 515.1182.
¹H NMR (DMSO-d$_6$, 300 MHz) δ: 11.08 (br, 1H), 9.21 (br, 1H), 8.64-8.62 (m, 2H), 8.56 (br, 1H), 8.11 (s, 1H), 7.82 (d, J = 3.9 Hz, 1H), 7.73-7.70 (m, 2H), 7.63 (d, J = 3.9 Hz, 1H), 7.03 (d, J = 8.7 Hz, 2H), 6.78 (d, J = 8.7 Hz, 2H), 5.23 (t, J = 8.0 Hz, 1H), 4.18 (s, 2H), 3.68 (s, 3H), 3.26 (dd, J = 7.3 and 13.9 Hz, 1H) and 3.15 (dd, J = 8.2 and 13.9 Hz, 1H).
¹³C NMR (DMSO-d$_6$, 75 MHz) δ: 163.8, 158.1, 150.6, 145.6, 143.1, 142.2, 139.2, 132.7, 130.0, 127.5, 126.7, 122.2, 119.9, 113.8, 61.9, 55.0, 38.3 and 36.6.

| 37 | (2S)-3-(1,3-benzodioxol-5-yl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

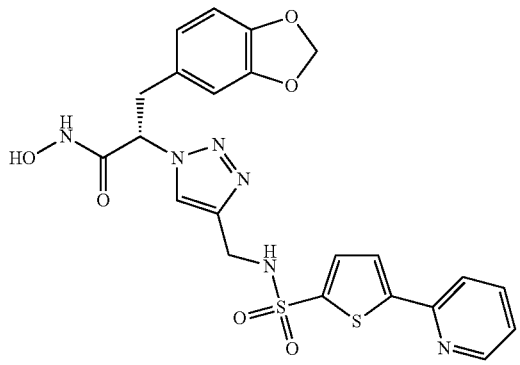 [SMILES: O=C(NO)[C@H](Cc1ccc2c(c1)OCO2)n1cc(CNS(=O)(=O)c2ccc(-c3ccccn3)s2)nn1]

Aspect: white amorphous solid. Yield: 77%. Purity: 96%, LC tr = 2.27min, MS (ESI−): m/z = 527 [M − H]⁻.

HRMS − ESI+ (m/z): calcd for $C_{22}H_{21}N_6O_6S_2$ [M + H]⁺: 529.0964; found: 529.0967.

¹H NMR (DMSO-$d_6$, 500 MHz) δ: 11.08 (s, 1H), 9.22 (s, 1H), 8.56 (ddd, J = 0.9, 1.8 and 4.8 Hz, 1H), 6.47 (t, J = 5.9 Hz, 1H), 8.09 (s, 1H), 8.02 (dt, J = 0.9 and 8.0 Hz, 1H), 7.88 (td, J = 1.8 and 7.6 Hz, 1H), 7.82 (d, J = 3.9 Hz, 1H), 7.59 (d, J = 3.9 Hz, 1H), 7.37 (ddd, J = 1.0, 4.8 and 7.6 Hz, 1H), 6.76 (d, J = 7.9 Hz, 1H), 7.71 (d, J = 1.6 Hz, 1H), 6.57 (dd, J = 1.6 and 7.9 Hz), 5.95 (s, 2H), 5.23 (t, J = 7.9 Hz, 1H), 4.15 (d, J = 5.9 Hz, 2H), 3.23 (dd, J = 7.6 and 13.9 Hz, 1H) and 3.13 (dd, J = 8.2 and 13.9 Hz, 1H).

¹³C NMR (DMSO-$d_6$, 75 MHz) δ: 163.6, 150.4, 150.0, 149.6, 147.1, 146.1, 143.2, 142.0, 137.5, 132.6, 129.3, 124.9, 123.7, 122.2 (2C), 119.3, 109.2, 108.1, 100.8, 61.8, 38.3 and 37.0.

| | | |
|---|---|---|
| 38 | (2S)-3-(4-methoxyphenyl)-2-[4-[[[5-(3-pyridyl)-2-thienyl]sulfonylamino]methyl]triazol-1-yl]propanehydroxamic acid | C |

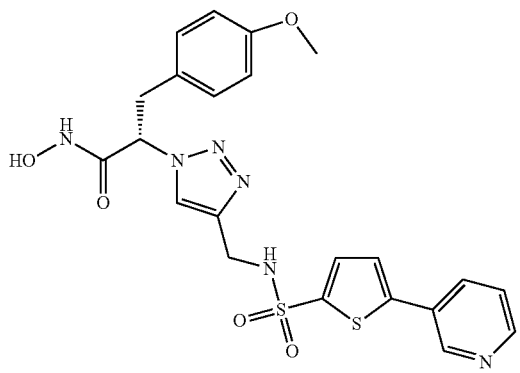 [SMILES: COc1ccc(C[C@@H](C(=O)NO)n2cc(CNS(=O)(=O)c3ccc(-c4cccnc4)s3)nn2)cc1]

Aspect: white amorphous solid. Yield: 52%. Purity: 100%, LC tr = 2.13min, MS (ESI−): m/z = 513 [M − H]⁻.

HRMS − ESI+ (m/z): calcd for $C_{22}H_{23}N_6O_5S_2$ [M + H]⁺: 515.1171; found: 515.1164.

¹H NMR (DMSO-$d_6$, 300 MHz) δ: 11.08 (br, 1H), 9.21 (br, 1H), 8.96 (dd, J = 0.8 and 2.4 Hz, 1H), 8.58 (dd, J = 1.5 and 4.7 Hz, 1H), 8.13 (m, 2H), 7.67 (d, J = 3.9 Hz, 1H), 7.61 (d, J = 3.9 Hz, 1H), 7.49 (ddd, J = 0.8, 4.8 and 8 Hz, 1H), 7.03 (d, J = 8.7 Hz, 2H), 6.78 (d, J = 8.7 Hz, 2H), 5.23 (t, J = 8.0 Hz, 1H), 4.18 (s, 2H), 3.68 (s, 3H), 3.26 (dd, J = 7.3 and 13.9 Hz, 1H) and 3.16 (dd, J = 8.5 Hz, 1H).

¹³C NMR (DMSO-$d_6$, 75 MHz) δ: 163.7, 158.1, 149.8, 146.6, 145.3, 143.2, 140.9, 133.4, 132.7, 130.0, 128.4, 127.5, 125.3, 124.2, 122.2, 113.7, 61.9, 54.9, 38.3 and 36.6.

| | | |
|---|---|---|
| 39 | (2S)-3-(3-chloro-4-hydroxy-phenyl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

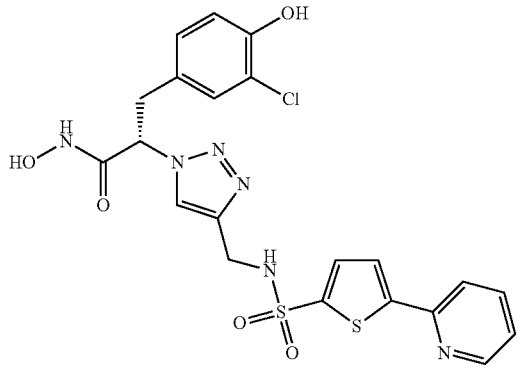 [SMILES: O=C(NO)[C@H](Cc1ccc(O)c(Cl)c1)n1cc(CNS(=O)(=O)c2ccc(-c3ccccn3)s2)nn1]

Aspect: white amorphous solid. Yield: 30%. Purity: 98%, LC tr = 2.18min, MS (ESI−): m/z = 533 [M − H]⁻.

HRMS − ESI+ (m/z): calcd for $C_{21}H_{20}N_6O_5S_2Cl$ [M + H]⁺: 535.0625; found: 535.0619.

¹H NMR (DMSO-$d_6$, 300 MHz) δ: 11.03 (br, 1H), 10.03 (br, 1H), 9.21 (br, 1H), 8.56 (ddd, J = 4.8, 1.6 and 0.9 Hz, 1H), 8.08 (s, 1H), 8.02 (dt, J = 0.9 and 8 Hz, 1H), 7.88 (td, J = 7.6 and 1.6 Hz, 1H), 7.81 (d, J = 4 Hz, 1H), 7.58 (d, J = 4 Hz, 1H), 7.36 (ddd, J = 1, 4.8 and 7.5 Hz, 1H), 7.12 (d, J = 1.9 Hz, 1H), 6.84 (dd, J = 8.3 Hz, 1H), 6.79 (d, J = 8.3 Hz, 1H), 5.20 (t, J = 7.9 Hz, 1H), 4.16 (s, 2H), 3.21 (dd, J = 7.5 and 13.8 Hz, 1H) and 3.09 (dd, J = 8 and 13.8 Hz).

¹³C NMR (DMSO-$d_6$, 75 MHz) δ: 163.6, 151.9, 150.4, 150.0, 149.7, 143.3, 142.1, 137.5, 132.6, 130.2, 128.6, 127.4, 124.9, 123.7, 122.2, 119.3 (2C), 116.4, 61.7, 36.6 and 36.2.

| 40 | (2S)-3-(3-chloro-4-hydroxy-phenyl)-2-[4-[[(5-phenyl-2-thienyl)sulfonylamino]methyl]triazol-1-yl]propanehydroxamic acid | B |

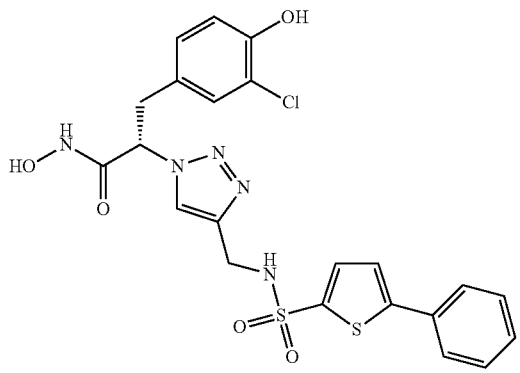 [SMILES: O=C(NO)[C@H](Cc1ccc(O)c(Cl)c1)n1cc(CNS(=O)(=O)c2ccc(-c3ccccc3)s2)nn1]

Aspect: white amorphous solid. Yield: 46%. Purity: 100%, LC tr = 2.47min, MS (ESI−): m/z = 532 [M − H]⁻.

HRMS − ESI+ (m/z): calcd for $C_{22}H_{21}N_5O_5S_2Cl$ [M + H]⁺: 534.0673; found: 534.0682.

¹H NMR (DMSO-$d_6$, 300 MHz) δ: 11.01 (br, 1H), 10.04 (br, 1H), 8.46 (br, 1H), 8.09 (s, 1H), 7.70-7.74 (m, 2H), 7.56 (d, J = 3.9 Hz, 1H), 7.54 (d, J = 3.9 Hz, 1H), 7.37-7.49 (m, 3H), 7.13 (d, J = 1.9 Hz, 1H), 6.85 (dd, J = 1.9 and 8.3 Hz, 1H), 6.79 (d, J = 8.3 Hz, 1H), 5.21 (t, J = 8 Hz, 1H), 4.17 (s, 2H), 3.22 (dd, J = 7.4 and 13.7 Hz, 1H) and 3.11 (dd, J = 8.1 and 13.7 Hz, 1H).

¹³C NMR (DMSO-$d_6$, 75 MHz) δ: 163.6, 161.9, 149.0, 143.3, 139.6, 132.6, 132.2, 130.0, 129.4, 129.1, 128.6, 127.4, 125.9, 124.0, 122.2, 119.3, 116.4, 61.7, 38.3 and 36.2.

| 41 | (2S)-3-(3,4-dimethoxyphenyl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

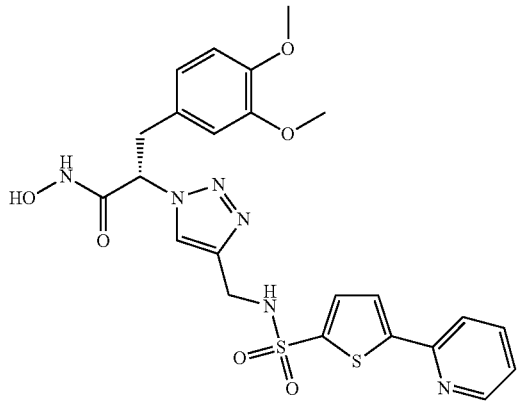 [SMILES: COc1ccc(C[C@@H](C(=O)NO)n2cc(CNS(=O)(=O)c3ccc(-c4ccccn4)s3)nn2)cc1OC]

Aspect: white amorphous solid. Yield: 31%. Purity: 100%, LC tr = 2.20min, MS (ESI−): m/z = 543 [M − H]⁻.

HRMS − ESI+ (m/z): calcd for $C_{23}H_{25}N_6O_6S_2$ [M + H]⁺: 545.1277; found: 545.1265.

¹H NMR (DMSO-d₆, 300 MHz) δ: 11.07 (br, 1H), 9.21 (br, 1H), 8.57 (ddd, J = 4.8, 1.7 and 1.0 Hz, 1H), 8.48 (br, 1H), 8.13 (s, 1H), 8.03 (dt, J = 1.0 and 8 Hz, 1H), 7.89 (dt, J = 1.7 and 7.5 Hz, 1H), 7.83 (d, J = 4 Hz, 1H), 7.59 (d, J = 4 Hz, 1H), 7.37 (ddd, J = 1.0, 4.8 and 7.5 Hz, 1H), 6.79 (d, J = 8.3 Hz, 1H), 6.70 (d, J = 1.9 Hz, 1H), 6.63 (dd, J = 1.9 and 8.3 Hz, 1H), 5.25 (t, J = 8 Hz ,1H), 4.17 (s, 2H), 3.69 (s, 3H), 3.68 (s, 3H), 3.25 (dd, J = 7.5 and 13.8 Hz, 1H) and 3.14 (dd, J = 8.3 and 13.8 Hz, 1H).

¹³C NMR (DMSO-d₆, 75 MHz) δ: 163.8, 150.4, 150.0, 149.7, 148.4, 147.7, 143.3, 142.0, 137.5, 132.6, 128.0, 124.9, 123.8, 122.2, 121.0, 119.3, 112.6, 111.6, 61.9, 55.4 (2C), 38.3, and 37.1.

| 42 | (2S)-3-(3,4-dimethoxyphenyl)-2-[4-[[(5-phenyl-2-thienyl)sulfonylamino]methyl]triazol-1-yl]propanehydroxamic acid | B |

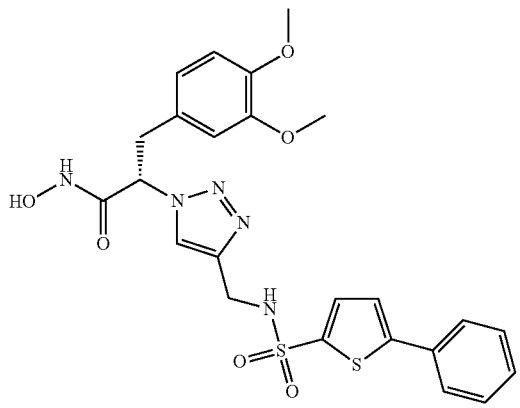 [SMILES: COc1ccc(C[C@@H](C(=O)NO)n2cc(CNS(=O)(=O)c3ccc(-c4ccccc4)s3)nn2)cc1OC]

Aspect: white amorphous solid. Yield: 24%. Purity: 100%, LC tr = 2.47min, MS (ESI−): m/z = 542 [M − H]⁻.

HRMS − ESI+ (m/z): calcd for $C_{24}H_{26}N_5O_6S_2$ [M + H]⁺: 544.1325; found: 544.1313.

¹H NMR (DMSO-d₆, 300 MHz) δ: 11.09 (br, 1H), 9.20 (br, 1H), 8.47 (br, 1H), 8.14 (s, 1H), 7.74-7.71 (m, 2H), 7.58 (d, J = 3.9 Hz, 1H), 7.55 (d, J = 3.9 Hz, 1H), 7.49-7.37 (m, 3H), 6.79 (d, J = 8.3 Hz, 1H), 6.70 (d, J = 1.9 Hz, 1H), 6.63 (dd, J = 1.9 and 8.3 Hz, 1H), 5.26 (t, J = 7.9 Hz, 1H), 4.2 (s, 2H), 3.68 (s, 3H), 3.67 (s, 3H), 3.27 (dd, J = 7.3 and 14 Hz, 1H), 3.16 (dd, J = 8.3 and 14 Hz, 1H).

¹³C NMR (DMSO-d₆, 75 MHz) δ: 163.8, 149.1, 148.4, 147.7, 143.3, 139.6, 132.8, 132.2, 129.4, 129.1, 128.0, 125.9, 124.0, 12.3, 121.0, 112.6, 111.6, 61.9, 55.4 (2C) 38.3, 37.1.

| 43 | 3-[5-[[1-[(1S)-2-(hydroxyamino)-1-[(4-methoxyphenyl)methyl]-2-oxo-ethyl]triazol-4-yl]methylsulfamoyl]-2-thienyl]-N-methyl-benzamide | C |

| Compound of formula (I) | Synthesis route |
|---|---|
| 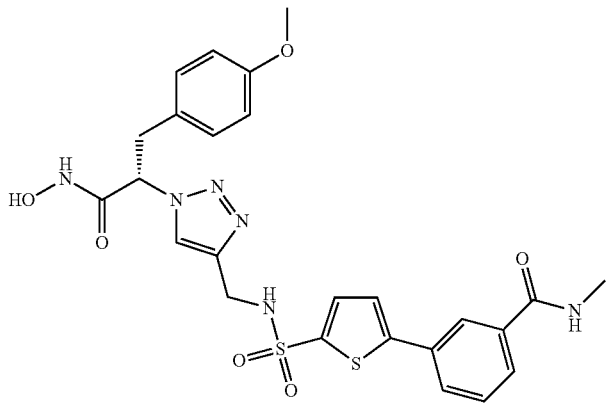 [SMILES: CNC(=O)c1cccc(-c2ccc(S(=O)(=O)NCc3cn([C@@H](Cc4ccc(OC)cc4)C(=O)NO)nn3)s2)c1]<br>Aspect: white amorphous solid. Yield: 46%. Purity (LC-MS): 96%, LC tr = 2.18 min, MS (ESI−):m/z = 569 [M − H]⁻. HRMS (ESI +): Mass calculated for $C_{25}H_{27}N_6O_6S_2$: 571.1434, Experimental Mass: 571.1422<br>¹H NMR (DMSO, 300 MHz) δ: 11.09 (br, 1H),9.20 (br, 1H), 8.49 (br, 1H), 8.6 (q, J = 4.5 Hz, 1H), 8.15 (t, J = 1.6 Hz, 1H), 8.11 (s, 1H), 7.88-7.83 (m, 2H), 7.63 (d, J = 4.0, 1H), 7.61 (d, J = 4.0 Hz, 1H), 7.55 (t, J = 7.8 Hz, 1H), 7.03 (d, J = 8.7, 2H), 6.78 (d, J = 8.7 Hz, 2H), 5.24 (t, J = 7.9 Hz, 1H), 4.18 (s, 2H), 3.69 (s, 3H), 3.27 (dd, J = 7.4 and 13.9 Hz, 1H), 3.15 (dd, J = 8.3 and 13.9 Hz, 1H) and 2.81 (d, J = 4.5 Hz, 3H).<br>¹³C NMR (DMSO, 75 MHz) δ: 166.3, 164.2, 158.6, 148.8, 143.7, 140.6, 135.9, 133.2, 132.8, 130.5,130.0, 128.8, 128.2, 128.0, 125.1, 124.8, 122.7, 114.2, 62.3, 55.4, 38.6, 37.1 and 26.7. | |
| 44  (2S)-3-(3-fluoro-4-hydroxy-phenyl)-2-[4-[[[5-(2-pyridyl)-2-thienyl]sulfonylamino]methyl]triazol-1-yl]propanehydroxamic acid | B |
| 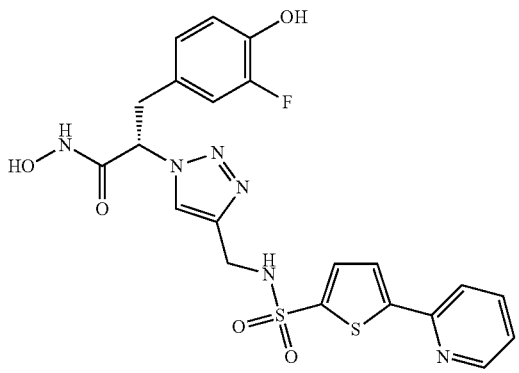 [SMILES: O=C(NO)[C@H](Cc1ccc(O)c(F)c1)n1cc(CNS(=O)(=O)c2ccc(-c3ccccn3)s2)nn1]<br>Aspect: white amorphous solid. Yield: 38%. Purity: 96%, LC tr = 2.10 min, MS (ESI−): m/z = 517 [M − H]⁻.<br>HRMS − ESI+ (m/z): calcd for $C_{21}H_{20}N_6O_5S_2F$ [M + H]⁺: 519.0921; found: 519.0919.<br>¹H NMR (300 MHz, DMSO-d₆) δ: 8.57 (ddd, J = 0.9, 1.7 and 4.8 Hz, 1H), 8.08 (s, 1H), 8.02 (dt, J = 1.0 and 8.0 Hz, 1H), 7.88 (td, J = 1.7 and 7.6 Hz, 1H), 7.82 (d, J = 4.0 Hz, 1H), 7.58 (d, J = 4.0 Hz, 1H), 7.36 (ddd, J = 1.0, 4.8 and 7.5 Hz, 1H), 6.90 (dd, J = 1.0 and 12.3 Hz, 1H), 6.77 (q, J = 8.3 Hz, 1H), 6.70 (dd, J = 1.0 and 8.3 Hz, 1H), 5.21 (t, J = 7.9 Hz, 1H), 4.16 (s, 2H), 3.22 (dd, J = 7.7 and 13.9 Hz, 1H) and 3.10 (dd, J = 8.1 and 13.9 Hz, 1H).<br>¹⁹F NMR (282, DMSO-d₆) δ: − 136.96.<br>¹³C NMR (75, DMSO-d₆) δ: 163.6, 150.6 (d, J = 240.4 Hz), 150.4, 150.0, 149.7, 143.6 (d, J = 12.0 Hz), 143.3,142.0, 137.5, 132.6, 126.9 (d, J = 6.0 Hz), 125.1 (d, J = 2.9 Hz), 124.9, 123.7, 122.2, 119.3, 117.6 (d, J = 3.2 Hz), 116.6 (d, J = 18.1 Hz), 61.7, 38.3 and 36.4. | |
| 45  (2S)-3-(3-fluoro-4-hydroxy-phenyl)-2-[4-[[[(5-phenyl-2-thienyl)sulfonylamino]methyl]triazol-1-yl]propanehydroxamic acid | B |

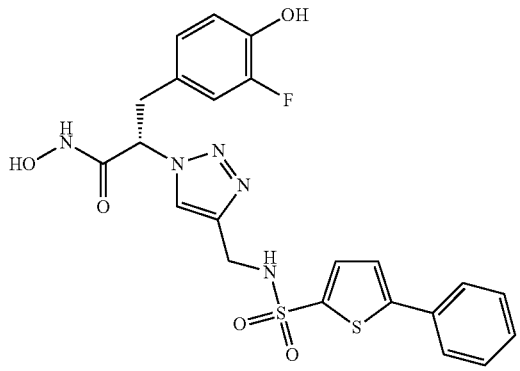 [SMILES: O=C(NO)[C@H](Cc1ccc(O)c(F)c1)n1cc(CNS(=O)(=O)c2ccc(-c3ccccc3)s2)nn1]

Aspect: white amorphous solid. Yield: 28%. Purity: 98%, LC tr = 2.4 min, MS (ESI−): m/z = 516 [M − H]⁻.

HRMS − ESI+ (m/z):calcd for $C_{22}H_{21}N_5O_5S_2F$ [M + H]⁺: 518.0968; found: 518.0965.

¹H NMR (300 MHz, DMSO-$d_6$) δ: 8.09 (s, 1H), 7.74-7.70 (m, 2H), 7.56 (d, J = 3.9 Hz, 1H), 7.54 (d, J = 3.9 Hz, 1H), 7.49-7.37 (m, 3H), 6.90 (dd, J = 2.0 and 12.4 Hz, 1H), 6.77 (q, J = 8.3 Hz, 1H), 6.71 (dd, J = 2.0 and 8.4 Hz, 1H), 5.21 (t, J = 7.8 Hz, 1H), 4.16 (s, 2H), 3.23 (dd, J = 7.3 and 13.7 Hz, 1H) and 3.12 (dd, J = 8.2 and 13.7 Hz, 1H).

¹⁹F NMR (75 MHz, DMSO-$d_6$) δ: − 136.96.

¹³C NMR (75 MHz, DMSO-$d_6$) δ: 163.6, 150.6 (d, J = 240.4 Hz), 149.1, 143.6 (d, J = 12.1 Hz), 143.3, 139.6, 132.8, 132.2, 129.4, 129.09, 126.9 (d, J = 6.1 Hz), 125.9, 125.1 (d, J = 3.0 Hz), 124.0, 122.2, 117.6 (d, J = 3.0 Hz), 116.6 (d, J = 18.2 Hz), 61.7, 38.4 and 36.4.

| 46 | (2S)-3-(4-methoxyphenyl)-2-[4-[[methyl-[[5-(2-pyridyl)-2-thienyl]sulfonyl]amino]methyl]triazol-1-yl]propanehydroxamic acid | B |

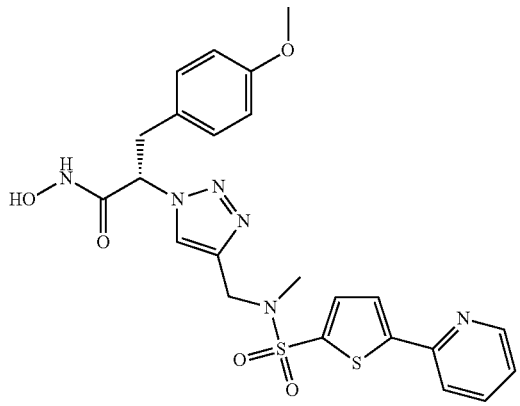 [SMILES: COc1ccc(C[C@@H](C(=O)NO)n2cc(CN(C)S(=O)(=O)c3ccc(-c4ccccn4)s3)nn2)cc1]

Aspect: white amorphous solid. Yield: 63%. Purity: 100%, LC tr = 2.48 min, MS (ESI+): m/z = 529 [M + H]+. HRMS m/z calculated for $C_{23}H_{25}N_6O_5S_2$ [M + H]+ 529.1328, found 529.1333.

¹H NMR (DMSO-$d_6$, 300 MHz) δ (ppm) 11.10 (br s, 1H), 9.22 (br s, 1H), 8.58 (ddd, J = 4.9, 1.7 and 0.9 Hz, 1H), 8.27 (s, 1H), 8.07 (ddd, J = 8.0, 1.0 and 0.9 Hz, 1H), 7.92 (d, J = 4.0 Hz, 1H), 7.91 (m,1H), 7.68 (d, J = 4.0 Hz, 1H), 7.39 (ddd, J = 7.5, 4.9 and 1.0 Hz, 1H), 7.04 (m, 2H), 6.78 (m, 2H), 5.28 (dd, J = 8.8 and 7.2 Hz, 1H), 4.33 (d, J = 14.6 Hz, 1H), 4.26 (d, J = 14.6 Hz, 1H), 3.68 (s, 3H), 3.26 (m, 2H), 2.68 (s, 3H).

¹³C NMR (DMSO-$d_6$, 75 MHz) δ (ppm) 163.8, 158.1, 150.9, 150.2, 149.7, 141.2, 137.6, 137.3, 133.6, 130.0 (2C), 127.5, 125.3, 123.9, 123.4, 119.4, 113.7 (2C), 62.0, 54.9, 44.9, 36.5, 34.7.

| 47 | (2S)-3-(4-methoxyphenyl)-2-[4-[(1S)-1-[[5-(2-pyridyl)-2-thienyl]sulfonylamino]ethyl]triazol-1-yl]propanehydroxamic acid | B |

|    | Compound of formula (I) | Synthesis route |
|----|------------------------|-----------------|

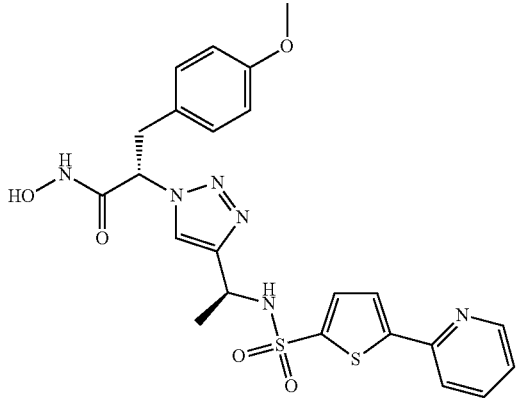 [SMILES: COc1ccc(C[C@@H](C(=O)NO)n2cc([C@H](C)NS(=O)(=O)c3ccc(-c4ccccn4)s3)nn2)cc1]

Aspect: white amorphous solid. Yield: 56%. Purity: 100%, LC tr = 2.33 min, MS (ESI−): m/z = 527 [M − H]⁻. HRMS m/z calculated for $C_{23}H_{25}N_6O_5S_2$ [M +H]+ 529.1328, found 529.1342.
¹H NMR (DMSO-$d_6$, 300 MHz) δ (ppm) 11.05 (br s, 1H), 9.17 (br s, 1H), 8.55 (ddd, J = 4.8, 1.7 and 0.9 Hz, 0.75H, maj), 8.53 (m, 0.25H, min), 7.99 (m, 2H), 7.86 (m, 1H), 7.78 (d, J = 4.0 Hz, 0.75H, maj), 7.75 (d, J = 4.0 Hz, 0.25H, min), 7.54 (d, J = 4.0 Hz, 0.75H, maj), 7.50 (d, J = 4.0 Hz, 0.25H, min), 7.36 (ddd, J = 7.5, 4.9 and 1.0 Hz, 0.75H, maj), 7.33 (m, 0.25H, min), 6.98 (m, 2H), 6.77 (m, 2H), 5.17 (m, 1H), 4.60 (m, 1H), 3.69 (s, 2.25H, maj), 3.68 (s, 0.75H, min), 3.19 (m, 2H), 1.33 (d, J = 6.9 Hz, 3H). (NH amide unobserved).
¹³C NMR (DMSO-$d_6$, 75 MHz) δ (ppm) 163.7, 158.1, 150.5 (0.75C, maj), 150.4 (0.25C, min), 149.8 (0.25C, min), 149.6 (0.75C, maj), 149.0 (0.25C, min), 148.8 (0.75C, maj), 143.4 (0.75C, maj), 143.2 (0.25C, min), 137.5, 132.5 (0.25C, min), 132.4 (0.75C, maj), 130.1 (1.5C, maj), 130.0 (0.5C, min), 127.5 (0.75C, maj), 127.4 (0.25C), 124.8 (0.75C, maj), 124.8 (0.25C, min), 123.7, 120.8, 119.3 (0.75C, maj), 119.3 (0.25C, min), 113.7 (2C), 61.8, 55.0, 46.2 (0.25C, min), 45.9 (0.75C, maj), 39.6, 21.9 (0.25C, min), 21.4 (0.75C, maj). Mixture of cis/transconformationnal isomers.

| 48 | (2S)-3-(4-methoxyphenyl)-2-[4-[(1R)-1-[[5-(2-pyridyl)-2-thienyl]sulfonylamino]ethyl]triazol-1-yl]propanehydroxamic acid | B |

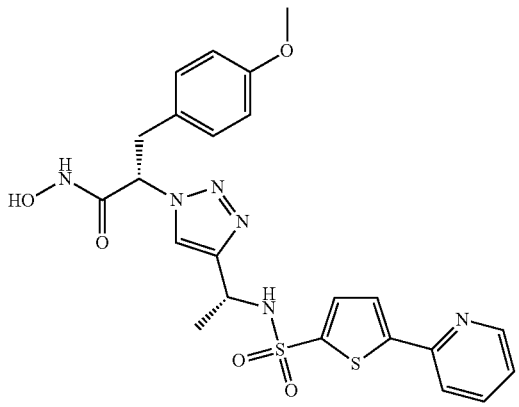 [SMILES: COc1ccc(C[C@@H](C(=O)NO)n2cc([C@@H](C)NS(=O)(=O)c3ccc(-c4ccccn4)s3)nn2)cc1]

Aspect: white amorphous solid. Yield: 88%. Purity: 100%, LC tr = 2.33 min, MS (ESI+): m/z = 529 [M + H]+. HRMS m/z calculated for $C_{23}H_{25}N_6O_5S_2$ [M +H]+ 529.1328, found 529.1363.
¹H NMR (DMSO-$d_6$, 300 MHz) δ (ppm) 11.09 (br s, 1H), 9.25 (br s, 1H), 8.53 (ddd, J = 4.8, 1.6 and 0.9 Hz, 0.3H, min), 8.52 (ddd, J = 4.9, 1.7 and 0.9 Hz, 0.7H, maj), 7.97 (m, 2H), 7.85 (m, 1H), 7.75 (d, J = 4.0 Hz, 0.3H, min), 7.72 (d, J = 4.0 Hz, 0.7H, maj), 7.53 (d, J = 4.0 Hz, 0.3H, min), 7.48 (d, J = 4.0 Hz, 0.7H, maj), 7.34 (m, 1H), 6.96 (m, 2H), 6.74 (m, 2H), 6.77 (m, 2H), 5.15 (m, 1H), 4.59 (m, 1H), 3.67 (s, 0.9H, min), 3.67 (s, 2.1H, maj), 3.10 (m, 2H), 1.32 (d, J = 7.0 Hz, 3H). (NH amide missing).
¹³C NMR (DMSO-$d_6$, 75 MHz) δ (ppm) 163.7, 158.1, 150.5 (0.7C, maj), 150.4 (0.3C, min), 149.8 (0.3C, min), 149.6 (0.7C, maj), 149.0 (0.3C, min), 148.8 (0.7C, maj), 143.4 (0.7C, maj), 143.2 (0.3C, min), 137.5, 132.5 (0.3C, min), 132.4 (0.7C, maj), 130.1 (1.5C, maj), 130.1 (1.4C, maj), 130.0 (0.6C, min), 127.5 (0.7C), 127.4 (0.3C, min), 124.8 (0.7C, maj), 124.8 (0.3C, min), 123.7, 120.8, 119.3 (0.7C, maj), 119.3 (0.3C, min), 113.7 (2C), 61.8, 55.0, 46.2 (0.3C, min), 45.9 (0.7C, maj), 39.6, 21.9 (0.3C, min), 21.4 (0.7C, maj). Mixture of cis/trans conformationnal isomers.

| 49 | (2S)-3-(3-methoxyphenyl)-2-[4-[[[5-(2-pyridyl)-2-thienyl]sulfonylamino]methyl]triazol-1-yl]propanehydroxamic acid | B |

| Compound of formula (I) | Synthesis route |
|---|---|

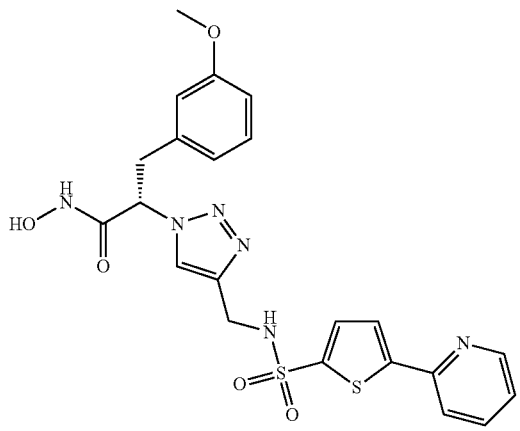 [SMILES: COc1cccc(C[C@@H](C(=O)NO)n2cc(CNS(=O)(=O)c3ccc(-c4ccccn4)s3)nn2)c1]

Aspect: white amorphous solid. Yield: 20%. Purity: 100%, LC tr = 2.32 min, MS (ESI+): m/z = 515 [M + H]⁺. HRMS m/z calculated for $C_{22}H_{23}N_6O_5S_2$ [M + H]+ 515.1171, found 515.1158.
$^1$H NMR (DMSO-$d_6$, 300 MHz) δ: 8.55 (ddd, J = 4.8, 1.8 and 1.0 Hz, 1H), 8.06 (s, 1H), 8.01 (ddd, J = 8.0, 1.0 and 1.0 Hz, 1H), 7.87 (ddd, J = 8.0, 7.6 and 1.8 Hz, 1H), 7.80 (d, J = 4.0 Hz, 1H), 7.54 (d, J = 4.0 Hz, 1H), 7.35 (ddd, J = 7.6, 4.8 and 1.0 Hz, 1H), 7.09 (m, 1H), 6.67 (m, 3H), 5.02 (dd, J = 7.7 and 7.5 Hz, 1H), 4.12 (s, 2H), 3.66 (s, 3H), 3.25 (dd, J = 13.9 and 7.5 Hz, 1H), 3.07 (dd, J = 13.9 and 7.7 Hz, 1H).
$^{13}$C NMR (DMSO-$d_6$, 75 MHz) δ: 163.6, 159.0, 150.6, 149.6, 149.5, 143.1, 142.9, 138.7, 137.5, 132.2, 129.1, 124.9, 123.6, 121.9, 121.2, 119.3, 114.4, 112.0, 63.3, 54.8, 38.9, 38.6.

| 50 | (2S)-3-(2-methoxyphenyl)-2-[4-[[[5-(2-pyridyl)-2-thienyl]sulfonylamino]methyl]triazol-1-yl]propanehydroxamic acid | B |
|---|---|---|

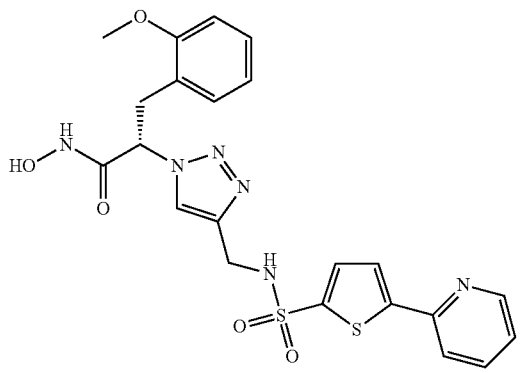 [SMILES: COc1ccccc1C[C@@H](C(=O)NO)n1cc(CNS(=O)(=O)c2ccc(-c3ccccn3)s2)nn1]

Aspect: white amorphous solid. Yield: 11%. Purity: 100%, LC tr = 2.33 min, MS (ESI+): m/z = 515 [M + H]⁺. HRMS m/z calculated for $C_{22}H_{23}N_6O_5S_2$ [M + H]+ 515.1171, found 515.1153.
$^1$H NMR (DMSO-$d_6$, 300 MHz) δ: 11.14 (brs, 1H), 9.17 (brs, 1H), 8.55 (ddd, J = 4.9, 1.7 and 0.9 Hz, 1H), 8.44 (brs, 1H), 8.07 (s, 1H), 8.01 (ddd, J = 7.7, 1.0 and 0.9 Hz, 1H), 7.87 (ddd, J = 7.7, 7.5 and 1.7 Hz, 1H), 7.81 (d, J = 4.0 Hz, 1H), 7.59 (d, J = 4.0 Hz, 1H), 7.35 (ddd, J = 7.5, 4.9 and 1.0 Hz, 1H), 7.18 (ddd, J = 8.3, 7.4 and 1.7 Hz, 1H), 6.94 (m, 2H), 6.76 (ddd, J = 7.6, 7.4 and 1.0 Hz, 1H), 5.34 (t, J = 7.6 Hz, 1H), 4.15 (s, 2H), 3.78 (s, 3H), 3.22 (dd, J = 13.6 and 7.6 Hz, 1H), 3.17 (dd, J = 13.6 and 7.6 Hz, 1H).
$^{13}$C NMR (DMSO-$d_6$, 75 MHz) δ: 163.8, 157.3, 150.4, 150.1, 149.6, 143.3, 142.0, 137.5, 132.6, 130.6, 128.6, 124.9, 123.7, 123.2, 122.0, 120.2, 119.3, 110.6, 59.8, 55.4, 38.3, 32.8.

| 51 | (2S)-3-[4-(2-methoxyethoxy)phenyl]-2-[4-[[[5-(2-pyridyl)-2-thienyl]sulfonylamino]methyl]triazol-1-yl]propanehydroxamic acid | B |
|---|---|---|

| Compound of formula (I) | Synthesis route |
|---|---|

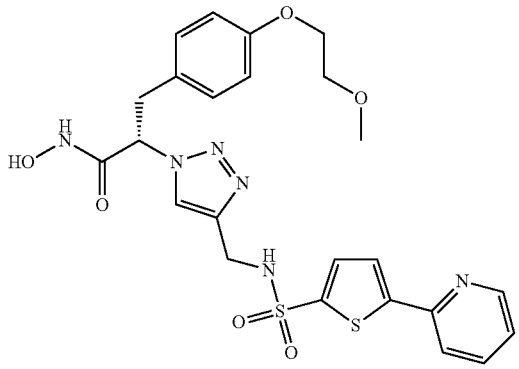 [SMILES: COCCOc1ccc(C[C@@H](C(=O)NO)n2cc(CNS(=O)(=O)c3ccc(-c4ccccn4)s3)nn2)cc1]

Aspect: white amorphous solid. Yield: 46%. Purity: 100%, LC tr = 2.28 min, MS (ESI+): m/z = 559 [M + H]$^+$. HRMS m/z calculated for $C_{24}H_{27}N_6O_6S_2$ [M + H]+ 559.1434, found 559.1430.

$^1$H NMR (DMSO-$d_6$, 300 MHz) δ: 11.08 (br s, 1H), 9.19 (brs), 8.56 (ddd, J = 4.8, 1.6, and 0.9 Hz, 1H), 8.47 (br s, 1H), 8.09 (s, 1H), 8.02 (m, 1H), 7.89 (ddd, J = 7.7, 7.4 and 1.6 Hz, 1H), 7.82 (d, J = 4.0 Hz, 1H), 7.59 (d, J = 4.0 Hz, 1H), 7.37 (ddd, J = 7.4, 4.8 and 1.0 Hz, 1H), 7.01 (d, J = 8.6 Hz, 2H), 7.79 (d, J = 8.6 Hz, 2H), 5.22 (t, J = 7.8 Hz, 1H), 4.16 (s, 2H), 4.01 (m, 2H), 3.61 (m, 2H), 3.28 (s, 3H), 3.25 (dd, J = 14.0 and 7.8 Hz, 1H), 3.13 (dd, J = 14.0 and 7.8 Hz, 1H).

$^{13}$C NMR (DMSO-$d_6$, 75 MHz) δ: 163.7, 157.3, 150.4, 150.0, 149.7, 143.2, 142.1, 137.5, 132.6, 130.0 (2C), 127.6, 124.9, 123.8, 122.2, 119.3, 114.2 (2C), 70.4, 66.7, 61.8, 58.1, 38.3, 36.6.

| 52 | (2S)-3-(3-fluoro-4-methoxy-phenyl)-2-[4-[[[5-(2-pyridyl)-2-thienyl]sulfonylamino]methyl]triazol-1-yl]propanehydroxamic acid | B |
|---|---|---|

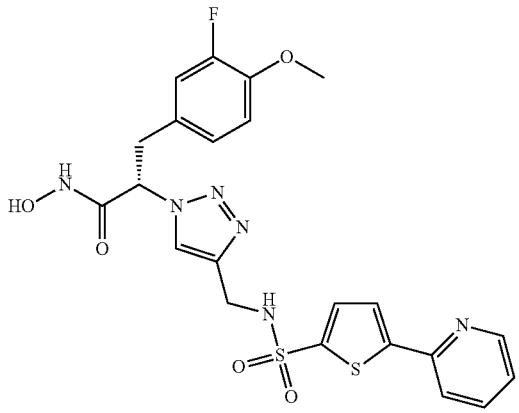 [SMILES: COc1ccc(C[C@@H](C(=O)NO)n2cc(CNS(=O)(=O)c3ccc(-c4ccccn4)s3)nn2)cc1F]

Aspect: white amorphous solid. Yield: 78%. Purity: 100%, LC tr = 2.33 min, MS (ESI+): m/z = 533 [M + H]$^+$. HRMS m/z calculated for $C_{22}H_{22}N_6O_5S_2F$ [M + H]+ 533.1077, found 533.1075.

$^1$H NMR (500 MHz, DMSO-$d_6$) δ: 11.12 (br s, 1H), 9.26 (br s, 1H), 8.55 (ddd, J = 4.8, 1.6 and 0.9 Hz, 1H), 8.49 (br s, 1H), 8.08 (s, 1H), 8.00 (m, 1H), 7.88 (ddd, J = 7.7, 7.5 and 1.6 Hz, 1H), 7.81 (d, J = 4.0 Hz, 1H), 7.58 (d, J = 4.0 Hz, 1H), 7.36 (ddd, J = 7.5, 4.9 and 0.9 Hz, 1H), 6.99 (m, 2H), 6.86 (m, 1H), 5.24 (dd, J = 8.4 and 7.5 Hz, 1H), 4.15 (s, 2H), 3.76 (s, 3H), 3.24 (dd, J = 13.9 and 7.5 Hz, 1H), 3.15 (dd, J = 13.9 and 8.4 Hz, 1H).

$^{19}$F NMR (282 MHz, DMSO-$d_6$) δ: - 136.05 (dd, J = 12.2 and 9.2 Hz).

$^{13}$C NMR (125 MHz, DMSO-$d_6$) δ: 163.7, 151.1 (d, J = 241.0 Hz), 150.5, 150.1, 149.8, 146.1 (d, J = 10.2 Hz), 143.4, 142.1, 137.0, 132.8, 128.5 (d, J = 6.4 Hz), 125.4 (d, J = 4.6 Hz), 125.1, 123.9, 122.4, 119.5, 116.5 (d, J = 18.5 Hz), 113.7, 61.7, 56.0, 38.4, 36.4.

| 53 | (2S)-3-(3-chloro-4-methoxy-phenyl)-2-[4-[[[5-(2-pyridyl)-2-thienyl]sulfonylamino]methyl]triazol-1-yl]propanehydroxamic acid | B |
|---|---|---|

| Compound of formula (I) | Synthesis route |
|---|---|

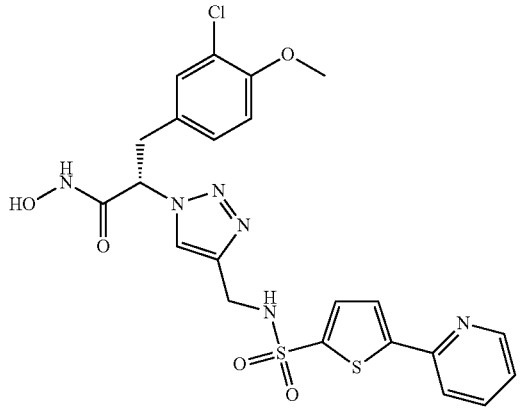 [SMILES: COc1ccc(C[C@@H](C(=O)NO)n2cc(CNS(=O)(=O)c3ccc(-c4ccccn4)s3)nn2)cc1Cl]

Aspect: white amorphous solid. Yield: 15%. Purity 95%, LC tr = 2.42 min, MS (ESI+): m/z = 549 [M + H]$^+$.

HRMS – ESI+ (m/z): calcd for $C_{23}H_{25}N_6O_6S_2$ [M + H]$^+$: 545.1277; found: 545.1265.

$^1$H NMR (DMSO-d$_6$, 300 MHz) δ: 11.04 (br, 1H), 9.23 (br, 1H), 8.56 (ddd, J = 5.0, J = 1.5, J = 1.0 Hz, 1H), 8.47 (br, 1H), 8.09 (s, 1H), 8.02 (dt, J = 1.0, J = 8.0 Hz, 1H), 7.88 (dt, J = 1.5, J = 7.5 Hz, 1H), 7.82 (d, J = 4.0 Hz, 1H), 7.59 (d, J = 4.0 Hz, 1H), 7.36 (ddd, J = 1.0 Hz, J = 5.0 Hz, 1H), 7.23 (d, J = 2.0 Hz, 1H), 7.02 (dd, J = 8.0 Hz, J = 2.0 Hz, 1H), 6.98 (d, J = 8.5 Hz, 1H), 5.25 (t, J = 8.0 Hz ,1H), 4.16 (s, 2H), 3.79 (s, 3H), 3.26 (dd, J = 14.0 Hz, J = 7.5 Hz, 1H), 3.16 (dd, J = 14.0 Hz, J = 8.0 Hz, 1H).

$^{13}$C NMR (DMSO-d$_6$, 75 MHz) δ: 163.5, 153.4, 150.4, 150.0, 149.7, 143.3, 142.0, 137.5, 132.6, 130.3, 128.9 (2C), 124.9, 123.8, 122.2, 120.6, 119.3, 112.6, 61.6, 56.0, 38.3, 36.1.

| 54 | (2S)-3-(4-ethynylphenyl)-2-[4-[[(5-phenyl-2-thienyl)sulfonylamino]methyl]triazol-1-yl]propanehydroxamic acid | B |

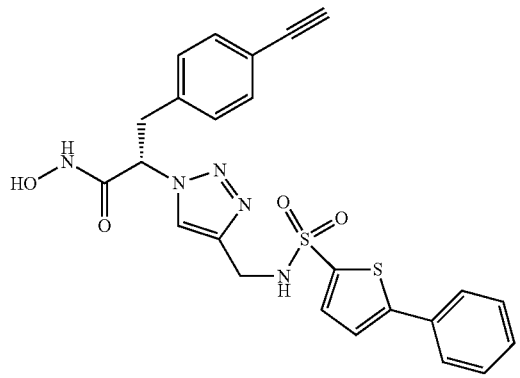 [SMILES: C#Cc1ccc(C[C@@H](C(=O)NO)n2cc(CNS(=O)(=O)c3ccc(-c4ccccc4)s3)nn2)cc1]

Aspect: clear oil. Yield: 33%. Purity: 95%. LC tr = 2.68 min, MS (ESI+): m/z = 508 [M + H]$^+$.HRMS m/z calculated for $C_{24}H_{22}N_5O_4S_2$ [M + H]+ 508.1113, found 508.1105.

$^1$H NMR (DMSO-d$_6$, 300 MHz) δ: 11.09 (br s), 1H), 8.46 (br s, 1H), 8.12 (s, 1H), 7.72 (m, 2H), 7.57 (d, J = 3.9 Hz, 1H), 7.55 (d, J = 3.9 Hz, 1H), 7.44 (m, 3H), 7.34 (m, 2H), 7.13 (m, 2H), 5.40 (br s, 1H), 5.29 (dd, J = 8.3 and 7.6 Hz, 1H), 4.16 (s, 2H), 4.15 (s, 1H), 3.33 (dd, J = 13.8 and 7.6 Hz, 1H), 3.27 (dd, J = 13.8 and 8.3 Hz, 1H).

$^{13}$C NMR (DMSO-d$_6$, 75 MHz) δ: 163.5, 149.1, 143.3, 142.5, 139.6, 136.8, 132.8, 132.2, 131.7, 129.4 (2C), 129.3 (2C), 129.1, 125.9 (2C), 124.0, 122.3, 120.3, 83.3, 80.8, 61.4, 38.3, 37.1.

| 55 | (2S)-3-[4-(N-hydroxycarbamimidoyl)phenyl]-2-[4-[[(5-phenyl-2-thienyl)sulfonylamino]methyl]triazol-1-yl]propanehydroxamic acid | B |

| Compound of formula (I) | Synthesis route |
|---|---|
| 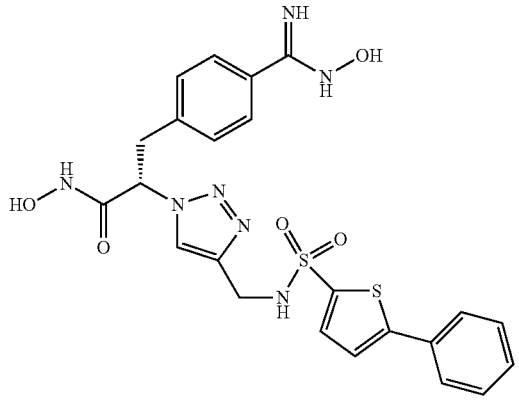 [SMILES: N=C(NO)c1ccc(C[C@@H](C(=O)NO)n2cc(CNS(=O)(=O)c3ccc(-c4ccccc4)s3)nn2)cc1] Aspect: beige solid. Yield: 60%. Purity: 95%. LC tr = 2.22 min, MS (ESI+): m/z = 542 [M + H]+.HRMS m/z calculated for $C_{23}H_{24}N_7O_5S_2$ [M+ H]+ 542.1280, found 542.1296 <br> $^1$H NMR (DMSO-d$_6$, 300 MHz) δ: 9.59 (s, 1H), 9.28 (br s, 1H), 8.13 (s, 1H), 7.72 (m, 2H), 7.47 (m, 7H), 7.12 (m, 2H), 5.32 (dd, J = 8.4 and 7.5 Hz, 1H), 4.17 (s, 2H), 3.35 (dd, J = 13.8 and 7.5 Hz, 1H), 3.26 (dd, J = 13.8 and 8.4 Hz, 1H). <br> $^{13}$C NMR (DMSO-d$_6$, 75 MHz) δ: 163.6, 150.5, 149.1, 143.3, 139.6, 136.5, 132.8, 132.3, 132.0, 129.4 (3C), 129.1, 128.7, 125.9 (3C), 125.4, 124.0, 122.3, 65.5, 38.3, 37.1. | |
| 56   (2)-3-(4-methoxyphenyl)-2-[4-[[(2-phenylthiazol-5-yl)sulfonylamino]methyl]triazol-1-yl]propanehydroxamic acid | B |
| 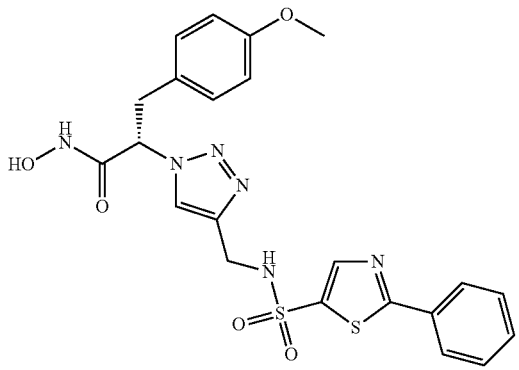 [SMILES: COc1ccc(C[C@@H](C(=O)NO)n2cc(CNS(=O)(=O)c3cnc(-c4ccccc4)s3)nn2)cc1] Aspect: white amorphous solid. Yield: 65%. Purity: 97%. LC tr = 2.47 min, MS (ESI−): m/z = 513 [M − H]−. HRMS m/z calculated for $C_{22}H_{23}N_6O_5S_2$ [M + H]+ 515.1771, found 515.1203. <br> $^1$H NMR (DMSO-d$_6$, 300 MHz) δ: 9.19 (br s, 1H), 8.90 (br s, 1H), 8.29 (s, 1H), 8.15 (s, 1H), 7.99 (m, 2H), 7.54 (m, 3H), 7.02 (m, 2H), 6.78 (m, 2H), 5.40 (br s, 1H), 5.23 (dd, J = 8.2 and 7.8 Hz, 1H), 4.22 (s, 2H), 3.68 (s, 3H), 3.27 (dd, J = 13.8 and 7.8 Hz, 1H), 3.14 (dd, J = 13.8 and 8.2 Hz, 1H). <br> $^{13}$C NMR (DMSO-d$_6$, 75 MHz) δ: 172.0, 163.7, 158.1, 146.9, 143.0, 137.0, 131.9, 131.7, 130.0 (2C), 129.5 (2C), 127.5, 126.7 (2C), 122.3, 113.7 (2C), 61.9, 54.9, 38.2, 36.6. | |
| 57   (2S)-2-[4-[cyclopropyl-[[5-(2-pyridyl)-2-thienyl]sulfonyl]amino]methyl]triazol-1-yl]-3-(4-methoxyphenyl)propanehydroxamic acid | B |
| 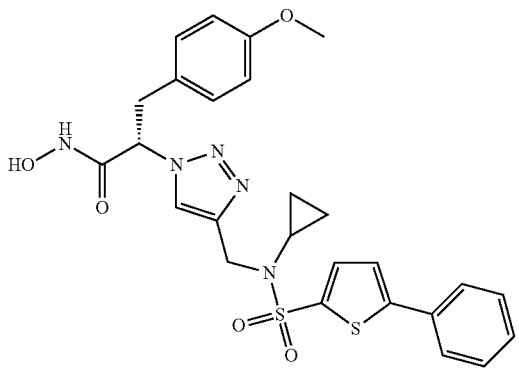 [SMILES: COc1ccc(C[C@@H](C(=O)NO)n2cc(CN(C3CC3)S(=O)(=O)c3ccc(-c4ccccc4)s3)nn2)cc1] | |

| | Compound of formula (I) | Synthesis route |
|---|---|---|
| | Aspect: white amorphous solid. Yield: 87%. Purity: 100%. LC tr = 2.68 min, MS (ESI+): m/z = 508 [M + H]+. HRMS m/z calculated for $C_{25}H_{27}N_6O_5S_2$ [M+ H]+ 555.1484, found 555.1516. $^1$H NMR (DMSO-$d_6$, 300 MHz) δ: 11.08 (br s, 1H), 9.23 (br s, 1H), 8.56 (ddd, J = 4.8, 1.7 and 0.9 Hz, 1H), 8.13 (s, 1H), 8.03 (ddd, J = 8.0, 1.0 and 0.9 Hz, 1H), 7.90 (ddd, J = 8.0, 7.4 and 1.7 Hz, 1H), 7.84 (d, J = 4.1 Hz, 1H), 7.55 (d, J = 4.1 Hz, 1H), 7.38 (ddd, J = 7.4, 4.8 and 1.0 Hz, 1H), 7.03 (m, 2H), 7.76 (m, 2H), 5.40 (br s, 1H), 5.27 (dd, J = 8.8 and 7.1 Hz, 1H), 4.46 (s, 2H), 3.67 (s, 3H), 3.24 (m, 2H), 2.19 (tt, J = 7.1 and 3.4 Hz, 1H), 0.70 (m, 4H). $^{13}$C NMR (DMSO-$d_6$, 75 MHz) δ: 163.9, 158.1, 151.0, 150.2, 149.6, 141.9, 138.4, 137.6, 133.8, 130.0 (2C), 127.5, 125.1, 123.9, 123.3, 119.4, 113.7 (2C), 61.8, 54.9, 45.5, 36.5, 30.6, 7.4, 7.1. | |
| 58 | (2S)-3-(4-methoxyphenyl)-2-[4-[1-[(5-phenyl-2-thienyl)sulfonyl]-2-piperidyl]triazol-1-yl]propanehydroxamic acid | B |
| | 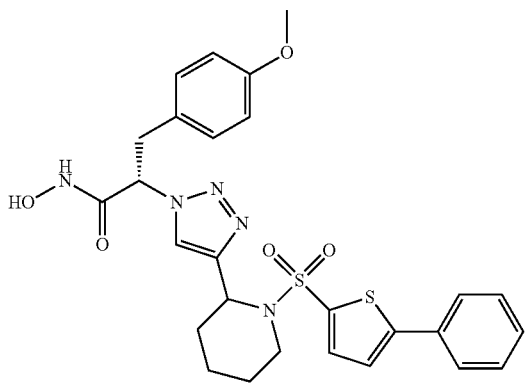 [SMILES: COc1ccc(C[C@@H](C(=O)NO)n2cc(C3CCCCN3S(=O)(=O)c3ccc(-c4ccccc4)s3)nn2)cc1] | |
| | Aspect: white amorphous solid. Yield: 49%. Purity: 95%, LC tr: 2.92 min, MS (ESI+): m/z = 568 [M + H]+. HRMS m/z calculated for $C_{27}H_{30}N_5O_5S_2$ [M + H]+ 568.1688, found 568.1641. $^1$H NMR (DMSO-$d_6$, 300 MHz) δ: 11.10 (s, 2H), 9.24 (d, J = 11.5 Hz, 2H), 8.16 (d, J = 7.4 Hz, 2H), 7.70 (m, 4H), 7.50 (d, J = 3.9 Hz, 1H), 7.48 (d, J = 4.0 Hz, 1H), 7.47 (d, J = 4.0 Hz, 1H), 7.41 (d, J = 4.0 Hz, 1H), 7.51-7.37 (m, 6H), 7.05 (m, 2H), 6.97 (m, 2H), 6.77 (m, 4H), 5.31-5.19 (m, 4H), 3.79-3.75 (m, 1H), 3.67 (m, 6H), 3.30-3.05 (m, 6H), 1.99-1.90 (m, 2H), 1.67-1.35 (m, 10H). $^{13}$C NMR (DMSO-$d_6$, 75 MHz) δ: 163.9, 163.7, 158.1, 158.1, 149.4 (2C), 145.5, 145.1, 139.0, 138.3, 133.3, 133.2, 132.1 (2C), 130.1 (2C), 130.0 (2C), 129.4 (4C), 129.2, 129.1, 127.6, 127.5, 125.9 (2C), 125.8 (2C), 124.2, 124.0, 122.2, 122.1, 113.7 (4C), 62.0, 61.9, 55.0 (2C), 49.4, 49.4, 42.0, 41.9, 36.5, 36.4, 29.0, 28.5, 24.2, 24.0, 18.1, 18.1, (1:1 diastereomeric mix). | |
| 59 | (2S)-3-(4-methoxyphenyl)-2-[4-[(2S)-1-[(5-phenyl-2-thienyl)sulfonyl]pyrrolidin-2-yl]triazol-1-yl]propanehydroxamic acid | B |
| | 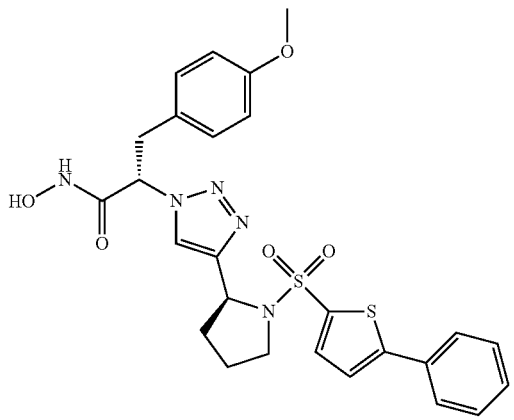 [SMILES: COc1ccc(C[C@@H](C(=O)NO)n2cc([C@@H]3CCCN3S(=O)(=O)c3ccc(-c4ccccc4)s3)nn2)cc1] | |
| | Aspect: white amorphous solid. Yield: 75%. Purity: 100%. LC tr = 2.82 min, MS (ESI−): m/z = 552 [M − H]−. HRMS m/z calculated for $C_{26}H_{28}N_5O_5S_2$ [M + H]+ 554.1532, found 554.1581. $^1$H NMR (DMSO-$d_6$, 300 MHz) δ: 11.14 (br s, 1H), 9.25 (br s, 1H), 8.26 (br s, 1H), 7.78 (m, 2H), 7.73 (d, J = 4.0 Hz, 1H), 7.66 (d, J = 4.0 Hz, 1H), 7.47 (m, 3H), 7.10 (m, 2H), 6.78 (m, 2H), 5.27 (dd, J = 8.0 and 7.6 Hz, 1H), 4.92 (dd, J = 7.5 and 2.7 Hz, 1H), 3.68 (s, 3H), 3.59 (m, 1H), 3.30 (m, 3H), 1.94-1.76 (m, 4H). $^{13}$C NMR (DMSO-$d_6$, 75 MHz) δ: 163.6, 158.1, 149.9, 148.8, 134.8, 133.9, 132.0, 130.1 (2C), 129.4 (2C), 129.3, 127.7, 126.0 (2C), 124.4, 122.0, 113.7 (2C), 62.0, 56.1, 54.9, 49.0, 36.6, 32.5, 23.8. | |
| 60 | (2S)-3-(4-cyanophenyl)-2-[4-[[(5-phenyl-2-thienyl)sulfonylamino]methyl]triazol-1-yl]propanehydroxamic acid | B |

| Compound of formula (I) | Synthesis route |
|---|---|
| 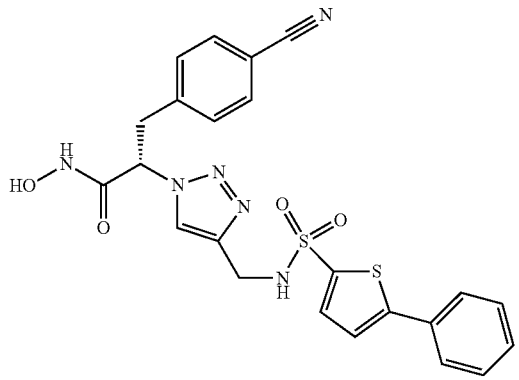 [SMILES: N#Cc1ccc(C[C@@H](C(=O)NO)n2cc(CNS(=O)(=O)c3ccc(-c4ccccc4)s3)nn2)cc1] Aspect: beige solid. Yield: 30% Purity: 100%. LC tr = 2.55 min, MS (ESI+): m/z = 509 [M + H]$^+$. HRMS m/z calculated for $C_{23}H_{21}N_6O_4S_2$ [M + H]+ 509.1066, found 509.1066. $^1$H NMR (DMSO-$d_6$, 500 MHz) δ: 11.13 (d, J = 1.1 Hz, 1H), 9.26 (d, J = 1.1 Hz, 1H), 8.47 (t, J = 6.2 Hz, 1H), 8.14 (s, 1H), 7.72 (m, 4H), 7.57 (d, J = 4.0 Hz, 1H), 7.56 (d, J = 4.0 Hz, 1H), 7.46 (m, 2H), 7.40 (m, 2H), 7.33 (m, 2H), 5.34 (dd, J = 8.6 and 7.4 Hz, 1H), 4.16 (d, J = 6.2 Hz, 2H), 3.44 (dd, J = 13.8 and 7.4 Hz, 1H), 3.36 (dd, J = 13.8 and 8.6 Hz, 1H). $^{13}$C NMR (DMSO-$d_6$, 125 MHz) δ: 163.8, 149.5, 143.9, 142.2, 140.0, 133.3, 132.7 (2C), 132.6, 130.6 (2C), 129.8 (2C), 129.6, 126.4 (2C), 124.5, 122.8, 119.2, 110.3, 61.5, 38.7, 37.6. | |

Biological Data

I. In Vitro ERAP Activity Assay

The enzymatic activity of ERAP1 or 2 was assayed using L-AMC (L-Leucine-7-amido-4-methylcoumarin hydrochloride) or R-AMC (L-Arginine-7-amido-4-methylcoumarin hydrochloride) respectively. Hepes at 50 mM with 100 mM NaCl at pH 7 was used as buffer. Briefly, 60 nL of test compounds were added in 384-wells plates (dark, non-binding surface) by acoustic dispensing with nanoacoustic dispenser Echo (Labcyte) and pre-incubated 30 minutes at ambient temperature with 10 μL of ERAP 0.8 μg/mL or 1 μg/mL or vehicle. The reaction was then started with the addition of 10 μL of substrate at 10 μM. The final concentration of ERAP, substrate and DMSO was 0.5 μg/mL, 5 μM and 0.4% respectively. For the kinetic readout a Victor 3V (Perkin-Elmer) was used with excitation at 380 nm and emission at 450 nm. The fluorescence was measured each 3 minutes during one hour.

The Z and Z' factors were calculated according to J.-H. Zhang, T. D. Y. Chung, K. R. Oldenburg, A Simple Statistical Parameter for Use in Evaluation and Validation of High Throughput Screening Assays, J. Biomol. Screen., 4 (1999) 67-73. Data analysis was performed using Xlfit® v 5.0 or GraphPad Prism® v 4.0.

Percentages of inhibition at different concentrations were obtained as described above and IC50s were carried out as 8-point dose response curves and reported as the average of at least three independent measurements. Bestatin was used as a reference inhibitor (100% inhibition at 2 mM). Data analysis was performed using Xlfit® v 5.0 or GraphPad Prism® v 4.0. Nonlinear curve fitting and statistical analysis was done using built-in functions.

Results are presented in tables 1 and 2.

TABLE 1

Activity of selected compounds of formula (I)

| | |
|---|---|
| 1 | + |
| 2 | + |
| 3 | + + |
| 4 | + |
| 5 | + + |
| 6 | + + |
| 7 | + + |
| 8 | + + |
| 9 | + |
| 10 | + + |
| 11 | + + |
| 12 | + + |
| 13 | + + |
| 14 | + + |
| 15 | + + |
| 16 | + + |
| 17 | + + |
| 18 | + + |
| 19 | + + |
| 20 | + + |
| 21 | +++ |
| 22 | +++ |
| 23 | +++ |
| 24 | +++ |
| 25 | +++ |
| 26 | +++ |
| 27 | +++ |
| 28 | +++ |
| 29 | +++ |
| 30 | + |
| 31 | + + |
| 32 | + + |
| 33 | + + |
| 34 | + + |
| 35 | + |
| 36 | +++ |
| 37 | +++ |
| 38 | +++ |
| 39 | +++ |
| 40 | +++ |
| 41 | +++ |
| 42 | +++ |
| 43 | +++ |
| 44 | +++ |

TABLE 1-continued

Activity of selected compounds of formula (I)

| | |
|---|---|
| 45 | +++ |
| 46 | +++ |
| 47 | +++ |
| 48 | ++ |
| 49 | +++ |
| 50 | + |
| 51 | +++ |
| 52 | +++ |
| 53 | +++ |
| 54 | +++ |
| 55 | +++ |
| 56 | +++ |
| 57 | ++ |
| 58 | + |
| 59 | + |
| 60 | +++ |

IC50 on ERAP2 using R-AMC as substrate
+++ (<500 nM);
++ (<5 µM);
+ (>5 µM)

TABLE 2

Activity of selected compounds of formula (I)

| | | | | | |
|---|---|---|---|---|---|
| 2 | + | 20 | + | 42 | +++ |
| 3 | + | 24 | + | 49 | + |
| 4 | + | 25 | + | 52 | + |
| 5 | + | 33 | + | 53 | ++ |
| 6 | + | 36 | + | 54 | ++ |
| 8 | + | 37 | + | 55 | ++ |
| 10 | + | 40 | + | 56 | ++ |
| 12 | + | 43 | + | 57 | + |
| 13 | + | 44 | + | 58 | ++ |
| 14 | + | 45 | + | 59 | ++ |
| 15 | + | 28 | ++ | 60 | ++ |
| 17 | + | 39 | ++ | | |
| 19 | + | 41 | ++ | | |

IC50 on ERAP1 or ERAAP using L-AMC as substrate
+++ (<500 nM);
++ (<5 µM);
+ (>5 µM)

II. Hydrolysis of Nonamer-Peptides

Enzymatic reactions were performed using KSIINFEKL peptide (from Proteogenix, Schiltigheim, FR). The enzymatic reactions were stopped at the desired time-point by dilution using iced acetonitrile (×100 dilution), before injection in LC-MS/MS to measure AUC. LC-MS/MS analysis were performed on an UPLC system Acquity I Class (Waters®), combined with a triple quadrupole mass spectrometer Xevo TQD (Waters®). The column was an Acquity BEH C18 50*2.1 mm, 1.7 µm column (Waters®) and the following mobile phases were used: 5 mM ammonium formate pH 3.75 buffer for solvent (A) and 5 mM ammonium formate pH 3.75 in acetonitrile for solvent (B). At a flow rate of 600 µL/min, the analytical method starts at 98% (A) for 10 s, then the percentage of B gradually increases at 98% till 2 minutes, hold at 98% (B) for 30 s before returning to the initial conditions, hold 1.5 minutes. The injection volume was 1 µL. MS analyses were performed under MRM detection using the parameters optimized for each peptide (capillary voltage, product ions, collision energy, desolvation temperature). The control of the equipment as well as the reprocessing of the analyses were carried out using MassLynx software (Waters®). For XSIINFEKL, 100% corresponds to the AUC of the peptide at t=0 without enzyme. Dose-response curves with compounds were performed at t=60 min.

Results are presented in table 3.

TABLE 3

Inhibition of the ERAP2-mediated hydrolysis of KSIINFEKL into SIINFEKL by compounds 23, 24

| Cpd # | IC$_{50}$ µM |
|---|---|
| 24 | 1.72 |
| 23 | 2.21 |

III. Example of Antigen Presentation Assay

Using Jetprime according to the manufacturer's recommendations, HEK293 cells are transiently transfected with a single plasmid encoding i) the 14 amino-acids HiBiT tag (part of the nanoluciferase) fused to the N-terminal end of mouse H2kB, ii) an ER-targeted N terminally extended antigenic precursor peptide for L-SIINFEKL, and iii) a TAP inhibitor (UL49.5 protein). The cells are harvested 4 h post-transfection and plated in 96 wells-plate format in which the studied compounds are previously dispensed. The amount of a HiBiT-tagged H2kB protein present on the cell surface is determined 24 h later using the Nano-Glo® HiBiT Extracellular Detection System (Promega). The results are presented on FIG. 1.

BIBLIOGRAPHY

[1] Serwold T, Gonzalez F, Kim J, Jacob R, & Shastri N (2002) ERAAP customizes peptides for MHC class I molecules in the endoplasmic reticulum. Nature 419(6906):480-483.

[2] Saveanu L, et al. (2005) Concerted peptide trimming by human ERAP1 and ERAP2 aminopeptidase complexes in the endoplasmic reticulum. Nat Immunol 6(7):689-697.

[3] J. A. López de Castro, How ERAP1 and ERAP2 Shape the Peptidomes of Disease-Associated MHC-I Proteins, Front Immunol, 9 (2018) 2463.

[4] Hammer G E, Gonzalez F, James E, Nolla H, & Shastri N (2007) In the absence of aminopeptidase ERAAP, MHC class I molecules present many unstable and highly immunogenic peptides. Nat Immunol 8(1): 101-108.

[5] Y. Yao, N. Liu, Z. Zhou, L. Shi, Influence of ERAP1 and ERAP2 gene polymorphisms on disease susceptibility in different populations, Hum. Immunol., 80 (2019) 325-334.

[6] A. L. Hanson, T. Cuddihy, K. Haynes, D. Loo, C. J. Morton, U. Oppermann, P. Leo, G. P. Thomas, K.-A. Lê Cao, T. J. Kenna, M. A. Brown, Genetic Variants in ERAP1 and ERAP2 Associated With Immune-Mediated Diseases Influence Protein Expression and the Isoform Profile, Arthritis & Rheumatology, 70 (2018) 255-265.

[7] M. Compagnone, L. Cifaldi, D. Fruci, Regulation of ERAP1 and ERAP2 genes and their disfunction in human cancer, Hum. Immunol., 80 (2019) 318-324.

[8] Cifaldi, E. Lo Monaco, M. Forloni, E. Giorda, S. Lorenzi, S. Petrini, et al., Natural killer cells efficiently reject lymphoma silenced for the endoplasmic reticulum aminopeptidase associated with antigen processing, Cancer Res. 71 (2011) 1597.

[9] L. Cifaldi, P. Romania, M. Falco, S. Lorenzi, R. Meazza, S. Petrini, et al., ERAP1 regulates natural killer cell function by controlling the engagement of inhibitory receptors, Cancer Res. 75 (2015) 824

[10] E. James, I. Bailey, G. Sugiyarto, T. Elliott, Induction of protective antitumor immunity through attenuation of ERAAP function, J. Immunol. 190 (2013) 5839.

[11] Y. W. Lim, H. Chen-Harris, O. Mayba, S. Lianoglou, A. Wuster, T. Bhangale, et al., Germline genetic polymorphisms influence tumor gene expression and immune cell infiltration, Proc. Natl. Acad. Sci. U.S.A. 115 (2018) E11701.

[12] R. T. Manguso, H. W. Pope, M. D. Zimmer, F. D. Brown, K. B. Yates, B. C. Miller, et al., In vivo CRISPR screening identifies Ptpn2 as a cancer immunotherapy target, Nature 547 (2017) 413.

[13] I. Saulle, I., et al. An overview on erap roles in infectious diseases. *Cells* 2020, 9.

[14] I. Saulle, C. Vanetti, S. Goglia, C. Vicentini, E. A.-O. Tombetti, M. Garziano, M. Clerici, M. A.-O. Biasin, A New ERAP2/Iso3 Isoform Expression Is Triggered by Different Microbial Stimuli in Human Cells. Could It Play a Role in the Modulation of SARS-CoV-2 Infection? LID—E1951.

[15] E. Zervoudi, E. Saridakis, J. R. Birtley, S. S. Seregin, E. Reeves, P. Kokkala, Y. A. Aldhamen, A. Amalfitano, I. M. Mavridis, E. James, D. Georgiadis, E. Stratikos, Rationally designed inhibitor targeting antigen-trimming aminopeptidases enhances antigen presentation and cytotoxic T-cell responses, Proc. Natl. Acad. Sci. U.S.A, 110 (2013) 19890-19895.

[16] Z. Maben, R. Arya, D. Rane, W. F. An, S. Metkar, M. Hickey, S. Bender, A. Ali, T. T. Nguyen, I. Evnouchidou, R. Schilling, E. Stratikos, J. Golden, L. J. Stern, Discovery of Selective Inhibitors of Endoplasmic Reticulum Aminopeptidase 1, J. Med. Chem., 63 (2020) 103-121.

[17] Patent application GR 20130100582; Patent application WO 2020/104822 A1

[18] Chen, L., et al Silencing or inhibition of endoplasmic reticulum aminopeptidase 1 (ERAP1) suppresses free heavy chain expression and Th17 responses in ankylosing spondylitis. *Ann. Rheum. Dis.*, 2016, 75, 916-23.

[19] Koumantou, D et al Editing the Immunopeptidome of Melanoma Cells Using a Potent Inhibitor of Endoplasmic Reticulum Aminopeptidase 1. *Cancer Immunol. Immunother.* 2019, 68, 1245-1261.

The invention claimed is:

1. A compound of formula (I):

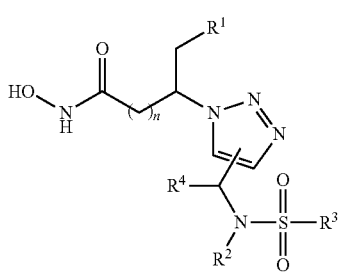

(I)

wherein:
n is 0 or 1;
$R^1$ is selected from the group consisting of phenyl, naphthalenyl, indolyl and benzodioxolyl, wherein said phenyl, naphthalenyl, indolyl and benzodioxolyl may be substituted by one more substituents selected from the group consisting of hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy;

$R^3$ is a 5- or 6-membered heteroaryl comprising one sulfur atom and optionally one further nitrogen, sulfur or oxygen atom, wherein said 5- or 6-membered heteroaryl may be substituted by one or more substituents selected from the group consisting of halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl;

$R^2$ is hydrogen, $C_1$-$C_6$-alkyl or $C_3$-$C_6$-cycloalkyl; and $R^4$ is selected from the group consisting of hydrogen, $C_1$-$C_6$-alkyl, —$CH_2$—O—$R^{a4}$, —$CH_2$—C(=O)$R^{b4}$ and —$CH_2$—NH—C(=O)$R^{c4}$, wherein $R^{a4}$ is hydrogen or $C_1$-$C_6$-alkyl, $R^{b4}$ is hydroxyl, $C_1$-$C_6$-alkoxy, amino or $C_1$-$C_6$-alkylcarbonylamino and $R^{c4}$ is $C_1$-$C_6$-alkoxy, or $R^2$ and $R^4$ form together with the nitrogen and carbon atoms to which they are attached a 5- or 6-membered heteroaryl selected from pyrrolidinyl morpholinyl, thiazolidinyl and piperidinyl;

or hydrates, solvates, or salts thereof.

2. The compound of formula (I) according to claim 1 wherein $R^1$ is selected from the group consisting of phenyl, indol-3-yl, naphthalen-2-yl and 1,3-benzodioxol-5-yl, wherein said phenyl, indol-3-yl, naphthalen-2-yl and 1,3-benzodioxol-5-yl may be substituted by one more substituents selected from the group consisting of hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl amidoxime and phenoxy.

3. The compound of formula (I) according to claim 1 wherein $R^1$ is

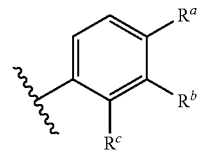

wherein $R^a$, $R^b$ and $R^c$ are independently selected from the group consisting of hydrogen, hydroxyl, halogen, cyano, $C_1$-$C_6$-alkyl, $C_1$-$C_6$-halogenoalkyl, $C_1$-$C_6$-alkoxy, $C_1$-$C_6$-halogenoalkoxy, $C_1$-$C_6$-hydroxyalkoxy, $C_1$-$C_6$-alkoxy-$C_1$-$C_6$-alkoxy, ethynyl, carbamoyl, $C_1$-$C_6$-alkylcarbamoyl, polyoxyethylenyl, amidoxime and phenoxy.

4. The compound of formula (I) according to claim 1 wherein $R^3$ is a 5- or 6-membered heteroaryl selected from the group consisting of thiophenyl, thiazolyl, isothiazolyl, thiopyranyl, dithiinyl and thiazinyl, wherein said 5- or 6-membered heteroaryl may be substituted as recited in claim 1.

5. The compound of formula (I) according to claim 1 wherein $R^3$ is a 5-membered heteroaryl selected from the group consisting of thiophenyl, thiazolyl and isothiazolyl, wherein said thiophenyl, thiazolyl and isothiazolyl may be substituted as recited in claim 1.

6. The compound of formula (I) according to claim 1 wherein $R^3$ is

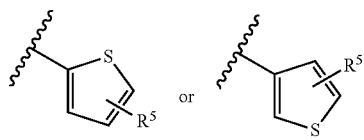

wherein R[5] is selected from the group consisting of hydrogen, halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

7. The compound of formula (I) according to claim 1 wherein R[3] is

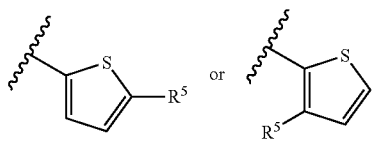

wherein R[5] is selected from the group consisting of hydrogen, halogen, $C_1$-$C_6$-alkyl, phenyl and pyridyl, wherein said phenyl and pyridyl may be substituted by one or more substituents selected from the group consisting of halogen, $C_1$-$C_6$-alkyl, phenyl, pyridyl, $C_1$-$C_6$-aminoalkyl and $C_1$-$C_6$-alkylcarbamoyl.

8. The compound of formula (I) according to claim 1 wherein the compound of formula (I) has the following formula:

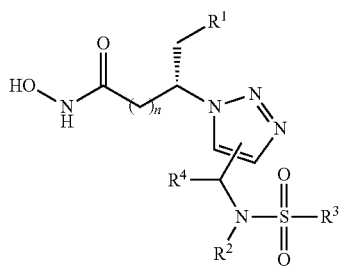

(I)

wherein n, R[1], R[2], R[3] and R[4] are as recited in any of the preceding claims.

9. The compound of formula (I) according to claim 1 which is:
- (R)—N-hydroxy-4-(1H-indol-3-yl)-3-(4-((5-phenylthiophene-2-sulfonamido)methyl)-1H-1,2,3-triazol-1-yl)butanamide;
- (R)—N-hydroxy-3-(1H-indol-3-yl)-2-(4-((5-phenylthiophene-2-sulfonamido)methyl)-1H-1,2,3-triazol-1-yl)propenamide;
- (S)—N-hydroxy-3-(1H-indol-3-yl)-2-(4-((N-methyl-5-phenylthiophene-2-sulfonamido)methyl)-1H-1,2,3-triazol-1-yl)propenamide;
- (S)—N-hydroxy-3-(1H-indol-3-yl)-2-(4-((5-phenylthiophene-2-sulfonamido)methyl)-1H-1,2,3-triazol-1-yl)propenamide;
- (S)-2-(4-((5-bromothiophene-2-sulfonamido)methyl)-1H-1,2,3-triazol-1-yl)-N-hydroxy-3-(1H-indol-3-yl)propenamide;
- (R)—N-hydroxy-4-(naphthalen-2-yl)-3-(4-((5-phenylthiophene-2-sulfonamido)methyl)-1H-1,2,3-triazol-1-yl)butanamide;
- (S)—N-hydroxy-4-(4-hydroxyphenyl)-3-(4-((N-methyl-5-phenylthiophene-2-sulfonamido)methyl)-1H-1,2,3-triazol-1-yl)butanamide;
- (R)—N-hydroxy-3-(4-hydroxyphenyl)-2-(4-((5-phenylthiophene-2-sulfonamido)methyl)-1H-1,2,3-triazol-1-yl)propenamide;
- (S)—N-hydroxy-4-(4-hydroxyphenyl)-3-(4-((N-methyl-5-phenylthiophene-2-sulfonamido)methyl)-1H-1,2,3-triazol-1-yl)butanamide;
- (S)—N-hydroxy-3-(4-hydroxyphenyl)-2-(4-((5-phenylthiophene-2-sulfonamido)methyl)-1H-1,2,3-triazol-1-yl)propenamide;
- (S)-4-(5-(N-((1-(1-(hydroxyamino)-3-(4-hydroxyphenyl)-1-oxopropan-2-yl)-1H-1,2,3-triazol-4-yl)methyl)sulfamoyl)thiophen-2-yl)-N-methylbenzamide;
- (S)—N-hydroxy-3-(4-hydroxyphenyl)-2-(4-((N-methyl-5-phenylthiophene-2-sulfonamido)methyl)-1H-1,2,3-triazol-1-yl)propenamide;
- (S)-2-(4-((5-bromothiophene-2-sulfonamido)methyl)-1H-1,2,3-triazol-1-yl)-N-hydroxy-3-(4-hydroxyphenyl)propenamide;
- (S)—N-hydroxy-3-(4-hydroxyphenyl)-2-(4-((thiophene-2-sulfonamido)methyl)-1H-1,2,3-triazol-1-yl)propenamide;
- (S)—N-hydroxy-3-(4-hydroxyphenyl)-2-(4-((thiophene-2-sulfonamido)methyl)-1H-1,2,3-triazol-1-yl)propenamide;
- (2S)-3-(4-hydroxyphenyl)-2-[4-[(3-thienylsulfonylamino)methyl]triazol-1-yl]propanehydroxamic acid
- (2S)-2-[4-[[(3-bromo-2-thienyl)sulfonylamino]methyl]triazol-1-yl]-3-(4-hydroxyphenyl)propanehydroxamic acid;
- (2S)-3-(4-hydroxyphenyl)-2-[4-[[[5-(2-pyridyl)-2-thienyl]sulfonylamino]methyl]triazol-1-yl]propanehydroxamic acid;
- (R)—N-hydroxy-3-(4-hydroxyphenyl)-2-(4-((5-(pyridin-2-yl)thiophene-2-sulfonamido)methyl)-1H-1,2,3-triazol-1-yl)propanamide;
- (S)—N-hydroxy-2-(4-((5-(pyridin-2-yl)thiophene-2-sulfonamido)methyl)-1H-1,2,3-triazol-1-yl)-3-(4-(trifluoromethoxy)phenyl)propanamide;
- (S)—N-hydroxy-2-(4-((5-phenylthiophene-2-sulfonamido)methyl)-1H-1,2,3-triazol-1-yl)-3-(4-(trifluoromethoxy)phenyl)propenamide;
- (S)—N-hydroxy-3-(4-phenoxyphenyl)-2-(4-((5-(pyridin-2-yl)thiophene-2-sulfonamido)methyl)-1H-1,2,3-triazol-1-yl)propenamide;
- (S)—N-hydroxy-3-(4-methoxyphenyl)-2-(4-((5-phenylthiophene-2-sulfonamido)methyl)-1H-1,2,3-triazol-1-yl)propenamide;
- (S)—N-hydroxy-3-(4-methoxyphenyl)-2-(4-((5-(pyridin-2-yl)thiophene-2-sulfonamido)methyl)-1H-1,2,3-triazol-1-yl)propenamide;
- (2S)-3-(4-tert-butoxyphenyl)-2-[4-[[(5-phenyl-2-thienyl)sulfonylamino]methyl]triazol-1-yl]propanehydroxamic acid;
- (2S)-3-(4-tert-butoxyphenyl)-2-[4-[[[5-(2-pyridyl)-2-thienyl]sulfonylamino]methyl]triazol-1-yl]propanehydroxamic acid;
- (S)-4-(5-(N-((1-(1-(hydroxyamino)-3-(4-methoxyphenyl)-1-oxopropan-2-yl)-1H-1,2,3-triazol-4-yl)methyl)sulfamoyl)thiophen-2-yl)-N-methylbenzamide;

(S)—N-hydroxy-3-(4-hydroxyphenyl)-2-(4-((5-(pyridin-3-yl)thiophene-2-sulfonamido)methyl)-1H-1,2,3-triazol-1-yl)propenamide;
(3R)-4-(1H-indol-3-yl)-3-[5-[[(5-phenyl-2-thienyl)sulfonylamino]methyl]triazol-1-yl]butanehydroxamic acid;
(3S)-4-(4-hydroxyphenyl)-3-[5-[[(5-phenyl-2-thienyl)sulfonylamino]methyl]triazol-1-yl]butanehydroxamic acid;
(S)—N-hydroxy-4-(4-hydroxyphenyl)-3-(4-((N-methyl-5-phenylthiophene-2-sulfonamido)methyl)-1H-1,2,3-triazol-1-yl)butanamide;
(3S)-4-(4-hydroxyphenyl)-3-[5-[[[5-(2-pyridyl)-2-thienyl]sulfonylamino]methyl]triazol-1-yl]butanehydroxamic acid;
(2S)-3-(4-hydroxyphenyl)-2-[5-[[(5-phenyl-2-thienyl)sulfonylamino]methyl]triazol-1-yl]propanehydroxamic acid;
(2R)-3-(4-hydroxyphenyl)-2-[5-[[(5-phenyl-2-thienyl)sulfonylamino]methyl]triazol-1-yl]propanehydroxamic acid;
(2S)-3-(4-methoxyphenyl)-2-[4-[[[5-(4-pyridyl)-2-thienyl]sulfonylamino]methyl]triazol-1-yl]propanehydroxamic acid;
(2S)-3-(1,3-benzodioxol-5-yl)-2-[4-[[[5-(2-pyridyl)-2-thienyl]sulfonylamino]methyl]triazol-1-yl]propanehydroxamic acid;
(2S)-3-(4-methoxyphenyl)-2-[4-[[[5-(3-pyridyl)-2-thienyl]sulfonylamino]methyl]triazol-1-yl]propanehydroxamic acid;
(2S)-3-(3-chloro-4-hydroxy-phenyl)-2-[4-[[[5-(2-pyridyl)-2-thienyl]sulfonylamino]methyl]triazol-1-yl]propanehydroxamic acid;
(2S)-3-(3-chloro-4-hydroxy-phenyl)-2-[4-[[(5-phenyl-2-thienyl)sulfonylamino]methyl]triazol-1-yl]propanehydroxamic acid;
(2S)-3-(3,4-dimethoxyphenyl)-2-[4-[[[5-(2-pyridyl)-2-thienyl]sulfonylamino]methyl]triazol-1-yl]propanehydroxamic acid;
(2S)-3-(3,4-dimethoxyphenyl)-2-[4-[[(5-phenyl-2-thienyl)sulfonylamino]methyl]triazol-1-yl]propanehydroxamic acid;
3-[5-[[1-[(1 S)-2-(hydroxyamino)-1-[(4-methoxyphenyl)methyl]-2-oxo-ethyl]triazol-4-yl]methylsulfamoyl]-2-thienyl]-N-methyl-benzamide;
(2S)-3-(3-fluoro-4-hydroxy-phenyl)-2-[4-[[[5-(2-pyridyl)-2-thienyl]sulfonylamino]methyl]triazol-1-yl]propanehydroxamic acid;
(2S)-3-(3-fluoro-4-hydroxy-phenyl)-2-[4-[[(5-phenyl-2-thienyl)sulfonylamino]methyl]triazol-1-yl]propanehydroxamic acid;
(2S)-3-(4-methoxyphenyl)-2-[4-[[methyl-[[5-(2-pyridyl)-2-thienyl]sulfonyl]amino]methyl]triazol-1-yl]propanehydroxamic acid;
(2S)-3-(4-methoxyphenyl)-2-[4-[(1 S)-1-[[5-(2-pyridyl)-2-thienyl]sulfonylamino]ethyl]triazol-1-yl]propanehydroxamic acid; or
(2S)-3-(4-methoxyphenyl)-2-[4-[(1R)-1-[[5-(2-pyridyl)-2-thienyl]sulfonylamino]ethyl]triazol-1-yl]propanehydroxamic acid; or
(2S)-3-(3-methoxyphenyl)-2-[4-[[[5-(2-pyridyl)-2-thienyl]sulfonylamino]methyl]triazol-1-yl]propanehydroxamic acid; or
(2S)-3-(2-methoxyphenyl)-2-[4-[[[5-(2-pyridyl)-2-thienyl]sulfonylamino]methyl]triazol-1-yl]propanehydroxamic acid; or
(2S)-3-[4-(2-methoxyethoxy)phenyl]-2-[4-[[[5-(2-pyridyl)-2-thienyl]sulfonylamino]methyl]triazol-1-yl]propanehydroxamic acid; or
(2S)-3-(3-fluoro-4-methoxy-phenyl)-2-[4-[[[5-(2-pyridyl)-2-thienyl]sulfonylamino]methyl]triazol-1-yl]propanehydroxamic acid; or
(2S)-3-(3-chloro-4-methoxy-phenyl)-2-[4-[[[5-(2-pyridyl)-2-thienyl]sulfonylamino]methyl]triazol-1-yl]propanehydroxamic acid; or
(2S)-3-(4-ethynylphenyl)-2-[4-[[(5-phenyl-2-thienyl)sulfonylamino]methyl]triazol-1-yl]propanehydroxamic acid; or
(2S)-3-[4-(N-hydroxycarbamimidoyl)phenyl]-2-[4-[[(5-phenyl-2-thienyl)sulfonylamino]methyl]triazol-1-yl]propanehydroxamic acid; or
(2S)-3-(4-methoxyphenyl)-2-[4-[[(2-phenylthiazol-5-yl)sulfonylamino]methyl]triazol-1-yl]propanehydroxamic acid; or
(2S)-2-[4-[[cyclopropyl-[[5-(2-pyridyl)-2-thienyl]sulfonyl]amino]methyl]triazol-1-yl]-3-(4-methoxyphenyl)propanehydroxamic acid; or
(2S)-3-(4-methoxyphenyl)-2-[4-[1-[(5-phenyl-2-thienyl)sulfonyl]-2-piperidyl]triazol-1-yl]propanehydroxamic acid; or
(2S)-3-(4-methoxyphenyl)-2-[4-[(2S)-1-[(5-phenyl-2-thienyl)sulfonyl]pyrrolidin-2-yl]triazol-1-yl]propanehydroxamic acid; or
(2S)-3-(4-cyanophenyl)-2-[4-[[(5-phenyl-2-thienyl)sulfonylamino]methyl]triazol-1-yl]propanehydroxamic acid.

10. A pharmaceutical composition comprising at least one compound of formula (I) according to claim 1 and one or more excipients.

11. A method for the treatment or prophylaxis of proliferative disorders, autoinflammatory disorders and autoimmune disorders in a subject comprising administering to the subject a therapeutically effective amount of at least one compound of formula (I) according to claim 1.

12. A method for the treatment or prophylaxis of cancers, spondyloarthritis, Birdshot retinochoroidopathy, type-1 diabetes, Behcet's disease and psoriasis in a subject comprising administering to the subject a therapeutically effective amount of at least one compound of formula (I) according to claim 1.

13. A pharmaceutical combination comprising at least one compound of formula (I) according to claim 1 and one or more additional pharmaceutically active agents.

14. The pharmaceutical combination according to claim 13 wherein said additional pharmaceutically active agent is an anticancer agent, a disease-modifying anti-rheumatic drug (DMARD), an antiviral or antibacterial agent or another ERAP1 or ERAP2 or IRAP inhibitor.

15. A pharmaceutical composition comprising at least one compound of formula (I) according to claim 9 and one or more excipients.

16. A method for the treatment or prophylaxis of proliferative disorders, autoinflammatory disorders and autoimmune disorders in a subject comprising administering to the subject, that may be human or animal, a therapeutically effective amount of at least one compound of formula (I) according to claim 9.

17. A method for the treatment or prophylaxis of cancers, spondyloarthritis, Birdshot retinochoroidopathy, type-1 diabetes, Behcet's disease and psoriasis in a subject comprising administering to the subject a therapeutically effective amount of at least one compound of formula (I) according to claim 9.

* * * * *